United States Patent [19]

Bryan et al.

[11] Patent Number: 4,641,262
[45] Date of Patent: Feb. 3, 1987

[54] PERSONAL COMPUTER ATTACHMENT FOR HOST SYSTEM DISPLAY STATION

[75] Inventors: Barry L. Bryan, Woodstock; Martin Druckerman, Poughkeepsie; Allen W. McDowell, Lake Katrine; Ira H. Schneider, Kingston; Gary L. Newkirk, New Paltz, all of N.Y.

[73] Assignee: International Business Machines Corporation, Armonk, N.Y.

[21] Appl. No.: 585,813

[22] Filed: Mar. 2, 1984

Related U.S. Application Data

[63] Continuation-in-part of Ser. No. 473,058, Mar. 7, 1983, abandoned.

[51] Int. Cl.[4] .................. G06Z 15/00; G06Z 3/00
[52] U.S. Cl. .................................. 364/900; 340/745
[58] Field of Search ... 364/200 MS File, 900 MS File, 364/521; 340/721, 745; 358/181

[56] References Cited

U.S. PATENT DOCUMENTS

| 4,115,868 | 9/1978 | Suzuki et al. | 364/900 |
| 4,271,479 | 6/1981 | Cheselka et al. | 364/900 |
| 4,313,176 | 1/1982 | Cecil | 364/900 |
| 4,324,954 | 4/1982 | Taylor | 179/90 B |
| 4,433,392 | 2/1984 | Beaven | 364/900 |
| 4,445,115 | 4/1984 | Rudgard | 340/745 |
| 4,458,311 | 7/1984 | Clements et al. | 364/200 |

OTHER PUBLICATIONS

"Intelligent Processor Feature Attachment to a Fixed Function Display Terminal" by Pellacto et al., IBM Technical Disclosure Bulletin, vol. 24, No. 7A, Dec., 1981, pp. 3533-3534.

*Primary Examiner*—James D. Thomas
*Assistant Examiner*—Thomas C. Lee
*Attorney, Agent, or Firm*—Frederick D. Poag; C. Lamont Whitham

[57] ABSTRACT

A personal computer attachment is provided for a display station of the type that communicates with a host computer (48). The display station has a display unit (10) and a keyboard (12) to which a personal computer system unit (14) is attached. The personal computer system unit typically supports floppy diskette drives (16) and a printer (18). The display unit includes a CRT (38), a regeneration buffer (42), a keyboard adapter (46) and a feature bus (44). The personal computer system unit includes a system bus, a microprocessor, memory, a keyboard adapter and I/O interface connected to the system bus. A display adapter (26 or 28) is connected to the I/O interface. An analog input switch (52) is disposed between the buffer (42) and the analog circuits driving the CRT (38). This switch has a second input from the display adapter (26 or 28) and is controlled from inputs from the keyboard (12) to selectively supply image data from the buffer (42) or the display adapter (26 or 28). An attachment adapter (36) mates with the I/O interface of the personal computer system unit. The adapter (36) includes an input/output interface (54), a switch control (56), a two-way keyboard adapter (58) and a feature bus adapter (60). The keyboard (12) is connected to the two-way keyboard adapter (58). Each of the switch control (56), the two-way keyboard adapter (58) and the feature bus adapter (60) communicate with the system bus of the personal computer system unit via the input/output interface. The switch control (56) is also connected to the control input of the analog input switch (52). The two-way keyboard adapter (58) is also connected to the keyboard adapter in the display station and the keyboard adapter in the personal computer system unit. The feature bus adapter (60) is also connected to the feature bus (44) of the display station. This arrangement allows keystroke signals from the keyboard (12) to be transmitted by the two-way keyboard adapter (58) via the input/output interface (54) and system bus to the memory in the personal computer system unit for interpretation by the microprocessor and then retransmitted back to the two-way keyboard adapter and then to a designated one of the keyboard adapters in either the display station or the personal computer system unit. The switch control is responsive to a unique keystroke signal to control the analog input switch (52). In this way, the operator can control the mode of operation between either a host mode or a personal computer mode. Further, data transfer can be made between the host computer and the personal computer.

16 Claims, 22 Drawing Figures

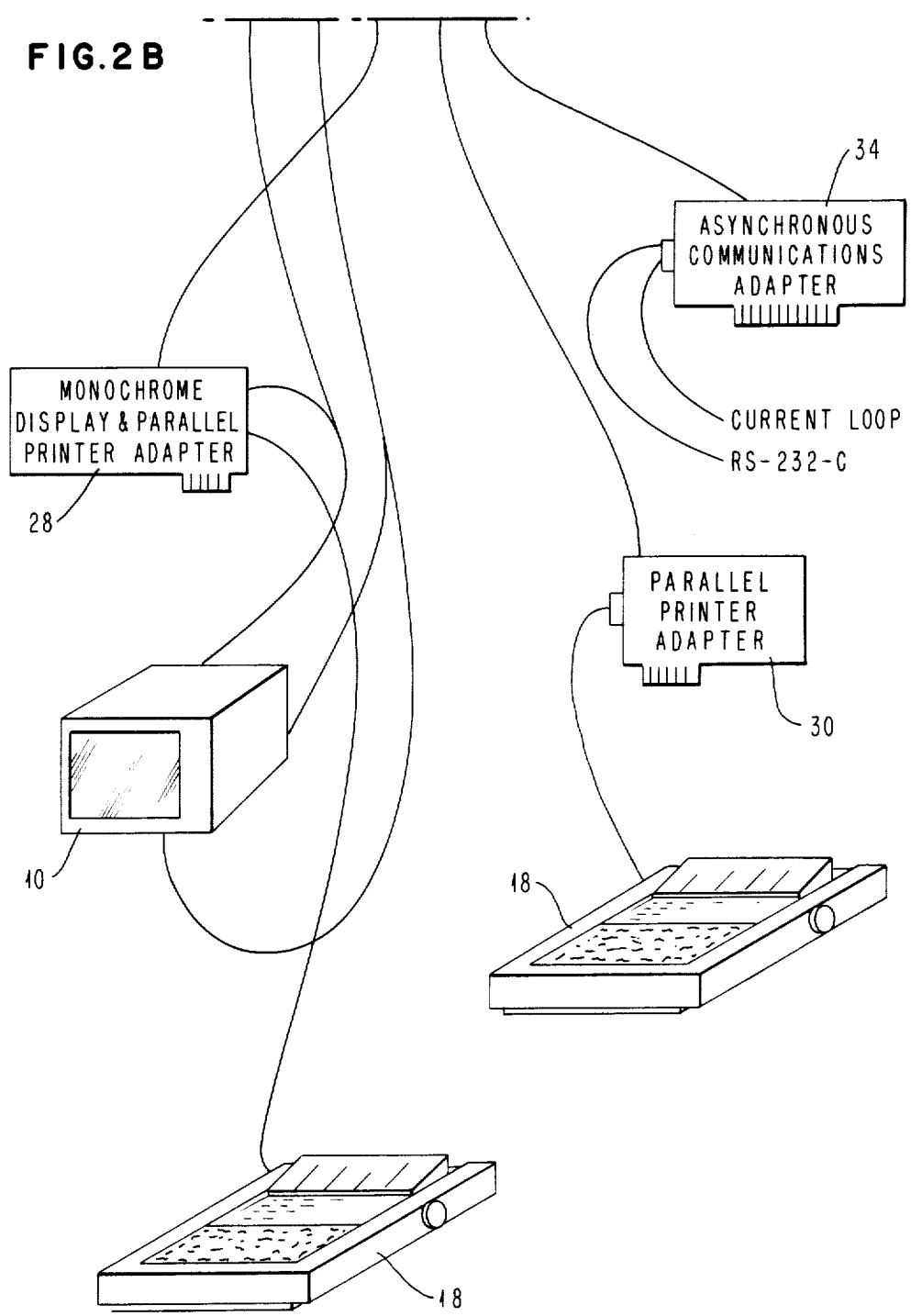

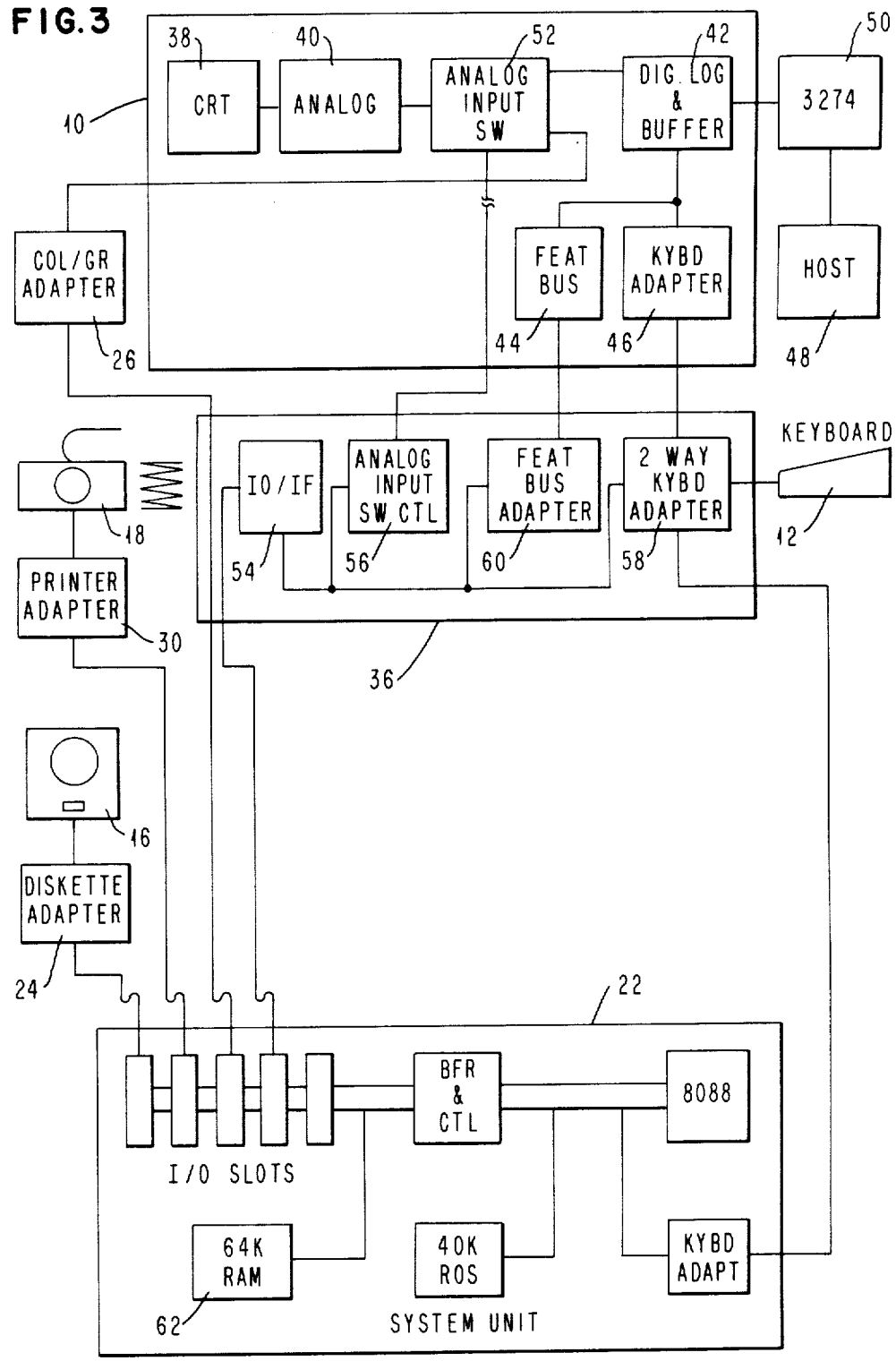

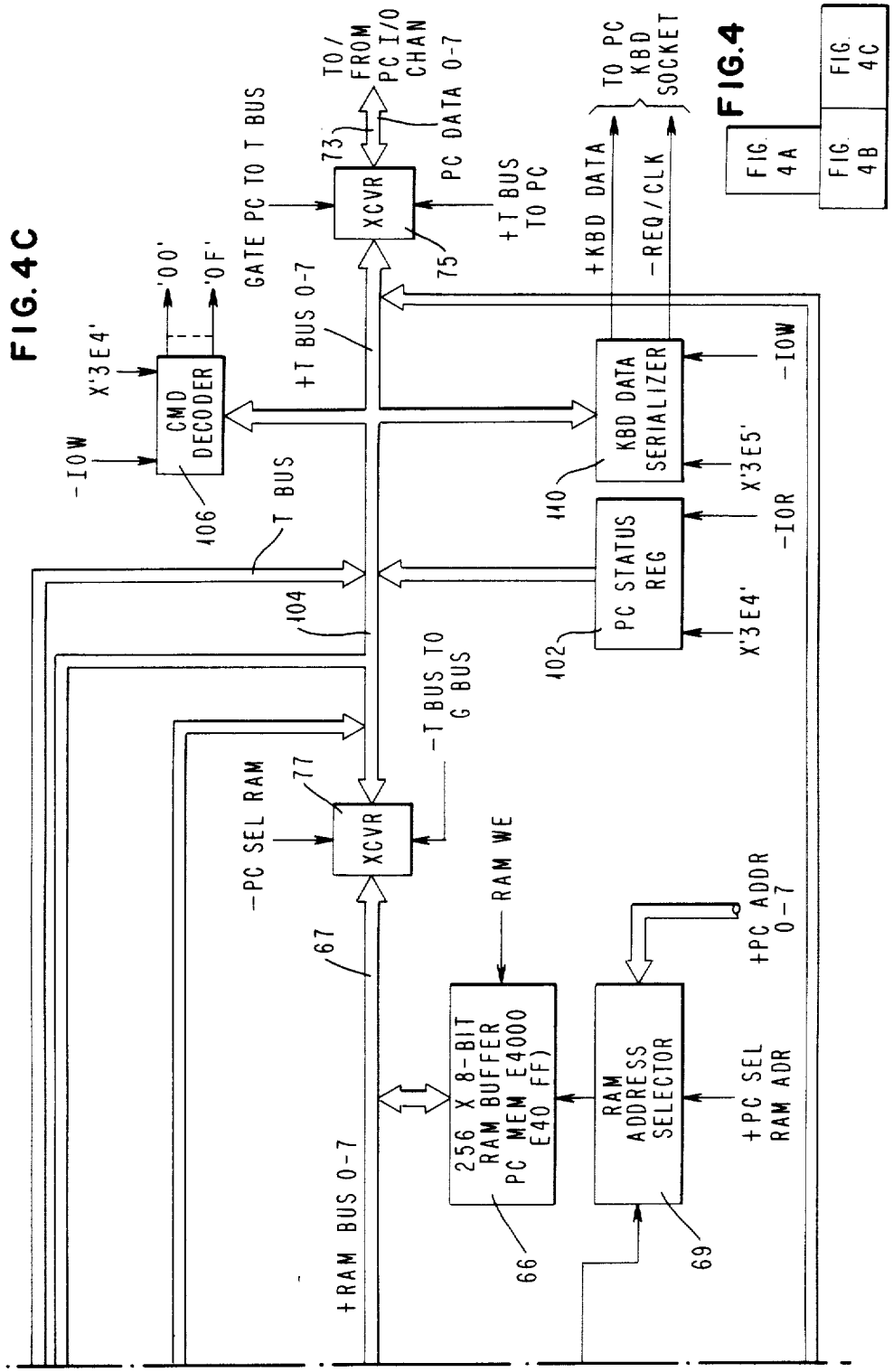

PERSONAL COMPUTER ATTACHMENT FOR HOST SYSTEM DISPLAY STATION

CROSS REFERENCE TO RELATED APPLICATION

This application is a continuation-in-part of application Ser. No. 06/473,058, filed Mar. 7, 1983, now abandoned.

FIELD OF THE INVENTION

The present invention generally relates to data processing systems of the type having a central host computer and a plurality of display stations each typically having a keyboard and a display such as a CRT, and more particularly to a personal computer attachment for the display stations to allow the display stations to operate with the host or with the personal computer and to allow the transfer of files between the host and the personal computer and the printing of the data displayed on the screen of the CRT.

BACKGROUND OF THE INVENTION

Data processing systems are known where a plurality of display systems communicate with a central host computer. These display systems typically include a base unit which acts as a display and supports a keyboard for operation as a keyboard/display terminal that communicates with the host via a controller. The terminal may interface with a plurality of features connected thereto such as a card reader or a light pen. The base unit and the features receive transmission from the controller via a feature bus in the base unit and also transmit to the controller via this feature bus. The base unit also provides priority control in permitting features to respond to a controller poll. Commands are also directly addressable to the base unit and features by the controller. Typical of such systems are the IBM 3270 information display system, the IBM 3274 control unit and the IBM 3278 display stations.

In such systems, the display stations are used to access data and run programs on the host. Storage of data or printing a hard copy typically are accomplished using bulk storage media or printers associated with the host computer. These may not always be readily accessible or available to a display station operator. Moreover, some data may be sensitive or confidential, and the operator may desire to exercise direct control over the bulk storage media on which the data is stored or the hard copy produced by the printer. Current display stations do not provide this access or flexibility. Recently, small desk top or so-called personal computers have been introduced on the market. These typically include a system unit containing a microprocessor, read only storage (ROS), random access memory (RAM), and various adapters connected to the system unit bus to allow connection of a keyboard, a CRT display, one or more floppy diskette drives, possibly one or more hard disk drives, and a printer. A personal computer would provide the display station operator with accessibility to both bulk storage media, in this case a floppy diskette, and a printer, but to simply provide the display station operator with a personal computer would be a duplication of equipment and no ability to use host files on the personal computer and vice versa.

It is therefore an object of this invention to provide a personal computer attachment for a display station that will allow the display station operator to operate the display station in either a host mode or a personal computer mode without duplication of equipment.

It is another object of the invention to provide a personal computer attachment for the display station that will allow transfer of files between the host and the personal computer and vice versa.

SUMMARY OF THE INVENTION

The objects of the invention are accomplished by providing an attachment between the feature bus of the base unit of the display station and the system unit of the personal computer. Both the keyboard and the display can be used in either a host mode or a personal computer mode in response to commands entered on the keyboard on the display station operator. For purposes of providing a specific example of the invention, the following description is directed to the attachment of the the IBM Personal Computer (PC) to the IBM 3278 display station. It will be understood by those skilled in the art, however, that the invention may be practiced with other so-called personal computers or sub-units thereof and other display units manufactured by others than the International Business Machines Corporation.

The 3278 personal computer attachment provides a method for combining the IBM 3278 display station with the IBM PC. It uses the 3278 display and keyboard and does not require the display or keyboard of the personal computer. The personal computer attachment allows existing host programs to be run unmodified, and also allows most Disk Operating System (DOS) based PC programs to run unmodified. These two operations are referred to as "host mode" and "PC mode". They can run concurrently with no interference between the programs. An additional option is offered to provide data transfer between personal computer and host programs.

The personal computer attachment use the existing personal computer system unit. There are no hardware or software modifications required. The attachment does, however, add a new adapter card and some new software (called an interrupt handler) to use the 3278 display and keyboard. No host hardware or software modifications are necessary to operate the personal computer attachment. The attachment is designed to maintain the integrity of the host session in the event of a disruption in the personal computer operation (caused by program, hardware or power failure).

The personal computer attachment consists of three major sub-features. The first is the modifications to the 3278 display to accept the output of one of two PC video adapters; either the monochrome adapter or the color graphics adapter.

The second sub-feature consists of a new adapter for the PC (called the 3278 adapter) and a group of interconnecting cables. This sub-feature also includes 5¼ inch diskettes. On those diskettes is an interrupt handler program, some sample application programs for the host computer and the PC to support file transfer and screen capture, and installation and diagnostic programs.

The third sub-feature is a modification to the 3274 microcode which will support data transfer (both file transfer and screen capture).

The personal computer system unit comprises a keyboard adapter, an Intel 8088 microprocessor with 40K of ROS in which is stored character generation data and the Basic Input/Output System (BIOS), 64K to 256K of RAM and a group of five or eight Input/Output (I/O) slots which can receive diskette drive adapters, printer adapters, display adapters, additional RAM and so forth. The I/O slots are connected in parallel to the system unit bus.

The 3278 has some digital logic and a regeneration buffer. The digital logic includes a keyboard adapter and the feature bus. These are used as part of the personal computer attachment. The digital logic attaches to a 3274 control unit via an interface commonly referred to as the "DCA" for device control adapter. The output of the digital logic normally goes through some analog circuits to generate an image on the face of the CRT display. An additional circuit function (called the analog input switch) is introduced between the digital logic and the analog logic. This allows the analog logic to be driven from either the normal digital logic of the 3278 or from the output of a video adapter plugged into the personal computer system unit. The state of this switch is controlled by an external source, which in the specific example being described, is the 3278 adapter plugged into one of the I/O slots in the personal computer system unit.

The 3278 adapter consists of four major sub-functions. The first of these is the PC I/O interface function which allows the 3278 adapter to meet the interface of the I/O slots of the personal computer.

The second sub-function of the 3278 adapter is the analog input switch control. These circuits (which are controlled by the PC program) will cause the analog input switch in the 3278 to switch states. Thus, a PC program has the capability to determine what is displayed on the face of the CRT; either the 3278 host image or the personal computer display adapter image. Because the analog switch is introduced in the position just described, the 3278 regeneration buffer and its supporting logic operate just as they did before installation of the personal computer attachment. The same is true for the regeneration buffer and its supporting logic in the display adapter of the personal computer. This allows the host program and the personal computer program to continue to generate images and send them to their respective regeneration buffers, thus allowing concurrent operation of both the host program and the personal computer program.

The third sub-function in the 3278 adapter is the two-way keyboard adapter. It operates in conjunction with the PC program. An unmodified 3278 keyboard is plugged into the two-way keyboard adapter using the existing 3278 keyboard cable and connector. The two-way keyboard adapter accepts keystroke scan codes from the 3278 keyboard and feeds them to the personal computer system unit RAM. The PC program is expected to interrogate these scan codes in RAM, alter them (if necessary) using a table look-up, send them back to the two-way keyboard adapter and direct whether the adapter output is sent to the existing keyboard adapters in the 3278 or PC. The program that supports this function is called the interrupt handler. The interrupt handler also monitors the 3278 keyboard operation for a unique key sequence which is the way the operator requests the interrupt handler to switch modes. When in the host mode, the CRT image and keystrokes are associated with the host program; when in the PC mode, the CRT image and keystrokes are associated with the PC program. This is a toggle operation; that is, when a key is hit once, it switches from one mode to the other, and when hit again, it switches back.

An inherent capability of this design is that a PC program can generate keystrokes to the 3278 or personal computer system unit which are identical to those a human operator could have generated.

The fourth sub-function is the feature bus adapter which provides circuits to connect the 3278 adapter to the feature bus of the 3278 display. The feature bus is normally an internal bus of the 3278 display and exists to support such features as light pen, magnetic stripe card reader, etc. This feature bus is extended outside the 3278 base unit to the mating portion of the PC adapter to provide a relatively high speed, two-way path for sending data from the host to the PC and vice versa.

The function referred to as "Data Transfer" is divided into two sub-functions; file transfer and screen capture. In order to make use of this feature, a modification in the microcode of the 3274 controller is provided. This modification in the microcode will recognize additional 3270 structured fields and direct the data sent from the host to the feature bus rather than to the 3278 regeneration buffer. A program in the personal computer can accept that data and act on it immediately or store it on diskette for later use with other PC programs. In addition, that program will take data from the diskette and send it via the feature bus and the 3274 controller to the host.

The ability for a PC program to generate 3278 keystrokes enables the function called "upload" to be performed. Using the upload function, the operator invokes a keystroke generation program in the PC. This program produces the keystrokes which are sent to the host and appear to be macro-language instructions. Thse instructions are a bootstrap program which bring in the rest of the file transfer program. This file transfer program is a private exec which is permanently stored and available for use anytime the operator invokes it. It only requires this upload once.

The other sub-function is screen capture. The only place within the display sub-system that the screen image resides is in the regeneration buffer of the 3278 display. Additional microcode is provided in the 3274 controller to unload that screen image from the regeneration buffer of the 3278 display into the 3274 controller and redirect it out through the feature bus to the PC system unit. A program in the PC system unit will write this image to diskette or to the printer adapter giving the capability for local copy.

An important integrity aspect of the design is that if the personal computer application fails, then the operator can, using the keystroke sequence, switch to host mode and continue the host operation. Additionally, if power is removed from the personal computer, then keystroke data is redirected to the display station rather than the personal computer without invoking the switchover key sequencing. This is made possible because the front end of the two-way keyboard adapter is powered directly from the 3278 display.

BRIEF DESCRIPTION OF THE DRAWINGS

The foregoing and other objects, aspects and advantages of the invention will be better understood from the following detailed description with reference to the accompanying drawings, in which:

FIGS. 2A and 2B together from a pictorial representation of the personal computer and the various adapter options available including the 3278 adapter;

FIG. 3 is a block diagram of the 3278 display and the personal computer showing how they are interfaced with the 3278 adapter;

DESCRIPTION OF THE PREFERRED EMBODIMENT

Figure 1:
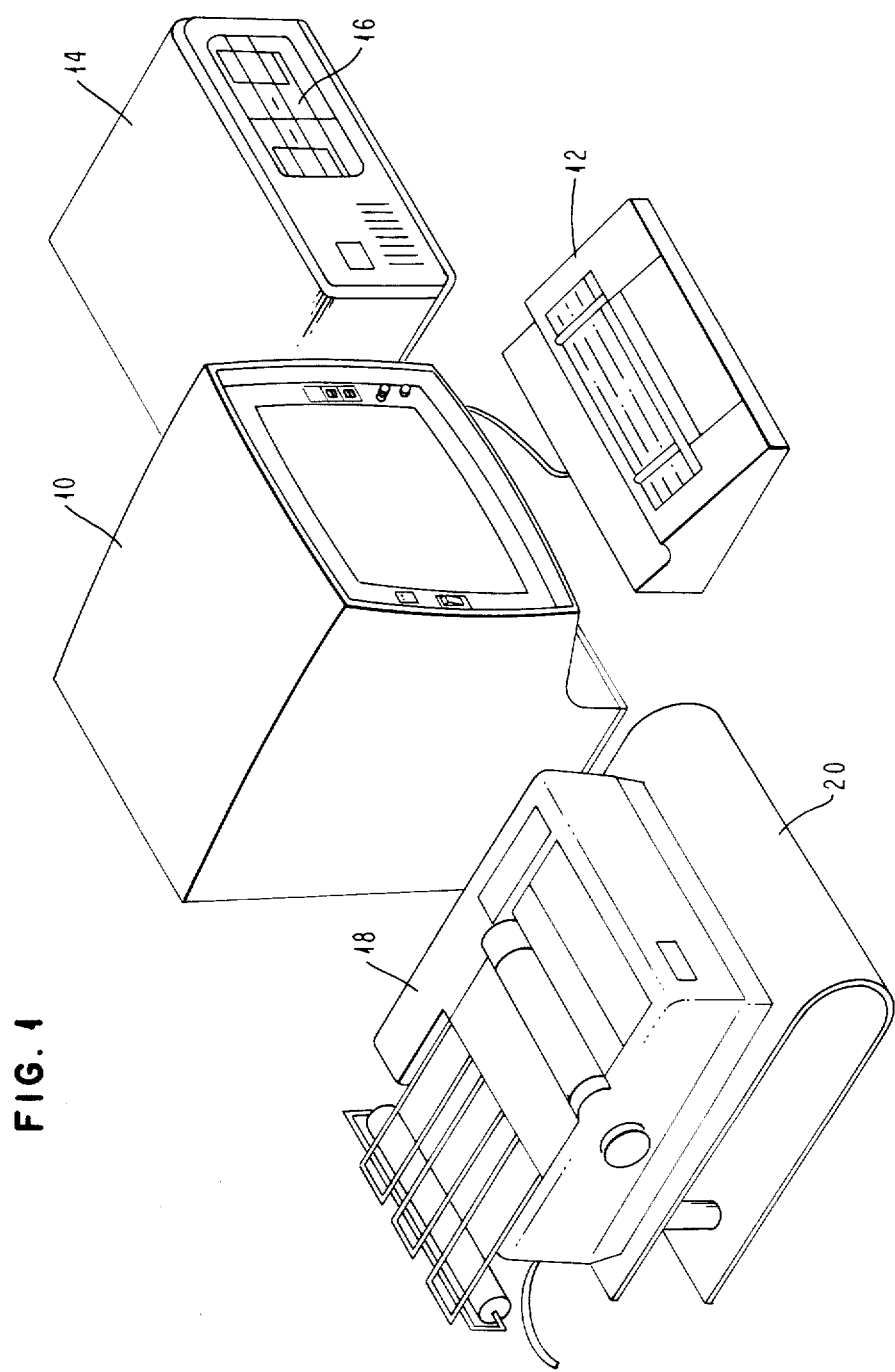
FIG. 1 is a perspective view of a 3278 display station flanked by a personal computer system unit and a printer.

Referring now to the drawings, and more particularly to FIG. 1, a 3278 display station is shown as comprising a CRT display 10 and a keyboard 12. On the right of the CRT display 10 is an IBM Personal Computer system unit 14 which may have one or two floppy diskette drives 16 installed in the system unit cabinet. On the left of the CRT display 10 is a printer 18, here shown on an optional stand 20. The printer 18 is connected to and controlled by the personal computer system unit 14.

Figure 2A:
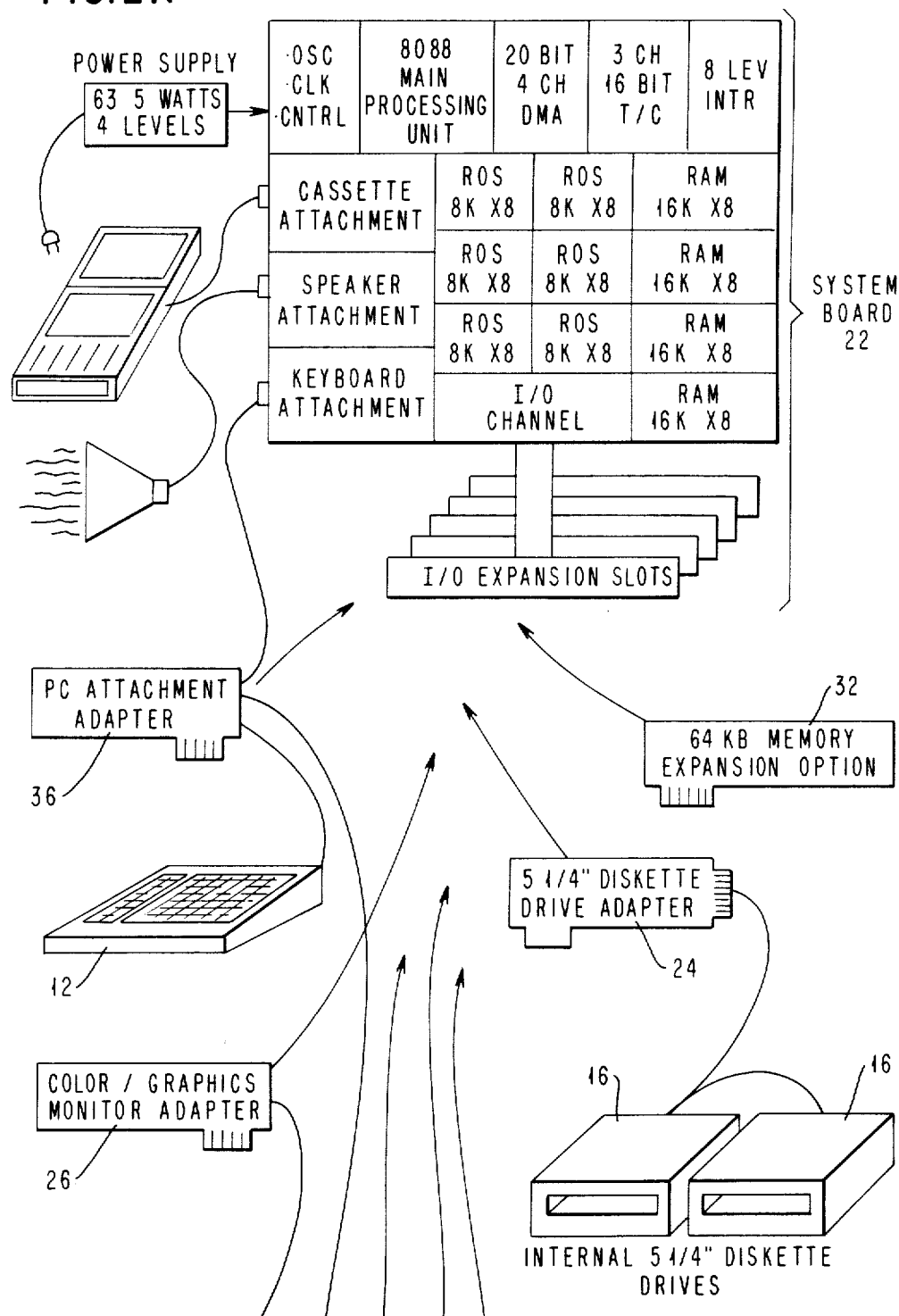

FIGS. 2A and 2B show the IBM Personal Computer system unit mother board 22 mapped to generally show the location of the Intel 8088 microprocessor, the read only storage (ROS), the random access memory (RAM), the keyboard attachment, and the I/O expansion slots as well as other parts of the system unit. A number of adapters in the form of printed circuit boards are available which are designed to be plugged into one of the I/O slots. For example, a diskette drive adapter 24 capable of supporting up to four diskette drives would be plugged into one of the I/O slots. This in turn would be connected to the two internal diskette drives 16. Two monitor adapters are available for the IBM Personal Computer; a color graphics monitor adapter 26 and a monochrome display and parallel printer adapter 28. Typically, one or the other of the adapters 26 or 28 would be plugged into one of the I/O slots and a connection made from the adapter to the base unit of the 3278 display. If the monochrome display and parallel printer adapter 28 is used, then a cable connection is also made from the adapter to the printer 18. On the other hand, if the color graphics monitor adapter 26 is used, it is necessary to plug the parallel printer adapter 30 in to one of the I/O slots and make the cable connection from this adapter to the printer 18. Another I/O slot might have plugged into it a RAM expansion card 32 and/or an asynchronous communications adapter 34, the latter having a cable connection to a modem (not shown) for connection to a telephone line, for example.

Accordingly to the invention, a 3278 attachment adapter 36 is provided to be plugged into one of the I/O slots of the IBM Personal Computer system unit. This adapter 36 has cable connections to the base unit of the 3278 display station and cable connections to both the 3278 keyboard and the keyboard attachment on the mother board of the system unit. The relationship of the 3278 attachment adapter to the 3278 display station and the personal computer system unit is best shown in FIG. 3 to which reference is now made.

In FIG. 3, the same reference numerals as used in the preceding figures refers to the same components or circuits. Therefore, it will be understood that the several adapters shown in block diagram form are plugged into the I/O slots in the sytem unit. The 3278 display unit 10 is represented as having a CRT 38 which is driven by analog circuits 40 in a conventional manner. The analog circuits 40 are controlled by digital logic and a regeneration buffer 42 which is also connected to the feature bus 44 and the keyboard adapter 46. Normally, the 3278 keyboard 12 would be connected to the keyboard adapter 46. In addition, the 3278 display station communicates with a host computer 48 via a 3274 controller 50.

The circuitry described thus far for the 3278 display station 10 is conventional. For purposes of the subject invention, this circuitry is modified by the addition of an analog input switch 52. Normally, the output of the digital logic and regeneration buffer 42 goes through the analog circuits 40 to generate an image on the face of the CRT 38. However, the analog input switch 52 is introduced between the digital logic and regeneration buffer 42 and the analog circuits 40. The analog input switch has a second input which is connected to the color graphics adapter 26 or optionally the monochrome monitor and parallel printer adapter (not shown in FIG. 3). The analog input switch 52 thus allows the analog circuits 40 to be driven from the normal digital logic and regeneration buffer 42 of the 3278 display unit or from the output of a video adapter plugged into the personal computer system unit. The state of the analog input switch is controlled by the 3278 adapter 36.

The 3278 adapter 36 has four major sub-functions; the I/O interface function 54, the analog input switch control 56, the two-way keyboard adapter 58, and the feature bus adapter 60. The I/O interface function 54 allows the 3278 adapter 36 to meet the interface of the I/O slots of the personal computer system unit. The analog input switch control 56 is controlled by a personal computer program to cause the analog input switch 52 to switch states. Thus, the personal computer program has the capability to determine what is displayed on the face of the CRT 38; either the 3278 host image or the personal computer display adapter image. Because of the position of the analog input switch 52, the regeneration buffer 42 and its supporting logic operate as they did before installation of the personal computer attachment. The same is true for the regeneration buffer and its supporting logic in either the color graphics adapter 26 or the monochrome monitor and parallel printer adapter 28. This allows the host program and the personal computer program to continue to generate images and send them to their respective regeneration buffers, thereby allowing concurrent operation of both the host program and the personal computer program.

The third sub-function in the 3278 adapter 36 is the two-way keyboard adapter 58 which also operates in conjunction with a personal computer program. In an unmodified 3278 display station, the keyboard 12 is plugged into the keyboard adapter 46; however, when the personal computer attachment is installed, the keyboard 12 is plugged into the two-way keyboard adapter 58 using the existing 3278 keyboard cable and connector. The two-way keyboard adapter 58 accepts keystroke scan codes from the keyboard 12 and feeds them to the personal computer memory 62 via the I/O interface 54. The personal computer program is expected to interrogate these scan codes in memory 62, alter them (if necessary) using table lookup in memory, send them back to the two-way keyboard adapter and direct whether the adapter output is sent to the existing keyboard adapters in the 3278 display or the personal computer. The program that performs this function is called the interrupt handler which, in addition, monitors the keyboard 12 operation for a unique key sequence which is the way the operator requests the interrupt handler to switch modes. When in the host mode, the CRT image and keystrokes are associated with the host program; when in the personal computer mode, the CRT image and keystrokes are associated with the personal computer program.

The feature bus adapter 60 provides circuits to connect the 3278 adapter 36 to the feature bus 44. The feature bus 44 normally supports such features as light pen, magnetic strip readers, programmable symbol sets, and the like. This feature bus mates with the feature bus adaper 60 of the 3278 adapter 36 to provide a relatively high speed two-way path for sending data from the host to the personal computer and vice versa.

Figure 4A:
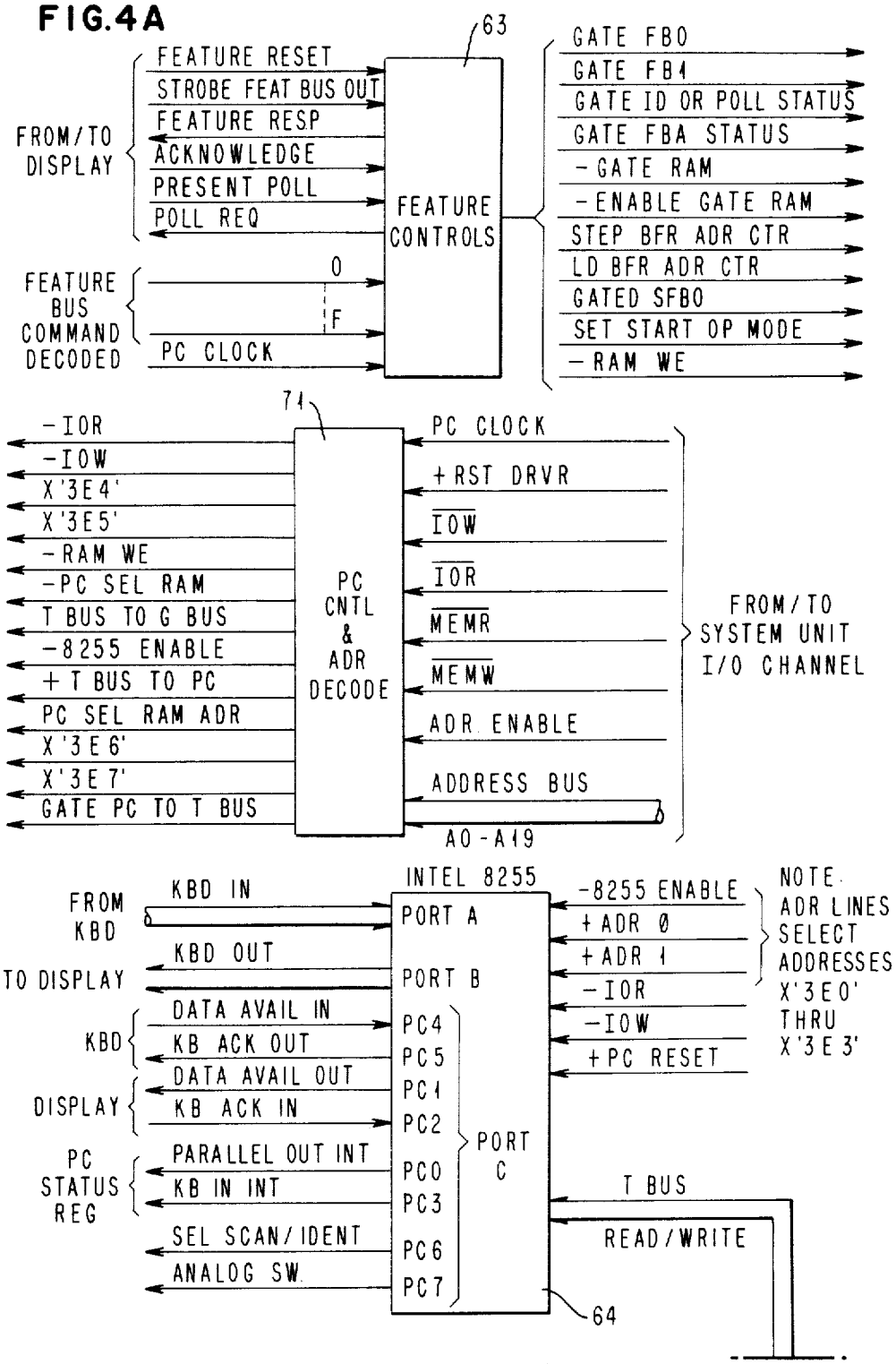
FIG. 4 illustrates the relationship of FIGS. 4A, 4B and 4C which, taken together, are in turn a detailed block diagram of the 3278 attachment.
Figure 4B:
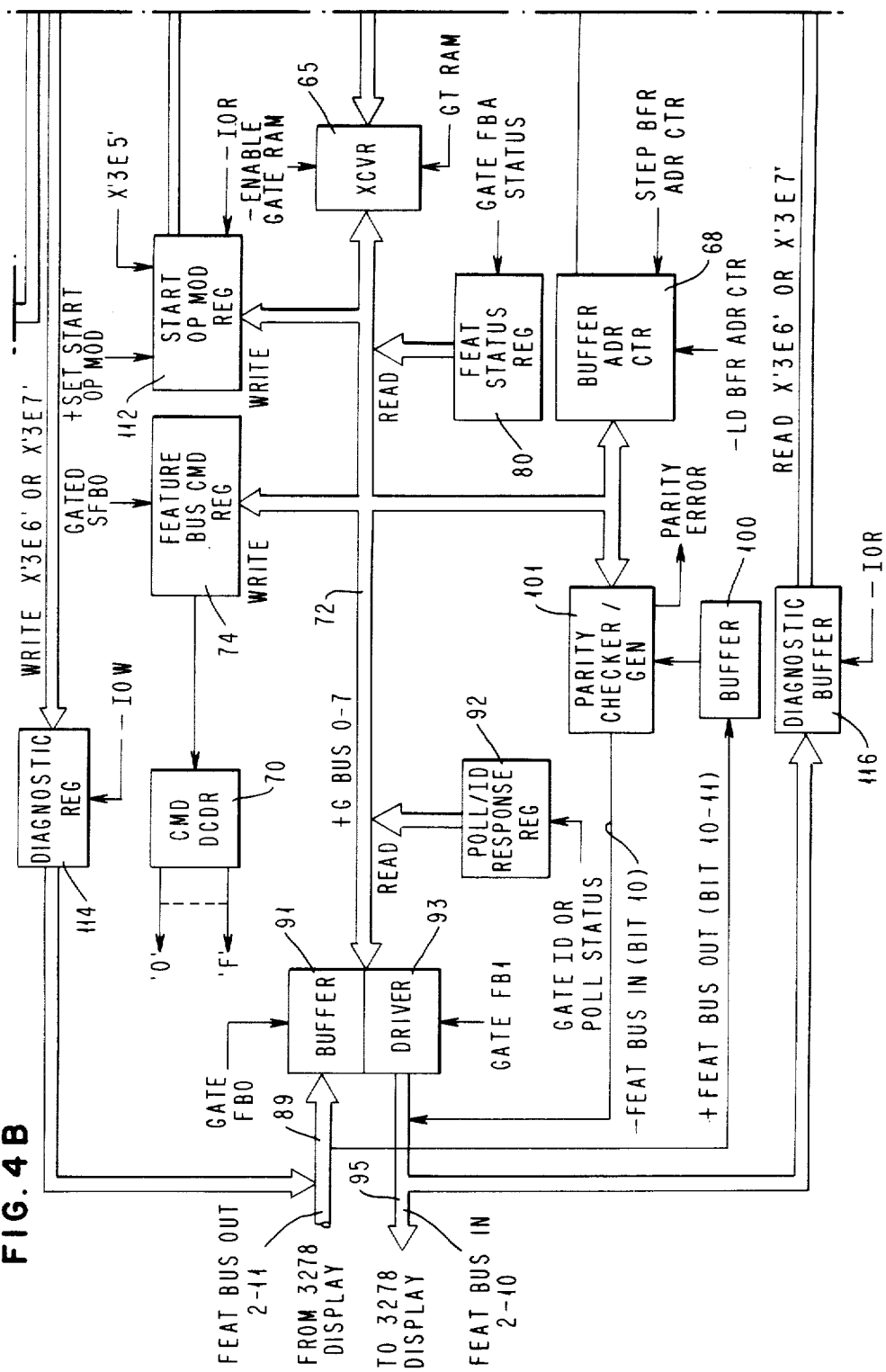

The 3278 attachment adapter 36 is shown in greater detail in FIG. 4 and includes a 256×8-bit RAM buffer 66 that can be written to or read from by either the personal computer or by a feature command, but not simultaneously. The buffer 66 resides in the personal computer memory address space starting at base address X'C4000'. The only time the personal computer is allowed access to the buffer 66 is the time when the feature has received a Start Op command until the personal computer responds with an Op Complete Pending. The only other time that the personal computer may have access to the buffer 66 is if the Initial Program Load (IPL) latch has been reset. At all other times the buffer 66 is dedicated to the feature bus adapter. The feature bus reads the buffer 66 at the address specified by the buffer address counter 68 with either a Read Data or Read Multiple command. Data is written to the buffer 66 at the address specified by the RAM address selector 69 with a Write command from the feature bus.

The buffer address counter 68 is one byte wide. It is loaded with the Set Address Counter Low command from the 3274 controller. It can also be reset to zero with the Reset command from the 3274 controller. The buffer address counter 68 contains the address which is to be read from or written to by the 3274 controller.

The buffer 66 is connected to a RAM bus 67 which is isolated by two tri-state tranceivers 65 and 77. When provided with an enable signal and an appropriate direction control signal, the transceiver 65 allows data to flow from the G bus 72 to the RAM bus 67 or vice versa. Similarly, the transceiver 77 will allow data to flow from the T bus 104 to the RAM bus 67 or vice versa. An interface to the PC data bus 73 is provided by yet another tri-state tranceiver 75 which, when provided with an enable signal and an appropriate direction control signal, allows data to flow from the PC data bus 73 to the T bus 104 or vice versa. The interface to the 3278 display comprises two parts, a tri-state buffer 91 and a tri-state driver 93. These serve the same function as the transceivers 65, 75 and 77 but they are necessary to provide the connections to the feature bus out 89 and the feature bus in 95. The buffer 91 and the driver 93 allow data flow in only one direction so direction control signals are not required. When buffer 91 is provided with an enable signal, data on the feature bus out 89 is allowed to flow onto the G bus 72. When driver 93 is enabled, data on the G bus 72 is allowed to flow onto the feature bus in 95.

Figure 5:
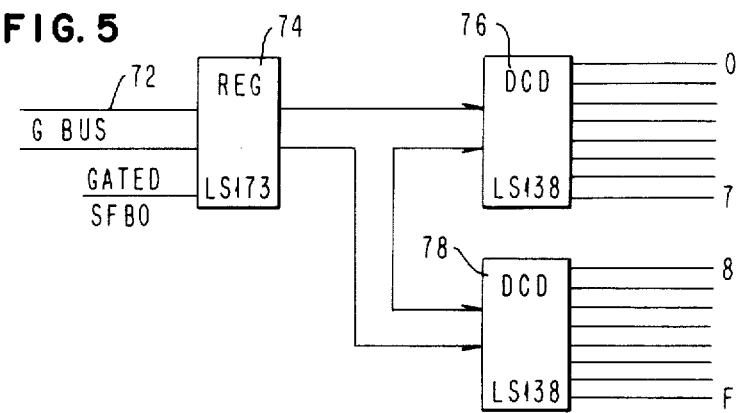
FIG. 5 is a block diagram of the feature command decoder of the 3278 adapter.

The feature command decoder 70 is connected to the G bus 72 by the feature command register 74. The decoder 70 is shown in more detail in FIG. 5 and comprises two decoder circuits 76 and 78 connected to command register 74. These decoder circuits provide feature command outputs which are listed below:

| COMMAND | DESCRIPTION |
| --- | --- |
| X'1' | Nop |
| X'2' | Poll. Sends poll status to feature bus. |
| X'3' | Reset. Sets buffer address counter to all zeros. |
| X'4' | Read Data. Reads one byte of data. Increments buffer address counter. |
| X'5' | Write BAR High. Loads the buffer address counter high. |
| X'6' | Write BAR Low. Loads the buffer address counter low. |
| X'7' | Read ID. Feature ID and poll status are sent to the feature bus. |
| X'8' | Start Op. Loads Start Op modifier register. |
| X'9' | Nop |
| X'A' | Nop |
| X'B' | Read Multiple. Reads up to four bytes of data from the buffer. |
| X'C' | Write Data. Stores up to 256 bytes of data in the buffer. |
| X'D' | Nop |
| X'E' | Nop |
| X'F' | Read Status. Sends contents of feature status register to feature bus. |

Figure 6:
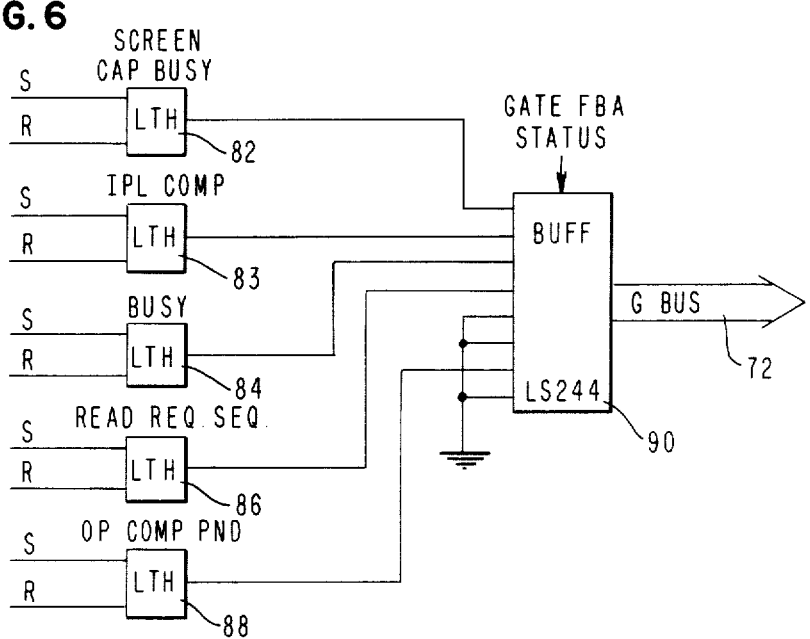
FIG. 6 is a block diagram of the feature status register of the 3278 adapter.

Returning now to FIG. 4, the feature status register 80 is one byte wide and provides an output to the G bus 72. This register is read only by the 3274 controller and is read using a Read Status command. This Read Status command is decoded by the command decoder 70 which provides an output to the feature controls block 63 (FIG. 4A). In response to the decoded Read Status command, the feature controls block 63 generates a Gate FBA (Feature Bus Adapter) Status signal to the feature status register 80 causing it to ouput its content on the G bus 72. FIG. 6 shows the feature status register in more detail. It comprises five latches 82, 83, 84, 86, and 88 and a buffer 90. The following is a description of the bits in the feature status register beginning with the most significant bit:

| BIT | DESCRIPTION |
|---|---|
| 7 | Screen Capture Busy. Set by PC write command (bit 7=1) when screen capture message is receive. Reset by a PC write command (bit 7=0) or PC reset or Reset. |
| 6 | IPL Complete. Set by PC write command (bit 6=1). Reset by PC write command (bit 6=0) or PC reset. |
| 5 | Not Busy. Set by feature bus adapter when 'Op Complete Pending' is set in feature status register or PC reset. Reset when a Start Op Modifier has been received. |
| 4 | Read Request Sequence. Set by PC write command (bit 4=1) when it is ready for the 3274 to read the buffer. Reset by PC write command (bit 4=0) or PC reset or Reset. |
| 3 | Reserved. |
| 2 | Reserved. |
| 1 | Op Complete Pending. Set by PC write command (bit 1=1). Reset by Acknowledge to feature poll or PC reset or Reset. |
| 0 | Reserved. |

Figure 7:
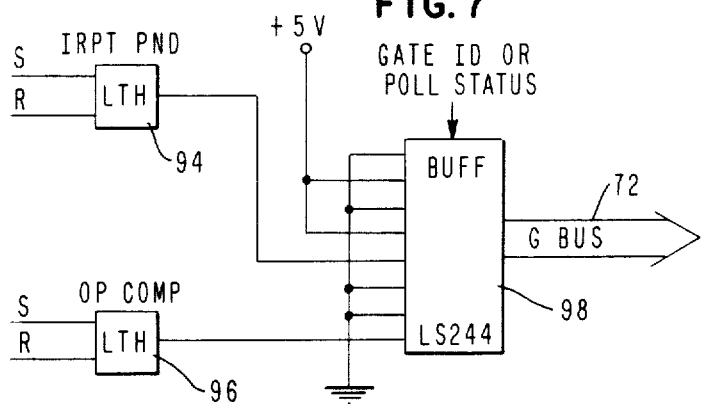
FIG. 7 is a block diagram of the feature poll register of the 3278 adapter.

Returning again to FIG. 4, the feature poll/ID response register 92 is connected to the G bus 72. This register is also one byte wide and is read only by the 3274 controller. As shown in FIG. 7, register 92 comprises two latches 94 and 96 and a buffer 98. The bit descriptions are give below beginning with the most significant bit:

| BIT | DESCRIPTION |
|---|---|
| 7 | 0 ⎫ |
| 6 | 1 ⎪ |
| 5 | 0 ⎬ Feature ID = X'5' |
| 4 | 1 ⎭ |
| 3 | Feature Interrupt. Set if IPL complete has been activated or Read Request Sequence has been activated. Reset by Acknowledge to poll or PC reset or Reset |
| 2 | Reserved. |
| 1 | Reserved. |
| 0 | Op Complete. Set by PC write command (bit 0=Reset by Acknowledge to poll or PC reset or Reset. |

Returning to FIG. 4, when a Read Feature ID command is decoded by the adapter, the poll/ID response register 92 is gated onto the feature bus in 95.

The control signals from the 3278 feature bus are logically combined with the outputs of the feature bus command decoder 70 to generate gating and enable signals for reading from or writing to the RAM buffer 66 and various ones of the registers on the attachment adapter 38 by the 3278 display station. The logic that generates these gating and enable signals is generally represented by block 63 which has as inputs the control signals Feature Reset, Strobe Feature Bus Out (FBO), Acknowledge, Present Poll, and the outputs '∅' to 'F' from the command decoder 70. The control signals Feature Reset, Strobe Feature Bus Out, Acknowledge, and Present Poll originate from the 3278 display and are communicated via the feature bus out 89. Also communicated via the feature bus in 95 to the 3278 display are the Feature Response and the Poll Request signals. The feature read signals produced by the feature control block 63 include Gate ID or Poll Status, Gate FBA (feature bus adapter) Status, and Gate RAM in combination with the Gate FBI (feature bus in) signal. The feature write signals produced by the feature control block 63 include LD BFR ADR CTR and −RAM WE (write enable) in combination with the Gate FBO signal. The specific details of the logic circuitry in feature control block 63 are shown in Appendix B of the *IBM 3270 Personal Computer Attachment User's Guide* published in March 1983, and the procedure by which a 3278 display communicates with an attached feature is described in U.S. Pat. No. 4,271,479 to Cheselka et al. However, a few examples should illustrate the operations performed.

Figure 8:
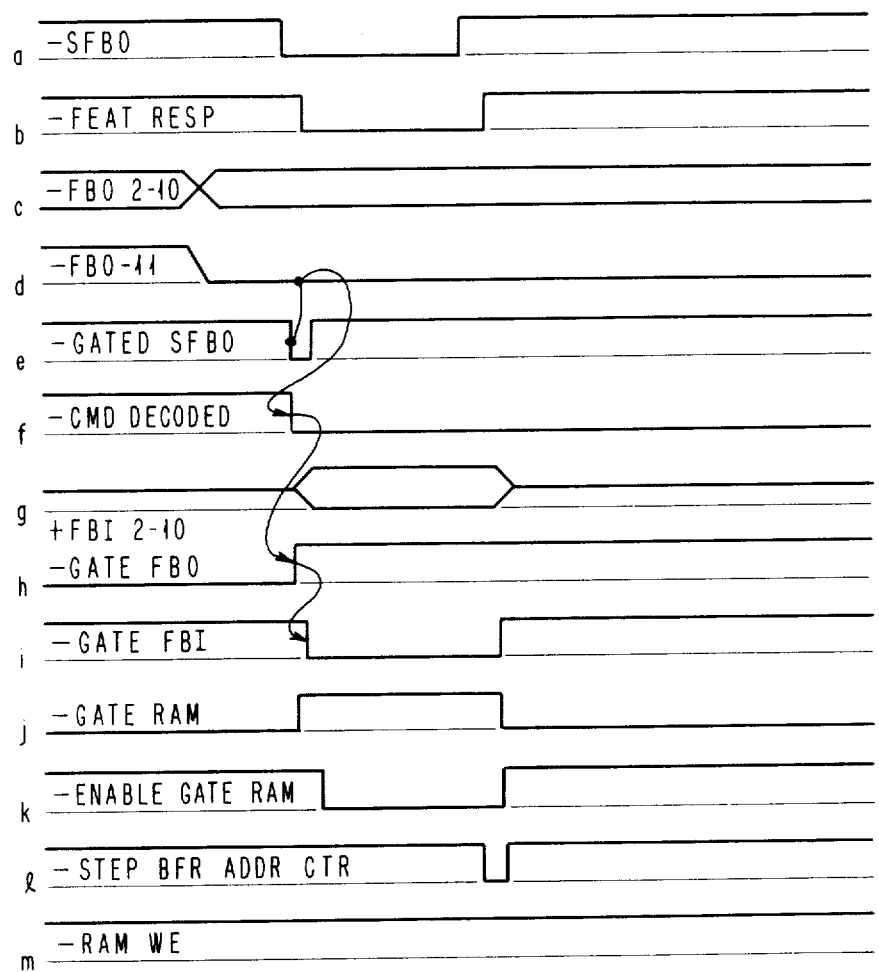
FIG. 8 is a timing diagram illustrating the operation of reading from the RAM buffer on the 3278 adapter by the 3278 display.

Referring now to FIGS. 4 and 8, consider first the operation of reading from the buffer 66 to the 3278 display via the feature bus in 95. Parallel command bits on the feature bus out 89 are inputted to the tri-state buffer 91 as indicated in FIG. 8 as c and d. FIG. 8 at c indicates that bits 2 to 10 may be "0" or "1" depending on the code of the command, while FIG. 8 at d indicates that bit 11 is a "0" indicating that the data on the feature bus out 89 is a command. Bits 10 and 11 are supplied to buffer 100 which supplies an input to the parity checker/generator 101. The parity checker/generator 101 checks the parity of the incoming command or other data and, if there is a parity error, provides an error output signal which is processed in a conventional manner. Since as shown in FIG. 8 at h the Gate FBO signal to the tri-state buffer 91 is low, bits 2 to 9 on the feature bus out 89 are transferred to the G bus 72. The 3278 display then causes the input control signal Strobe Feature Bus Out (SFBO) to go low as shown in FIG. 8 at a. A negative gated SFBO signal shown in FIG. 8 at e gates the command on the G bus 72 into the feature bus command register 74. This register 74 supplies the command to decoder 70 which provides a feature bus command signal on one of lines '∅' to 'F' to the feature controls block 63. At this point it has been logically determined that a read operation is to be performed from the buffer 66. The gate FBO signal now goes positive as shown in FIG. 8 at h turning off the tri-state buffer 91 and blocking further input from the feature bus out 89 to the G bus 72. The gate FBI signal then goes negative as shown in FIG. 8 at i enabling the tri-state driver 93 to allow data on G bus 72 to pass to the feature bus in 95. Since there is assumed to be no parity error and the command is assumed to be valid in this example, the feature response signal is sent to the 3278 display as shown in FIG. 8 at b. At the same time, the gated SFBO signal goes positive isolating register 74 from the G bus 72. Two signals are now sent to the tri-state transceiver 65. These are Gate RAM and Enable Gate RAM signals shown in FIG. 8 at j and k. The Gate RAM signal is a directional a control signal to allow data to go from the G bus 72 to the RAM bus 67 (Gate RAM negative) or from the RAM bus 67 to the G bus 72 (Gate RAM positive). The Enable Gate RAM signal enables the transceiver 65 to pass the data between the two buses. Since the RAM WE signal is positive as shown in FIG. 8 at m, the data from the address specified by the address selector 69 is read from buffer 66 onto RAM bus 67 and via the transceiver 65 to G bus 72 from where it is transferred via driver 93 to the feature bus in 95. At the end of the SFBO signal, a negative going step buffer address counter gate is generated as shown in FIG. 8 at 1 causing the address counter 68 to advance to the next address.

It it had been desired to read from the buffer 66 beginning at a specific address, it will of course be understood that the read operation would have been first preceded by a write operation which loaded the starting address into the buffer address counter 68. Similarly, a write operation to the buffer 66 from the 3278 display would also be preceded by a write operation to load the starting address into the buffer address counter 68.

Figure 9:
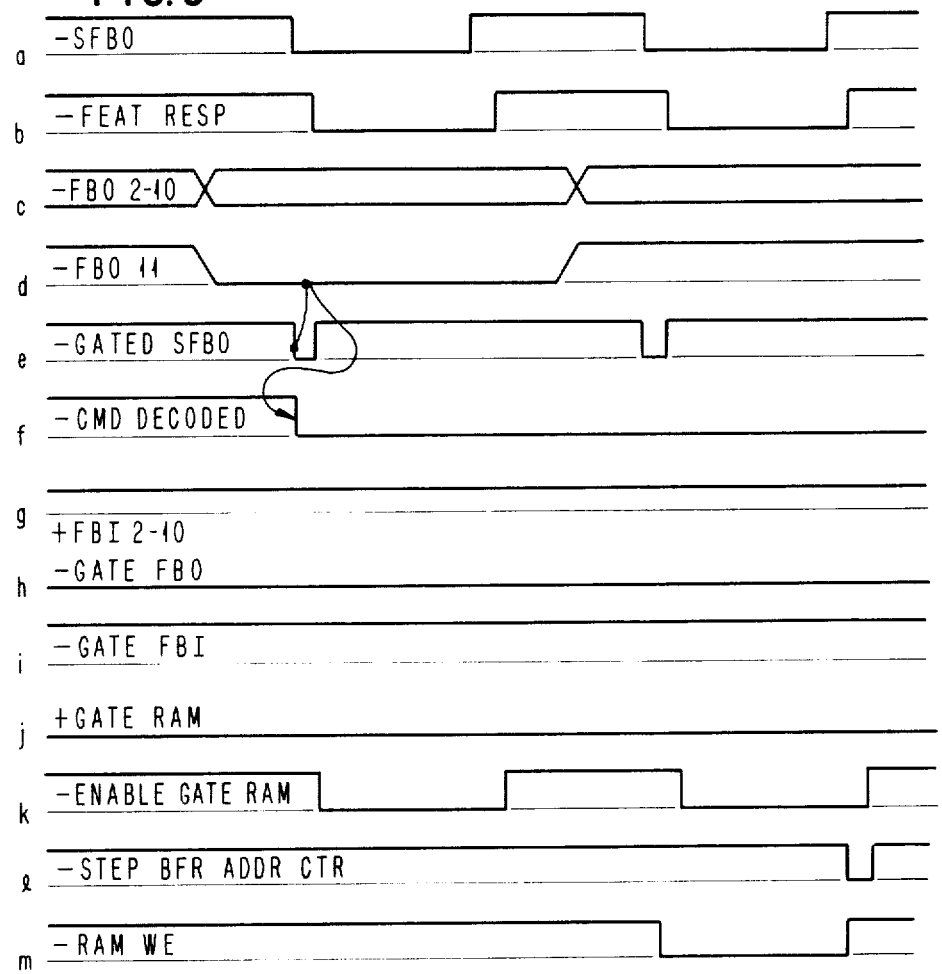
FIG. 9 is a timing diagram illustrating the operation of writing into the RAM buffer on the 3278 adapter by the 3278 display.

The write operation is illustrated by a write operation to the buffer 66. Reference is now made to FIGS. 4 and 9. As before, parllel command bits on the feature bus out 89 are inputted to the tri-state buffer 91 as indicated in FIG. 9 at c and d. Since as shown in FIG. 9 at h the Gate FBO signal is negative, bits 2 to 9 on the feature bus out 89 are transferred by the tri-state buffer 91 to the G bus 72. The 3278 display then causes the input control SFBO to go low as shown in FIG. 9 at a and this produces the negative gated SFBO signal shown in FIG. 9 at e that gates the command on the G bus 72 into the feature bus command register 74. The decoder 70 in response to the command data in register 74 provides a feature bus command signal to the feature control block 63. At this time in the example, it has been logically determined that a write to buffer 66 is to be performed. This time, however, the gate FBO signal remains negative and the gate FBI signal remains positive as shown in FIG. 9 at h and i, respectively, so that the tri-state buffer 91 remains on and the tri-state driver 93 remains off. The feature response signal is sent to the 3278 display as shown in FIG. 9 at b and the gated SFBO signal goes positive as shown in FIG. 9 at e as in the preceding example. The Gate RAM signal shown in FIG. 9 at k remains negative. This is the direction control signal to transceiver 65, and in response to this signal, the transceiver 65 allows data to flow from the G bus 72 to the RAM bus 67 when the transceiver 65 is enabled by a negative going Enable Gate RAM Signal. The first time this occurs, the command on the G bus 72 is transferred to the RAM bus 67 but it is not written to buffer 66 because the RAM WE signal is positive as shown in FIG. 9 at m. On the next cycle, the data to be written to the buffer 66 is input to the tri-state buffer 92 as shown at FIG. 9 at c. Note that at this point bit 11 on the feature bus out 89 goes high as shown in FIG. 9 at d to indicate that the bits 2 to 10 represent data and not a command. This time the RAM WE signal goes negative allowing the data on the data bus 67 to be written to the buffer 66. At the end of the RAM WE signal, the step buffer address counter pulse shown in FIG. 9 at 1 is generated causing the buffer address counter 68 to supply the next address to the RAM address selector 69 in anticipation of the next write operation.

Figure 10:
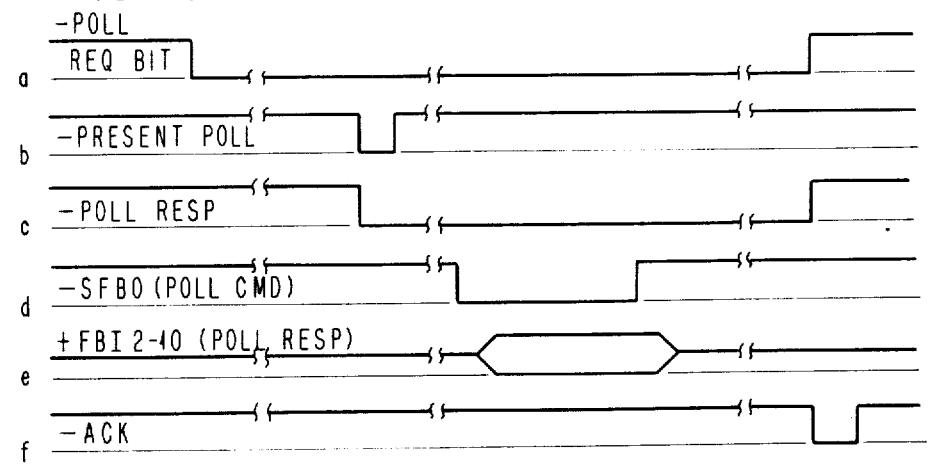
FIG. 10 is a timing diagram illustrating the operation of the poll request and response sequence between the 3278 display and the personal computer attachment feature.

Consider now the poll request and response sequence with reference to FIGS. 4 and 10. As is common to all features which may be attached to the 3278 display, a poll request line is activated by the personal computer attachment when it has status to transmit. This is shown in FIG. 10 at a. In order to prevent conflicts among several features which may be attached to the 3278 display, each feature is assigned a number (5 for the personal computer attachment in this specific example) and when a priority counter in the 3278 base unit reaches the number assigned to a particular feature, a present poll signal is sent to the feature. This is shown in FIG. 10 at b. Furthermore, once the poll request line has been activated by a particular feature, all other features are prevented from responding to a poll on the feature bus out 89. The poll request bit shown in FIG. 10 at a and the present poll signal shown in FIG. 10 at b cause the poll response signal shown in FIG. 10 at c to be generated and sent from the feature controls block 63 to the 3278 display. In response to the "hand shaking", the 3278 display then sends the poll command on the feature bus out 89 and the SFBO signal to the feature controls block 63, the latter being shown in FIG. 10 at d. As in the buffer read operation previously described, the gate FBO signal goes positive and the gate FBI signal goes negative turning off tri-state buffer 91 and turning on tri-state driver 93 thereby connecting the G bus 72 to the feature bus in 95. The poll command is decoded by the command decoder 70 and, in response to the decoded command, the feature controls block 63 generates the Gate ID or Poll Status signal to the poll-/ID response register 92 causing it to output its contents on the G bus 72. This data is transferred to the feature bus in 95 via the tri-state buffer 93 as shown in FIG. 10 at e. Finally, the 3278 display provides an acknowledge signal shown in FIG. 10 at f to the feature control block 63 to complete the "hand shaking".

Considering next the PC side of adapter 36, the PC status register 102 is connected to the T bus 104 and is one byte wide. This register is read only to the personal computer. It resides at I/O address X'3E4'. The following is a description of the bits of the PC status register beginning with the most significant bit:

| BIT | DESCRIPTION |
| --- | --- |
| 7 | Reserved. |
| 6 | Poll Request Active. The bit is interrogated by the personal computer data transfer software to either allow the software to change the feature status register bits 0) or to prohibit the change of feature status register bits (1). It is set when any feature status register bit is initially turned on and the present poll signal from the feature bus is present and is turned off by the feature bus poll acknowledge. |
| 5 | Display Type. This bit is a 1 for a 3278 and a 0 for a 3279 or similar color monitor. |
| 4 | Serial Port Busy. This bit is a 1 when the keyboard serializer is busy. It is reset when the port becomes available or with PC reset. |
| 3 | Serial Port Interrupt. This bit is a 1 when the keyboard serial port has completed sending a character. It is reset by an adapter command or with PC reset. |
| 2 | Start Op Interrupt. This bit is a 1 when the Start Op Modifier register has been loaded from the feature bus. The bit is reset when the Start Op Modifier register is read by the PC or with PC reset. |
| 1 | Parallel Output Port Interrupt. This bit is a 1 when the parallel output port (8255 Port B) is available to accept another character. This bit is reset when data is sent to the port or by PC reset. |
| 0 | Keyboard In Interrupt. This is a 1 when the adapter has received a character from the keyboard (8255 Port A). This bit is reset when the data is read from the adapter or with PC reset. |

The PC command decoder 106 is connected to the T bus 104 and is similar in construction to the feature command decoder 70 and so a detailed illustration of the decoder 106 is omitted from this description. The PC command decoder 106 is one byte wide and is write only. This decoder resides at I/O address X'3E4'. The following is a list of the commands decoded by the decoder 106:

| COMMAND | DESCRIPTION |
|---------|-------------|
| X'00' | Turn off serial interrupt. Resets the keyboard serial I/O port. |
| X'01' | Turn on Op Complete Pending. Turns the Op Complete Pending bit on and causes a poll request to the 3278. |
| X'02' | Turn off Read Request Sequence. |
| X'03' | Turn on Read Request Sequence. |
| X'04' | Turn off Screen Capture Busy. |
| X'05' | Turn on Screen Capture Busy. |
| X'06' | Turn off Test Mode. |
| X'07' | Turn on Test Mode. |
| X'08' | Turn off Keyboard Clicker Gate. |
| X'09' | Turn on Keyboard Clicker Gate. |
| X'0A' | Turn off 3278 Display gate. |
| X'0B' | Turn on 3278 Display gate. |
| X'0C' | Turn off IPL Complete. |
| X'0D' | Turn on IPL Complete. |
| X'0E' | Turn off Diagnostic Mode. |
| X'0F' | Turn on Diagnostic Mode. |

The adapter 36 uses an Intel 8255 programmable parallel interface controller 64 to interface to the keyboard 12, the keyboard adapter 46, and the analog switch control 56. For detailed information on the 8255 programmable parallel interface controller, the reader is referred to the *Intel Data* book. The controller 64 has four ports identified as Ports A, B, C and D. These ports, their I/O addresses and a description of their use are listed below:

| PORT | ADDRESS | DESCRIPTION |
|------|---------|-------------|
| A | X'3E0' | This port is used to read the keyboard. |
| B | X'3E1' | This port is used to send keyboard data to the 3278 display. |
| C | X'3E2' | This port has multiple uses. It is used for the control signal for ports A and B, the analog switch control, and control to select which input is read into port A (i.e. 3278 keyboard data or 3278 keyboard ident code). |
| D | X'3E3' | This is the control register for the 8255 controller. |

The Intel 8255 controller 64 is the main device used to interface the keyboard. The Keyboard In at Port A of the 8255 controller is connected to the keyboard 12. The interface is asynchronous in that when the keyboard has a character to send, it activates the line "Data Avail In". The 8255 Port A is set for strobed input, and when the "Data Avail In" line from the keyboard becomes active, the eight scan bits from the keyboard are loaded into Port A of the 8255 controller. The 8255 responds by activating the "KB Ack Out" line. When the software reads Port A of the 8255, the "Data Avail Out" line from the 8255 will deactivate. The 8255 also generates an interrupt ("KB In Int") to the personal computer when a character has been read into the 8255 controller.

The keyboard data serialization register 110 is write only and resides at I/O address X'3E5'. The data writen to this register will be serialized and sent to the PC keyboard input socket. After a keystroke has been read in from the keyboard 12, the PC software determines where to send the data. If the attachment is in the PC mode, the keystroke will be mapped using a software lookup table to a corresponding PC keyboard scancode. In the specific example being discussed, scan code conversion is required because the 3279 keyboard 12 is encoded in a different scan code than the PC keyboard scan code. Obviously, in the host mode, no scan code conversion is required. Next, the new scan-code will be output to the keyboard serializer 110. Writing this register causes PC Status Bit 4 (Serial Port Busy) to become active. When the serialization is complete, Bit 4 will be reset and PC Status Bit 3 (Serial Port Interrupt) will be set. The data sent to this port will be serialized in the following order: First, a parity bit will be sent out. Second, the data will be sent out with the least significant bit sent first. This port is not bidirectional and therefore does not respond to the PC keystroke software reset command.

Figure 11:
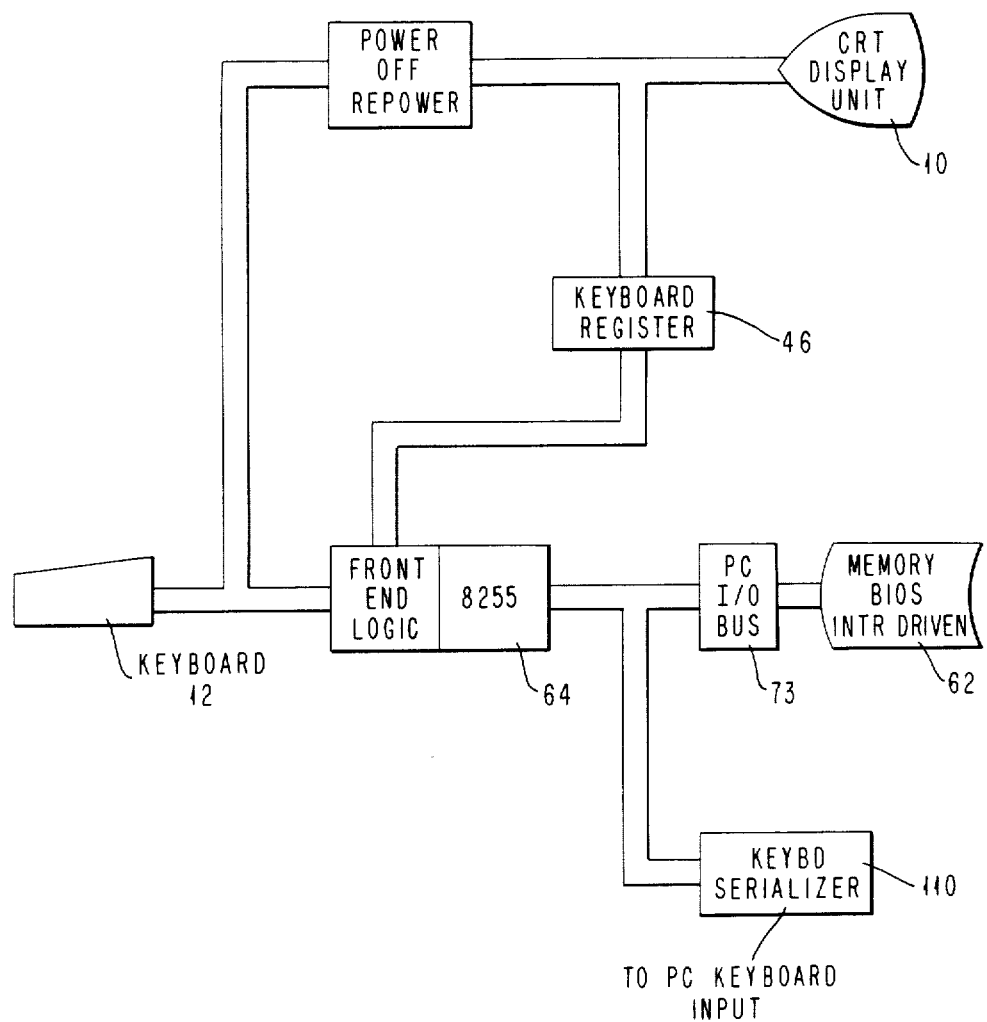
FIG. 11 is a block diagram of the keyboard data paths.

FIG. 11 is a functional block diagram which summarizes the keyboard data paths just described. Note that the 8255 controller 64 operates as the two-way keyboard adapter 58 shown in FIG. 3. An important aspect of the invention is that if the personal computer application fails, then the operator can, using the keystroke sequence, switch to the host mode and continue the host operation. This is made possible by powering the front end of the two-way keyboard adapter directly from the 3278 display station. The front end of the two-way keyboard adapter is that section of the logic which accepts keystroke information from the keyboard and directs it either to the 3278 or to the personal computer. Additionally, if power is removed from the personal computer, then keystroke data is automatically redirected from the front end of the two-way adapter to the display station rather than to the personal computer without requiring the operator to invoke the switchover key sequencing so that host operation is maintained.

The appendicies at the end of the specification are reproductions of the macro assembler print outs of the following software which facilitates the interrupt handling of the IBM Personal Computer attachment to an IBM 3278 display station: Appendix A is the listing for the 3278 attachment BIOS (Basic Input/Output System) extension. Appendix B is the listing for the keyboard interrupt handler. Appendix C is the listing for the feature bus interrupt handler. Appendix D is the listing for the attachment BIOS end label. Appendix E is the listing for the 3278 attachment initialization. Appendix F is the listing for the EBCDIC keyboard translation tables and keyboard selection tables. The function of the 3278 attachment BIOS extension is to handle all hardware interrupts from the 3278 attachment and all software interrupts for the 3278 attachment functions. The function of the 3278 attachment keyboard interrupt handler is to process keystrokes from the 3278 keyboard and keyboard related function requests from an application program. The function of the 3278 attachment feature bus interrupt handler is to process all Start Operation commands from the 3274 controller and all 3278 attachment related function requests from an application program. The function of the 3278 attachment BIOS end label is to mark the physical end of the 3278 attachment BIOS extension. The function of the 3278 attachment initialization is to initialize the 3278 attachment and the 3278 attachment BIOS extension interrupt handlers. These appendicies are intended to show an example of the software to support a specific preferred embodiment of the invention. Those skilled in the art will recognize that the software listed in the appendicies is tailored to the IBM Personal Computer used as an attachment to the IBM 3278 display station. The attachment of a personal computer to a display station of different manufacture and having different characteristics would require different software support. In some cases, the software support needed will be simpler than that of the specific embodiment disclosed. For example, the keyboard of the 3278 display terminal uses a scan code which is different than the scan code for the IBM Personal Computer keyboard which requires a translation between the two codes depending on what mode the attachment is in. This translation is accomplished by table lookup in the memory of the PC system unit as described above. Obviously, when both the display station and the personal computer use the same keyboard code, typically ASCII, this translation function is not required. Other simplifications and modifications will be apparant to those skilled in the art depending on the characteristics of the display station and personal computer which are to be attached.

Returning now to FIG. 4, the control signals from the Personal Computer are logically combined to generated gating, enable and address signals for reading from or writing to the RAM buffer 66 and various ones of the registers on the attachment adapter by the Personal Computer Feature. The logic that generates these signals is generally represented by block 71. Again, the specific details of the logic circuitry in the PC Controls and Address Decode Block 71 are shown in Appendix B of the *IBM* 3270 *Personal Computer Attachment User's Guide.* The inputs to the logic block 71 from the Personal Computer are the PC Clock, +Reset Driver, Input/Output Read, Input/Output Write, Memory Read, Memory Write, Address Enable, and the Address Bus A0–A19.

Consider first the operation of writing to the buffer 66 by the Personal Computer. The logic block 71 generates control signals to the tri-state transceiver 75 in order to connect the PC data bus 73 to the T bus 104. One of these signals, the +T Bus to PC signal, is a direction control signal, and the other, the Gate PC to T Bus signal, enables the transceiver 75. Similar direction and enabling signals are generated for the tri-state transceiver 77. Specifically, the −T Bus to G Bus direction control signal allows data to flow from the T bus 104 to the RAM bus 67, and the −PC Select RAM signal enables the transceiver 77. With the two transceivers enabled, a data path is established from the PC bus 73 to the T bus 104 and to the RAM bus 67. The −RAM WE (write enable) signal applied to the RAM buffer 66 then causes the data on the RAM bus 67 to be written into the RAM buffer at the location specified by the RAM address selector 69. A RAM buffer read operation is similar except that the direction control signals and the −RAM WE signal are inverted.

In order to write to the PC command decoder 106, the transceiver 75 is enabled as in a write to buffer operation, but the transceiver 77 is not enabled. The logic block 71 generates a −IOW (I/O write) signal and the address X'3E4' to the command decoder 106 to cause data on the T bus 104 to be written into the decoder. The PC Status Register 102 shares the address X'3E4' with the PC Command Decoder 106. This is possible since register 102 is a read only register while the decoder 106 is write only. Therefore, to read the PC Status Register 102, the direction control signal to the transceiver 75 is inverted and the logic block 71 generates a −IOR (I/O read) signal and the address X'3E4' to the register 102.

The Keyboard Data Serializer 110 and the Start Op Modifier Register 112 also share an address, X'3E5', the former being write only and the latter being read only. The operations of writing to and reading from these registers are similar to those just described for the command decoder 106 and the status register 102. In addition to the address X'3E5', the logic block 71 generates the −IOW signal for the serializer 110 or the −IOR signal for the register 112.

The diagnostic register 114 contains the ten feature bus out bits as well as strobe feature but out, Poll Acknowledge, Present Poll, and Reset. This register can be written by the diagnostic program via the PC I/O bus. Two additional I/O addresses are decoded in the adapter for this purpose. With the feature bus cable disconnected, the diagnostic program is able to manipulate this bus (feature bus out) to simulate feature commands and data.

The diagnostic buffer 116 is attached to the feature bus in (bits 2 to 20), Feature Response, Poll Request, and the analog switch control. The buffer 116 can be activated by the diagnostic program via the PC I/O bus. Two I/O addresses are decoded for this function. With the feature bus cable disconnected, the diagnostic program is able to detect feature responses and data.

Data transfer between the personal computer and the host program consists of file transfer and screen capture. File transfer is enabled by the 3274 controller 50 microcode which recognizes certain structured fields in the host data stream and directes the data to the feature bus 44 instead of the regeneration buffer 42 of the 3278 display station as shown in FIG. 3. The personal computer can accept the data and act on it immediately or store it on diskette for latter use with other PC programs. In addition, data can be taken from the diskette and sent via the feature bus 44 and the 3274 controller 50 to the host 48. This same ability to transmit data from the personal computer to the host permits a PC program to perform a function called "upload". With this function, an operator signs on to the host system in the normal manner. Then the operator can invoke a keystroke generation program in the personal computer. This program produces the keystrokes which are sent to the host 48 and appear to be macro-language instructions. These instructions are a bootstrap program which bring in the rest of the file transfer program. This file transfer program is a private exec which the operator now owns. It is permanently stored at the host 48 and available for use any time the operator invokes it. It only requires this upload once. Other uses can be envisioned for the automatic keyboard operations just described. For example, there could be automatic sign on or automatic generation of any keystroke sequence that the operator wishes to define.

Screen capture is the equivalent of the 3270 localcopy function and of the IBM Personal Computer printscreen function. Screen capture permits an operator to obtain a printed hard copy of the screen image or to copy the screen image to the system unit diskette. The only place within the display sub-system that the screen image resides is in the regeneration buffers. If the analog switch 52 currently connects the regeneration buffer 42 to the analog circuits 40, then the host data image is displayed. The 3274 controller 50 has microcode to unload that screen image from the regeneration buffer 42 into the 3274 controller 50 and redirect it out through the feature bus 44 to the PC system unit 14. The system unit 14 then directs this screen image data to either the printer 18 or a diskette drive 16 via the corresponding adapter. If on the other hand the analog switch 52 connects the output of a PC monitor adapter, either the color graphics adapter 26 or the monochrome monitor and parallel printer adapter 28, to the analog circuits 40, then the image displayed is the PC program image. This image may be printed in the usual manner since it is already resident in the PC system unit. This capability for local copy also makes it possible for programs to be written to operate on the screen image in whatever way the programmer desires.

While the feature bus adapter physically resides in the personal computer, it appears to the 3274 controller as feature address '0101'B on the 3278 display. 3274 microcode and PC microcode communicate with each other via the feature bus adapter. The Poll Response register 92 is used to signal the 3274 controller 50 that the PC status has changed. The Poll Response register 92 contains the following:

bits 0-3: Feature Address ('0101')
  bit 4: Request Read Status
  bits 5,6: reserved
  bit 7: Operation Complete The Poll Response register 92 can be read using a Read Feature ID command. The FBA Status register 80 is used to indicate the current state of the PC and the Feature Bus Adapter. The FBA Status register 80 contains the following:

bit 0: Screen Capture Busy
  bit 1: FBA Interface Enabled
  bit 2: FBA NOT Busy
  bit 3: Request Read Operation
  bits 4, 5: reserved
  bit 6: Operation Complete Pending
  bit 7: reserved The Start Op Modifier register is used to tell the PC why it is being signaled by the 3274. The Start Op Modifiers include the following:

X'00'-reserved
  X'01'-3278 POR
  X'02'-Read Operation
  X'03'-Write Operation
  X'04'-Execute
  X'05'-Abort Transfer (Abort-T)
  X'06'-Abort to Last Verify (Abort-LV)
  X'07'-Error
  X'08'-Verify
  X'09'-X'FF' are reserved The address counter register 68 is used to tell the FBA hardware what buffer displacement to use when transferring data from/to the buffer on the next coax read/write command.

The messages between the 3274 and the PC are transferred via the RAM buffer 66. The format of the buffer is as follows:

| length | type | flags | data (0-252 bytes) |
|---|---|---|---|
| 0 | 2 | 3 | 4           256 |

Each buffer passed to or from the attachment consists of a buffer header and data. The personal computer sends data to the 3274 that consist of the following:

1. File Transfer Data for the Host
  2. Screen Capture Options Definition
  3. Wrap Test Message
  4. Query Keyboard State The data sent to the PC attachment from the 3274 will consist of the following:

1. File Transfer Data from the Host
  2. Screen Capture Data from the Display
  3. Wrap Test Message
  4. Keyboard State Information The buffer header provides the necessary information for both the 3274 and the PC to know the amount of data in the buffer, the type of data, and other message indications. The format of the buffer header is as follows:

length=number of data bytes in the buffer (0-252)
  type=message type (structured field, screen capture)
  flags=control flags The length field is 2 bytes. It contains the number of data bytes in the buffer. It does not include the buffer header. Byte 0 is the high order byte and byte 1 is the low order byte. The type field is 1 byte. Bit 7 signifies message direction (0=inbound, 1=outbound). The possible type fields flowing from the PC to the 3274 (inbound) are as follows:

X'00'-Wrap Test Request
  X'02'-Inbound Structured Fields
  X'04'-Define Screen Capture Options
  X'06'-Query Keyboard State The possible type fields flowing to the PC from the 3274 (outbound) are as follows:

X'01'-Wrap Test Reply
  X'03'-Outboard Structured Fields
  X'05'-Screen Capture Buffer Transfer
  X'07'-Keyboard State The flag field is also 1 byte. The bits are defined as follows:

Bit 0=X'1' beginning of message
  Bit 1=X'1' end of message
  Bits 2-7=reserved

The objective of the file transfer function is to transfer files between a host application and the PC. The 3274 controller implements this objective by expanding its structured field support. The terminal operator initiates a file transfer between a host application program and the PC by entering a message while in host mode. The host application program controls the transfer by issuing Write Structured Field (WSF) commands with FBA Structured Fields to the 3274 controller. The 3274 transfers the FBA Structured Fields to the PC for processing. The PC generates replies to the host application in the form of FBA Structured Fields and signals the 3274 that it has data to be read. The 3274 reads the data and sends it to the host application. After one host message is sent to the PC, the host application will wait for a reply from the PC. The 3274 microcode changes required for file transfer are host system independent. The functions that require changes are as follows:

1. outbound data stream
  2. inbound data stream
  3. query reply

The Write Structured Field Data Stream is extended to provide support for File Transfer between the host and the PC. The FBA Structured Field is identified by the type of fields X'D0'. In host to PC (outbound) transfer, the structured fields except FBA Structured Fields are processed by the 3274 Data Stream Processor. The data contained in the FBA Structured Field is not processed by the 3274. Instead, it is interpreted by the PC. When the 3274 detects a SF type of X'DO', data is passed to the PC through the FBA. A response is generated by the PC that is sent to the host. The FBA Structured Field is defined as follows:

| BYTE | CONTENT | MEANING |
|------|---------|---------|
| 0-1 | L | variable length |
| 2-3 | x'DOXX' | FBA type |
| 4-n | data | data |

The 3274 takes only the FBA structured fields, puts them into the FBA buffer 66, with a four byte buffer header, and issues a write start-op command for the PC to get the data in the buffer. The buffer 66 holds 252 bytes of data with the 4 byte buffer header. The PC reads the data out of buffer 66 and puts the data into its own storage area. The start-op command indicates to the FBA the end of the DCA command sequence. A modifier byte following the command indicates the reason for the start-op command, and the start-op command and modifier provides the 3274 control of the FBA buffer. The 3274 Outbound Data Stream Processor issues start-op commands to the FBA with the following modifiers:
1. X'03'-Write
2. X'04'-Execute
3. X'05'-Abort-T
4. X'06'-Abort-LV
5. X'08'-Verify The WRITE Start-op is sent to the PC after the 3274 has written data into the FBA. The WRITE Start-op signals the PC that access to the buffer now belongs to the PC in order to remove the data placed there by the 3274. The PC has access to the buffer 66 until it indicates 'Op-Complete'. The EXECUTE Start-op is sent when the data in the WSF indicates End of Message and there are no transmission errors or data stream errors in the message. Execute is a signal to the PC that processing may begin on the informaion received. The ABORT-T Start-op indicates to the PC that there was an error in the WSF data stream. The VERIFY Start-op is sent to the PC when the 3274 detects an end-of-block condition. The ABORT-LV Start-op indicates to the PC that there was a transmission error.

For PC to host (inbound) data transfer, the PC sends an asynchronous request to the 3274 when it wants to send a FBA Structured Field to the host. The 3274 gets the data from the PC and puts it into its own line buffers and sends the data to the host. The 3274 does not examine any of the data that is sent from the PC to the host. After the PC sends the 3274 an inbound file transfer message, the inbound transmission must be acknowledged before a new inbound operation can be performed. The 3274 will continue to issue Read Start-Op command queues to get more data into the FBA buffer 66 to be transferred to the host until the End of Message flag is on in the buffer header. The start-op command indicates to the FBA the end of the DCA command sequence. A modifier byte following the command indicates the reason for the Start-Op command. The 3274 Inbound Data Stream Processor issues start-op command to the FBA with the following modifiers:
1. X'02'-Read
2. X'04'-Execute
3. X'05'-Abort-T
4. X'06'-Abort-LV 5. X'07'-Error The READ Start-op is sent to the PC after the PC has sent asynchronous status to the 3274 requesting data to be sent to the host. On receipt of the Read Start-op, the PC has control of the buffer 66 and will put data into the buffer until it indicates Op-complete. The EXECUTE Start-op is sent to the PC when no errors are detected in the buffer header protocol. The ABORT-T Start-op is sent to terminate an inbound message operation. The ABORT-LV Start-op is sent to terminate an inbound message operation. The ERROR Start-op is sent to the PC if the 3274 detects an incorrect buffer header.

The objective of the screen capture function is to transfer the data visible on the 3278 display screen to the PC for printing on the PC printer or storing on a PC diskette. The terminal operator initiates a screen capture by pressing the print key while in host mode with the display's Print ID set for local copy to the PC. The 3274 microcode functions affected by screen capture include the following:
1. Print IDENT key
2. Print key
3. Host Initiated Copy
4. Device Cancel key
5. Host Loadable Printer Authorization Matrix (PAM) key sequence The Print IDENT key is used by the operator to determine what the current printer assignment is or to assign a printer or a printer class based on the PAM. The Print key is used by the operator to initiate a local copy function. The host initiated copy function is invoked in SNA environment by the host sending a 3270 write type command to a display. The operator may use Device Cancel to cancel a current outstanding print request if the input is inhibited beacuse of a Device Busy condition. The host loadable PAM key sequence is used to update the cluster's PAM based on information transfer from the host.

The choice of the monochrome display and parallel printer adapter 28 and the color graphics adapter 26 depends on whether a graphics display function is desired. Either of these adapters may be used with the 3278 display which is itself a monochrome display. In the case where the color graphics monitor adapter 26 is used with a 3278 display, color signals are converted into a grey scale for display. If the color graphics monitor adapter 26 is used with the 3279 display or similar color monitor, the color conversion to grey scale is not required or used. The output characteristics of the monochrome display and parallel printer adapter 28 and the color graphics adapter 26 for the IBM PC are different. Both are designed around a Motorola 6845 CRT Controller module, but there are significant differences in resolution, modes and frequency of operation which are summarized below:

|  | Monochrome | Color Graphics |
|---|---|---|
| 80 × 25 text mode | yes | yes |
| 40 × 25 text mode | no | yes |
| APA graphics mode | no | yes |
| character box size | 9 × 14 | 8 × 8 |
| character size | 7 × 9 | 5 × 7 |
| video frequency | 18 MHz | 7 MHz/14 MHz |

Programming for the 6845 CRT Controller for the monochrome display adapter and the color graphics adapter is described on pages 2–45 and 2–60, respectively, of the IBM *Technical Reference* for the IBM PC, Revised Edition (July 1982). In the present invention, the following initialization parameters are loaded into the 6845 CRT Controller from the diskette containing the interrupt handler program for the monochrome display adapter:

| Register No. | Register File | Program Unit | Hex Code |
| --- | --- | --- | --- |
| R0 | Horizontal Total | Characters | 63H |
| R1 | Horizontal Display | Characters | 50H |
| R2 | HSync Position | Characters | 52H |
| R3 | HSync Width | Characters | 0FH |
| R4 | Vertical Total | Char Rows | 19H |
| R5 | VTotal Adjust | Scan Line | 00H |
| R6 | Vertical Display | Char Row | 19H |
| R7 | VSync Position | Char Row | 18H |
| R8 | Interlace Mode | — | 02H |
| R9 | MaxScan Line Addr | Scan Line | 0DH |
| R10 | Cursor Start | Scan Line | 0BH |
| R11 | Cursor End | Scan Line | 0CH |
| R12 | Start Addr (H) | — | 00H |
| R13 | Start Addr (L) | — | 00H |
| R14 | Cursor (H) | — | 00H |
| R15 | Cursor (L) | — | 00H |

The following initialization parameters are loaded into the 6845 CRT Controller for the color graphics adapter with the register file and program unit being the same as above:

| Register No. | 40 × 25 Alpha | 80 × 25 Alpha | Graphic Modes |
| --- | --- | --- | --- |
| R1 | 38H | 71H | 38H |
| R2 | 28H | 50H | 28H |
| R3 | 2BH | 57H | 2BH |
| R4 | 05H | 0AH | 05H |
| R5 | 1AH | 1AH | 6BH |
| R6 | 00H | 00H | 00H |
| R7 | 19H | 19H | 64H |
| R8 | 19H | 19H | 64H |
| R9 | 02H | 02H | 02H |
| R10 | 07H | 07H | 01H |
| R11 | 06H | 06H | 06H |
| R12 | 07H | 07H | 07H |
| R13 | 00H | 00H | 00H |
| R14 | 00H | 00H | 00H |
| R15 | 00H | 00H | 00H |
| R16 | 00H | 00H | 00H |

In each case, only the first eight parameters are used for horizontal and vertical definitions. The second group of eight are the standard PC values. Additional details of both the monochrome display and parallel printer adapter 28 and the color graphics adapter 26 may be had with reference to the aforementioned *Technical Reference* Manual for the IBM PC at pages 2-41 to 2-67. The analog input switch 52 is specifically designed to provide the interface between either of the two adapters and the 3278 display.

Figure 12:
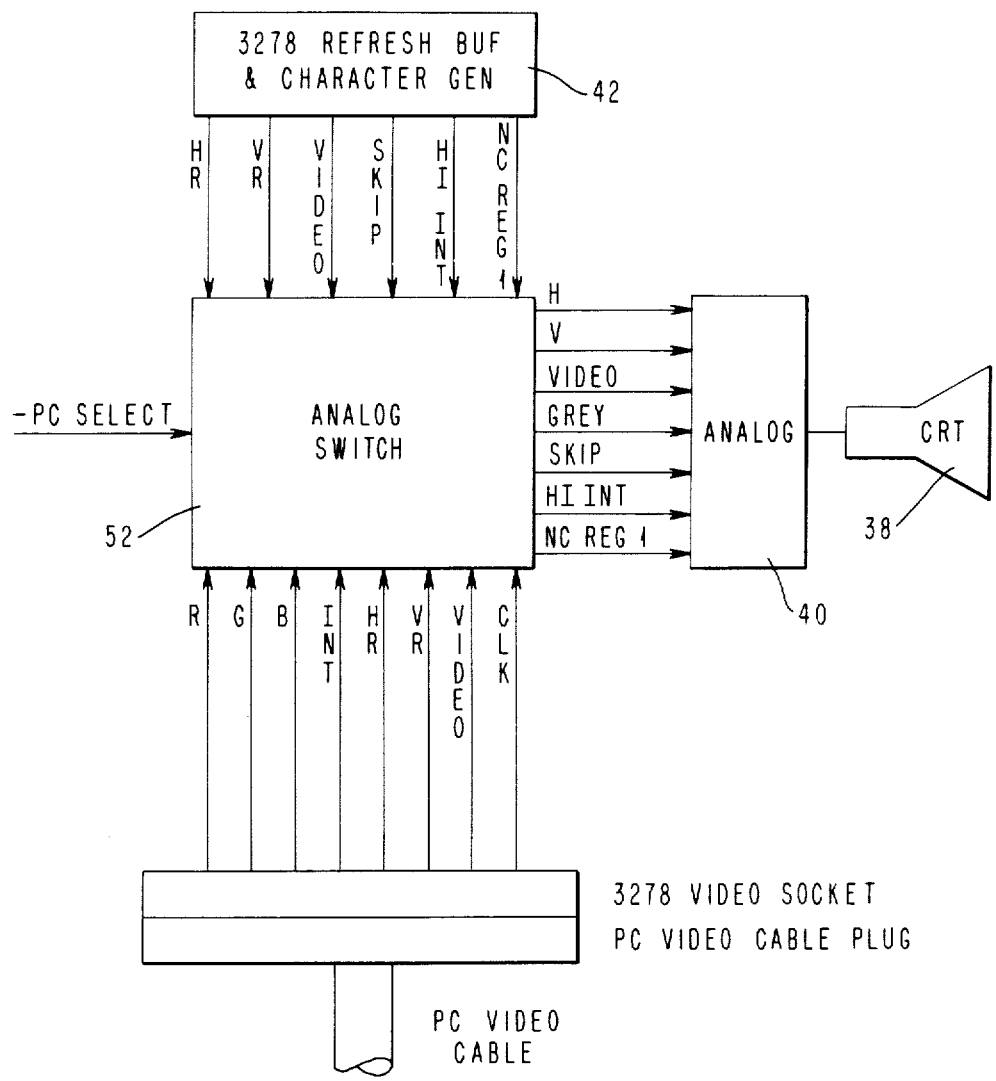
FIG. 12 is a block diagram showing the cable connections between the analog switch, the analog display circuits, the digital logic and refresh buffer, and the video cable input from the personal computer system unit.

Reference is now made to FIG. 12 which shows in detail the cable connections between the analog switch 52, the analog circuits 40, the digital logic and refresh buffer 42, and either the monochrome display adapter 28 or the color graphics adapter 26. Normally, the digital logic and refresh buffer 42 would provide to the analog circuits 40 horizontal sync signals (HR), vertical sync signals (VR), video data, intensity level, NC Reg 1 and vertical skip signals. When in the host mode, the switch 52 is transparent and passes these signals directly to the analog circuits 40. The monochrome display adapter 28 also produces horizontal sync, vertical sync, video and intensity (INT) signals which, in the PC mode, are modified by the analog switch 52 and passed to the analog circuits 40. The color graphics adapter 26 in addition produces red (R), green (G) and blue (B) color signals which, for the 3278 display, are converted to grey scale signals by the analog switch 52 and passed to the analog circuits 40.

Figure 13A:
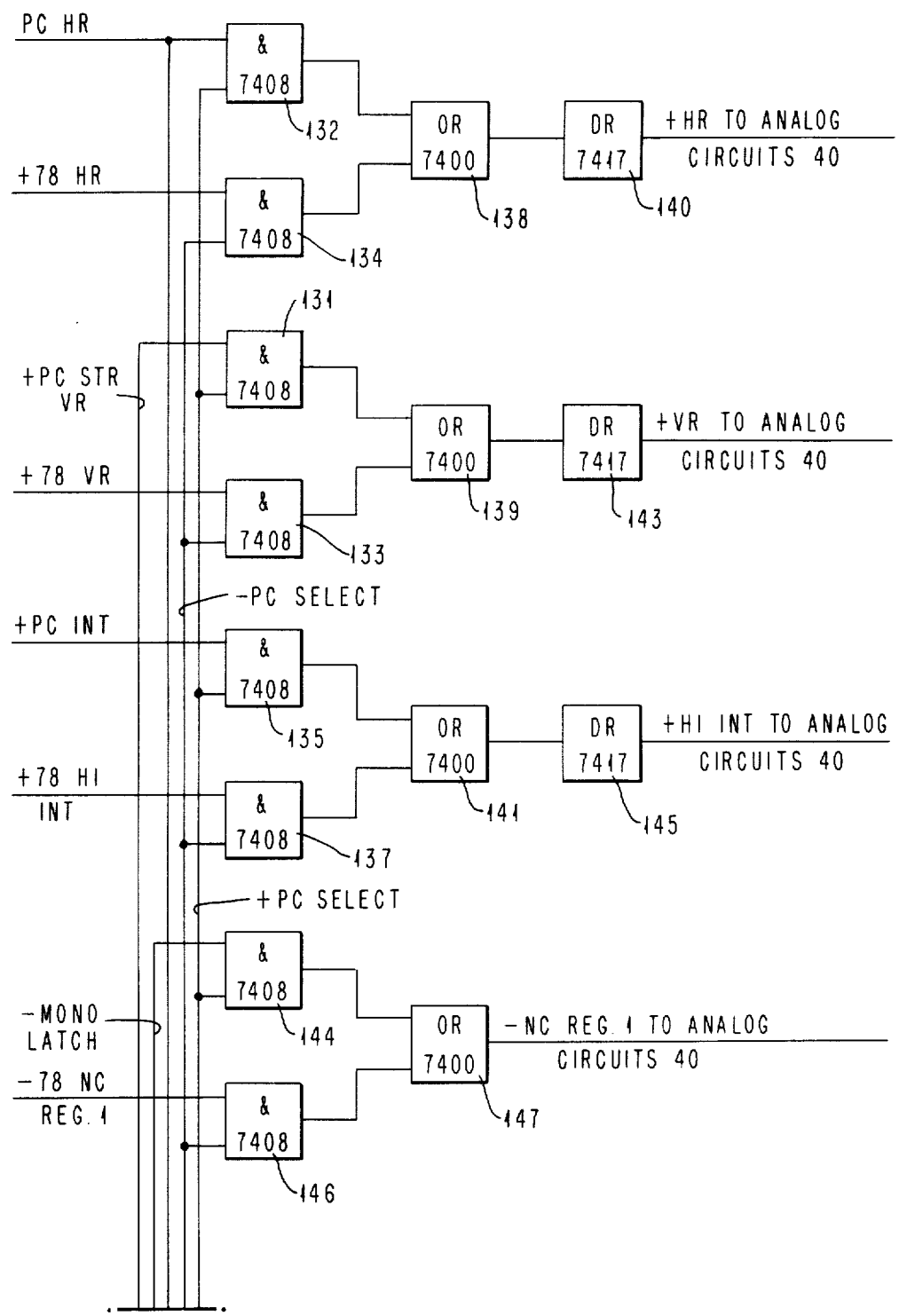
FIG. 13 illustrates the relationship of FIGS. 13A, 13B and 13C which, taken together, are in turn logic diagrams of the monitoring logic and video switch, the horizontal sync switch, the vertical sync switch and related switching logic, the vertical retrace signal stretcher, the color to grey scale translator, and the grey scale gate signal generator which comprise the analog switch in the preferred embodiment.
Figure 13B:
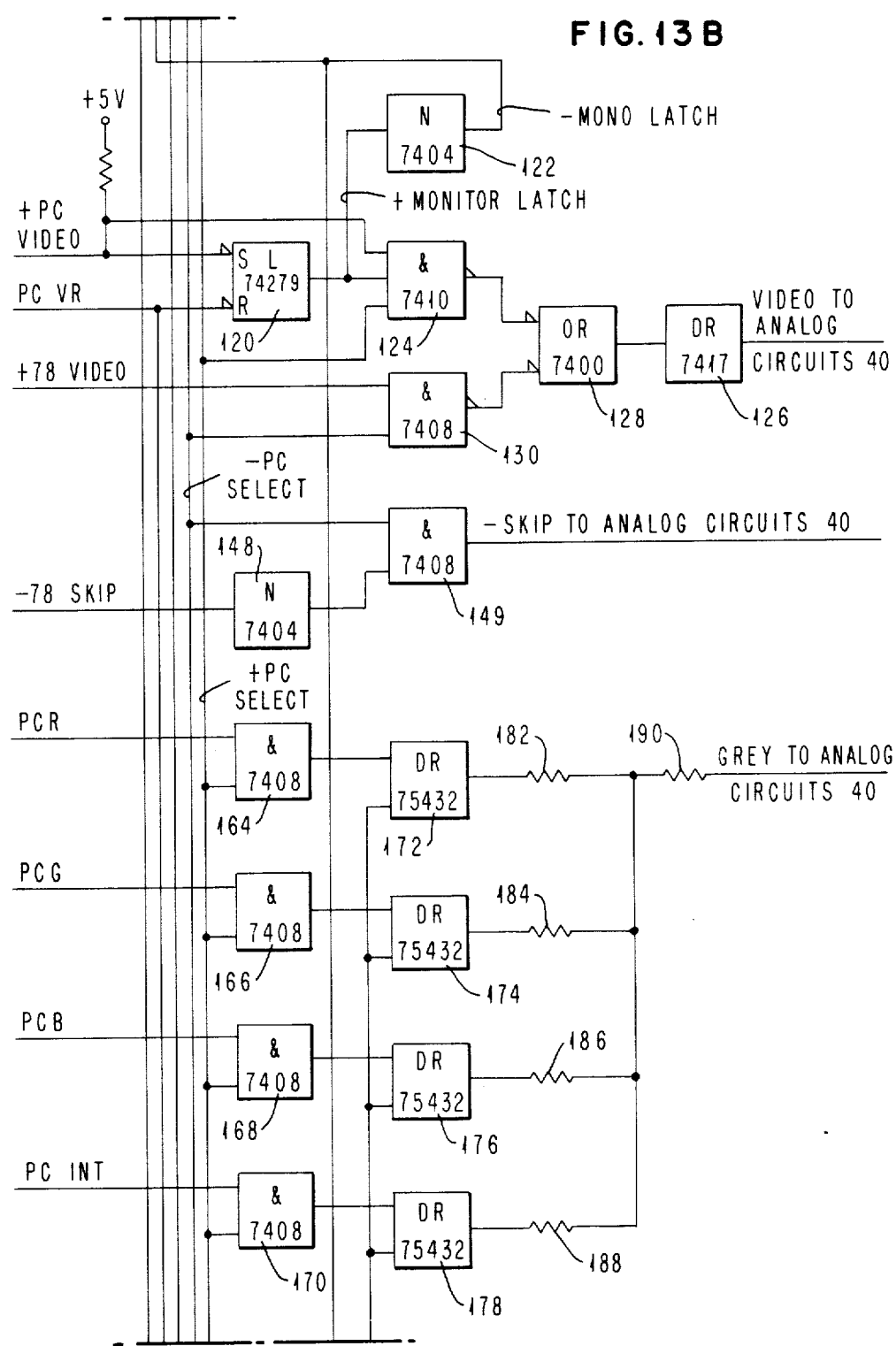
Figure 14:
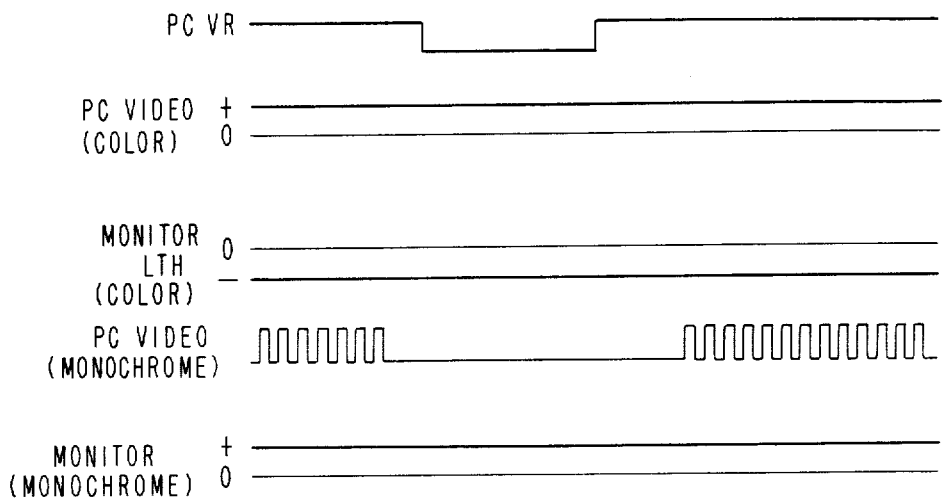
FIG. 14 is a timing diagram illustrating the operation of the monitoring logic.

The first function that is performed by the analog switch 52 is to monitor the presence of data on the PC data line in the video cable to determine whether the monochrome display adapter 28 or the color graphics adapter 26 is installed in the PC system unit 22. The monitoring logic is shown in FIG. 13B and comprises a monitor latch 120 which is set by the video signal from the PC adapter and reset by the vertical sync signal. As shown in FIG. 14, the PC video input (monochrome) signal from a monochrome display adapter is driven to a negative state prior to, during, and following the PC VR vertical sync signal. As a result, latch 120 is inhibited from being reset and provides a positive or high level output. When driven from a color graphics adapter, the PC video line floats and is held at +5 volts by a pullup resistor on the switch card. As a result, latch 120 is reset on the negative going edge of the PC VR vertical sync pulse. Since the latch 120 is an edge triggered device, it will not again be set and provides a negative or low level output. Thus, the latch 120 is always held in the appropriate state depending on which adapter is driving the cable.

The output of latch 120 is inverted by an inverter 122 to provide a monochrome latch control output. This control is described in more detail hereinafter but briefly summarizing, the control in combination with the PC select signal provides the following functions:

I. Monochrome and PC Select
    A. Disables the Color to Greyscale Translator
    B. Enables the Video Data and High Intensity data lines to the analog circuits
    C. Activates the −NC Reg 1 line at the analog circuits. This enables the 3278 Model 5 analog card to adapt its horizontal and vertical scan times to match the requirements of the PC monochrome adapter.

II. Color Graphics and PC Select
    A. Enables the Color to Greyscale Translator
    B. Disables the Video Data and High Intensity Data lines to the analog circuits
    C. De-activates the −NC Reg line at the analog circuits to revert to the 3278 Model 2 ramp times which match the horizontal and vertical scan times of the color graphics adapter The output of latch 120 is also used for video switching. Specifically, the output of latch 120 is connected to enable AND gate 124 which is selected by the PC Select signal to pass the video signal from the monochrome adapter. The output of AND gate 124 is supplied to driver 126 via OR gate 128. The other input to OR gate 128 is supplied by AND gate 130 which is selected by the inverse or NOT PC mode signal to pass the 3278 video signal. The output of driver 126 is connected to the analog circuits.

Figures 13, 13C:
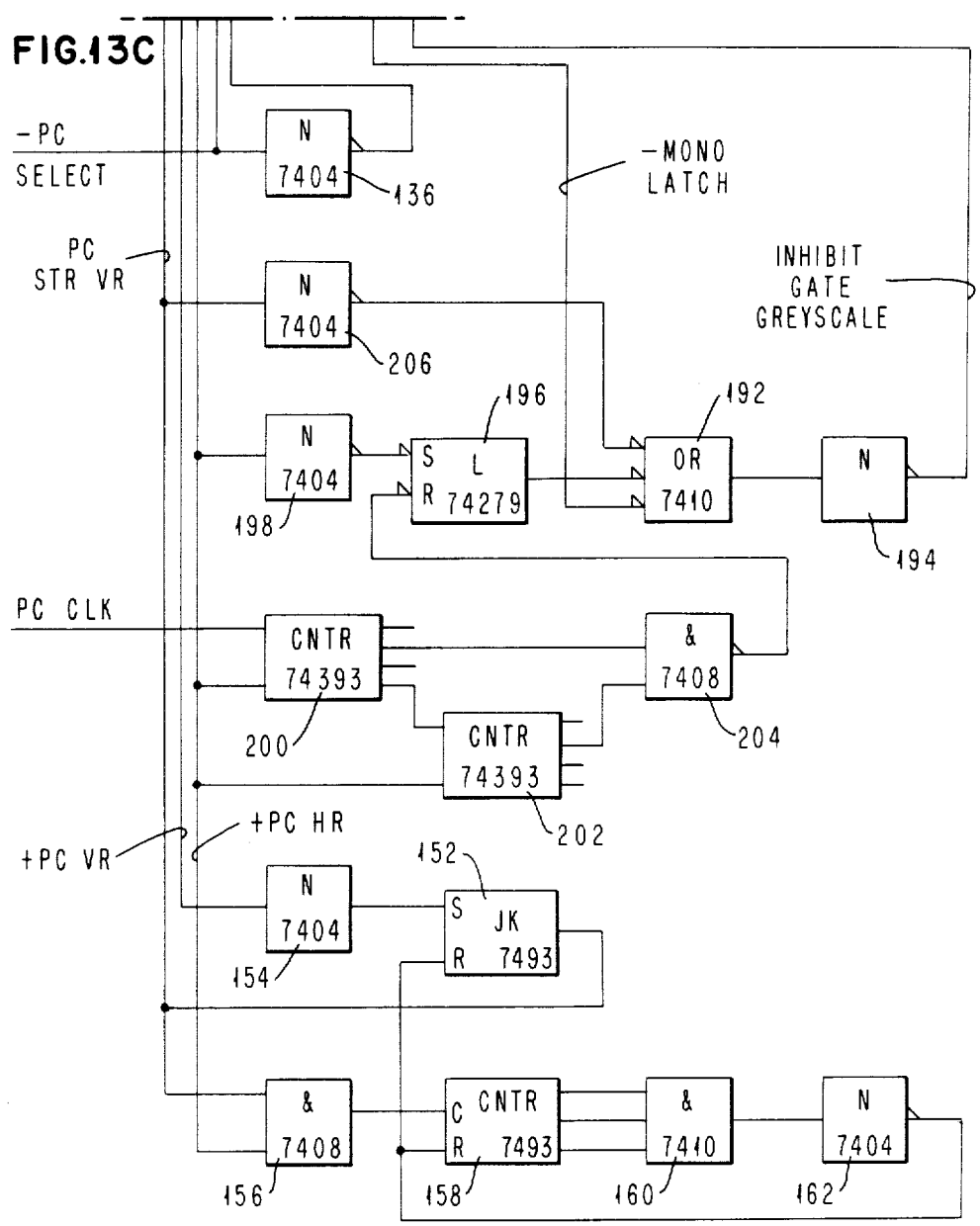

The analog switch also provides switching for the horizontal sync and vertical sync signals from both the 3278 digital logic and the PC attachment. As shown in FIG. 13A, the horizontal sync switching logic comprises a pair of AND gates 132 and 134. The horizontal sync signals from the PC are supplied to AND gate 132, while the horizontal sync signals from the 3278 logic are supplied to AND gate 134. The PC Select signal from the output of inverter 136 shown in FIG. 13C is used to select AND gate 132, and the inverse or NOT PC Select signal is used to select AND gate 134. The outputs of AND gates 132 and 134 are supplied via OR gate 138 to driver 140. The output of dirver 140 is supplied to the analog circuits 40. Similarly, the vertical sync switching logic comprises a pair of AND gates 131 and 133, an OR gate 139 and a driver 143. The AND gate 131 is used to select PC vertical sync pulses, while the AND gate 133 is used to select the 3278 vertical sync pulses. However, as will be described in more detail hereinafter, the PC vertical sync pulses supplied to the input of AND gate 131 are first stretched to match the input requirements of the 3278 display. In like manner, the intensity switching logic comprises a pair of AND gates 135 and 137, an OR gate 141 and a driver 145. The AND gate 135 is used to select the PC intensity signal, while the AND gate 137 is used to select the 3278 high intensity signal. The switching logic further includes AND gates 144 and 146, OR gate 147, inverter 148 and AND gate 149, the latter two being shown in FIG. 13B. AND gate 144 is selected by the PC Select signal, while AND gates 146 and 149 are selected by the inverse or NOT PC Select signal. The other input to AND gate 144 is the monochrome latch control output from inverter 122 in FIG. 13B. The other input to AND gate 146 is the NC Reg 1 signal from the digital logic and refresh buffer 42. The output of OR gate 147 is supplied to the analog circuits 40. In FIG. 13B, the Skip signal from the digital logic and refresh buffer 42 is supplied to the other input of AND gate 149 via inverter 148. The output of AND gate 149 is supplied to the analog circuits 40. Thus, the video switch logic presents the 3278 or PC sync and video signals to analog circuits 40 under the control of the PC Select signal received from the PC on the feature bus cable. A PC Select signal will cause data from the PC buffer to be displayed or data from the 3278 buffer to be displayed on the 3278 screen. The status of the PC Select signal and hence the video switch logic is controlled by the operator by entering a specific key sequence such as, for example, the "Alternate" key with the "Insert" key. Successive operations of this key sequence will toggle the screen between 3278 buffer data and PC buffer data.

The following table summarizes the data or signals received by the analog switch 52 and presented to the analog circuits 40:

| | Signal Names Presented To 3278 Analog Circuits |
|---|---|
| Signal Names Received From 3278 Base Logic | |
| +78 Horizontal Sync | +Horizontal Sync |
| +78 Vertical Retrace | +Vertical Retrace |
| +78 Hi Intensity | +Hi Intensity |
| +78 Video Data | +Video Data |
| −78 Vertical Skip | −Vertical Skip |
| −78 NC Reg 1 | −NC Reg 1 |
| Signal Names Received From Color Graphics Adptr | |
| +PC Horizontal Sync | +Horizontal Sync |
| +PC Vertical Sync | +Vertical Sync |
| +PC Red | |
| +PC Green | |
| +PC Blue | −PC Grey |
| +PC Hi Intensity | |
| Signal Names Received From Monochrome Adapter | |
| +PC Horizontal Sync | +Horizontal Sync |

-continued

| | Signal Names Presented To 3278 Analog Circuits |
|---|---|
| −PC Vertical Sync | +Vertical Sync |
| +PC Video | +Video |
| +PC Hi Intensity | +Hi Intensity |
| | −NC Reg 1 |

Figure 15:
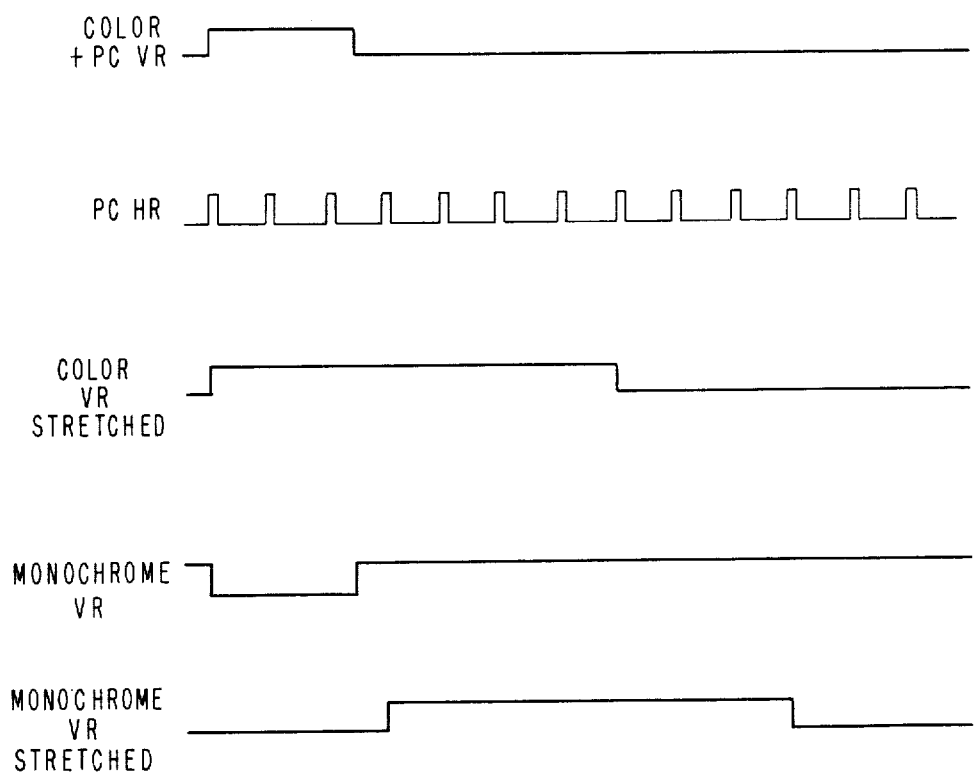
FIG. 15 is a timing diagram illustrating the operation of the vertical retrace signal stretcher.

In order to match the PC display adapters to the 3278 display, it is necessary to stretch the vertical retrace signal provided by the monochrome display adpater 28 or the color graphics adapter 26. The logic for doing this is shown in FIG. 13C. Both the PC adapters 26 and 28 provide a pulse of approximately 200 microseconds duration, the pulse from adpater 26 being positive going while the pulse from adapter 28 is negative going as shown in FIG. 15. What is required by the 3278 display is a pulse of approximately 450 to 500 microseconds duration. The pulse stretching logic shown in FIG. 13C receives the vertical and horizontal sync signals from the adapters 26 or 28. The vertical sync signal is supplied to the set input of an edge triggered latch 152 via an inverter 154. The latch 152 is therefore set on the leading edge of the vertical sync signal from adapter 26 and on the trailing edge of the vertical sync signal from adapter 28. When set, the latch 152 enables AND gate 156 to pass the horizontal sync pulses. Counter 158 counts the horizontal sync pulses to a predetermined count of 8 to allow for a stretched vertical retrace signal. When the predetermined count is reached, AND gate 160 produces a reset pulse via inverter 162 to reset latch 152 and counter 158. The output of latch 152 is therefore a stretched vertical retrace pulse of approximately 480 microseconds when adapter 26 is used and approximately 450 microseconds when adapter 28 is used as shown in FIG. 15.

When the color graphics adapter 26 is used with the 3278 display, the RGB color signals from the adapter are converted to greyscale signals which can be accomplished with the logic shown in FIG. 13C. The red, green, blue and high intensity signals received on the video cable from the PC are passed by respective AND gates 164, 166, 168 and 170 to corresponding drivers 172, 174, 176 and 178. The AND gates are enabled by a PC Select signal from inverter 136. The drivers are enabled by a greyscale gate signal produced by retrace blanking logic described hereinafter. The outputs of the drivers are fed to corresponding binary weighted resistors 182, 184, 186 and 188 which, together with summing resistor 190, form a digital-to-analog converting resistive ladder network. Thus, for the sixteen possible binary combinations input, sixteen different analog levels are produced at the −PC Grey output which is supplied to the intensity control of the analog circuits 40.

The greyscale gate signal is generated by the logic shown in FIG. 13C. First of all, the greyscale gate signal is inhibited by the monochrome latch control signal from inverter 122 shown in FIG. 13B. This signal is provided as an input to NAND gate 192 which, in combination with inverter 194, functions as an AND gate. This, a low input from inverter 122 indicating that a monochrome adapter is installed will produce a low output from inverter 194 disabling the drivers 172, 174, 176 and 178 shown in FIG. 13B. The other function performed by the retrace blanking logic is to blank the boarder area produced by the color graphics adapter 26 during horizontal retrace periods. This is accomplished by latch 196 which is set by the output of inverter 198. The input to inverter 198 is the PC horizontal retrace signal which also enables four stage counters 200 and 202. Counter 200 is clocked by the PC clock, and counter 202 is clocked by the output of counter 200. AND gate 204 functions as a decoder to detect a count of thirty-four and produce a reset pulse to latch 196. The counters 200 and 202 are reset by the trailing edge of the horizontal retrace pulse. When latch 196 is set, it produces a low level output to NAND gate 192 resulting in a low level output from inverter 194. A low level output from inverter 194 is also produced by the stretched vertical retrace signal from latch 152 after inversion by inverter 206.

Those skilled in the art will appreciate that what has been disclosed as a preferred embodiment and the best mode contemplated for the practice of the invention defined in the appended claims is not to be construed to limit the invention to the specifically disclosed hardware or software. As pointed out in the specification, simplifications can be achieved if the display station and the personal computer normally use keyboards that use the same scan codes. Other simplifications can be achieved if the display driver circuits of the display station and the personal computer are fully compatible. Still other simplifications can be made if not all the data transfer functions are implemented. Moreover, those skilled in the art will recognize that different hardware and software than that which is specifically disclosed could be used to perform the same or similar functions.

APPENDIX A

The IBM Personal Computer MACRO Assembler
3278/3279 Attachment BIOS Extension

```
  3
  4
  5                              ; ****************** Start of Specifications ********************
  6                              ;
  7                              ; Module Name: 3270ATT
  8                              ;
  9                              ; Descriptive Name: 3278/3279 Attachment BIOS extension
 10                              ;
 11                              ; Copyright: IBM Corp 1982
 12                              ;
 13                              ; Status: Version 1.00
 14                              ;
 15                              ; Function: To handle all hardware interrupts from the 3278/3279
 16                              ;           attachment option and all software interrupts for
 17                              ;           3278/3279 attachment functions
 18                              ;
 19                              ; Notes:
 20                              ;
 21                              ;   Dependencies: DOS 1.1 or later
 22                              ;
 23                              ;   Restrictions: None
 24                              ;
 25                              ; Module Type: Program
 26                              ;
 27                              ;   Processor: Assembler
 28                              ;
 29                              ; Entry Point: NDSP_COPYRIGHT
 30                              ;
 31                              ;   Purpose: Copyright notice displayed when BIOS is initialized
 32                              ;
 33                              ;   Linkage: None
 34                              ;
 35                              ;   Input Parameters: None
 36                              ;
 37                              ; Entry Point: NDSP_INT
 38                              ;
 39                              ;   Purpose: To process all hardware interupts from the 3278/3279
 40                              ;            attachment option
 41                              ;
 42                              ;   Linkage: Hardware interrupt 2
 43                              ;
 44                              ;   Input Parameters: None
 45                              ;
 46                              ; Exit Normal:
 47                              ;
 48                              ;   Purpose: To return to the interrupted program
 49                              ;
 50                              ;   Linkage: IRET
 51                              ;
 52                              ;   Output: None
 53                              ;
 54                              ; Exit Error: None
 55                              ;
 56                              ; External References:
 57                              ;
 58                              ;   Procedure Invoked: PROC_KEYBOARD_DATA
 59                              ;
 60                              ;     Purpose: To process a keystroke from the 3278/3279 keyboard
 61                              ;
 62                              ;     Linkage: CALL
 63                              ;
 64                              ;     Input Parameters: None
 65                              ;
 66                              ;     Output: None
```

```
 67                                            ;
 68                                            ;   Procedure Invoked: PROC_PC_PORT_AVAIL
 69                                            ;
 70                                            ;      Purpose: To send the next waiting keystroke to the Personal
 71                                            ;               Computer
 72                                            ;
 73                                            ;      Linkage: CALL
 74                                            ;
 75                                            ;      Input Parameters: None
 76                                            ;
 77                                            ;      Output: None
 78                                            ;
 79                                            ;   Procedure Invoked: PROC_3278_PORT_AVAIL
 80                                            ;
 81                                            ;      Purpose: To send the next waiting keystroke to the 3278/3279
 82                                            ;
 83                                            ;      Linkage: CALL
 84                                            ;
 85                                            ;      Input Parameters: None
 86                                            ;
 87                                            ;      Output: None
 88                                            ;
 89                                            ;   Procedure Invoked: PROC_START_OP
 90                                            ;
 91                                            ;      Purpose: To process a Start Operation command received from the
 92                                            ;               3274 control unit
 93                                            ;
 94                                            ;      Linkage: CALL
 95                                            ;
 96                                            ;      Input Parameters: None
 97                                            ;
 98                                            ;      Output: None
 99                                            ;
100                                            ;   Control Blocks:
101                                            ;
102                                            ;      NDSPDCLS - 3278/3279 adapter interfaces
103                                            ;      NDSPUSER - 3278/3279 attachment BIOS software interfaces
104                                            ;
105                                            ; Messages Issued: None
106                                            ;
107                                            ; Change Activity: None
108                                            ;
109                                            ; ****************** End of Specifications ******************
110
111                                                    SUBTTL  3278/3279 Attachment Option Interfaces
112
113                                        C           INCLUDE NDSPDCLS.ASM
114                                        C
115                                        C  ;************************************************************
116                                        C  ;*
117                                        C  ;*     I/O ADDRESS ASSIGNMENTS
118                                        C  ;*
119                                        C  ;************************************************************
120                                        C
121        = 03E0                          C  BASE_ADDR       EQU 03E0H          ; BASE I/O ADDRESS FOR NDSP ADAPTER
122        = 03E0                          C  NDS_KB_IN       EQU BASE_ADDR+0    ; 3278/3279 KEYBOARD INPUT PORT
123        = 03E1                          C  NDS_KB_OUT      EQU BASE_ADDR+1    ; 3278/3279 DISPLAY OUTPUT PORT
124        = 03E2                          C  KB_CTL          EQU BASE_ADDR+2    ; KEYBOARD CONTROL PORT
125        = 03E3                          C  CMD_8255        EQU BASE_ADDR+3    ; 8255 COMMAND PORT
126        = 03E4                          C  STATUS_PORT     EQU BASE_ADDR+4    ; NDSP ADAPTER STATUS PORT
127        = 03E4                          C  COMMAND_PORT    EQU BASE_ADDR+4    ; NDSP ADAPTER COMMAND PORT
128        = 03E5                          C  START_OP_MOD    EQU BASE_ADDR+5    ; START OPERATION MODIFIER PORT
129        = 03E5                          C  PC_KB_OUT       EQU BASE_ADDR+5    ; PERSONAL COMPUTER KEYBOARD OUTPUT PO
130                                        C
131        = 0020                          C  CTL_8259 EQU    20H                ; 8259 INTERRUPT CONTROLLER PORT
132        = 0021                          C  IMR_8259 EQU    21H                ; 8259 INTERRUPT MASK REGISTER
133                                        C
134                                        C
135                                        C  ;************************************************************
136                                        C  ;*
137                                        C  ;*     VALUES TO BE SENT TO KEYBOARD CONTROL PORT (KB_CTL)
138                                        C  ;*
139                                        C  ;************************************************************
140                                        C
141        = 0000                          C  SELECT_DATA EQU 00H                ; SELECT KEYBOARD DATA
142        = 0040                          C  SELECT_ID   EQU 40H                ; SELECT KEYBOARD IDENTIFIER
143                                        C
144                                        C
145                                        C  ;************************************************************
146                                        C  ;*
147                                        C  ;*     VALUES TO BE SENT TO 8255 COMMAND PORT (CMD_8255)
148                                        C  ;*
149                                        C  ;************************************************************
150                                        C
151        = 0003                          C  NOT_OBF EQU         03H            ; NO OUTPUT CHARACTER AVAILABLE
152        = 0004                          C  RESET_INTE_B EQU    04H            ; DISABLE INTERRUPT FROM 3278/3279
153        = 0005                          C  SET_INTE_B EQU      05H            ; ENABLE INTERRUPT FROM 3278/3279
154        = 0008                          C  RESET_INTE_A EQU    08H            ; DISABLE INTERRUPT FROM 3278/3279
155                                        C                                     ;   KEYBOARD
156        = 0009                          C  SET_INTE_A EQU      09H            ; ENABLE INTERRUPT FROM 3278/3279
157                                        C                                     ;   KEYBOARD
158        = 000E                          C  PC_MODE EQU         0EH            ; SWITCH 3278/3279 TO PERSONAL COMPUTER
159                                        C                                     ;   MODE
160        = 000F                          C  HOST_MODE EQU       0FH            ; SWITCH 3278/3279 TO HOST PROCESSOR
```

```
161                      C                        ;    MODE
162                      C
163                      C
164                      C  ;********************************************************
165                      C  ;*
166                      C  ;*     VALUES TO BE SENT TO INTERRUPT CONTROLLER PORT (CTL_8259)
167                      C  ;*
168                      C  ;********************************************************
169                      C
170      = 0062          C  EOI        EQU    62H            ; END OF INTERRUPT FOR LEVEL 2
171                      C
172                      C
173                      C
174                      C  ;********************************************************
175                      C  ;*
176                      C  ;*     VALUES TO BE SENT TO NDSP COMMAND PORT (COMMAND_PORT)
177                      C  ;*
178                      C  ;********************************************************
179                      C
180      = 0000          C  SERIAL_INT_OFF           EQU  00H ; TURN OFF SERIAL PORT INTERRUPT FLAG
181      = 0001          C  OP_COMPLETE              EQU  01H ; OPERATION COMPLETE
182      = 0002          C  READ_COMPLETE            EQU  02H ; 3274 CAN READ DATA FROM NDSP ADAPTER
183                      C                                   ;   BUFFER
184      = 0003          C  READ_REQUEST             EQU  03H ; REQUEST READ FROM 3274
185      = 0004          C  SCREEN_CAPTURE_COMPLETE  EQU  04H ; SCREEN CAPTURE COMPLETE
186      = 0005          C  SCREEN_CAPTURE           EQU  05H ; SCREEN CAPTURE IN PROCESS
187      = 0006          C  DIAGNOSTIC_MODE_OFF      EQU  06H ; TURN OFF DIAGNOSTIC MODE
188      = 0007          C  DIAGNOSTIC_MODE_ON       EQU  07H ; TURN ON DIAGNOSTIC MODE
189      = 0008          C  CLICK_OFF                EQU  08H ; TURN OFF 3278/3279 KEYBOARD CLICKER
190      = 0009          C  CLICK_ON                 EQU  09H ; TURN ON 3278/3279 KEYBOARD CLICKER
191      = 000A          C  DISABLE_NDS              EQU  0AH ; DISABLE 3278/3279 DISPLAY INTERFACE
192      = 000B          C  ENABLE_NDS               EQU  0BH ; ENABLE 3278/3279 DISPLAY INTERFACE
193      = 000C          C  RESET_IPL_COMPLETE       EQU  0CH ; NDSP ADAPTER CODE NOT INITIALIZED
194      = 000D          C  IPL_COMPLETE             EQU  0DH ; NDSP ADAPTER CODE INITIALIZED
195      = 000E          C  RESET_ADAPTER            EQU  0EH ; RESET 3278/3279 ADAPTER
196                      C
197                      C
198                      C  ;********************************************************
199                      C  ;*
200                      C  ;*     MASK VALUES FOR NDSP ADAPTER STATUS (READ FROM STATUS_PORT)    *
201                      C  ;*
202                      C  ;********************************************************
203      = 0001          C  ST_KB_IN       EQU    01H        ; 3278/3279 KEYBOARD DATA AVAILABLE
204      = 0002          C  ST_KB_OUT      EQU    02H        ; 3278/3279 KEYBOARD OUTPUT PORT
205                      C                                   ;   AVAILABLE
206      = 0004          C  ST_START_OP    EQU    04H        ; START OPERATION FROM 3274
207      = 0008          C  ST_PC_KB_OUT   EQU    08H        ; PERSONAL COMPUTER KEYBOARD OUTPUT PORT
208                      C                                   ;   AVAILABLE
209      = 0010          C  ST_PC_KB_BUSY  EQU    10H        ; PERSONAL COMPUTER KEYBOARD OUTPUT PORT
210                      C                                   ;   BUSY
211      = 0020          C  ST_3278        EQU    20H        ; DISPLAY IS A 3278
212      = 0040          C  ST_POLL_ACTIVE EQU    40H        ; POLL REQUEST IS ACTIVE
213                      C
214                      C
215                      C  ;********************************************************
216                      C  ;*
217                      C  ;*     START OPERATION MODIFIERS (READ FROM START_OP_MOD)            *
218                      C  ;*
219                      C  ;********************************************************
220                      C
221      = 0001          C  SOM_POR        EQU    01H        ; 3278/3279 POWER ON RESET
222      = 0002          C  SOM_READ       EQU    02H        ; START OF READ SEQUENCE
223      = 0003          C  SOM_WRITE      EQU    03H        ; END OF WRITE SEQUENCE
224      = 0004          C  SOM_EXECUTE    EQU    04H        ; EXECUTE COMMAND
225      = 0005          C  SOM_ABORT_E    EQU    05H        ; ABORT TRANSFER COMMAND
226      = 0006          C  SOM_ABORT_V    EQU    06H        ; ABORT TO LAST VERIFY COMMAND
227      = 0007          C  SOM_ERROR      EQU    07H        ; ERROR COMMAND
228      = 0008          C  SOM_VERIFY     EQU    08H        ; VERIFY COMMAND
229                      C
230                      C
231                      C
232                      C  ;********************************************************
233                      C  ;*
234                      C  ;*     KEYBOARD TRANSLATION TABLE VALUES - SPECIAL FUNCTION KEYS     *
235                      C  ;*
236                      C  ;********************************************************
237                      C
238      =-0001          C  SHIFT_LOCK     EQU    -1         ; SHIFT LOCK KEY
239      =-0002          C  L_SHIFT        EQU    -2         ; LEFT HAND SHIFT KEY
240      =-0003          C  R_SHIFT        EQU    -3         ; RIGHT HAND SHIFT KEY
241      =-0004          C  NUM_LOCK       EQU    -4         ; NUMERIC LOCK KEY
242      =-0005          C  NUM_SHIFT      EQU    -5         ; NUMERIC SHIFT KEY
243      =-0006          C  ALPHA_SHIFT    EQU    -6         ; ALPHAMERIC SHIFT KEY
244      =-0007          C  ALT_SHIFT      EQU    -7         ; ALT KEY
245      =-0008          C  RESET          EQU    -8         ; RESET KEY
246      =-0009          C  CLICK          EQU    -9         ; CLICK ON/OFF KEY
247      =-000A          C  DEC_INP        EQU    -10        ; START DECIMAL INPUT KEY
248      =-000B          C  SWITCH_MODE    EQU    -11        ; TOGGLE MODE KEY
249      =-000C          C  CTL_KEY        EQU    -12        ; ENTER PERSONAL COMPUTER CTRL CASE
250      =-000D          C  ALT_KEY        EQU    -13        ; ENTER PERSONAL COMPUTER ALT CASE
251      =-000E          C  PAUSE_KEY      EQU    -14        ; PAUSE UNTIL ANOTHER KEY IS HIT
252      = 0007          C  NO_SHIFT_KEYS  EQU    7          ; NUMBER OF SHIFT KEYS DEFINED
253                      C
254                      C
```

```
255
256           C ;*                                                                  *
257           C ;*      KEYBOARD TRANSLATION TABLE VALUES - REQUIRED STATES          *
258           C ;*
259           C ;***************************************************************
260           C
261  = 0000   C  L       EQU    00H           ; LOWER CASE
262  = 0080   C  U       EQU    80H           ; UPPER CASE
263  = 0040   C  C       EQU    40H           ; CTRL CASE
264  = 0020   C  A       EQU    20H           ; ALT CASE
265  = 0002   C  BA      EQU    02H           ; INDICATE BREAK ALT AFTER KEYSTROKE
266  = 0001   C  B       EQU    01H           ; MUST ALSO INDICATE BREAK FOR THIS
267           C                                ;   KEYSTROKE
268           C
269           C
270           C
271  0000     C  FBA_BUFFER SEGMENT AT 0E400H
272           C
273           C ;***************************************************************
274           C ;*
275           C ;*      FEATURE BUS ADAPTER BUFFER
276           C ;*
277           C ;***************************************************************
278           C
279  0000 ????  C  HDR_LENGTH   DW  ?         ; LENGTH OF DATA
280  0002 ??    C  HDR_TYPE     DB  ?         ; MESSAGE TYPE
281  0003 ??    C  HDR_FLAGS    DB  ?         ; MESSAGE FLAGS
282  = 0080     C  HDR_F_START  EQU 80H       ;   START OF MESSAGE
283  = 0040     C  HDR_F_END    EQU 40H       ;   END OF MESSAGE
284  0004  FC [ C  HDR_DATA     DB  252 DUP(?) ; TEXT OF MESSAGE
285         ??  C
286          ]  C
287           C
288           C
289  = 0100   C  SIZE_FBA_BUFFER EQU $-FBA_BUFFER ; SIZE OF FBA BUFFER
290           C
291  0100     C  FBA_BUFFER  ENDS
292           C
293           C
294           C ;***************************************************************
295           C ;*
296           C ;*      TYPE CODES IN FEATURE BUS MESSAGE HEADER
297           C ;*
298           C ;***************************************************************
299           C
300           C ;       MESSAGES SENT TO THE 3274
301           C
302  = 0000   C  HT_WRAP_TO_3274    EQU  00H  ; WRAP TEST MESSAGE TO 3274
303  = 0002   C  HT_SF_TO_HOST      EQU  02H  ; STRUCTURED FIELD TO HOST
304  = 0004   C  HT_SET_SC_OPTIONS  EQU  04H  ; SET SCREEN CAPTURE OPTIONS
305  = 0006   C  HT_QUERY_KBD_STATE EQU  06H  ; QUERY KEYBOARD STATE
306  = 0008   C  HT_ERROR_LOG       EQU  08H  ; ERROR LOG MESSAGE TO 3274
307           C
308           C ;       MESSAGES RECEIVED FROM THE 3274
309           C
310  = 0001   C  HT_WRAP_FROM_3274  EQU  01H  ; WRAP TEST MESSAGE FROM 3274
311  = 0003   C  HT_SF_FROM_HOST    EQU  03H  ; STRUCTURED FIELD FROM HOST
312  = 0005   C  HT_SC_DATA         EQU  05H  ; SCREEN CAPTURE DATA
313  = 0007   C  HT_KBD_STATE       EQU  07H  ; KEYBOARD STATE
314           C
315           C ;       DEVICE TYPE CODES
316           C
317  = 0001   C  HT_ID              EQU  01H  ; 3278/3270 PERSONAL COMPUTER ATTACHMEN
318           C
319                  SUBTTL  3278/3279 Attachment BIOS Extension Interfaces
320
321           C      INCLUDE NDSPUSER.ASM
322           C
323           C ;***************************************************************
324           C ;*                                                                  *
325           C ;*      NDSP USER INTERFACES                                        *
326           C ;*                                                                  *
327           C ;***************************************************************
328           C
329  = 0050   C  NDSP_INT_CODE EQU 50H         ; NDSP SOFTWARE INTERRUPT CODE
330           C
331           C
332           C ;***************************************************************
333           C ;*                                                                  *
334           C ;*      FUNCTION CODES - PLACED IN REGISER AH BEFORE INVOKING BIOS  *
335           C ;*                                                                  *
336           C ;***************************************************************
337           C
338  = 0000   C  FUNC_SET_MODE            EQU  0 ; SET MODE
339  = 0001   C  FUNC_SEND_KEYS           EQU  1 ; SEND KEYSTROKES TO 3278/3279
340  = 0002   C  FUNC_SET_INT_VECTOR      EQU  2 ; SET NDSP INTERRUPT VECTOR
341  = 0003   C  FUNC_RESET_INT_VECTOR    EQU  3 ; RESET NDSP INTERRUPT VECTOR
342  = 0004   C  FUNC_SET_BUFFER_ADDRESS  EQU  4 ; SET INPUT BUFFER ADDRESS
343  = 0005   C  FUNC_SEND_MESSAGE        EQU  5 ; SEND MESSAGE TO HOST
344  = 0006   C  FUNC_CANCEL_MESSAGE      EQU  6 ; CANCEL MESSAGE TO HOST
345  = 0007   C  FUNC_MOD_XLAT_IN         EQU  7 ; MODIFY INBOUND TRANSLATION TABLE
346  = 0008   C  FUNC_MOD_XLAT_OUT        EQU  8 ; MODIFY OUTBOUND TRANSLATION TABLE
347  = 0009   C  FUNC_QUERY_KEYBOARD_ID   EQU  9 ; QUERY KEYBOARD ID
```

```
348
349
350           C       ;*******************************************************
351           C       ;*                                                      *
352           C       ;*   MODE VALUES - PLACED IN AL REGISTER WHEN SETTING MODE *
353           C       ;*                                                      *
354           C       ;*******************************************************
355           C
356  = 0000   C       SET_MODE_HOST         EQU  0 ; CHANGE TO HOST PROCESSOR MODE
357  = 0001   C       SET_MODE_PC           EQU  1 ; CHANGE TO PERSONAL COMPUTER MODE
358  = 0002   C       SET_MODE_HOST_SCREEN  EQU  2 ; DISPLAY HOST SCREEN IMAGE
359  = 0003   C       SET_MODE_PC_SCREEN    EQU  3 ; DISPLAY PC SCREEN IMAGE
360           C
361           C
362           C       ;*******************************************************
363           C       ;*                                                      *
364           C       ;*   INTERRUPT VECTOR VALUES - PLACED IN AL REGISTER WHEN *
365           C       ;*   SETTING OR RESETTING NDSP INTERRUPT VECTOR AND WHEN  *
366           C       ;*   SPECIFYING INPUT BUFFER ADDRESS                    *
367           C       ;*                                                      *
368           C       ;*******************************************************
369           C
370  = 0000   C       VECTOR_DATA_XFER        EQU  0 ; DATA TRANSFER
371  = 0001   C       VECTOR_SCREEN_CAPTURE   EQU  1 ; SCREEN CAPTURE
372  = 0002   C       VECTOR_WRAP_TEST        EQU  2 ; WRAP TEST
373  = 0003   C       VECTOR_QUERY_KBD_STATE  EQU  3 ; QUERY KEYBOARD STATE (USED INTERNALLY)
374           C
375           C
376           C       ;*******************************************************
377           C       ;*                                                      *
378           C       ;*   RETURN CODE (IN AL REGISTER) FROM NDSP BIOS        *
379           C       ;*                                                      *
380           C       ;*******************************************************
381           C
382  = 0000   C       RC_OK                 EQU  0 ; FUNCTION PERFORMED
383  = 0001   C       RC_INVALID_FUNC       EQU  1 ; FUNCTION CODE INVALID
384  = 0002   C       RC_INVALID_MODE       EQU  2 ; MODE SELECTION CODE INVALID
385  = 0003   C       RC_FBA_NOT_OP         EQU  3 ; FEATURE BUS ADAPTER NOT OPERATIONAL
386  = 0004   C       RC_INVALID_KEY        EQU  4 ; INVALID KEY STROKE IN MESSAGE
387  = 0005   C       RC_INVALID_VECTOR     EQU  5 ; INVALID INTERRUPT VECTOR SPECIFIED
388  = 0006   C       RC_POWER_ON_RESET     EQU  6 ; MESSAGE CANCELLED BY 3278/3279/3274
389           C                                   ;   POWER ON RESET
390  = 0007   C       RC_PROTOCOL_VIOLATION EQU  7 ; MESSAGE REJECTED BY 3274 DUE TO
391           C                                   ;   PROTOCOL VIOLATION
392  = 0008   C       RC_MESSAGE_CANCELLED  EQU  8 ; MESSAGE CANCELLED BY USER REQUEST
393  = 0009   C       RC_INVALID_PARM       EQU  9 ; INVALID PARAMETER
394  = 000A   C       RC_AID_PENDING        EQU 10 ; 3278/3279 KEYBOARD IS INHIBITED
395           C                                   ;   BECAUSE OF A PREVIOUS AID
396  = 000B   C       RC_KEYBOARD_INHIBITED EQU 11 ; 3278/3279 KEYBOARD IS INHIBITED
397           C                                   ;   FOR SOME OTHER REASON
398  = 000C   C       RC_AID_SENT           EQU 12 ; 3278/3279 KEYBOARD IS NOW INHIBITED
399           C                                   ;   BECAUSE AN AID WAS SENT
400  = 000D   C       RC_MESSAGE_LOST       EQU 13 ; 3278/3279 KEYBOARD IS NOW INHIBITED -
401           C                                   ;   SOME OF THE KEYSTROKES WERE LOST
402           C
403           C
404           C
405           C       ;*******************************************************
406           C       ;*                                                      *
407           C       ;*   CODE (IN AH REGISTER) WHEN INTERRUPT HANDLER IS    *
408           C       ;*   ENTERED FROM NDSP BIOS                             *
409           C       ;*                                                      *
410           C       ;*******************************************************
411           C
412  = 0001   C       REASON_MESSAGE_RECEIVED EQU 1 ; MESSAGE RECEIVED FROM 3274
413  = 0002   C       REASON_POWER_ON_RESET   EQU 2 ; POWER ON RESET RECEIVED FROM 3278/327
414  = 0003   C       REASON_DATA_OVERRUN     EQU 3 ; DATA RECEIVED FROM 3274 WHEN NO BUFFE
415           C                                    ;   WAS AVAILABLE
416           C
417           C
418
419                   SUBTTL Process an interrupt from the 3278/3279 attachment optic
420                   PAGE
421
422                   ;*******************************************************
423                   ;*                                                      *
424                   ;*   GROUP ALL BIOS DATA SEGMENTS TOGETHER              *
425                   ;*                                                      *
426                   ;*******************************************************
427
428                   BIOSDATA GROUP  BIOSDATA_COMMON,BIOSDATA_KEYBOARD,BIOSDATA_FBA
429
430  0000             BIOSDATA_COMMON   SEGMENT COMMON 'NDSPBIOS'
431  0000             BIOSDATA_COMMON   ENDS
432
433  0000             BIOSDATA_KEYBOARD SEGMENT PUBLIC 'NDSPBIOS'
434  0000             BIOSDATA_KEYBOARD ENDS
435
436  0000             BIOSDATA_FBA      SEGMENT PUBLIC 'NDSPBIOS'
437  0000             BIOSDATA_FBA      ENDS
438
439                   Page
440
441  0000             NDSPBIOS SEGMENT PUBLIC 'NDSPBIOS'
```

```
442
443                             EXTRN    PROC_KEYBOARD_DATA:NEAR
444                             EXTRN    PROC_PC_PORT_AVAIL:NEAR
445                             EXTRN    PROC_3278_PORT_AVAIL:NEAR
446                             EXTRN    PROC_START_OP:NEAR
447                             PUBLIC   NDSP_INT
448                             PUBLIC   PROC_INTERRUPTS
449                             PUBLIC   NDSP_COPYRIGHT
450
451   0000                      NDSP_COPYRIGHT  LABEL BYTE
452   0000  49 42 4D 20 50 65           DB       'IBM Personal Computer 3278 Attachment',0DH,0AH
453         72 73 6F 6E 61 6C
454         20 43 6F 6D 70 75
455         74 65 72 20 33 32
456         37 38 20 41 74 74
457         61 63 68 6D 65 6E
458         74 0D 0A
459   0027  56 65 72 73 69 6F           DB       'Version 1.00 (C)Copyright IBM Corp 1982',0DH,0AH,'$'
460         6E 20 31 2E 30 30
461         20 28 43 29 43 6F
462         70 79 72 69 67 68
463         74 20 49 42 4D 20
464         43 6F 72 70 20 31
465         39 38 32 0D 0A 24
466
467                             ;*********************************************************
468                             ;*
469                             ;*  Procedure Name: NDSP_INT
470                             ;*
471                             ;*  Function: To process all hardware interrupts from the 3278/3279
472                             ;*            Attachment Option
473                             ;*
474                             ;*  Input: 3278/3279 Attachment Option status register
475                             ;*
476                             ;*  Output: None
477                             ;*
478                             ;*********************************************************
479
480   0051                      NDSP_INT PROC FAR
481
482                                      ASSUME   CS:NDSPBIOS,DS:BIOSDATA
483   0051  FB                           STI                    ; ALLOW HIGHER PRIORITY INTERRUPTS
484   0052  50                           PUSH     AX            ; SAVE REGISTERS
485   0053  53                           PUSH     BX
486   0054  51                           PUSH     CX
487   0055  52                           PUSH     DX
488   0056  56                           PUSH     SI
489   0057  57                           PUSH     DI
490   0058  1E                           PUSH     DS
491   0059  06                           PUSH     ES
492
493   005A  B8 ---- R                    MOV      AX,BIOSDATA   ; ESTABLISH ADDRESSABILITY TO WORK ARE
494   005D  8E D8                        MOV      DS,AX
495
496   005F  E8 006B R                    CALL     PROC_INTERRUPTS ; PROCESS ALL PENDING INTERRUPTS
497
498   0062  07                           POP      ES            ; RESTORE REGISTERS
499   0063  1F                           POP      DS
500   0064  5F                           POP      DI
501   0065  5E                           POP      SI
502   0066  5A                           POP      DX
503   0067  59                           POP      CX
504   0068  5B                           POP      BX
505   0069  58                           POP      AX
506
507   006A  CF                           IRET                   ; RETURN TO INTERRUPTED PROGRAM
508
509   006B                      NDSP_INT ENDP
510
511                                      Page
512
513                             ;*********************************************************
514                             ;*
515                             ;*  Procedure Name: PROC_INTERRUPTS
516                             ;*
517                             ;*  Function: To process all pending interrupts from the 3278/3279
518                             ;*            attachment option
519                             ;*
520                             ;*  Input: 3278/3279 Attachment Option status register
521                             ;*
522                             ;*  Output: All interrupts processed - EOI sent to 8259 for level 2
523                             ;*
524                             ;*********************************************************
525
526   006B                      PROC_INTERRUPTS PROC NEAR
527
528   006B                      DETERMINE_CAUSE:
529   006B  BA 03E4                      MOV      DX,STATUS_PORT ; READ THE ADAPTER STATUS REGISTER
530   006E  EC                           IN       AL,DX
531
532   006F  A8 04                        TEST     AL,ST_START_OP ; WAS THE INTERRUPT CAUSED BY RECEIPT O
533                             ;                                 A START OPERATION COMMAND FROM THE
534                             ;                                 3274 CONTROL UNIT?
```

```
535    0071  74 05                JZ      CAUSE_1              ; NO, NOT START OPERATION COMMAND
536    0073  E8 0000 E            CALL    PROC_START_OP        ; YES, PROCESS START OPERATION COMMAND
537    0076  EB F3                JMP     DETERMINE_CAUSE      ; PROCESS NEXT PENDING INTERRUPT
538    0078                CAUSE_1:
539    0078  A8 08                TEST    AL,ST_PC_KB_OUT      ; WAS THE INTERRUPT CAUSED BY ACCEPTANC
540                             ;                                 OF DATA BY THE PERSONAL COMPUTER?
541    007A  74 05                JZ      CAUSE_2              ; NO, NOT PC PORT AVAILABLE
542    007C  E8 0000 E            CALL    PROC_PC_PORT_AVAIL   ; YES, CAN SEND NEXT BYTE TO PC
543    007F  EB EA                JMP     DETERMINE_CAUSE      ; PROCESS NEXT PENDING INTERRUPT
544    0081                CAUSE_2:
545    0081  A8 02                TEST    AL,ST_KB_OUT         ; WAS THE INTERRUPT CAUSED BY ACCEPTANC
546                             ;                                 OF DATA BY THE 3278/3279?
547    0083  74 05                JZ      CAUSE_3              ; NO, NOT 3278/3279 PORT AVAILABLE
548    0085  E8 0000 E            CALL    PROC_3278_PORT_AVAIL ; YES, CAN SEND NEXT BYTE TO
549    0088  EB E1                JMP     DETERMINE_CAUSE      ; PROCESS NEXT PENDING INTERRUPT
550                             ;                                 3278/3279 TERMINAL
551    008A                CAUSE_3:
552    008A  A8 01                TEST    AL,ST_KB_IN          ; WAS THE INTERRUPT CAUSED BY DATA
553                             ;                                 AVAILABLE FROM THE 3278/3279 KEYBOARD
554    008C  74 05                JZ      CAUSE_4              ; NO, NOT KEYBOARD DATA AVAILABLE
555    008E  E8 0000 E            CALL    PROC_KEYBOARD_DATA   ; YES, PROCESS KEYBOARD DATA
556    0091  EB D8                JMP     DETERMINE_CAUSE      ; PROCESS NEXT PENDING INTERRUPT
557
558    0093                CAUSE_4:
559    0093  FA                   CLI                          ; DISABLE ALL INTERRUPTS
560    0094  B0 62                MOV     AL,EOI               ; SIGNAL END OF INTERRUPT FOR LEVEL 2
561    0096  E6 20                OUT     CTL_8259,AL
562
563    0098  C3                   RET                          ; RETURN TO CALLER
564
565    0099                PROC_INTERRUPTS ENDP
566
567    0099                NDSPBIOS ENDS
568
569                               END
```

APPENDIX B

The IBM Personal Computer MACRO Assembler
            3278/3279 Attachment Keyboard Interrupt Handler

```
3
4
5                   ; ******************** Start of Specifications ********************
6                   ;
7                   ; Module Name: NDSPBKBD
8                   ;
9                   ; Descriptive Name: 3278/3279 Attachment Keyboard Interrupt Handler
10                  ;
11                  ; Copyright: IBM Corp 1982
12                  ;
13                  ; Status: Version 1.00
14                  ;
15                  ; Function: To process keystrokes from the 3278/3279 keyboard and
16                  ;           keyboard related function requests from an application
17                  ;           program
18                  ;
19                  ; Notes:
20                  ;
21                  ;   Dependencies: None
22                  ;
23                  ;   Restrictions: None
24                  ;
25                  ; Module Type: Program
26                  ;
27                  ;   Processor: Assembler
28                  ;
29                  ; Entry Point: PROC_KEYBOARD_DATA
30                  ;
31                  ;   Purpose: To process a keystroke from the 3278/3279 keyboard
32                  ;
33                  ;   Linkage: CALL from NDSPBIOS
34                  ;
35                  ;   Input Parameters: None
36                  ;
37                  ; Entry Point: PROC_PC_PORT_AVAIL
38                  ;
39                  ;   Purpose: To send the next waiting keystroke to the Personal Computer
40                  ;
41                  ;   Linkage: CALL from NDSPBIOS
42                  ;
43                  ;   Input Parameters: None
44                  ;
45                  ; Entry Point: PROC_3278_PORT_AVAIL
46                  ;
47                  ;   Purpose: To send the next waiting keystroke to the 3278/3279
48                  ;
49                  ;   Linkage: CALL from NDSPBIOS
50                  ;
51                  ;   Input Parameters: None
52                  ;
53                  ; Entry Point: SEND_ENCODED_KEYSTROKES_TO_3278
```

```
;   Purpose: To send a series of encoded keystrokes to the 3278/3279
;
;   Linkage: CALL from NDSPBFBA
;
;   Input Parameters:
;
;     BX:DX = address of encoded keystrokes
;     CX = number of encoded keystrokes
;
;   Outputs:
;
;     CF = 0 if all keystrokes are valid
;        = 1 if any keystroke is invalid
;     AL = return code
;
; Entry Point: MOD_XLAT_IN
;
;   Purpose: To modify the inbound keyboard translation table
;
;   Linkage: CALL from NDSPBFBA
;
;   Input Parameters:
;
;     CH = 3278/3279 relative key number
;     CL = 3278/3279 keyboard case
;     DH = Personal Computer keyboard scan code
;     DL = Personal Computer keyboard case
;
;   Outputs:
;
;     CF = 0 if parameters are valid
;        = 1 if parameters are invalid
;     AL = return code
;     BX on stack = old table entry
;
; Entry Point: MOD_XLAT_OUT
;
;   Purpose: To modify the outbound keyboard translation table
;
;   Linkage: CALL from NDSPBFBA
;
;   Input Parameters:
;
;     CH = encoded keystroke value
;     DH = 3278/3279 relative key number
;     DL = 3278/3279 keyboard case
;
;   Outputs:
;
;     CF = 0 if parameters are valid
;        = 1 if parameters are invalid
;     AL = return code
;     BX on stack = old table entry
;
; Entry Point: QUERY_KEYBOARD_ID
;
;   Purpose: To find out the type of keyboard which is attached
;
;   Linkage: CALL from NDSPBFBA
;
;   Input Parameters: None
;
;   Outputs:
;
;     BX on stack = keyboard identifier
;
; Exit Normal:
;
;   Purpose: To continue processing
;
;   Linkage: Return to caller
;
;   Output: None unless specified under Entry Point
;
; Exit Error: None
;
; External References:
;
;   Procedure Invoked: PROC_INTERRUPTS
;
;     Purpose: To process all other pending hardware interrupts
;
;     Linkage: CALL
;
;     Input Parameters: None
;
;   Control Blocks:
;
;     NDSPDCLS - 3278/3279 Attachment option interfaces
;     NDSPUSER - 3278/3279 BIOS extension interfaces
;     NDSPBCOM - 3278/3279 BIOS common data area
;
```

```
147                       ; Messages Issued: None
148                       ;
149                       ; Change Activity: None
150                       ;
151                       ; ****************** End of Specifications ********************
152
153                              SUBTTL  WORK AREAS
154
155                       ;      INCLUDE NDSPDCLS.ASM
156                       ;      INCLUDE NDSPUSER.ASM
157                              .LIST
158
159   0000                ROMDATA SEGMENT AT 40H
160
161                       ;***************************************************************
162                       ;*
163                       ;*     WORK AREAS USED BY THE ROM BIOS ROUTINES
164                       ;*
165                       ;***************************************************************
166
167   0017                       ORG     17H
168   0017 ??             R_KB_FLAG       DB      ?       ; FIRST BYTE OF KEYBOARD STATUS
169   = 0040              R_CAPS_STATE    EQU     40H     ; PC CAPS LOCK HAS BEEN TOGGLED
170   = 0020              R_NUM_STATE     EQU     20H     ; PC NUM LOCK HAS BEEN TOGGLED
171   = 0010              R_SCROLL_STATE  EQU     10H     ; PC SCROLL LOCK HAS BEEN TOGGLED
172   = 0008              R_ALT_SHIFT     EQU     08H     ; PC ALTERNATE SHIFT KEY IS DEPRESSED
173   = 0004              R_CTL_SHIFT     EQU     04H     ; PC CONTROL SHIFT KEY IS DEPRESSED
174   = 0002              R_LEFT_SHIFT    EQU     02H     ; PC LEFT SHIFT KEY IS DEPRESSED
175   = 0001              R_RIGHT_SHIFT   EQU     01H     ; PC RIGHT SHIFT KEY IS DEPRESSED
176
177   0018 ??             R_KB_FLAG_1     DB      ?       ; SECOND BYTE OF KEYBOARD STATUS
178   = 0040              R_CAPS_SHIFT    EQU     40H     ; PC CAPS LOCK KEY IS DEPRESSED
179   = 0020              R_NUM_SHIFT     EQU     20H     ; PC NUM LOCK KEY IS DEPRESSED
180   = 0010              R_SCROLL_SHIFT  EQU     10H     ; PC SCROLL LOCK KEY IS DEPRESSED
181
182   0049                       ORG     49H
183   0049 ??             CRT_MODE DB     ?               ; CURRENT CRT MODE
184   0065                       ORG     65H             ;
185   0065 ??             CRT_MODE_SET DB ?               ; CURRENT SETTING OF THE 3X6 REGISTER
186
187   0066                ROMDATA ENDS
188
189
190
191                       BIOSDATA GROUP BIOSDATA_COMMON,BIOSDATA_KEYBOARD
192
193                     C        INCLUDE NDSPBCOM.ASM
194   0000              C BIOSDATA_COMMON SEGMENT COMMON 'NDSPBIOS'
195                     C
196                     C ;***************************************************************
197                     C ;*
198                     C ;*     NDSPBIOS COMMON WORK AREAS
199                     C ;*
200                     C ;***************************************************************
201                     C
202   0000 00           C TERM_MODE       DB  0           ; CURRENT MODE OF TERMINAL
203   = 0000            C T_PC            EQU 00H         ;   PERSONAL COMPUTER MODE
204   = 0080            C T_HOST          EQU 80H         ;   HOST PROCESSOR MODE
205                     C
206   0001              C BIOSDATA_COMMON ENDS
207                     C
208
209
210   0000                BIOSDATA_KEYBOARD SEGMENT PUBLIC 'NDSPBIOS'
211
212                       ;***************************************************************
213                       ;*
214                       ;*     NDSPBIOS KEYBOARD WORK AREAS
215                       ;*
216                       ;***************************************************************
217
218   = 681A              DELAY_100_MS    EQU     26650   ; LOOP CONSTANT NEEDED TO DELAY
219                                                       ;   PROCESSING FOR 100 MILLISECONDS TO
220                                                       ;   PACE KEYSTROKES SENT TO THE
221                                                       ;   3278/3279 DISPLAY UNIT AT A RATE OF
222                                                       ;   10 KEYSTROKES PER SECOND
223
224   0000 00             KBD_STATE   DB  0               ; CURRENT 3278/3279 KEYBOARD STATE
225
226   = 0080              SHIFT_LOCK  EQU 80H             ;   SHIFT LOCK KEY IS DEPRESSED
227   = 0040              LEFT_SHIFT  EQU 40H             ;   LEFT SHIFT KEY IS DEPRESSED
228   = 0020              RIGHT_SHIFT EQU 20H             ;   RIGHT SHIFT KEY IS DEPRESSED
229   = 0020              NUM_SHIFT   EQU 20H             ;   NUMERIC SHIFT KEY IS DEPRESSED
230   = 0010              ALPHA_SHIFT EQU 10H             ;   ALPHA SHIFT KEY IS DEPRESSED
231   = 0008              LOCK_STATE  EQU 08H             ;   SHIFT LOCK STATE
232   = 0004              CLICK_STATE EQU 04H             ;   CLICKER IS ON
233   = 0002              ALT_STATE   EQU 02H             ;   ALT KEY IS DEPRESSED
234   = 0001              FORCED_ALT_STATE EQU 01H        ;   SEQUENCE OF ALT KEYSTROKES
235
236   0001 00             PC_STATE    DB  0               ; PERSONAL COMPUTER KEYBOARD STATE
237   =                   P_SHIFT     EQU U               ;   SHIFT KEY IS DEPRESSED
238   =                   P_CTL       EQU C               ;   CTRL KEY IS DEPRESSED
239   =                   P_ALT       EQU A               ;   ALT KEY IS DEPRESSED
```

```
240
241    0002  00                  LOGICAL_STATE  DB  0         ; BIOS LOGICAL STATE
242    = 0080                    L_ALT          EQU 80H       ;   NEXT KEY IS IN ALT MODE
243    = 0040                    L_CTL          EQU 40H       ;   NEXT KEY IS IN CTRL MODE
244    = 0020                    L_PAUSE        EQU 20H       ;   BIOS IS IN PAUSE STATE
245    = 0010                    L_PC_PORT_AVAIL EQU 10H      ;   PC OUTPUT PORT BECAME AVAILABLE
246                                                           ;     WHILE IN PAUSE STATE
247    = 0008                    L_KBD_DISABLED EQU 08H       ;   KEYBOARD LOGICALLY DISABLED
248
249    0003  00                  DEC_DIGIT      DB  0         ; NUMBER OF DECIMAL DIGITS EXPECTED
250
251    0004  00                  KBD_SCAN_CODE  DB  0         ; SCAN CODE FROM 3278/3279 KEYBOARD
252
253    0005  00                  PC_SCAN_CODE   DB  0         ; SCAN CODE TO PERSONAL COMPUTER
254    = 0080                    BREAK_BIT      EQU 80H       ; BIT IN SCAN CODE INDICATING BREAK
255
256    = 001D                    PC_CTL_KEY     EQU 29        ; PC SCAN CODE FOR CTRL KEY
257    = 002A                    PC_SHIFT_KEY   EQU 42        ; PC SCAN CODE FOR SHIFT KEY
258    = 0038                    PC_ALT_KEY     EQU 56        ; PC SCAN CODE FOR ALT KEY
259
260    = 004C                    NDS_LOCK_KEY      EQU 4CH    ; 3278/3279 SCAN CODE FOR LOCK KEY
261    = 004D                    NDS_L_SHIFT_KEY   EQU 4DH    ; 3278/3279 SCAN CODE FOR LEFT SHIFT KE
262    = 004E                    NDS_R_SHIFT_KEY   EQU 4EH    ; 3278/3279 SCAN CODE FOR RIGHT SHIFT
263    = 004F                    NDS_ALT_KEY       EQU 4FH    ; 3278/3279 SCAN CODE FOR ALT KEY
264
265    0006                      PC_DIGITS LABEL BYTE         ; PC SCAN CODES FOR DECIMAL DIGITS ON
266                              ;                              THE NUMERIC KEYPAD
267    0006  4F 50 51 4B 4C 4D           DB    79,80,81,75,76,77,71,72,73,82
268          47 48 49 52
269
270    0010    10 [               BUFFER_3278 DB 16 DUP(?)     ; SCAN CODES WAITING TO BE SENT TO THE
271                ??
272             ]
273                               ;                              3278/3279
274                               BUFFER_3278_END LABEL BYTE   ; END OF BUFFER
275    0020                       BUFFER_3278_HEAD DW BIOSDATA:BUFFER_3278 ; ADDRESS OF FIRST SCAN CODE
276    0020  0010 R                                           ;   TO BE SENT
277                               BUFFER_3278_TAIL DW BIOSDATA:BUFFER_3278 ; ADDRESS OF NEXT FREE SLOT
278    0022  0010 R                                           ;   IN BUFFER
279
280    0024  0000                 BUFFER_3278_LAST DW 0        ; ADDRESS OF LAST SCAN CODE TO BE SENT
281
282    0026    10 [               BUFFER_PC DB 16 DUP(?)       ; SCAN CODES WAITING TO BE SENT TO THE
283                ??
284             ]
285
286                               ;                              PERSONAL COMPUTER
287    0036                       BUFFER_PC_END LABEL BYTE     ; END OF BUFFER
288    0036  0026 R               BUFFER_PC_HEAD DW BIOSDATA:BUFFER_PC ; ADDRESS OF FIRST SCAN CODE
289                                                           ;   TO BE SENT
290    0038  0026 R               BUFFER_PC_TAIL DW BIOSDATA:BUFFER_PC ; ADDRESS OF NEXT FREE SLOT
291                                                           ;   IN BUFFER
292    003A  0000                 BUFFER_PC_LAST DW 0          ; ADDRESS OF LAST SCAN CODE TO BE SENT
293
294
295
296                               ;**********************************************************
297                               ;*                                                        *
298                               ;*     KEYBOARD TRANSLATION TABLES                        *
299                               ;*                                                        *
300                               ;**********************************************************
301
302                               ;      3278/3279 SCAN CODE TO KEY NUMBER TRANSLATION TABLE
303
304    003C                       SCAN_CODE_TABLE LABEL BYTE
305    003C  00 00 00 00 00 00           DB     0, 0, 0, 0, 0, 0, 0,42,44, 0, 0,65,69,70,41 ; 00-0F
306          00 00 2A 2C 00 00
307          44 45 46 29
308    004C  4B 0D 28 47 36 1B           DB     75,13,40,71,54,27,72, 0,57, 0,73,26, 0,88, 0,89 ; 10-1F
309          48 00 39 00 49 1A
310          00 58 00 59
311    005C  0B 02 03 04 05 06           DB     11, 2, 3, 4, 5, 6, 7, 8, 9,10, 0, 0, 0, 0, 0, 0 ; 20-2F
312          07 08 09 0A 00 00
313          00 00 00 00
314    006C  0C 0E 35 34 38 1C           DB     12,14,53,52,56,28,15, 0, 0, 0, 0, 0, 0, 1, 0, 0 ; 30-3F
315          0F 00 00 00 00 00
316          00 01 00 00
317    007C  4C 4D 4E 4F 50 51           DB     76,77,78,79,80,81,82,83,84,85,86,87,29,43,55,74 ; 40-4F
318          52 53 54 55 56 57
319          1D 2B 37 4A
320    008C  3A 3B 3C 3D 3E 3F           DB     58,59,60,61,62,63,64,65, 0, 0, 0, 0, 0, 0,67,66 ; 50-5F
321          40 41 00 00 00 00
322          00 00 43 42
323    009C  1E 31 2F 20 12 21           DB     30,49,47,32,18,33,34,35,23,36,37,38,51,50,24,25 ; 60-6F
324          22 23 17 24 25 26
325          33 32 18 19
326    00AC  10 13 1F 14 16 30           DB     16,19,31,20,22,48,17,46,21,45, 0, 0, 0, 0,39, 0 ; 70-7F
327          11 2E 15 2D 00 00
328          00 00 27 00
329
330                               ;      KEY NUMBER TO 3278/3279 SCAN CODE TRANSLATION TABLE
331
332    00BC                       SCAN_CODE_XLAT LABEL BYTE
```

| | | | | | |
|---|---|---|---|---|---|
|333|00BC|3D 21 22 23 24 25| |DB|3DH,21H,22H,23H,24H,25H,26H,27H,28H,29H ; 1-10|
|334| |26 27 28 29| | | |
|335|00C6|20 30 11 31 36 70| |DB|20H,30H,11H,31H,36H,70H,76H,64H,71H,73H ; 11-20|
|336| |76 64 71 73| | | |
|337|00D0|78 74 68 6E 6F 1B| |DB|78H,74H,68H,6EH,6FH,1BH,15H,35H,4CH,60H ; 21-30|
|338| |15 35 4C 60| | | |
|339|00DA|72 63 65 66 67 69| |DB|72H,63H,65H,66H,67H,69H,6AH,6BH,7EH,12H ; 31-40|
|340| |6A 6B 7E 12| | | |
|341|00E4|0F 08 4D 09 79 77| |DB|0FH,08H,4DH,09H,79H,77H,62H,75H,61H,6DH ; 41-50|
|342| |62 75 61 6D| | | |
|343|00EE|6C 33 32 14 4E 34| |DB|6CH,33H,32H,14H,4EH,34H,18H,50H,51H,52H ; 51-60|
|344| |18 50 51 52| | | |
|345|00F8|53 54 55 56 57 5F| |DB|53H,54H,55H,56H,57H,5FH,5EH,0CH,0DH,0EH ; 61-70|
|346| |5E 0C 0D 0E| | | |
|347|0102|13 16 1A 4F 10 40| |DB|13H,16H,1AH,4FH,10H,40H,41H,42H,43H,44H ; 71-80|
|348| |41 42 43 44| | | |
|349|010C|45 46 47 48 49 4A| |DB|45H,46H,47H,48H,49H,4AH,4BH,1DH,1FH ; 81-89|
|350| |4B 1D 1F| | | |

```
351
352                              ;       KEY NUMBER TO PC SCAN CODE TRANSLATION TABLES
353
354                                      PUBLIC  XLAT_TABLES,XLAT_TABLES_END
355     0115  90                          EVEN
356     0116                      XLAT_TABLES LABEL WORD
357     0116  ????                 XLAT_TABLE_ID   DW ?           ; KEYBOARD IDENTIFIER
358     0118    59 [                LOWER_CASE_XLAT DW 89 DUP(?)   ; LOWER CASE
359                 ????
360                     ]
361
362     01CA    59 [               UPPER_CASE_XLAT DW 89 DUP(?)   ; UPPER CASE
363                 ????
364                     ]
365
366     027C    59 [               CTL_CASE_XLAT   DW 89 DUP(?)   ; PC CTRL CASE
367                 ????
368                     ]
369
370     032E    59 [               ALT_CASE_XLAT   DW 89 DUP(?)   ; PC ALT CASE
371                 ????
372                     ]
373
374     03E0    59 [               ALT_KEY_XLAT    DW 89 DUP(?)   ; ALT CASE
375                 ????
376                     ]
377
378     0492  0100 [                KEYSTROKE_XLAT  DW 256 DUP(?)  ; ENCODED KEYSTROKE TRANSLATION TABLE
379                 ????
380                     ]
381
382     0692                       XLAT_TABLES_END LABEL BYTE     ; END OF TRANSLATION TABLES
383
384     0692                       BIOSDATA_KEYBOARD ENDS
385
386                                      SUBTTL  Process an interrupt from the 3278/3279 keyboard
387
388
389     0000                       NDSPBIOS SEGMENT PUBLIC 'NDSPBIOS'
390
391                                      PUBLIC  PROC_KEYBOARD_DATA
392                                      PUBLIC  PROC_PC_PORT_AVAIL
393                                      PUBLIC  PROC_3278_PORT_AVAIL
394                                      PUBLIC  SEND_ENCODED_KEYSTROKES_TO_3278
395                                      PUBLIC  MOD_XLAT_IN
396                                      PUBLIC  MOD_XLAT_OUT
397                                      PUBLIC  QUERY_KEYBOARD_ID
398
399                                      EXTRN   PROC_INTERRUPTS:NEAR
400
401                                      ASSUME  CS:NDSPBIOS,DS:BIOSDATA
402
403
404
405                              ;********************************************************
406                              ;*                                                      *
407                              ;* Procedure Name: PROC_KEYBOARD_DATA                   *
408                              ;*                                                      *
409                              ;* Function: To process a keystroke from the 3278/3279  *
410                              ;*                                                      *
411                              ;* Input: 3278/3279 keyboard scan code                  *
412                              ;*                                                      *
413                              ;* Output: keystroke sent to Personal Computer or 3278/3279 *
414                              ;*                                                      *
415                              ;********************************************************
416
417     0000                       PROC_KEYBOARD_DATA PROC NEAR
418
419                         C             INCLUDE NDSPKBD1.ASM
420                         C
421                         C    ;********************************************************
422                         C    ;*                                                      *
423                         C    ;*      READ THE SCAN CODE FROM THE KEYBOARD AND TRANSLATE IT TO A  *
424                         C    ;*      RELATIVE KEY NUMBER                             *
425                         C    ;*                                                      *
```

```
426                              C ;***************************************************
427                              C
428   0000 BA 03E0                       MOV     DX,NDS_KB_IN    ; READ THE 3278/3279 KEYBOARD SCAN CODE
429   0003 EC                            IN      AL,DX
430                              C
431   0004 F6 06 0002 R 08                TEST   LOGICAL_STATE,L_KBD_DISABLED ; IS THE KEYBOARD
432                              C                                ;   LOGICALLY DISABLED?
433   0009 74 02                         JZ      KEYBOARD_0      ; NO, CONTINUE
434   000B 32 C0                         XOR     AL,AL           ; YES, SIMULATE A KEYBOARD OVERRUN
435                              C
436   000D                       C KEYBOARD_0:
437   000D A2 0004 R                     MOV     KBD_SCAN_CODE,AL; SAVE 3278/3279 KEYBOARD SCAN CODE
438   0010 0A C0                         OR      AL,AL           ; DID THE KEYBOARD INDICATE OVERRUN?
439   0012 75 03                         JNZ     KEYBOARD_1      ; NO, CONTINUE PROCESSING
440   0014 E9 02F1 R                     JMP     OVERRUN         ; YES, PROCESS OVERRUN
441   0017                       C KEYBOARD_1:
442                              C
443   0017 8A E0                         MOV     AH,AL           ; SAVE THE MAKE/BREAK BIT IN AH
444   0019 80 E4 80                      AND     AH,80H
445   001C 24 7F                         AND     AL,7FH          ; ISOLATE SCAN CODE
446   001E 8D 1E 003C R                  LEA     BX,SCAN_CODE_TABLE ; CONVERT SCAN CODE TO
447   0022 D7                            XLAT    SCAN_CODE_TABLE ;   RELATIVE KEY NUMBER
448   0023 0A E0                         OR      AH,AL
449                              C
450                              C ;     AT THIS POINT:
451                              C ;       (AL) = RELATIVE KEY NUMBER
452                              C ;       (AH) = RELATIVE KEY NUMBER WITH MAKE/BREAK BIT
453                              C ;       KBD_SCAN_CODE = SCAN CODE WITH MAKE/BREAK BIT
454                              C
455                              C
456                              C ;***************************************************
457                              C ;*                                                  *
458                              C ;*     TRANSLATE THE RELATIVE KEY NUMBER TO A 3278/3279 SCAN CODE *
459                              C ;*                                                  *
460                              C ;*     THE TRANSLATION TABLE USED MAY BE ONE OF THE FOLLOWING: *
461                              C ;*       ALT_CASE_XLAT   - WHEN THE NEXT KEYSTROKE IS IN PC ALT CASE *
462                              C ;*       CTL_CASE_XLAT   - WHEN THE NEXT KEYSTROKE IS IN PC CTL CASE *
463                              C ;*       ALT_KEY_XLAT    - WHEN THE 3278/3279 ALT KEY IS DEPRESSED *
464                              C ;*       LOWER_CASE_XLAT - WHEN THE 3278/3279 KEYBOARD IS IN LOWER *
465                              C ;*                         OR ALPHA CASE SHIFT       *
466                              C ;*       UPPER_CASE_XLAT - WHEN THE 3278/3279 KEYBOARD IS IN UPPER *
467                              C ;*                         OR NUMERIC CASE SHIFT     *
468                              C ;*                                                  *
469                              C ;*     THE TRANSLATED SCAN CODE MAY BE:              *
470                              C ;*       0          = IGNORE THIS KEYSTROKE          *
471                              C ;*       1 TO 83    = PERSONAL COMPUTER SCAN CODE    *
472                              C ;*       -1 TO -127 = INDEX INTO SPECIAL FUNCTION TABLE *
473                              C ;*                                                  *
474                              C ;***************************************************
475                              C
476   0025 8D 1E 032E R                  LEA     BX,ALT_CASE_XLAT ; POINT TO PROPER TRANSLATION
477   0029 F6 06 0002 R 80                TEST   LOGICAL_STATE,L_ALT ;        TABLE
478   002E 75 2C                         JNZ     XLAT_SCAN_CODE
479   0030 8D 1E 027C R                  LEA     BX,CTL_CASE_XLAT
480   0034 F6 06 0002 R 40                TEST   LOGICAL_STATE,L_CTL
481   0039 75 21                         JNZ     XLAT_SCAN_CODE
482   003B 8D 1E 03E0 R                  LEA     BX,ALT_KEY_XLAT
483   003F F6 06 0000 R 02                TEST   KED_STATE,ALT_STATE
484   0044 75 16                         JNZ     XLAT_SCAN_CODE
485   0046 8D 1E 0118 R                  LEA     BX,LOWER_CASE_XLAT
486   004A F6 06 0000 R 10                TEST   KED_STATE,ALPHA_SHIFT
487   004F 75 0B                         JNZ     XLAT_SCAN_CODE
488   = 0068                     C UP_SHIFT EQU  LOCK_STATE OR LEFT_SHIFT OR RIGHT_SHIFT OR NUM_SHIFT
489   0051 F6 06 0000 R 68                TEST   KED_STATE,UP_SHIFT
490   0056 74 04                         JZ      XLAT_SCAN_CODE
491   0058 8D 1E 01CA R                  LEA     BX,UPPER_CASE_XLAT
492                              C
493   005C                       C XLAT_SCAN_CODE:
494   005C FE C8                         DEC     AL              ; PICK UP CODE FROM TRANSLATION TABLE
495   005E 8A C8                         MOV     CL,AL
496   0060 32 ED                         XOR     CH,CH
497   0062 D1 E1                         SAL     CX,1
498   0064 8B F1                         MOV     SI,CX
499   0066 8B 10                         MOV     DX,[BX+SI]      ; DH = SCAN CODE
500                              C                                ; DL = REQUIRED PC SHIFT STATE
501   0068 88 36 0005 R                  MOV     PC_SCAN_CODE,DH ; SAVE PERSONAL COMPUTER SCAN CODE
502   006C 80 FE 00                      CMP     DH,0            ; COMPARE SCAN CODE TO ZERO
503   006F 75 0D                         JNE     XLAT_1          ; NOT ZERO, CONTINUE
504   0071 F6 06 0000 R 80                TEST   TERM_MODE,T_HOST ; IS THE TERMINAL IN HOST MODE?
505   0076 75 03                         JNZ     DONT_IGNORE     ; YES, PROCESS THE KEYSTROKE
506   0078 E9 02EB R                     JMP     RESET_SHIFTS    ; NO, IGNORE KEYSTROKE - RESET LOGICAL
507                              C                                ; SHIFT STATES
508   007B                       C DONT_IGNORE:
509   007B E9 021F R                     JMP     ROUTE           ; SEND KEYSTROKE TO 3274/3276
510                              C
511   007E                       C XLAT_1:
512   007E 78 03                         JS      XLAT_2          ; NEGATIVE, PROCESS FUNCTION CODE
513   0080 E9 021F R                     JMP     ROUTE           ; POSITIVE, ROUTE SCAN CODE AS REQUIRED
514   0083                       C XLAT_2:
515                              C
516                              C ;***************************************************
517                              C ;*                                                  *
518                              C ;*     PROCESS SPECIAL FUNCTION CODE                *
```

```
519                             C ;*                                                                           *
520                             C ;**************************************************************************
521                             C
522     0083  F6 DE              C           NEG    DH                    ; FIND PROPER ENTRY IN BRANCH TABLE
523     0085  F6 06 0002 R 20    C           TEST   LOGICAL_STATE,L_PAUSE ; ARE WE IN PAUSE STATE?
524     008A  74 08              C           JZ     XLAT_3                ; NO, NORMAL PROCESSING
525     008C  80 FE 07           C           CMP    DH,NO_SHIFT_KEYS      ; YES, IS THIS A SHIFT KEY?
526     008F  76 03              C           JBE    XLAT_3                ; YES, PROCESS IT NORMALLY
527     0091  E9 021F R          C           JMP    ROUTE                 ; NO, EXIT PAUSE STATE
528     0094                     C XLAT_3:
529     0094  FE CE              C           DEC    DH
530     0096  8A DE              C           MOV    BL,DH
531     0098  32 FF              C           XOR    BH,BH
532     009A  D1 E3              C           SAL    BX,1
533     009C  8B F3               C           MOV    SI,BX
534     009E  2E: 8B 9C 00A5 R   C           MOV    BX,CS:FUNCTIONS[SI]
535     00A3  FF E3              C           JMP    BX                    ; PERFORM SPECIAL FUNCTION
536                              C
537     00A5                     C FUNCTIONS LABEL WORD
538     00A5  00C1 R             C           DW     PROC_SHIFT_LOCK       ; SHIFT LOCK KEY PRESSED/RELEASED
539     00A7  00EF R             C           DW     PROC_L_SHIFT          ; LEFT SHIFT KEY PRESSED/RELEASED
540     00A9  00F3 R             C           DW     PROC_R_SHIFT          ; RIGHT SHIFT KEY PRESSED/RELEASED
541     00AB  0114 R             C           DW     PROC_NUM_LOCK         ; NUM LOCK KEY PRESSED/RELEASED
542     00AD  0120 R             C           DW     PROC_NUM_SHIFT        ; NUM SHIFT KEY PRESSED/RELEASED
543     00AF  0125 R             C           DW     PROC_ALPHA_SHIFT      ; ALPHA SHIFT KEY PRESSED/RELEASED
544     00B1  013A R             C           DW     PROC_ALT_SHIFT        ; ALT KEY PRESSED/RELEASED
545     00B3  014D R             C           DW     PROC_RESET            ; RESET KEY PRESSED
546     00B5  0181 R             C           DW     PROC_CLICK            ; CLICK KEY PRESSED
547     00B7  019F R             C           DW     PROC_DECIMAL_KEY      ; ENTER DECIMAL DIGIT INPUT MODE
548     00B9  01BF R             C           DW     PROC_SWITCH_MODE      ; TOGGLE MODE PRESSED
549     00BB  01D1 R             C           DW     PROC_CTL_KEY          ; NEXT KEYSTROKE IS IN PC CTL MODE
550     00BD  01E0 R             C           DW     PROC_ALT_KEY          ; NEXT KEYSTROKE IS IN PC ALT MODE
551     00BF  01EF R             C           DW     PROC_PAUSE            ; ENTER PAUSE STATE
552                              C
553                              C ;        SHIFT LOCK KEY WAS PRESSED OR RELEASED
554                              C
555     00C1                     C PROC_SHIFT_LOCK:
556     00C1  F6 C4 80           C           TEST   AH,BREAK_BIT          ; WAS KEY PRESSED?
557     00C4  75 22              C           JNZ    BREAK_SHIFT_LOCK      ; NO, SHIFT LOCK WAS RELEASED
558     00C6  80 0E 0000 R 08    C           OR     KBD_STATE,LOCK_STATE  ; INDICATE SHIFT LOCK STATE
559     00CB  80 0E 0000 R 80    C           OR     KBD_STATE,SHIFT_LOCK  ; INDICATE SHIFT LOCK KEY DEPRESSED
560                              C
561     00D0                     C PROC_SHIFT_KEY:
562     00D0  F6 06 0000 R 80    C           TEST   TERM_MODE,T_HOST      ; ARE WE IN HOST PROCESSOR MODE?
563     00D5  75 06              C           JNZ    TEST_PAUSE            ; YES, THE SHIFT KEY WILL BE ROUTED
564                              C                                        ;      TO THE 3278/3279 NORMALLY
565     00D7  A0 0004 R          C           MOV    AL,KBD_SCAN_CODE      ; NO, ROUTE THE SHIFT KEY TO THE
566     00DA  E8 02FD R          C           CALL   SEND_TO_3278          ;     3278/3279 DISPLAY TO KEEP THE CONTROL
567                              C                                        ;     UNIT IN SYNCH WITH BIOS
568                              C
569     00DD                     C TEST_PAUSE:
570     00DD  F6 06 0002 R 20    C           TEST   LOGICAL_STATE,L_PAUSE ; ARE WE IN PAUSE STATE?
571     00E2  75 03              C           JNZ    TEST_PAUSE_1          ; YES, DISCARD THE KEY STROKE
572     00E4  E9 021F R          C           JMP    ROUTE                 ; ROUTE THE KEY STROKE
573     00E7                     C TEST_PAUSE_1:
574     00E7  C3                 C           RET                          ; DISCARD THE KEY STROKE
575     00E8                     C BREAK_SHIFT_LOCK:
576     00E8  80 26 0000 R 7F    C           AND    KBD_STATE,NOT SHIFT_LOCK ; INDICATE SHIFT LOCK KEY IS NO
577                              C ;                                         LONGER DEPRESSED
578     00ED  EB E1              C           JMP    PROC_SHIFT_KEY        ; ROUTE KEYSTROKE AS NEEDED
579                              C
580                              C ;        LEFT HAND SHIFT KEY WAS PRESSED OR RELEASED
581                              C
582     00EF                     C PROC_L_SHIFT:
583     00EF  B0 40              C           MOV    AL,LEFT_SHIFT         ; SET UP MASK FOR LEFT SHIFT KEY
584     00F1  EB 02              C           JMP    SHORT PROC_SHIFT      ; PROCESS SHIFT KEY
585                              C
586                              C ;        RIGHT HAND SHIFT KEY WAS PRESSED OR RELEASED
587                              C
588     00F3                     C PROC_R_SHIFT:
589     00F3  B0 20              C           MOV    AL,RIGHT_SHIFT        ; SET UP MASK FOR RIGHT SHIFT KEY
590                              C
591                              C ;        LEFT OR RIGHT SHIFT KEY WAS PRESSED OR RELEASED
592                              C
593     00F5                     C PROC_SHIFT:
594     00F5  F6 C4 80           C           TEST   AH,BREAK_BIT          ; WAS SHIFT KEY PRESSED?
595     00F8  75 06              C           JNZ    BREAK_SHIFT           ; NO, SHIFT KEY WAS RELEASED
596     00FA  08 06 0000 R       C           OR     KBD_STATE,AL          ; INDICATE SHIFT KEY IS DEPRESSED
597     00FE  EB D0              C           JMP    PROC_SHIFT_KEY        ; ROUTE THE KEYSTROKE AS NEEDED
598     0100                     C BREAK_SHIFT:
599     0100  F6 D0              C           NOT    AL                    ; INDICATE SHIFT KEY IS NO LONGER
600     0102  20 06 0000 R       C           AND    KBD_STATE,AL          ;      DEPRESSED
601                              C
602     0106  F6 06 0000 R E0    C           TEST   KBD_STATE,LEFT_SHIFT+RIGHT_SHIFT+SHIFT_LOCK ; IS EITHER
603                              C ;                                          SHIFT KEY OR SHIFT LOCK DEPRESSED?
604     010B  75 05              C           JNZ    BREAK_SHIFT_1         ; YES, LEAVE SHIFT LOCK STATE AS IS
605     010D  80 26 0000 R F7    C           AND    KBD_STATE,NOT LOCK_STATE ; THE LAST SHIFT KEY HAS BEEN
606                              C ;                                          RELEASED - CANCEL SHIFT LOCK STATE
607     0112                     C BREAK_SHIFT_1:
608     0112  EB BC              C           JMP    PROC_SHIFT_KEY        ; ROUTE THE KEYSTROKE AS NEEDED
609                              C
610                              C ;        NUMERIC LOCK KEY WAS PRESSED OR RELEASED
611                              C
```

```
612   0114                    C   PROC_NUM_LOCK:
613   0114  F6 C4 80          C         TEST    AH,BREAK_BIT      ; WAS THE KEY PRESSED?
614   0117  75 05             C         JNZ     JMP_ROUTE         ; NO, NUM LOCK KEY WAS RELEASED
615   0119  80 36 0000 R 08   C         XOR     KBD_STATE,LOCK_STATE ; TOGGLE NUMERIC LOCK STATE
616   011E                    C   JMP_ROUTE:
617   011E  EB B0             C         JMP     PROC_SHIFT_KEY    ; ROUTE THE KEYSTROKE AS NEEDED
618                           C
619                           C   ;     NUMERIC SHIFT KEY WAS PRESSED OR RELEASED
620                           C
621   0120                    C   PROC_NUM_SHIFT:
622   0120  B0 20             C         MOV     AL,NUM_SHIFT      ; SET UP MASK FOR NUMERIC SHIFT KEY
623   0122  EB 03 90          C         JMP     PROC_AN_SHIFT     ; PROCESS SHIFT KEY
624                           C
625                           C   ;     ALPHAMERIC SHIFT KEY WAS PRESSED OR RELEASED
626                           C
627   0125                    C   PROC_ALPHA_SHIFT:
628   0125  B0 10             C         MOV     AL,ALPHA_SHIFT    ; SET UP MASK FOR ALPHAMERIC SHIFT KEY
629                           C
630                           C   ;     ALPHA OR NUMERIC SHIFT KEY WAS PRESSED OR RELEASED
631                           C
632   0127                    C   PROC_AN_SHIFT:
633   0127  F6 C4 80          C         TEST    AH,BREAK_BIT      ; WAS SHIFT KEY PRESSED?
634   012A  75 06             C         JNZ     BREAK_AN_SHIFT    ; NO, SHIFT KEY WAS RELEASED
635   012C  08 06 0000 R      C         OR      KBD_STATE,AL      ; INDICATE SHIFT KEY IS DEPRESSED
636   0130  EB 9E             C         JMP     PROC_SHIFT_KEY    ; ROUTE THE KEYSTROKE AS NEEDED
637   0132                    C   BREAK_AN_SHIFT:
638   0132  F6 D0             C         NOT     AL                ; INDICATE SHIFT KEY IS NO LONGER
639   0134  20 06 0000 R      C         AND     KBD_STATE,AL      ;   DEPRESSED
640   0138  EB 96             C         JMP     PROC_SHIFT_KEY    ; ROUTE THE KEYSTROKE AS NEEDED
641                           C
642                           C   ;     ALT KEY PRESSED OR RELEASED
643                           C
644   013A                    C   PROC_ALT_SHIFT:
645   013A  F6 C4 80          C         TEST    AH,BREAK_BIT      ; WAS THE KEY PRESSED?
646   013D  75 07             C         JNZ     BREAK_ALT_SHIFT   ; NO, ALT KEY WAS RELEASED
647   013F  80 0E 0000 R 02   C         OR      KBD_STATE,ALT_STATE ; INDICATE ALT KEY IS DEPRESSED
648   0144  EB 8A             C         JMP     PROC_SHIFT_KEY    ; ROUTE THE KEYSTROKE AS NEEDED
649   0146                    C   BREAK_ALT_SHIFT:
650   0146  80 26 0000 R FD   C         AND     KBD_STATE,NOT ALT_STATE ; INDICATE ALT KEY IS NO LONGER
651                           C   ;                                       DEPRESSED
652   014B  EB 83             C         JMP     PROC_SHIFT_KEY    ; ROUTE THE KEYSTROKE AS NEEDED
653                           C
654                           C   ;     RESET KEY WAS PRESSED
655                           C
656   014D                    C   PROC_RESET:
657   014D  F6 06 0000 R 80   C         TEST    TERM_MODE,T_HOST  ; ARE WE IN PC MODE?
658   0152  75 2A             C         JNZ     PROC_RESET_1      ; NO, DO NOT PROCESS RESET KEY
659   0154  C6 06 0003 R 00   C         MOV     DEC_DIGIT,0       ; CANCEL DECIMAL DIGIT INPUT MODE
660   0159  80 26 0002 R 3F   C         AND     LOGICAL_STATE,NOT L_ALT+L_CTL ; CANCEL PC ALT
661                           C   ;                                   AND PC CTL MODES
662                           C
663   015E                    C   RESET_ALT:
664   015E  B0 B8             C         MOV     AL,BREAK_BIT OR PC_ALT_KEY ; INDICATE THE ALT KEY
665   0160  E8 0367 R         C         CALL    SEND_TO_PC        ;   WAS RELEASED
666   0163  B0 90             C         MOV     AL,BREAK_BIT OR PC_CTL_KEY ; INDICATE THE CTL KEY
667   0165  E8 0367 R         C         CALL    SEND_TO_PC        ;   WAS RELEASED
668   0168  80 26 0001 R 1F   C         AND     PC_STATE,NOT (P_SHIFT OR P_ALT OR P_CTL)
669   016D  BA ---- R         C         MOV     DX,ROMDATA        ; ESTABLISH ADDRESSABILITY TO DATA AREA
670   0170  8E C2             C         MOV     ES,DX             ;   USED BY THE ROM BIOS ROUTINES
671                           C         ASSUME  ES:ROMDATA
672      = 0070               C   R_MASK_1A EQU R_CAPS_STATE OR R_NUM_STATE OR R_SCROLL_STATE
673      = 007C               C   R_MASK_1B EQU R_MASK_1A OR R_ALT_SHIFT OR R_CTL_SHIFT
674      = 007F               C   R_MASK_1C EQU R_MASK_1B OR R_LEFT_SHIFT OR R_RIGHT_SHIFT
675   0172  26: 80 26 0017 R 80 C       AND     R_KB_FLAG,NOT R_MASK_1C ; INSURE CAPS STATE, NUM LOCK
676                           C                                   ;   STATE AND SCROLL LOCK STATES ARE
677                           C                                   ;   RESET IN THE KEYBOARD BIOS ROUTINE
678                           C                                   ;   AND THAT THE ALT, CTRL, AND SHIFT
679                           C                                   ;   KEYS ARE NOT DEPRESSED
680      = 0070               C   R_MASK_2 EQU  R_CAPS_SHIFT OR R_NUM_SHIFT OR R_SCROLL_SHIFT
681   0178  26: 80 26 0018 R 8F C       AND     R_KB_FLAG_1,NOT R_MASK_2 ; INSURE THE ROM BIOS ROUTINE
682                           C                                   ;   KNOWS THE CAPS LOCK, NUM LOCK, AND
683                           C                                   ;   SCROLL LOCK KEYS ARE NOT DEPRESSED
684                           C         ASSUME  ES:NOTHING
685                           C
686   017E                    C   PROC_RESET_1:
687   017E  E9 021F R         C         JMP     ROUTE             ; ROUTE THE KEYSTROKE AS NEEDED
688                           C
689                           C   ;     CLICK KEY WAS PRESSED - TOGGLE THE KEYBOARD CLICKER STATE
690                           C
691   0181                    C   PROC_CLICK:
692   0181  F6 06 0000 R 80   C         TEST    TERM_MODE,T_HOST  ; ARE WE IN PERSONAL COMPUTER MODE?
693   0186  75 14             C         JNZ     PROC_CLICK_1      ; NO, JUST PASS ON CLICK KEY
694   0188  80 36 0000 R 04   C         XOR     KBD_STATE,CLICK_STATE ; TOGGLE CLICKER STATE
695   018D  B0 09             C         MOV     AL,CLICK_ON       ; SET UP TO TURN CLICKER ON
696   018F  F6 06 0000 R 04   C         TEST    KBD_STATE,CLICK_STATE ; IS CLICKER OFF?
697   0194  75 02             C         JNZ     SET_CLICKER       ; YES, CONTINUE
698   0196  B0 08             C         MOV     AL,CLICK_OFF      ; NO, SET UP TO TURN CLICKER OFF
699   0198                    C   SET_CLICKER:
700   0198  BA 03E4           C         MOV     DX,COMMAND_PORT   ; TURN KEYBOARD CLICKER ON OR OFF
701   019B  EE                C         OUT     DX,AL
702                           C
703   019C                    C   PROC_CLICK_1:
704   019C  E9 021F R         C         JMP     ROUTE             ; ROUTE THE KEYSTROKE AS NEEDED
```

```
705                              C ;       START DECIMAL DIGIT INPUT
706                              C ;
707                              C
708    019F                      C PROC_DECIMAL_KEY:
709    019F   F6 06 0000 R 80    C         TEST    TERM_MODE,T_HOST  ; ARE WE IN PC MODE?
710    01A4   75 16              C         JNZ     PROC_DECIMAL_KEY_1 ; NO, DO NOT PROCESS THIS KEY
711    01A6   C6 06 0003 R 03    C         MOV     DEC_DIGIT,3      ; INDICATE 3 DIGITS EXPECTED
712    01AB   F6 06 0001 R 20    C         TEST    PC_STATE,P_ALT   ; IS THE PERSONAL COMPUTER IN ALT MODE?
713    01B0   74 0A              C         JZ      PROC_DECIMAL_KEY_1 ; NO, CONTINUE
714    01B2   B0 B8              C         MOV     AL,BREAK_BIT OR PC_ALT_KEY ; YES, INDICATE THE ALT KEY
715    01B4   E8 0367 R          C         CALL    SEND_TO_PC       ; WAS RELEASED - THIS WILL TERMINATE
716                              C                                  ;   THE DECIMAL INPUT FIELD IN PROGRESS
717    01B7   80 26 0001 R DF    C         AND     PC_STATE,NOT P_ALT
718                              C
719    01BC                      C PROC_DECIMAL_KEY_1:
720    01BC   EB 61 90           C         JMP     ROUTE            ; ROUTE THE KEYSTROKE AS NEEDED
721                              C
722                              C ;       TOGGLE BETWEEN PERSONAL COMPUTER AND HOST PROCESSOR MODES
723                              C
724    01BF                      C PROC_SWITCH_MODE:
725    01BF   F6 06 0000 R 80    C         TEST    TERM_MODE,T_HOST ; IS THE TERMINAL IN HOST MODE?
726    01C4   74 04              C         JZ      SWITCH_TO_HOST   ; NO, SWITCH TO HOST MODE
727                              C
728    01C6   B0 01              C         MOV     AL,SET_MODE_PC   ; YES, INDICATE SWITCH TO PC MODE
729    01C8   EB 02              C         JMP     SHORT SWITCH_MODE_1
730                              C
731    01CA                      C SWITCH_TO_HOST:
732    01CA   B0 00              C         MOV     AL,SET_MODE_HOST ; INDICATE SWITCH TO HOST MODE
733                              C
734    01CC                      C SWITCH_MODE_1:
735    01CC   B4 00              C         MOV     AH,FUNC_SET_MODE ; INDICATE SET MODE
736    01CE   CD 50              C         INT     NDSP_INT_CODE    ; SWITCH TERMINAL MODE
737    01D0   C3                 C         RET                      ; PROCESS NEXT PENDING INTERRUPT
738                              C
739                              C ;       CTRL KEY - INDICATE NEXT KEY STROKE IS IN PERSONAL COMPUTER
740                              C ;       CTRL CASE
741                              C
742    01D1                      C PROC_CTL_KEY:
743    01D1   F6 06 0000 R 80    C         TEST    TERM_MODE,T_HOST ; ARE WE IN PC MODE?
744    01D6   75 05              C         JNZ     PROC_CTL_KEY_1   ; NO, DO NOT PROCESS PC CTL KEY
745    01D8   80 0E 0002 R 40    C         OR      LOGICAL_STATE,L_CTL ; INDICATE PC CTL CASE
746                              C
747    01DD                      C PROC_CTL_KEY_1:
748    01DD   EB 40 90           C         JMP     ROUTE            ; ROUTE KEYSTROKE AS NEEDED
749                              C
750                              C ;       PC ALT KEY - INDICATE NEXT KEY STROKE IS IN PERSONAL COMPUTER
751                              C ;       ALT CASE
752                              C
753    01E0                      C PROC_ALT_KEY:
754    01E0   F6 06 0000 R 80    C         TEST    TERM_MODE,T_HOST ; ARE WE IN PC MODE?
755    01E5   75 05              C         JNZ     PROC_ALT_KEY_1   ; NO, DO NOT PROCESS PC ALT KEY
756    01E7   80 0E 0002 R 80    C         OR      LOGICAL_STATE,L_ALT ; INDICATE PC ALT CASE
757                              C
758    01EC                      C PROC_ALT_KEY_1:
759    01EC   EB 31 90           C         JMP     ROUTE            ; ROUTE KEY STROKE AS NEEDED
760                              C
761                              C ;       PAUSE KEY - STOP ALL NORMAL PERSONAL COMPUTER PROCESSING
762                              C ;       UNTIL THE USER PRESSES ANOTHER NON-SHIFT KEY
763                              C
764    01EF                      C PROC_PAUSE:
765    01EF   F6 06 0000 R 80    C         TEST    TERM_MODE,T_HOST ; ARE WE IN HOST MODE?
766    01F4   74 03              C         JZ      PAUSE_1          ; NO, PERSONAL COMPUTER MODE
767    01F6   EB 27 90           C         JMP     ROUTE            ; YES, NO SPECIAL PROCESSING
768    01F9                      C PAUSE_1:
769    01F9   80 0E 0002 R 20    C         OR      LOGICAL_STATE,L_PAUSE ; INDICATE WE ARE IN PAUSE STATE
770                              C
771    01FE   E8 0000 E          C         CALL    PROC_INTERRUPTS  ; PROCESS ALL OTHER PENDING INTERRUPTS
772                              C
773    0201   BA ---- R          C         MOV     DX,ROMDATA       ; POINT TO ROM BIOS DATA AREA
774    0204   8E C2              C         MOV     ES,DX
775                              C         ASSUME  ES:ROMDATA
776                              C
777    0206   26: 80 3E 0049 R 07 C        CMP     CRT_MODE,7       ; IS THE MONOCHROME CARD BEING USED?
778    020C   74 08              C         JE      PAUSE_2          ; YES, NO PROCESSING NEEDED
779    020E   BA 03D8            C         MOV     DX,03D8H         ; NO, TURN ON DISPLAY DURING PAUSE
780    0211   26: A0 0065 R      C         MOV     AL,CRT_MODE_SET
781    0215   EE                 C         OUT     DX,AL
782                              C         ASSUME  ES:NOTHING
783                              C
784    0216                      C PAUSE_2:
785    0216   FB                 C         STI                      ; ENABLE INTERRUPTS
786                              C
787    0217                      C PAUSE_3:                         ; WAIT FOR THE USER TO PRESS A KEY
788    0217   F6 06 0002 R 20    C         TEST    LOGICAL_STATE,L_PAUSE
789    021C   75 F9              C         JNZ     PAUSE_3
790                              C
791    021E   C3                 C         RET                      ; PROCESS ALL OTHER PENDING INTERRUPTS
792                              C
793                              C         INCLUDE NDSPKBD2.ASM
794                              C
795                              C ;*************************************************************
796                              C ;*
797                              C ;*      ROUTE THE CONVERTED SCAN CODE TO THE PERSONAL COMPUTER OR
```

```
798                             C ;*      ROUTE THE ORIGINAL SCAN CODE TO THE 3278/3279
799                             C ;*
800                             C ;********************************************************
801                             C
802   021F                      C ROUTE:
803   021F  F6 06 0000 R 80     C         TEST    TERM_MODE,T_HOST ; IS THE TERMINAL IN HOST MODE?
804   0224  74 07               C         JZ      ROUTE_PC         ; NO, SEND THE CONVERTED SCAN CODE TO
805                             C ;                                  THE PERSONAL COMPUTER
806                             C
807                             C ;       THE TERMINAL IS IN HOST PROCESSOR MODE - SEND ALL
808                             C ;       KEY STROKES TO THE 3278/3279
809                             C
810   0226  A0 0004 R           C         MOV     AL,KBD_SCAN_CODE ; PICK UP ORIGINAL SCAN CODE
811   0229  E8 02FD R           C         CALL    SEND_TO_3278     ; SEND THE SCAN CODE TO THE 3278/3279
812                             C
813   022C  C3                  C         RET                      ; PROCESS NEXT PENDING INTERRUPT
814                             C
815                             C ;       THE TERMINAL IS IN PERSONAL COMPUTER MODE - SEND THE CONVERTED
816                             C ;       KEY STROKE TO THE PERSONAL COMPUTER
817                             C
818   022D                      C ROUTE_PC:
819   022D  F6 06 0002 R 20     C         TEST    LOGICAL_STATE,L_PAUSE ; ARE WE IN PAUSE STATE?
820   0232  74 15               C         JZ      ROUTE_TO_PC      ; NO, ROUTE KEYSTROKE TO THE PC
821                             C
822                             C ;       THIS KEY STROKE IS USED TO EXIT PAUSE STATE
823                             C
824   0234  80 26 0002 R DF     C         AND     LOGICAL_STATE,NOT L_PAUSE ; NO LONGER IN PAUSE STATE
825   0239  F6 06 0002 R 10     C         TEST    LOGICAL_STATE,L_PC_PORT_AVAIL ; DID A PC OUTPUT PORT
826                             C                                  ;    AVAILABLE INTERRUPT OCCUR WHILE WE
827                             C                                  ;    WERE IN PAUSE STATE?
828   023E  74 08               C         JZ      EXIT_PAUSE_1     ; NO, CONTINUE PROCESSING
829   0240  80 26 0002 R EF     C         AND     LOGICAL_STATE,NOT L_PC_PORT_AVAIL ; YES, PROCESS IT
830   0245  E8 03A7 R           C         CALL    XMIT_TO_PC       ; SEND PENDING KEY STROKES TO THE PC
831                             C
832   0248                      C EXIT_PAUSE_1:
833   0248  C3                  C         RET                      ; IGNORE THIS KEY STROKE
834                             C
835   0249                      C ROUTE_TO_PC:
836   0249  80 3E 0005 R 00     C         CMP     PC_SCAN_CODE,0   ; IS THIS A FUNCTION CODE?
837   024E  79 01               C         JNS     ROUTE_PC1        ; NO, IT IS A SCAN CODE
838   0250  C3                  C         RET                      ; YES, DO NOT SEND IT TO THE PC
839   0251                      C ROUTE_PC1:
840                             C
841                             C ;       IF THE KEYBOARD IS IN DECIMAL DIGIT INPUT MODE, CONVERT THE
842                             C ;       KEY STROKE TO A NUMERIC KEYPAD DIGIT SCAN CODE
843                             C
844   0251  80 3E 0003 R 00     C         CMP     DEC_DIGIT,0      ; ARE DECIMAL DIGITS EXPECTED?
845   0256  74 30               C         JE      TEST_SHIFTS      ; NO, CONTINUE PROCESSING
846                             C
847   0258  A0 0005 R           C         MOV     AL,PC_SCAN_CODE  ; INSURE THE KEY STROKE WAS A DECIMAL
848                             C ;                                  DIGIT
849   025B  3C 02               C         CMP     AL,2
850   025D  72 24               C         JB      CANCEL_DIGITS    ; NOT DIGIT - CANCEL DIGIT INPUT MODE
851   025F  3C 0B               C         CMP     AL,11
852   0261  77 20               C         JA      CANCEL_DIGITS    ; NOT DIGIT - CANCEL DIGIT INPUT MODE
853   0263  F6 C2 E0            C         TEST    DL,U+A+C
854   0266  75 1B               C         JNZ     CANCEL_DIGITS    ; NOT DIGIT - CANCEL DIGIT INPUT MODE
855                             C
856   0268  80 CA 20            C         OR      DL,A             ; VALID DIGIT - CONVERT IT TO A NUMERIC
857                             C ;                                  KEY PAD DIGIT KEY WITH THE ALT KEY
858                             C ;                                  PRESSED
859   026B  FE C8               C         DEC     AL
860   026D  FE C8               C         DEC     AL
861   026F  8D 1E 0006 R        C         LEA     BX,PC_DIGITS
862   0273  D7                  C         XLAT    PC_DIGITS
863   0274  A2 0005 R           C         MOV     PC_SCAN_CODE,AL
864                             C
865   0277  FE 0E 0003 R        C         DEC     DEC_DIGIT        ; A DIGIT HAS BEEN PROCESSED
866   027B  75 0B               C         JNZ     TEST_SHIFTS      ; NOT LAST DIGIT
867   027D  80 CA 02            C         OR      DL,BA            ; LAST DIGIT - INDICATE ALT KEY WAS
868                             C ;                                  RELEASED AFTER SENDING LAST DIGIT
869   0280  EB 06 90            C         JMP     TEST_SHIFTS      ; SEND KEY STROKE TO PERSONAL COMPUTER
870                             C
871                             C ;       A NON-DECIMAL DIGIT WAS KEYED DURING DECIMAL DIGIT INPUT MODE -
872                             C ;       CANCEL DECIMAL DIGIT INPUT MODE
873                             C
874   0283                      C CANCEL_DIGITS:
875   0283  C6 06 0003 R 00     C         MOV     DEC_DIGIT,0      ; INDICATE DECIMAL DIGITS ARE NOT
876                             C ;                                  EXPECTED
877                             C
878                             C ;       SEND THE PROPER SHIFT CODES TO THE PERSONAL COMPUTER TO MATCH
879                             C ;       THE STATE ASSOCIATED WITH THE SCAN CODE
880                             C
881   0288                      C TEST_SHIFTS:
882   0288  8A CA               C         MOV     CL,DL            ; DETERMINE WHICH SHIFT STATES MUST BE
883   028A  32 0E 0001 R        C         XOR     CL,PC_STATE      ;    CHANGED
884   028E  80 E1 E0            C         AND     CL,0E0H
885   0291  74 3C               C         JZ      SHIFTS_MATCH     ; STATES MATCH, CONTINUE
886                             C
887                             C ;       AT THIS POINT:
888                             C ;         DL = NEEDED PERSONAL COMPUTER KEYBOARD STATE
889                             C ;         CL = MISMATCHED STATES
890                             C
```

```
891    0293  F6 C1 80          C          TEST     CL,U              ; DOES SHIFT CASE MATCH?
892    0296  74 0C             C          JZ       CASE_OK           ; YES, CONTINUE
893    0298  B0 2A             C          MOV      AL,PC_SHIFT_KEY   ; NO, INDICATE SHIFT KEY PRESSED
894    029A  F6 C2 80          C          TEST     DL,U              ; IS UPPER CASE NEEDED?
895    029D  75 02             C          JNZ      SEND_CASE         ; YES, CONTINUE
896    029F  0C 80             C          OR       AL,BREAK_BIT      ; NO, INDICATE SHIFT KEY RELEASED
897    02A1                    C SEND_CASE:
898    02A1  E8 0367 R         C          CALL     SEND_TO_PC        ; SEND KEY STROKE TO PC
899    02A4                    C CASE_OK:
900                            C
901    02A4  F6 C1 20          C          TEST     CL,A              ; DOES ALT CASE MATCH?
902    02A7  74 0C             C          JZ       ALT_OK            ; YES, CONTINUE
903    02A9  B0 38             C          MOV      AL,PC_ALT_KEY     ; NO, INDICATE ALT KEY PRESSED
904    02AB  F6 C2 20          C          TEST     DL,A              ; IS ALT CASE NEEDED?
905    02AE  75 02             C          JNZ      SEND_ALT          ; YES, CONTINUE
906    02B0  0C 80             C          OR       AL,BREAK_BIT      ; NO, INDICATE ALT KEY RELEASED
907    02B2                    C SEND_ALT:
908    02B2  E8 0367 R         C          CALL     SEND_TO_PC        ; SEND KEY STROKE TO PC
909    02B5                    C ALT_OK:
910                            C
911    02B5  F6 C1 40          C          TEST     CL,C              ; DOES CTL CASE MATCH?
912    02B8  74 0C             C          JZ       CTL_OK            ; YES, CONTINUE
913    02BA  B0 1D             C          MOV      AL,PC_CTL_KEY     ; NO, INDICATE CTRL KEY PRESSED
914    02BC  F6 C2 40          C          TEST     DL,C              ; IS CTL CASE NEEDED?
915    02BF  75 02             C          JNZ      SEND_CTL          ; YES, CONTINUE
916    02C1  0C 80             C          OR       AL,BREAK_BIT      ; NO, INDICATE CTRL KEY RELEASED
917    02C3                    C SEND_CTL:
918    02C3  E8 0367 R         C          CALL     SEND_TO_PC        ; SEND KEY STROKE TO PC
919    02C6                    C CTL_OK:
920                            C
921    02C6  8A CA             C          MOV      CL,DL             ; SAVE PERSONAL COMPUTER KEYBOARD STATE
922    02C8  80 E1 E0          C          AND      CL,0E0H
923    02CB  88 0E 0001 R      C          MOV      PC_STATE,CL
924                            C
925    02CF                    C SHIFTS_MATCH:
926    02CF  A0 0005 R         C          MOV      AL,PC_SCAN_CODE   ; SEND KEY STROKE TO PERSONAL COMPUTER
927    02D2  E8 0367 R         C          CALL     SEND_TO_PC
928                            C
929    02D5  F6 C2 03          C          TEST     DL,B OR BA        ; DOES THE PERSONAL COMPUTER NEED TO BE
930                            C ;                                     TOLD THAT THE KEY WAS RELEASED ALSO?
931    02D8  74 11             C          JZ       RESET_SHIFTS      ; NO, CONTINUE
932                            C
933    02DA  0C 80             C          OR       AL,BREAK_BIT      ; YES, INDICATE KEY WAS RELEASED
934    02DC  F6 C2 02          C          TEST     DL,BA             ; WHAT KEY MUST BE RELEASED?
935    02DF  74 07             C          JZ       BREAK_KEYSTROKE   ; THE KEY STROKE JUST SENT
936    02E1  B0 B8             C          MOV      AL,BREAK_BIT OR PC_ALT_KEY ; THE ALT KEY WAS RELEASED
937    02E3  80 26 0001 R DF   C          AND      PC_STATE,NOT P_ALT ; UPDATE PC KEYBOARD STATE
938    02E8                    C BREAK_KEYSTROKE:
939    02E8  E8 0367 R         C          CALL     SEND_TO_PC
940                            C
941                            C ;*************************************************************
942                            C ;*                                                           *
943                            C ;*   END OF PROCESSING A VALID KEY STROKE - RESET THE PERSONAL *
944                            C ;*   COMPUTER STATE FLAGS SO THE NEXT KEY STROKE IS NOT INTERPRETED *
945                            C ;*   AS BEING IN CTL OR ALT MODE                             *
946                            C ;*                                                           *
947                            C ;*************************************************************
948                            C
949    02EB                    C RESET_SHIFTS:
950    02EB  80 26 0002 R 3F   C          AND      LOGICAL_STATE,NOT L_CTL+L_ALT
951                            C
952    02F0  C3                C          RET                        ; PROCESS NEXT PENDING INTERRUPT
953                            C
954                            C ;*************************************************************
955                            C ;*                                                           *
956                            C ;*   THE 3278/3279 KEYBOARD HAS SIGNALLED OVERRUN             *
957                            C ;*                                                           *
958                            C ;*************************************************************
959                            C
960    02F1                    C OVERRUN:
961    02F1  C6 06 0005 R FF   C          MOV      PC_SCAN_CODE,0FFH ; SET UP OVERRUN SCAN CODE
962    02F6  8A 16 0001 R      C          MOV      DL,PC_STATE       ; REQUIRED STATE = CURRENT STATE
963    02FA  E9 021F R         C          JMP      ROUTE             ; ROUTE THE OVERRUN INDICATION TO THE
964                            C                                     ; PERSONAL COMPUTER OR TO THE 3278/3279
965                            C
966                            C
967                            C
968                            C ;*************************************************************
969                            C ;*
970                            C ;*  Procedure Name: SEND_TO_3278
971                            C ;*
972                            C ;*  Function: Send a keystroke to the 3278/3279
973                            C ;*
974                            C ;*  Input: AL = keyboard scan code to be sent
975                            C ;*
976                            C ;*  Output: Scan code added to BUFFER_3278 and/or sent to 3278/3279
977                            C ;*
978                            C ;*************************************************************
979                            C
980    02FD                    C SEND_TO_3278 PROC NEAR
981    02FD  50                C          PUSH     AX                ; SAVE WORK REGISTERS
982    02FE  53                C          PUSH     BX
983    02FF  52                C          PUSH     DX
```

```
984    0300  57                    C         PUSH    DI
985                                C
986    0301  8B 3E 0022 R          C         MOV     DI,BUFFER_3278_TAIL ; PICK UP CURRENT BUFFER ADDRESS
987    0305  8B DF                 C         MOV     BX,DI           ; CALCULATE ADDRESS OF NEXT BYTE IN
988    0307  43                    C         INC     BX              ;    BUFFER
989    0308  8D 16 0020 R          C         LEA     DX,BUFFER_3278_END
990    030C  3B DA                 C         CMP     BX,DX
991    030E  75 04                 C         JNE     SEND_TO_3278_1
992    0310  8D 1E 0010 R          C         LEA     BX,BUFFER_3278
993    0314                        C SEND_TO_3278_1:
994                                C
995    0314  3B 1E 0020 R          C         CMP     BX,BUFFER_3278_HEAD ; IS THE BUFFER FULL?
996    0318  74 1A                 C         JE      OVERRUN_3278    ; YES, WE HAVE OVERRUN THE 3278/3279
997                                C
998    031A  88 05                 C         MOV     [DI],AL         ; NO, PUT THE SCAN CODE IN THE BUFFER
999    031C  89 3E 0024 R          C         MOV     BUFFER_3278_LAST,DI ; SAVE ADDRESS OF THIS BYTE
1000   0320  89 1E 0022 R          C         MOV     BUFFER_3278_TAIL,BX ; SAVE NEXT BUFFER BYTE ADDRESS
1001                               C
1002   0324                        C SEND_TO_3278_2:
1003   0324  BA 03E2               C         MOV     DX,KB_CTL       ; SEE IF THE 3278 KEYBOARD OUTPUT PORT
1004   0327  EC                    C         IN      AL,DX           ;    IS BUSY
1005   0328  A8 02                 C         TEST    AL,02H
1006   032A  74 03                 C         JZ      SEND_TO_3278_3  ; PORT IS BUSY - THE KEY STROKE WILL BE
1007                               C ;                                    SENT WHEN THE 3278/3279 ACKNOWLEDGES
1008                               C ;                                    THE KEY STROKE IT IS WORKING ON
1009   032C  E8 033D R             C         CALL    XMIT_TO_3278    ; PORT IS FREE - SEND THE NEXT KEY
1010                               C ;                                    STROKE TO THE 3278/3279
1011                               C
1012   032F                        C SEND_TO_3278_3:
1013   032F  5F                    C         POP     DI              ; RESTORE REGISTERS
1014   0330  5A                    C         POP     DX
1015   0331  5B                    C         POP     BX
1016   0332  58                    C         POP     AX
1017   0333  C3                    C         RET                     ; RETURN TO CALLER
1018                               C
1019   0334                        C OVERRUN_3278:
1020   0334  8B 3E 0024 R          C         MOV     DI,BUFFER_3278_LAST ; PICK UP ADDRESS OF LAST BYTE USED
1021   0338  C6 05 00              C         MOV     BYTE PTR [DI],0 ; REPLACE LAST KEY STROKE IN BUFFER
1022                               C ;                                    WITH OVERRUN SCAN CODE
1023   033B  EB E7                 C         JMP     SEND_TO_3278_2  ; SEND KEY STROKES TO 3278/3279
1024                               C
1025   033D                        C SEND_TO_3278 ENDP
1026                               C
1027                               C
1028                               C ;*************************************************************
1029                               C ;*
1030                               C ;*  Procedure Name: XMIT_TO_3278
1031                               C ;*
1032                               C ;*  Function: Send the next pending keystroke to the 3278/3279
1033                               C ;*
1034                               C ;*  Input: BUFFER_3278 contains scan codes to be sent to the display
1035                               C ;*
1036                               C ;*  Output: the oldest scan code sent to the 3278/3279 display
1037                               C ;*
1038                               C ;*************************************************************
1039                               C
1040   033D                        C XMIT_TO_3278 PROC NEAR
1041                               C
1042   033D  8B 1E 0020 R          C         MOV     BX,BUFFER_3278_HEAD ; SEE IF THERE ARE ANY KEY STROKES
1043   0341  3B 1E 0022 R          C         CMP     BX,BUFFER_3278_TAIL ;    IN THE BUFFER
1044   0345  74 1F                 C         JZ      XMIT_TO_3278_3  ; NO, JUST RETURN TO CALLER
1045                               C
1046   0347  8A 27                 C         MOV     AH,[BX]         ; PICK UP NEXT SCAN CODE TO BE SENT
1047   0349  43                    C         INC     BX              ; POINT TO NEXT SCAN CODE IN BUFFER
1048   034A  8D 16 0020 R          C         LEA     DX,BUFFER_3278_END
1049   034E  3B DA                 C         CMP     BX,DX
1050   0350  75 04                 C         JNE     XMIT_TO_3278_1
1051   0352  8D 1E 0010 R          C         LEA     BX,BUFFER_3278
1052   0356                        C XMIT_TO_3278_1:
1053   0356  89 1E 0020 R          C         MOV     BUFFER_3278_HEAD,BX
1054                               C
1055   035A  BA 03E3               C         MOV     DX,CMD_8255     ; ALLOW THE 3278/3279 TO INTERRUPT
1056   035D  B0 05                 C         MOV     AL,SET_INTE_B   ;    WHEN IT HAS ACKNOWLEDGED THE SCAN
1057   035F  EE                    C         OUT     DX,AL           ;    CODE
1058                               C
1059   0360                        C XMIT_TO_3278_2:
1060   0360  BA 03E1               C         MOV     DX,NDS_KB_OUT   ; SEND THE SCAN CODE TO THE 3278/3279
1061   0363  8A C4                 C         MOV     AL,AH
1062   0365  EE                    C         OUT     DX,AL
1063                               C
1064   0366                        C XMIT_TO_3278_3:
1065   0366  C3                    C         RET                     ; RETURN TO CALLER
1066                               C
1067   0367                        C XMIT_TO_3278 ENDP
1068                               C
1069                               C
1070                               C ;*************************************************************
1071                               C ;*
1072                               C ;*  Procedure Name: SEND_TO_PC
1073                               C ;*
1074                               C ;*  Function: Send a keystroke to the Personal Computer
1075                               C ;*
1076                               C ;*  Input: AL = keyboard scan code to be sent
```

```
1077                             C  ;*
1078                             C  ;*   Output: scan code added to BUFFER_PC and/or sent to Personal
1079                             C  ;*          Computer
1080                             C  ;*
1081                             C  ;****************************************************************
1082                             C
1083     0367                    C  SEND_TO_PC  PROC  NEAR
1084     0367  50                C              PUSH   AX                ; SAVE WORK REGISTERS
1085     0368  53                C              PUSH   BX
1086     0369  52                C              PUSH   DX
1087     036A  57                C              PUSH   DI
1088                             C
1089     036B  8B 3E 0038 R      C              MOV    DI,BUFFER_PC_TAIL ; PICK UP CURRENT BUFFER ADDRESS
1090     036F  8B DF             C              MOV    BX,DI             ; CALCULATE ADDRESS OF NEXT BYTE IN
1091     0371  43                C              INC    BX                ;    BUFFER
1092     0372  8D 16 0036 R      C              LEA    DX,BUFFER_PC_END
1093     0376  3B DA             C              CMP    BX,DX
1094     0378  75 04             C              JNE    SEND_TO_PC_1
1095     037A  8D 1E 0026 R      C              LEA    BX,BUFFER_PC
1096     037E                    C  SEND_TO_PC_1:
1097                             C
1098     037E  3B 1E 0036 R      C              CMP    BX,BUFFER_PC_HEAD ; IS THE BUFFER FULL?
1099     0382  74 1A             C              JE     OVERRUN_PC        ; YES, WE HAVE OVERRUN THE PERSONAL
1100                             C  ;                                         COMPUTER
1101                             C
1102     0384  88 05             C              MOV    [DI],AL           ; NO, PUT THE SCAN CODE IN THE BUFFER
1103     0386  89 3E 003A R      C              MOV    BUFFER_PC_LAST,DI ; SAVE ADDRESS OF THIS BYTE
1104     038A  89 1E 0038 R      C              MOV    BUFFER_PC_TAIL,BX ; SAVE NEXT BUFFER BYTE ADDRESS
1105                             C
1106     038E                    C  SEND_TO_PC_2:
1107     038E  BA 03E4           C              MOV    DX,STATUS_PORT    ; SEE IF THE PERSONAL COMPUTER KEYBOARD
1108     0391  EC                C              IN     AL,DX             ;    IS BUSY
1109     0392  A8 10             C              TEST   AL,ST_PC_KB_BUSY
1110     0394  75 03             C              JNZ    SEND_TO_PC_3      ; PORT IS BUSY - THE KEY STROKE WILL BE
1111                             C  ;                                         SENT WHEN THE PERSONAL COMPUTER
1112                             C  ;                                         ACKNOWLEDGES THE KEY STROKE IT IS
1113                             C  ;                                         WORKING ON
1114     0396  E8 03A7 R         C              CALL   XMIT_TO_PC        ; PORT IS FREE - SEND THE NEXT KEY
1115                             C  ;                                         STROKE TO THE PERSONAL COMPUTER
1116                             C
1117     0399                    C  SEND_TO_PC_3:
1118     0399  5F                C              POP    DI                ; RESTORE REGISTERS
1119     039A  5A                C              POP    DX
1120     039B  5B                C              POP    BX
1121     039C  58                C              POP    AX
1122     039D  C3                C              RET                      ; RETURN TO CALLER
1123                             C
1124     039E                    C  OVERRUN_PC:
1125     039E  8B 3E 003A R      C              MOV    DI,BUFFER_PC_LAST ; PICK UP ADDRESS OF LAST BYTE USED
1126     03A2  C6 05 FF          C              MOV    BYTE PTR[DI],0FFH ; REPLACE LAST KEY STROKE IN BUFFER
1127                             C  ;                                         WITH OVERRUN SCAN CODE
1128     03A5  EB E7             C              JMP    SEND_TO_PC_2      ; SEND KEY STROKES TO PERSONAL COMPUTER
1129                             C
1130     03A7                    C  SEND_TO_PC  ENDP
1131                             C
1132                             C
1133                             C  ;****************************************************************
1134                             C  ;*
1135                             C  ;*  Procedure Name: XMIT_TO_PC
1136                             C  ;*
1137                             C  ;*  Function: Send the next pending keystroke to the Personal
1138                             C  ;*            Computer
1139                             C  ;*
1140                             C  ;*  Input: BUFFER_PC contains scan codes to be sent to the PC
1141                             C  ;*
1142                             C  ;*  Output: oldest scan code sent to the Personal Computer
1143                             C  ;*
1144                             C  ;****************************************************************
1145                             C
1146     03A7                    C  XMIT_TO_PC  PROC  NEAR
1147                             C
1148     03A7  8B 1E 0036 R      C              MOV    BX,BUFFER_PC_HEAD ; SEE IF THERE ARE ANY KEY STROKES IN
1149     03AB  3B 1E 0038 R      C              CMP    BX,BUFFER_PC_TAIL ;    THE BUFFER
1150     03AF  74 19             C              JZ     XMIT_TO_PC_3      ; NO, JUST RETURN TO CALLER
1151                             C
1152     03B1  8A 27             C              MOV    AH,[BX]           ; PICK UP NEXT SCAN CODE TO BE SENT
1153     03B3  43                C              INC    BX                ; POINT TO NEXT SCAN CODE IN BUFFER
1154     03B4  8D 16 0036 R      C              LEA    DX,BUFFER_PC_END
1155     03B8  3B DA             C              CMP    BX,DX
1156     03BA  75 04             C              JNE    XMIT_TO_PC_1
1157     03BC  8D 1E 0026 R      C              LEA    BX,BUFFER_PC
1158     03C0                    C  XMIT_TO_PC_1:
1159     03C0  89 1E 0036 R      C              MOV    BUFFER_PC_HEAD,BX
1160                             C
1161     03C4  BA 03E5           C              MOV    DX,PC_KB_OUT      ; SEND THE SCAN CODE TO THE PERSONAL
1162     03C7  8A C4             C              MOV    AL,AH             ;    COMPUTER
1163     03C9  EE                C              OUT    DX,AL
1164                             C
1165     03CA                    C  XMIT_TO_PC_3:
1166     03CA  C3                C              RET                      ; RETURN TO CALLER
1167                             C
1168     03CB                    C  XMIT_TO_PC  ENDP
```

```
1169
1170
1171           C  ;****************************************************************
1172           C  ;*                                                              *
1173           C  ;*  Procedure Name: PROC_PC_PORT_AVAIL                          *
1174           C  ;*                                                              *
1175           C  ;*  Function: To process a Personal Computer keyboard port available *
1176           C  ;*            interrupt                                         *
1177           C  ;*                                                              *
1178           C  ;*  Input: None                                                 *
1179           C  ;*                                                              *
1180           C  ;*  Output: The next pending keystroke is sent to the Personal  *
1181           C  ;*          Computer                                            *
1182           C  ;*                                                              *
1183           C  ;****************************************************************
1184           C
1185  03CB     C  PROC_PC_PORT_AVAIL PROC NEAR
1186           C
1187  03CB BA 03E4    C      MOV     DX,COMMAND_PORT ; ACKNOWLEDGE THE INTERRUPT
1188  03CE B0 00      C      MOV     AL,SERIAL_INT_OFF
1189  03D0 EE         C      OUT     DX,AL
1190           C
1191  03D1 F6 06 0002 R 20   C      TEST    LOGICAL_STATE,L_PAUSE ; ARE WE IN PAUSE STATE?
1192  03D6 74 06     C       JZ      PC_PORT_AVAIL_1 ; NO, SEND PENDING KEY STROKE
1193  03D8 80 0E 0002 R 10   C      OR      LOGICAL_STATE,L_PC_PORT_AVAIL ; YES, INDICATE THAT THE
1194           C                                    ;      INTERRUPT OCCURRED SO IT CAN BE
1195           C                                    ;      PROCESSED WHEN WE EXIT PAUSE STATE
1196  03DD C3        C       RET                   ; PROCESS NEXT PENDING INTERRUPT
1197           C
1198  03DE     C  PC_PORT_AVAIL_1:
1199  03DE E8 03A7 R C       CALL    XMIT_TO_PC    ; SEND NEXT PENDING KEY STROKE TO THE
1200           C  ;                                 ;      PERSONAL COMPUTER
1201  03E1 C3        C       RET                   ; PROCESS NEXT PENDING INTERRUPT
1202           C
1203  03E2     C  PROC_PC_PORT_AVAIL ENDP
1204           C
1205           C  ;****************************************************************
1206           C  ;*                                                              *
1207           C  ;*  Procedure Name: PROC_3278_PORT_AVAIL                        *
1208           C  ;*                                                              *
1209           C  ;*  Function: To process a 3278/3279 keyboard port available interrupt *
1210           C  ;*                                                              *
1211           C  ;*  Input: None                                                 *
1212           C  ;*                                                              *
1213           C  ;*  Output: The next pending keystroke is sent to the 3278/3279 *
1214           C  ;*                                                              *
1215           C  ;****************************************************************
1216           C
1217  03E2     C  PROC_3278_PORT_AVAIL PROC NEAR
1218           C
1219  03E2 BA 03E3    C      MOV     DX,CMD_8255    ; ACKNOWLEDGE THE INTERRUPT
1220  03E5 B0 04      C      MOV     AL,RESET_INTE_B
1221  03E7 EE         C      OUT     DX,AL
1222           C
1223  03E8 E8 033D R  C      CALL    XMIT_TO_3278  ; SEND NEXT PENDING KEY STROKE TO THE
1224           C  ;                                 ;      3278/3279
1225  03EB C3        C       RET                   ; PROCESS NEXT PENDING INTERRUPT
1226           C
1227  03EC     C  PROC_3278_PORT_AVAIL ENDP
1228           C
1229
1230  03EC        PROC_KEYBOARD_DATA ENDP
1231                  INCLUDE NDSPKBD3.ASM
1232           C      SUBTTL  Process a keyboard software function
1233           C
1234           C
1235           C  ;****************************************************************
1236           C  ;*                                                              *
1237           C  ;*  Procedure Name: SEND_ENCODED_KEYSTROKES_TO_3278              *
1238           C  ;*                                                              *
1239           C  ;*  Function: To send a series of encoded keystrokes to the 3278/3279 *
1240           C  ;*            at a rate not exceeding 10 keystrokes per second  *
1241           C  ;*                                                              *
1242           C  ;*  Input:                                                       *
1243           C  ;*                                                              *
1244           C  ;*    BX:DX = address of encoded keystrokes                     *
1245           C  ;*    CX = number of encoded keystrokes                         *
1246           C  ;*                                                              *
1247           C  ;*  Output:                                                     *
1248           C  ;*                                                              *
1249           C  ;*    CF = 0 if all encoded keystroke values are valid          *
1250           C  ;*         1 if any of the encoded keystroke values are invalid for *
1251           C  ;*            this keyboard                                     *
1252           C  ;*                                                              *
1253           C  ;*    AL = 4 if any of the encoded keystroke values are invalid for *
1254           C  ;*            this keyboard                                     *
1255           C  ;*                                                              *
1256           C  ;****************************************************************
1257           C
1258  03EC     C  SEND_ENCODED_KEYSTROKES_TO_3278 PROC NEAR
1259  03EC 1E   C       PUSH    DS              ; SAVE DATA POINTER
1260  03ED 1E   C       PUSH    DS              ; SWAP SEGMENT REGISTERS
1261  03EE 07   C       POP     ES
```

```
1262   03EF  8E DB                    C         MOV      DS,BX
1263                                  C         ASSUME   DS:NOTHING,ES:BIOSDATA
1264                                  C
1265   03F1  8B F2                    C         MOV      SI,DX              ; PICK UP ADDRESS OF ENCODED KEYSTROKES
1266   03F3  FC                       C         CLD                         ; SET UP FOR FORWARD SCAN OF DATA
1267                                  C
1268                                  C ;************************************************************
1269                                  C ;*                                                            *
1270                                  C ;*    SCAN THE DATA TO INSURE THAT THE KEYSTROKES ARE ALL VALID *
1271                                  C ;*                                                            *
1272                                  C ;************************************************************
1273                                  C
1274   03F4  51                       C         PUSH     CX                 ; SAVE KEYSTROKE COUNTER
1275   03F5  0B C9                    C         OR       CX,CX              ; IS THE COUNTER ZERO?
1276   03F7  74 10                    C         JZ       SCAN_KEYS_2        ; YES, INVALID INPUT
1277                                  C
1278   03F9                           C SCAN_KEYS_1:
1279   03F9  32 E4                    C         XOR      AH,AH              ; PICK UP NEXT KEYSTROKE ENCODING
1280   03FB  AC                       C         LODSB
1281                                  C
1282   03FC  D1 E0                    C         SAL      AX,1               ; PICK UP KEYSTROKE INFORMATION
1283   03FE  8B F8                    C         MOV      DI,AX
1284   0400  26: 8B 85 0492 R         C         MOV      AX,KEYSTROKE_XLAT[DI]
1285                                  C
1286   0405  0B C0                    C         OR       AX,AX              ; IS THIS A VALID TABLE ENTRY?
1287   0407  75 06                    C         JNZ      SCAN_KEYS_3        ; YES, CONTINUE
1288                                  C
1289   0409                           C SCAN_KEYS_2:
1290   0409  B0 04                    C         MOV      AL,RC_INVALID_KEY  ; NO, INDICATE INVALID KEYSTROKE
1291   040B  59                       C         POP      CX                 ; RETURN TO CALLER INDICATING ERROR
1292   040C  1F                       C         POP      DS                 ;   IN KEYSTROKE ENCODING
1293   040D  F9                       C         STC
1294   040E  C3                       C         RET
1295                                  C
1296   040F                           C SCAN_KEYS_3:
1297   040F  E2 E8                    C         LOOP     SCAN_KEYS_1        ; SCAN ALL SPECIFIED KEYSTROKES
1298                                  C
1299                                  C ;************************************************************
1300                                  C ;*                                                            *
1301                                  C ;*    LOGICALLY DISABLE THE 3278/3279 KEYBOARD AND RESET ALL   *
1302                                  C ;*    SHIFT STATES                                            *
1303                                  C ;*                                                            *
1304                                  C ;*    NOTE: THE PHYSICAL KEYBOARD MAY NOW BE OUT OF SYNCH WITH *
1305                                  C ;*    THE 3274/3276 CONTROL UNIT SINCE THE USER COULD STILL BE  *
1306                                  C ;*    HOLDING A SHIFT KEY. HOWEVER, THIS IS THE ONLY WAY THE    *
1307                                  C ;*    SEND KEYSTROKE FUNCTION CAN WORK.                        *
1308                                  C ;*                                                            *
1309                                  C ;************************************************************
1310                                  C
1311   0411  B9 0002                  C         MOV      CX,2               ; FORCE A 100 MS DELAY BETWEEN THESE
1312                                  C                                     ;   KEYSTROKES
1313   0414  26: 80 0E 0002 R 08      C         OR       LOGICAL_STATE,L_KBD_DISABLED ; MARK THE KEYBOARD AS
1314                                  C                                     ;   DISABLED
1315                                  C
1316   041A  26: F6 06 0000 R 20      C         TEST     KBD_STATE,RIGHT_SHIFT ; IS THE RIGHT SHIFT KEY PRESSED?
1317   0420  74 0B                    C         JZ       RESET_KBD_3        ; NO, CONTINUE
1318                                  C
1319   0422  B0 CE                    C         MOV      AL,BREAK_BIT OR NDS_R_SHIFT_KEY ; YES, INDICATE THAT THE
1320   0424  E8 052A R                C         CALL     SEND_KEY_TO_3278   ; SHIFT KEY WAS RELEASED
1321   0427  26: 80 26 0000 R DF      C         AND      KBD_STATE,NOT RIGHT_SHIFT
1322                                  C
1323   042D                           C RESET_KBD_3:
1324   042D  26: F6 06 0000 R 80      C         TEST     KBD_STATE,SHIFT_LOCK ; IS THE SHIFT LOCK KEY DEPRESSED?
1325   0433  74 0B                    C         JZ       RESET_KBD_4        ; NO, CONTINUE
1326                                  C
1327   0435  B0 CC                    C         MOV      AL,BREAK_BIT OR NDS_LOCK_KEY ; YES, INDICATE SHIFT LOCK
1328   0437  E8 052A R                C         CALL     SEND_KEY_TO_3278   ;   KEY WAS RELEASED
1329   043A  26: 80 26 0000 R 7F      C         AND      KBD_STATE,NOT SHIFT_LOCK
1330                                  C
1331   0440                           C RESET_KBD_4:
1332   0440  26: F6 06 0000 R 08      C         TEST     KBD_STATE,LOCK_STATE ; IS THE KEYBOARD IN SHIFT LOCK OR
1333                                  C                                     ;   NUM LOCK STATE?
1334   0446  74 1C                    C         JZ       RESET_KBD_5        ; NO, CONTINUE
1335                                  C
1336   0448  B0 4C                    C         MOV      AL,NDS_LOCK_KEY    ; YES, MUST RESET SHIFT LOCK OR NUM
1337                                  C                                     ;   LOCK STATE
1338                                  C
1339                                  C ;       NOTE: IF THIS IS A DATA ENTRY KEYBOARD, NUM LOCK STATE IS
1340                                  C ;             RESET BY PRESSING AND RELEASING THE NUM LOCK KEY
1341                                  C ;             IF THIS IS A NON-DATA ENTRY KEYBOARD, SHIFT LOCK STATE
1342                                  C ;             IS RESET BY PRESSING AND RELEASING EITHER SHIFT KEY
1343                                  C ;             SINCE WE DO NOT KNOW THE KEYBOARD TYPE HERE, WE WILL
1344                                  C ;             DO BOTH
1345                                  C
1346   044A  B0 4C                    C         MOV      AL,NDS_LOCK_KEY    ; INDICATE LOCK KEY IS DEPRESSED
1347   044C  E8 052A R                C         CALL     SEND_KEY_TO_3278
1348   044F  B0 CC                    C         MOV      AL,BREAK_BIT OR NDS_LOCK_KEY ; INDICATE LOCK KEY IS
1349   0451  E8 052A R                C         CALL     SEND_KEY_TO_3278   ; RELEASED
1350   0454  B0 4D                    C         MOV      AL,NDS_L_SHIFT_KEY ; INDICATE SHIFT KEY IS DEPRESSED
1351   0456  E8 052A R                C         CALL     SEND_KEY_TO_3278
1352   0459  B0 CD                    C         MOV      AL,BREAK_BIT OR NDS_L_SHIFT_KEY ; INDICATE SHIFT KEY
1353   045B  E8 052A R                C         CALL     SEND_KEY_TO_3278   ;   IS RELEASED
1354   045E  26: 80 26 0000 R F7      C         AND      KBD_STATE,NOT LOCK_STATE
```

```
1355                               C
1356     0464                      C  RESET_KBD_5:
1357                               C
1358                               C  ;***********************************************************
1359                               C  ;*                                                          *
1360                               C  ;*     SEND THE SPECIFIED KEYSTROKES TO THE 3278/3279 DISPLAY *
1361                               C  ;*     STATION                                              *
1362                               C  ;*                                                          *
1363                               C  ;***********************************************************
1364                               C
1365     0464  8B F2                C          MOV    SI,DX             ; POINT TO START OF KEYSTROKE ENCODINGS
1366                               C
1367     0466                      C  SEND_KEYS_1:
1368     0466  32 E4                C          XOR    AH,AH             ; PICK UP NEXT KEYSTROKE ENCODING
1369     0468  AC                   C          LODSB
1370                               C
1371     0469  D1 E0                C          SAL    AX,1              ; PICK UP KEYSTROKE DATA FROM TABLE
1372     046B  8B F8                C          MOV    DI,AX
1373     046D  26: 8B 9D 0492 R     C          MOV    BX,KEYSTROKE_XLAT[DI]
1374                               C
1375     0472  26: F6 06 0000 R 01  C          TEST   KBD_STATE,FORCED_ALT_STATE ; ARE WE IN THE MIDDLE OF A
1376                               C                                      ;   SEQUENCE OF ALT KEYSTROKES?
1377     0478  74 07                C          JZ     TEST_CASE         ; NO, CONTINUE
1378     047A  F6 C3 02             C          TEST   BL,BA             ; YES, IS THIS THE END OF THE SEQUENCE?
1379     047D  75 02                C          JNZ    TEST_CASE         ; YES, CONTINUE
1380     047F  B3 20                C          MOV    BL,A              ; NO, FORCE THIS KEYSTROKE TO ALT CASE
1381                               C
1382     0481                      C  TEST_CASE:
1383     0481  F6 C3 80             C          TEST   BL,U              ; IS UPPER CASE REQUIRED?
1384     0484  75 15                C          JNZ    SEND_UC           ; YES, MUST BE IN UPPER CASE MODE
1385     0486  26: F6 06 0000 R 40  C          TEST   KBD_STATE,LEFT_SHIFT ; NO, MUST BE IN LOWER CASE MODE
1386     048C  74 20                C          JZ     SEND_CASE_OK      ; SHIFT KEY IS NOT PRESSED - CONTINUE
1387     048E  B0 CD                C          MOV    AL,BREAK_BIT OR NDS_L_SHIFT_KEY ; SHIFT KEY IS PRESSED
1388     0490  E8 052A R            C          CALL   SEND_KEY_TO_3278  ; - INDICATE SHIFT KEY IS RELEASED
1389     0493  26: 80 26 0000 R BF  C          AND    KBD_STATE,NOT LEFT_SHIFT
1390     0499  EB 13                C          JMP    SHORT SEND_CASE_OK ; NOW IN LOWER CASE - CONTINUE
1391                               C
1392     049B                      C  SEND_UC:
1393     049B  26: F6 06 0000 R 40  C          TEST   KBD_STATE,LEFT_SHIFT ; MUST BE IN UPPER CASE MODE
1394     04A1  75 0B                C          JNZ    SEND_CASE_OK      ; SHIFT KEY IS PRESSED - CONTINUE
1395     04A3  B0 4D                C          MOV    AL,NDS_L_SHIFT_KEY ; SHIFT KEY IS RELEASED - INDICATE
1396     04A5  E8 052A R            C          CALL   SEND_KEY_TO_3278  ; SHIFT KEY IS PRESSED
1397     04A8  26: 80 0E 0000 R 40  C          OR     KBD_STATE,LEFT_SHIFT
1398                               C
1399     04AE                      C  SEND_CASE_OK:
1400                               C
1401     04AE  F6 C3 20             C          TEST   BL,A              ; IS ALT CASE REQUIRED?
1402     04B1  75 15                C          JNZ    SEND_ALT_MODE     ; YES, MUST BE IN ALT MODE
1403     04B3  26: F6 06 0000 R 02  C          TEST   KBD_STATE,ALT_STATE ; MUST NOT BE IN ALT MODE
1404     04B9  74 2A                C          JZ     SEND_ALT_OK       ; ALT KEY IS NOT PRESSED - CONTINUE
1405     04BB  B0 CF                C          MOV    AL,BREAK_BIT OR NDS_ALT_KEY ; ALT KEY IS PRESSED
1406     04BD  E8 052A R            C          CALL   SEND_KEY_TO_3278  ; - INDICATE ALT KEY IS RELEASED
1407     04C0  26: 80 26 0000 R FD  C          AND    KBD_STATE,NOT ALT_STATE
1408     04C6  EB 1D                C          JMP    SHORT SEND_ALT_OK ; NOW IN NON-ALT CASE - CONTINUE
1409                               C
1410     04C8                      C  SEND_ALT_MODE:
1411     04C8  0A FF                C          OR     BH,BH             ; IS THIS THE START OF A SEQUENCE OF
1412                               C                                      ;   ALT MODE KEYSTROKES?
1413     04CA  75 06                C          JNZ    SEND_ALT_1        ; NO, CONTINUE
1414     04CC  26: 80 0E 0000 R 01  C          OR     KBD_STATE,FORCED_ALT_STATE ; YES, INDICATE ALT SEQUENCE
1415                               C
1416     04D2                      C  SEND_ALT_1:
1417     04D2  26: F6 06 0000 R 02  C          TEST   KBD_STATE,ALT_STATE ; MUST BE IN ALT MODE
1418     04D8  75 0B                C          JNZ    SEND_ALT_OK       ; ALT KEY IS PRESSED - CONTINUE
1419     04DA  B0 4F                C          MOV    AL,NDS_ALT_KEY    ; ALT KEY IS RELEASED - INDICATE
1420     04DC  E8 052A R            C          CALL   SEND_KEY_TO_3278  ; ALT KEY IS PRESSED
1421     04DF  26: 80 0E 0000 R 02  C          OR     KBD_STATE,ALT_STATE
1422                               C
1423     04E5                      C  SEND_ALT_OK:
1424     04E5  F6 C3 02             C          TEST   BL,BA             ; IS BREAK/ALT INDICATED?
1425     04E8  74 06                C          JZ     SEND_B_ALT_OK     ; NO, CONTINUE
1426     04EA  26: 80 26 0000 R FE  C          AND    KBD_STATE,NOT FORCED_ALT_STATE ; YES, INDICATE END OF
1427                               C                                      ;   ALT SEQUENCE
1428                               C
1429     04F0                      C  SEND_B_ALT_OK:
1430     04F0  59                   C          POP    CX                ; RESTORE KEYSTROKE COUNTER
1431     04F1  8A C7                C          MOV    AL,BH             ; PICK UP 3278/3279 KEY NUMBER
1432     04F3  0A C0                C          OR     AL,AL             ; IS THERE A KEYSTROKE TO SEND?
1433     04F5  74 0A                C          JZ     SEND_KEYS_2       ; NO, JUST ALT STATE CHANGE
1434                               C
1435     04F7  26: 8D 1E 00BB R     C          LEA    BX,SCAN_CODE_XLAT-1 ; CONVERT KEY NUMBER TO 3278/3279
1436     04FC  26: D7               C          XLAT   SCAN_CODE_XLAT    ; SCAN CODE
1437                               C
1438     04FE  E8 052A R            C          CALL   SEND_KEY_TO_3278  ; SEND THE SCAN CODE TO THE
1439                               C                                      ;   3278/3279 DISPLAY STATION
1440                               C
1441     0501                      C  SEND_KEYS_2:
1442     0501  49                   C          DEC    CX                ; DECREMENT KEYSTROKE COUNTER
1443     0502  E3 04                C          JCXZ   SEND_KEYS_3       ; ALL KEYSTROKES HAVE BEEN PROCESSED
1444     0504  51                   C          PUSH   CX                ; SAVE KEYSTROKE COUNTER
1445     0505  E9 0466 R            C          JMP    SEND_KEYS_1       ; LOOP UNTIL ALL KEYSTROKES HAVE BEEN
1446                               C                                      ;   SENT TO THE 3278/3279 DISPLAY
1447                               C
```

```
1448   0508                        C  SEND_KEYS_3:
1449                               C
1450   0508  26: 80 26 0000 R FE   C          AND     KBD_STATE,NOT FORCED_ALT_STATE ; INDICATE END OF
1451                               C                                                 ;   SEQUENCE OF ALT KEYSTROKES
1452                               C
1453   050E  26: F6 06 0000 R 02   C          TEST    KBD_STATE,ALT_STATE ; WAS THE ALT KEYSTROKE SENT?
1454   0514  74 0B                 C          JZ      SEND_KEYS_4        ; NO, CONTINUE
1455                               C
1456   0516  B0 CF                 C          MOV     AL,BREAK_BIT OR NDS_ALT_KEY ; YES, INDICATE THAT THE
1457   0518  E8 052A R             C          CALL    SEND_KEY_TO_3278 ;  ALT KEY WAS RELEASED
1458   051B  26: 80 26 0000 R FD   C          AND     KBD_STATE,NOT ALT_STATE
1459                               C
1460   0521                        C  SEND_KEYS_4:
1461   0521  26: 80 26 0002 R F7   C          AND     LOGICAL_STATE,NOT L_KBD_DISABLED ; ENABLE THE PHYSICAL
1462                               C                                                   ;   KEYBOARD
1463                               C
1464   0527  1F                    C          POP     DS              ; RESTORE DATA SEGMENT REGISTER
1465   0528  F8                    C          CLC                     ; INDICATE KEYSTROKES WERE VALID
1466   0529  C3                    C          RET                     ; RETURN TO CALLER
1467                               C
1468                               C
1469                               C  ;*******************************************************************
1470                               C  ;*                                                                 *
1471                               C  ;*  Procedure Name: SEND_KEY_TO_3278                               *
1472                               C  ;*                                                                 *
1473                               C  ;*  Function: To send a keystroke to the 3278/3279 and wait 100 ms *
1474                               C  ;*            if there are more keystrokes to be sent              *
1475                               C  ;*                                                                 *
1476                               C  ;*  Input:                                                         *
1477                               C  ;*                                                                 *
1478                               C  ;*    AL = 3278/3279 keyboard scan code to be sent                 *
1479                               C  ;*    CX = number of keystrokes waiting to be sent                 *
1480                               C  ;*                                                                 *
1481                               C  ;*  Output: None                                                   *
1482                               C  ;*                                                                 *
1483                               C  ;*******************************************************************
1484                               C
1485   052A                        C  SEND_KEY_TO_3278 PROC NEAR
1486                               C
1487   052A  53                    C          PUSH    BX              ; SAVE REGISTERS
1488   052B  51                    C          PUSH    CX
1489   052C  52                    C          PUSH    DX
1490                               C
1491   052D                        C  SEND_KEY_TO_3278_1:
1492   052D  26: 8B 1E 0020 R      C          MOV     BX,BUFFER_3278_HEAD ; WAIT UNTIL ALL STACKED KEYSTROKES
1493   0532  26: 3B 1E 0022 R      C          CMP     BX,BUFFER_3278_TAIL ;   HAVE BEEN SENT TO THE DISPLAY
1494   0537  75 F4                 C          JNE     SEND_KEY_TO_3278_1
1495                               C
1496   0539  50                    C          PUSH    AX              ; SAVE SCAN CODE TO BE SENT
1497   053A  BA 03E2               C          MOV     DX,KB_CTL       ; WAIT FOR THE 3278/3279 OUTPUT PORT
1498   053D                        C  SEND_KEY_TO_3278_2:             ;   TO BECOME AVAILABLE
1499   053D  EC                    C          IN      AL,DX
1500   053E  A8 02                 C          TEST    AL,02H
1501   0540  74 FB                 C          JZ      SEND_KEY_TO_3278_2
1502   0542  58                    C          POP     AX              ; RESTORE SCAN CODE
1503                               C
1504   0543  BA 03E1               C          MOV     DX,NDS_KB_OUT   ; SEND THE KEYSTROKE TO THE DISPLAY
1505   0546  EE                    C          OUT     DX,AL
1506                               C
1507   0547  83 F9 01              C          CMP     CX,1            ; IS THIS THE LAST KEYSTROKE?
1508   054A  74 05                 C          JE      SEND_KEY_TO_3278_3 ; YES, DO NOT DELAY
1509   054C  B9 681A               C          MOV     CX,DELAY_100_MS ; WAIT FOR 100 MILLISECONDS
1510   054F  E2 FE                 C          LOOP    $
1511                               C
1512   0551                        C  SEND_KEY_TO_3278_3:
1513                               C
1514   0551  5A                    C          POP     DX              ; RESTORE REGISTERS
1515   0552  59                    C          POP     CX
1516   0553  5B                    C          POP     BX
1517                               C
1518   0554  C3                    C          RET                     ; RETURN TO CALLER
1519                               C
1520   0555                        C  SEND_KEY_TO_3278 ENDP
1521                               C
1522                               C          ASSUME  DS:BIOSDATA,ES:NOTHING
1523                               C
1524   0555                        C  SEND_ENCODED_KEYSTROKES_TO_3278 ENDP
1525                               C
1526                               C
1527                               C  ;*******************************************************************
1528                               C  ;*                                                                 *
1529                               C  ;*  Procedure Name: MOD_XLAT_IN                                    *
1530                               C  ;*                                                                 *
1531                               C  ;*  Function: Modify the inbound keyboard translation table        *
1532                               C  ;*                                                                 *
1533                               C  ;*  Input:                                                         *
1534                               C  ;*                                                                 *
1535                               C  ;*    CH = 3278/3279 relative key number                           *
1536                               C  ;*    CL = 3278/3279 keyboard case                                 *
1537                               C  ;*    DH = Personal Computer keyboard scan code or BIOS function code *
1538                               C  ;*    DL = Personal Computer keyboard case                         *
1539                               C  ;*                                                                 *
1540                               C  ;*  Output:                                                        *
```

```
1541            C  ;*      CF = 0 if parameter values are acceptable               *
1542            C  ;*         = 1 if parameter values are not acceptable           *
1543            C  ;*                                                               *
1544            C  ;*      AL = 3 (invalid parameter specified) if parameter values are *
1545            C  ;*              not acceptable                                   *
1546            C  ;*                                                               *
1547            C  ;*      BX on stack = old table entry                           *
1548            C  ;*                                                               *
1549            C  ;****************************************************************
1550            C
1551   0555     C  MOD_XLAT_IN PROC NEAR
1552            C
1553   0555 80 FD 01    C          CMP     CH,1            ; VERIFY USER PARAMETERS
1554   0558 72 19       C          JB      MOD_XLAT_IN_1   ; 3278/3279 KEY NUMBER MUST BE BETWEEN
1555   055A 80 FD 59    C          CMP     CH,89           ;   1 AND 89
1556   055D 77 14       C          JA      MOD_XLAT_IN_1
1557   055F 80 F9 01    C          CMP     CL,1            ; 3278/3279 CASE MUST BE BETWEEN 1 AND 5
1558   0562 72 0F       C          JB      MOD_XLAT_IN_1
1559   0564 80 F9 05    C          CMP     CL,5
1560   0567 77 0A       C          JA      MOD_XLAT_IN_1
1561   0569 F6 C6 80    C          TEST    DH,80H          ; IS THIS A SPECIAL FUNCTION CODE?
1562   056C 75 13       C          JNZ     MOD_XLAT_IN_2   ; YES, IT IS OK
1563   056E 80 FE 53    C          CMP     DH,83           ; PERSONAL COMPUTER SCAN CODE MUST BE
1564   0571 76 0E       C          JNA     MOD_XLAT_IN_2   ;   0 OR A KEY NUMBER BETWEEN 1 AND 83
1565            C
1566   0573     C  MOD_XLAT_IN_1:
1567   0573 B0 09       C          MOV     AL,RC_INVALID_PARM ; INDICATE INVALID PARAMETER
1568   0575 F9          C          STC                     ;   SPECIFIED
1569   0576 C3          C          RET
1570            C
1571   0577     C  MOD_XLAT_IN_TABLE LABEL WORD          ; KEYBOARD TRANSLATION TABLE SECTIONS
1572   0577 0118 R      C          DW      BIOSDATA:LOWER_CASE_XLAT
1573   0579 01CA R      C          DW      BIOSDATA:UPPER_CASE_XLAT
1574   057B 027C R      C          DW      BIOSDATA:CTL_CASE_XLAT
1575   057D 032E R      C          DW      BIOSDATA:ALT_CASE_XLAT
1576   057F 03E0 R      C          DW      BIOSDATA:ALT_KEY_XLAT
1577            C
1578   0581     C  MOD_XLAT_IN_2:
1579   0581 8A C1       C          MOV     AL,CL           ; FIND ADDRESS OF APPROPRIATE SECTION
1580   0583 D0 E0       C          SAL     AL,1            ;   OF THE KEYBOARD TRANSLATION TABLE
1581   0585 98          C          CBW
1582   0586 8B F0       C          MOV     SI,AX
1583   0588 2E: 8B 9C 0575 R  C    MOV     BX,MOD_XLAT_IN_TABLE[SI-2]
1584            C
1585   058D 8A C5       C          MOV     AL,CH           ; FIND INDEX INTO TRANSLATION TABLE
1586   058F D0 E0       C          SAL     AL,1            ;   SECTION
1587   0591 8B F8       C          MOV     DI,AX
1588            C
1589   0593 87 51 FE    C          XCHG    WORD PTR [BX+DI-2],DX ; PUT NEW ENTRY INTO TABLE
1590            C
1591   0596 55          C          PUSH    BP              ; PUT OLD TABLE ENTRY INTO THE STACK
1592   0597 8B EC       C          MOV     BP,SP
1593   0599 89 56 10    C          MOV     [BP+16],DX
1594   059C 5D          C          POP     BP
1595            C
1596   059D F8          C          CLC                     ; INDICATE SUCCESSFUL COMPLETION
1597   059E C3          C          RET                     ; RETURN TO CALLER
1598            C
1599   059F     C  MOD_XLAT_IN ENDP
1600            C
1601            C
1602            C  ;****************************************************************
1603            C  ;*
1604            C  ;* Procedure Name: MOD_XLAT_OUT
1605            C  ;*
1606            C  ;* Function: Modify the outbound keyboard translation table
1607            C  ;*
1608            C  ;* Input:
1609            C  ;*
1610            C  ;*      CH = encoded keystroke value
1611            C  ;*      DH = 3278/3279 relative key number
1612            C  ;*      DL = 3278/3279 keyboard case
1613            C  ;*
1614            C  ;* Output:
1615            C  ;*
1616            C  ;*      CF = 0 if parameter values are acceptable
1617            C  ;*         = 1 if parameter values are not acceptable
1618            C  ;*
1619            C  ;*      AL = 3 (invalid parameter specified) if parameter values are
1620            C  ;*              not acceptable
1621            C  ;*
1622            C  ;*      BX on stack = old table entry
1623            C  ;*
1624            C  ;****************************************************************
1625            C
1626   059F     C  MOD_XLAT_OUT PROC NEAR
1627            C
1628   059F 0A F6       C          OR      DH,DH           ; 0 INDICATES INVALID KEY STROKE -
1629   05A1 74 0E       C          JZ      MOD_XLAT_OUT_2  ;   THIS IS ACCEPTABLE
1630   05A3 80 FE 01    C          CMP     DH,1            ; VERIFY USER PARAMETERS
1631   05A6 72 05       C          JB      MOD_XLAT_OUT_1  ; 3278/3279 KEY NUMBER MUST BE BETWEEN
1632   05A8 80 FE 59    C          CMP     DH,89           ;   1 AND 89
```

```
1635    05AB    76 04                C           JNA       MOD_XLAT_OUT_2
1636                                 C
1637    05AD                         C   MOD_XLAT_OUT_1:
1638    05AD    B0 09                C           MOV       AL,RC_INVALID_PARM ; INDICATE INVALID PARAMETER
1639    05AF    F9                   C           STC                          ;   SPECIFIED
1640    05B0    C3                   C           RET                          ;
1641                                 C
1642    05B1                         C   MOD_XLAT_OUT_2:
1643    05B1    8A C5                C           MOV       AL,CH              ; FIND INDEX INTO TRANSLATION TABLE
1644    05B3    32 E4                C           XOR       AH,AH
1645    05B5    D1 E0                C           SAL       AX,1
1646    05B7    8B F8                C           MOV       DI,AX
1647                                 C
1648    05B9    87 95 0492 R         C           XCHG      KEYSTROKE_XLAT[DI],DX ; PUT NEW ENTRY INTO TABLE
1649                                 C
1650    05BD    55                   C           PUSH      BP                 ; PUT OLD TABLE ENTRY INTO THE STACK
1651    05BE    8B EC                C           MOV       BP,SP
1652    05C0    89 56 10             C           MOV       [BP+16],DX
1653    05C3    5D                   C           POP       BP
1654                                 C
1655    05C4    F8                   C           CLC                          ; INDICATE SUCCESSFUL COMPLETION
1656    05C5    C3                   C           RET                          ; RETURN TO CALLER
1657                                 C
1658    05C6                         C   MOD_XLAT_OUT ENDP
1659                                 C
1660                                 C
1661                                 C
1662                                 C   ;*******************************************************************
1663                                 C   ;*
1664                                 C   ;*  Procedure Name: QUERY_KEYBOARD_ID
1665                                 C   ;*
1666                                 C   ;*  Function: To return the identifier of the current keyboard
1667                                 C   ;*            translation table
1668                                 C   ;*
1669                                 C   ;*  Input: None
1670                                 C   ;*
1671                                 C   ;*  Output:
1672                                 C   ;*
1673                                 C   ;*     BX = keyboard translation table identifier
1674                                 C   ;*
1675                                 C   ;*******************************************************************
1676                                 C
1677    05C6                         C   QUERY_KEYBOARD_ID PROC NEAR
1678                                 C
1679    05C6    55                   C           PUSH      BP                 ; SAVE REGISTER
1680                                 C
1681    05C7    8B 1E 0116 R         C           MOV       BX,XLAT_TABLE_ID   ; PUT THE TRANSLATION TABLE IDENTIFIER
1682    05CB    8B EC                C           MOV       BP,SP              ;   INTO THE STACK SO IT WILL
1683    05CD    89 5E 10             C           MOV       [BP+16],BX         ;   BE RESTORED INTO THE BX REGISTER
1684                                 C
1685    05D0    5D                   C           POP       BP                 ; RESTORE REGISTER
1686                                 C
1687    05D1    C3                   C           RET                          ; RETURN TO CALLER
1688                                 C
1689    05D2                         C   QUERY_KEYBOARD_ID ENDP
1690                                 C
1691
1692    05D2                                 HDSPBIOS ENDS
1693
1694                                         END
```

APPENDIX C

The IBM Personal Computer MACRO Assembler
    3278/3279 Attachment Feature Bus Int Handler

```
4
5
6                    ; **************** Start of Specifications ****************
7                    ;
8                    ; Module Name: HDSPBFBA
9                    ;
10                   ; Descriptive Name: 3278/3279 Attachment feature bus interrupt handler
11                   ;
12                   ; Copyright: IBM Corp 1982
13                   ;
14                   ; Status: Version 1.00
15                   ;
16                   ; Function: To process all Start Operation commands from the 3274 and
17                   ;           all 3278/3279 Attachment related function requests from
18                   ;           an application program
19                   ;
20                   ; Notes:
21                   ;
22                   ;   Dependencies: None
23                   ;
24                   ;   Restrictions: None
25                   ;
26                   ; Module Type: Program
27                   ;
28                   ;   Processor: Assembler
29                   ;
```

```
; Entry Point: PROC_START_OP
;
;   Purpose: To process a Start Operation command from the 3274
;
;   Linkage: CALL from NDSPBIOS
;
;   Input Parameters: None
;
; Entry Point: NDSP_API
;
;   Purpose: To process a 3278/3279 Attachment software interrupt
;
;   Linkage: INT 50H
;
;   Input Parameters:
;
;       AH = 00 - Set display mode
;           AL = 0 - Set Host Computer mode
;           AL = 1 - Set Personal Computer mode
;           AL = 2 - Display Host Computer screen image
;           AL = 3 - Display Personal Computer screen image
;
;       AH = 01 - Send keystrokes to 3278/3279
;           DS:DX = address of encoded keystrokes
;           CX = number of encoded keystrokes
;
;       AH = 02 - Set 3278/3279 Attachment interrupt vector
;           AL = 0 - Data Transfer
;           AL = 1 - Screen Capture
;           AL = 2 - Wrap Test
;           DS:DX = address of interrupt handler
;
;       AH = 03 - Reset 3278/3279 Attachment interrupt vector
;           AL = 0 - Data Transfer
;           AL = 1 - Screen Capture
;           AL = 2 - Wrap Test
;
;       AH = 04 - Set input buffer address
;           AL = 0 - Data Transfer
;           AL = 1 - Screen Capture
;           AL = 2 - Wrap Test
;           DS:DX = address of input buffer
;           CX = length of input buffer
;
;       AH = 05 - Send message to Host Computer
;           AL = 0 - Structured Field
;           AL = 1 - Set Screen Capture Options
;           AL = 2 - Wrap Test Message
;           DS:DX = address of message
;           CX = length of message
;
;       AH = 06 - Cancel pending message
;           AL = 0 - Structured Field
;           AL = 1 - Set Screen Capture Options
;           AL = 2 - Wrap Test Message
;
;       AH = 07 - Modify inbound keystroke translation table
;           CH = 3278/3279 relative key number
;           CL = 3278/3279 keyboard case
;           DH = Personal Computer keyboard scan code or BIOS function
;                code
;           DL = Personal Computer keyboard case
;
;       AH = 08 - Modify outbound keystroke translation table
;           CH = encoded keystroke value
;           DH = 3278/3279 relative key number
;           DL = 3278/3279 keyboard case
;
;       AH = 09 - Query keyboard ID
;
; Exit Normal:
;
;   Purpose: To return to the interrupted program
;
;   Linkage: IRET
;
;   Output: None
;
; Exit Error: None
;
; External References:
;
;   Procedure Invoked: PROC_INTERRUPTS
;
;       Purpose: To process all other pending hardware interrupt
;
;       Linkage: CALL
;
;       Input Parameters: None
;
;   Procedure Invoked: SEND_ENCODED_KEYSTROKES_TO_3278
;
;       Purpose: To send a series of encoded keystrokes to the 3278/3279
```

```
123                   ;
124                   ;     Linkage: CALL
125                   ;
126                   ;     Input Parameters:
127                   ;
128                   ;        BX:DX = address of encoded keystrokes
129                   ;        CX = number of encoded keystrokes
130                   ;
131                   ;     Output:
132                   ;
133                   ;        CF = 0 if keystrokes were all valid
134                   ;             1 if any keystroke was invalid for the current keyboard
135                   ;        AL = 3 if any keystroke was invalid for the current keyboard
136                   ;
137                   ;  Procedure Invoked: MOD_XLAT_IN
138                   ;
139                   ;     Purpose: To modify the inbound keyboard translation table
140                   ;
141                   ;     Linkage: CALL
142                   ;
143                   ;     Input Parameters:
144                   ;
145                   ;        CH = 3278/3279 relative key number
146                   ;        CL = 3278/3279 keyboard case
147                   ;        DH = Personal Computer keyboard scan code or BIOS function code
148                   ;        DL = Personal Computer keyboard case
149                   ;
150                   ;     Output:
151                   ;
152                   ;        CF = 0 if parameters were valid
153                   ;             1 if parameters were invalid
154                   ;        AL = 9 if parameters were invalid
155                   ;
156                   ;  Procedure Invoked: MOD_XLAT_OUT
157                   ;
158                   ;     Purpose: To modify the outbound keyboard translation table
159                   ;
160                   ;     Linkage: CALL
161                   ;
162                   ;     Input Parameters:
163                   ;
164                   ;        CH = encoded keystroke value
165                   ;        DH = 3278/3279 relative key number
166                   ;        DL = 3278/3279 keyboard case
167                   ;
168                   ;     Output:
169                   ;
170                   ;        CF = 0 if parameters were valid
171                   ;             1 if parameters were invalid
172                   ;        AL = 9 if parameters were invalid
173                   ;
174                   ;  Procedure Invoked: QUERY_KEYBOARD_ID
175                   ;
176                   ;     Purpose: To obtain the keyboard translation table identifier
177                   ;
178                   ;     Linkage: CALL
179                   ;
180                   ;     Input Parameters: None
181                   ;
182                   ;     Output: keyboard identifier on stack in place of BX
183                   ;
184                   ;  Control Blocks:
185                   ;
186                   ;     NDSPDCLS - 3278/3279 Attachment option interfaces
187                   ;     NDSPUSER - 3278/3279 Attachment BIOS extension interfaces
188                   ;     NDSPBCOM - 3278/3279 Attachment BIOS common data area
189                   ;
190                   ; Messages Issued: None
191                   ;
192                   ; Change Activity: None
193                   ;
194                   ; ******************* End of Specifications *********************
195
196                           SUBTTL  WORK AREAS
197
198                   ;        INCLUDE NDSPDCLS.ASM
199                   ;        INCLUDE NDSPUSER.ASM
200                            .LIST
201
202                   BIOSDATA GROUP BIOSDATA_COMMON,BIOSDATA_FBA
203
204                 C         INCLUDE NDSPBCOM.ASM
205       0000      C BIOSDATA_COMMON SEGMENT COMMON 'NDSPBICS'
206                 C
207                 C ;****************************************************************
208                 C ;*
209                 C ;*    NDSPBIOS COMMON WORK AREAS
210                 C ;*
211                 C ;****************************************************************
212                 C
213       0000 00   C TERM_MODE    DB  0         ; CURRENT MODE OF TERMINAL
214       = 0000    C T_PC         EQU 00H       ;   PERSONAL COMPUTER MODE
215       = 0080    C T_HOST       EQU 80H       ;   HOST PROCESSOR MODE
216                 C
```

```
217  0001                          C  BIOSDATA_COMMON ENDS
218                                C
219
220
221  0000                          BIOSDATA_FBA SEGMENT PUBLIC 'NDSPBIOS'
222
223                                ;****************************************************************
224                                ;*                                                              *
225                                ;*       NDSPBIOS FEATURE BUS ADAPTER WORK AREAS                *
226                                ;*                                                              *
227                                ;****************************************************************
228
229  = 681A                         DELAY_100_MS  EQU    26650     ; LOOP CONSTANT NEEDED TO DELAY
230                                                                ; PROCESSING FOR 100 MILLISECONDS
231
232                                      PUBLIC  FBA_STATE
233  0000 00                       FBA_STATE            DB   0     ; FEATURE BUS ADAPTER STATE
234  = 0080                         F_READ_PENDING      EQU 80H    ;   READ REQUEST PENDING
235  = 0040                         F_READ_IN_PROGRESS  EQU 40H    ;   READ SEQUENCE IN PROGRESS
236  = 0020                         F_WRITE_IN_PROGRESS EQU 20H    ;   WRITE SEQUENCE IN PROGRESS
237  = 0010                         F_QUERY_IN_PROGRESS EQU 10H    ;   QUERY KEYBOARD STATE IN PROGRESS
238  = 0008                         F_DEFERRED_CANCEL   EQU 08H    ;   CANCEL MESSAGE WAS DEFERRED
239
240  = 0002                         F_ENABLED           EQU 02H    ;   FEATURE BUS ADAPTER IS ENABLED
241  = 0001                         F_FBA_NOT_OP        EQU 01H    ;   FEATURE BUS ADAPTER NOT OPERATIONAL
242
243  0001 00                       FBA_PENDING_OP       DB   0     ; FEATURE BUS ADAPTER PENDING OPERATIONS
244  = 0080                         F_READ              EQU 80H    ;   READ REQUEST RECEIVED
245  = 0040                         F_POR               EQU 40H    ;   POWER ON RESET RECEIVED
246  = 0020                         F_EXECUTE           EQU 20H    ;   EXECUTE RECEIVED
247  = 0010                         F_ABORT_E           EQU 10H    ;   ABORT TRANSMISSION RECEIVED
248  = 0008                         F_ABORT_V           EQU 08H    ;   ABORT TO LAST VERIFY RECEIVED
249  = 0004                         F_ERROR             EQU 04H    ;   ERROR RECEIVED
250  = 0002                         F_CANCEL            EQU 02H    ;   USER SPECIFIED CANCEL MESSAGE
251
252  0002 00 00 00 00              FBA_MESSAGE_START    DD   0     ; ADDRESS OF MESSAGE TO BE SENT
253  0006 0000                     FBA_MESSAGE_SIZE     DW   0     ; LENGTH OF MESSAGE TO BE SENT
254  0008 00 00 00 00              FBA_MESSAGE          DD   0     ; ADDRESS OF NEXT BYTE TO BE SENT
255  000C 0000                     FBA_MESSAGE_LENGTH   DW   0     ; NUMBER OF BYTES REMAINING TO BE SENT
256  000E 00                       FBA_MESSAGE_TYPE     DB   0     ; TYPE OF MESSAGE TO BE SENT
257
258                                FBA_VECTOR           STRUC      ; INTERRUPT VECTOR FORMAT
259  0000 00 00 00 00               INTERRUPT_VECTOR    DD   0     ; ADDRESS OF INTERRUPT HANDLER
260  0004 00 00 00 00               BUFFER_ADDRESS      DD   0     ; ADDRESS OF INPUT BUFFER
261  0008 0000                      BUFFER_LENGTH       DW   0     ; LENGTH OF INPUT BUFFER
262  000A 0000                      BUFFER_COUNT        DW   0     ; NUMBER OF BYTES IN INPUT BUFFER
263  000C 0000                      VERIFY_COUNT        DW   0     ; NUMBER OF BYTES VERIFIED IN BUFFER
264  000E 00                        MESSAGE_TYPE        DB   0     ; MESSAGE TYPE
265  000F 00                        MESSAGE_FLAGS       DB   0     ; MESSAGE FLAGS
266                                 ;MF_DATA_TRUNC      EQU 80H    ;   DATA TRUNCATED
267                                 ;MF_VERIFY_TRUNC    EQU 40H    ;   VERIFIED DATA TRUNCATED
268                                 ;MF_IN_USE          EQU 20H    ;   BUFFER IN USE
269  0010 00                        STATUS_FLAGS        DB   0     ; STATUS FLAGS
270                                 ;SF_PROCESSING      EQU 80H    ;   USER INTERRUPT HANDLER IS PROCESSING
271                                                                ;     A FEATURE BUS INTERRUPT
272                                 ;SF_OVERRUN         EQU 40H    ;   DATA RECEIVED WHILE BUFFER IN USE
273  0011                          FBA_VECTOR           ENDS
274
275                                                                ; MESSAGE FLAGS WITHIN FBA_VECTOR
276  = 0080                        MF_DATA_TRUNC        EQU 80H    ;   DATA TRUNCATED
277  = 0040                        MF_VERIFY_TRUNC      EQU 40H    ;   VERIFIED DATA TRUNCATED
278  = 0020                        MF_IN_USE            EQU 20H    ;   BUFFER IN USE
279                                                                ; STATUS FLAGS WITHIN FBA_VECTOR
280  = 0080                        SF_PROCESSING        EQU 80H    ;   USER INTERRUPT HANDLER IS PROCESSING
281                                                                ;     A FEATURE BUS INTERRUPT
282  = 0040                        SF_OVERRUN           EQU 40H    ;   DATA RECEIVED WHILE BUFFER IN USE
283
284  000F 00 00 00 00              DATA_XFER_VECTOR     FBA_VECTOR <,,,,,HT_SF_TO_HOST>
285  0013 00 00 00 00
286  0017 0000
287  0019 0000
288  001B 0000
289  001D 02
290  001E 00
291  001F 00
292
293  0020 00 00 00 00              SCREEN_CAPTURE_VECTOR FBA_VECTOR <,,,,,HT_SET_FC_OPTIONS>
294  0024 00 00 00 00
295  0028 0000
296  002A 0000
297  002C 0000
298  002E 04
299  002F 00
300  0030 00
301
302  0031 00 00 00 00              WRAP_TEST_VECTOR     FBA_VECTOR <,,,,,HT_WRAP_TO_3274>
303  0035 00 00 00 00
304  0039 0000
305  003B 0000
306  003D 0000
307  003F 00
308  0040 00
309  0041 00
310
```

```
311  0042  00 00 00 00        QUERY_STATE_VECTOR   FBA_VECTOR <,,,,,HT_QUERY_KBD_STATE>
312  0046  00 00 00 00
313  004A  0000
314  004C  0000
315  004E  0000
316  0050  06
317  0051  00
318  0052  00
319
320
321  0053  0000               FBA_SEND_VECTOR      DW  0     ; INTERRUPT VECTOR FOR MESSAGE BEING
322                                                          ;   SENT TO THE 3274
323  0055  0000               FBA_RECEIVE_VECTOR   DW  0     ; INTERRUPT VECTOR FOR MESSAGE BEING
324                                                          ;   RECEIVED FROM THE 3274
325
326  0057  00 00 00 00        SC_SECTION_LENGTH    DD  0     ; ADDRESS OF LENGTH FIELD IN CURRENT
327                                                          ;   SCREEN CAPTURE BUFFER
328
329  005B  00                 QUERY_KBD_STATE_MSG  DB  0     ; DUMMY MESSAGE FOR QUERY KEYBOARD STAT
330  005C  00                 KBD_STATE            DB  0     ; CURRENT KEYBOARD STATE
331  005D  00                 QUERY_RC             DB  0     ; RETURN CODE FROM QUERY KEYBOARD STATE
332
333  005E                     BIOSDATA_FBA ENDS
334
335                           SUBTTL  Process a start operation command from the 3274 control
336
337
338                      ;********************************************************************
339                      ;*
340                      ;*  Procedure Name: PROC_START_OP
341                      ;*
342                      ;*  Function: To process a Start Operation command from the 3274
343                      ;*
344                      ;*  Input: Start Operation modifier from 3278/3279 Attachment Option
345                      ;*
346                      ;*  Output: None
347                      ;*
348                      ;********************************************************************
349
350  0000                     NDSPBIOS SEGMENT PUBLIC 'NDSPBIOS'
351
352                                  PUBLIC   PROC_START_OP
353                                  PUBLIC   NDSP_API
354                                  EXTRN    PROC_INTERRUPTS:NEAR
355                                  EXTRN    SEND_ENCODED_KEYSTROKES_TO_3278:NEAR
356                                  EXTRN    MOD_XLAT_IN:NEAR
357                                  EXTRN    MOD_XLAT_OUT:NEAR
358                                  EXTRN    QUERY_KEYBOARD_ID:NEAR
359
360                                  ASSUME   CS:NDSPBIOS,DS:BIOSDATA
361
362  0000                     NDSP_SOP PROC NEAR
363
364                    C       INCLUDE NDSPSOP1.ASM
365                    C
366                    C  ;********************************************************************
367                    C  ;*
368                    C  ;*    READ THE START OPERATION MODIFIER AND PROCESS IT
369                    C  ;*
370                    C  ;********************************************************************
371                    C
372  0000              C  START_OP_JMP_TABLE LABEL WORD
373  0000  0025 R      C       DW      POR_RECEIVED
374  0002  0081 R      C       DW      READ_RECEIVED
375  0004  00AD R      C       DW      WRITE_RECEIVED
376  0006  0189 R      C       DW      EXECUTE_RECEIVED
377  0008  020C R      C       DW      ABORT_E_RECEIVED
378  000A  0235 R      C       DW      ABORT_V_RECEIVED
379  000C  0266 R      C       DW      ERROR_RECEIVED
380  000E  027B R      C       DW      VERIFY_RECEIVED
381  = 0010            C  START_OP_JMP_TABLE_LENGTH EQU $-START_OP_JMP_TABLE
382                    C
383  0010              C  PROC_START_OP:
384  0010  BA 03E5     C       MOV     DX,START_OP_MOD ; READ THE START OPERATION MODIFIER
385  0013  EC          C       IN      AL,DX
386                    C
387  0014  FE C8       C       DEC     AL
388  0016  D0 E0       C       SAL     AL,1            ; ROUTE CONTROL BASED ON THE START
389  0018  98          C       CBW                     ;   OPERATION MODIFIER
390  0019  3C 10       C       CMP     AL,START_OP_JMP_TABLE_LENGTH
391  001B  77 07       C       JA      INVALID_SOM
392                    C
393  001D  8B F0       C       MOV     SI,AX
394  001F  2E: FF A4 0000 R  C       JMP     START_OP_JMP_TABLE[SI]
395                    C
396  0024              C  INVALID_SOM:
397  0024  C3          C       RET                     ; INVALID START OPERATION MODIFIER -
398                    C                               ;   IGNORE IT - THE 3274 WILL TIME
399                    C                               ;   OUT AND TAKE THE 3278/3279 OFFLINE
400                    C
401                    C
402                    C
```

```
403                              C  ;*******************************************************
404                              C  ;*
405                              C  ;*  Procedure Name: POR_RECEIVED
406                              C  ;*
407                              C  ;*  Function: To process a Start Operation command from the 3274
408                              C  ;*            which indicates Power On Reset
409                              C  ;*
410                              C  ;*  Input: None
411                              C  ;*
412                              C  ;*  Output:
413                              C  ;*
414                              C  ;*     All active interrupt handlers are called with a reason code
415                              C  ;*     indicating Power On Reset
416                              C  ;*
417                              C  ;*******************************************************
418                              C
419      0025                    C  POR_RECEIVED:
420                              C          ASSUME   ES:FBA_BUFFER    ; ESTABLISH ADDRESSABILITY TO THE
421      0025  BA ---- R         C          MOV      DX,FBA_BUFFER    ;   FEATURE BUS ADAPTER BUFFER
422      0028  8E C2             C          MOV      ES,DX
423                              C
424      002A  B8 00FC           C          MOV      AX,SIZE_FBA_BUFFER-4 ; PUT LENGTH OF DATA AREA INTO
425      002D  86 E0             C          XCHG     AH,AL            ;   BUFFER HEADER
426      002F  26: A3 0000 R     C          MOV      HDR_LENGTH,AX
427      0033  26: C6 06 0002 R 01 C        MOV      HDR_TYPE,HT_ID   ; INDICATE THIS IS A PC ATTACHMENT
428                              C
429      0039  E8 02A3 R         C          CALL     SEND_OP_COMPLETE ; ACKNOWLEDGE THE POWER ON RESET
430                              C
431      003C  F6 06 0000 R 80   C          TEST     FBA_STATE,F_READ_PENDING ; IS THERE A READ REQUEST
432                              C                                    ;   PENDING?
433      0041  74 0A             C          JZ       POR_1            ; NO, CONTINUE
434                              C
435      0043  80 0E 0001 R 40   C          OR       FBA_PENDING_OP,F_POR ; YES, INDICATE POR RECEIVED
436      0048  80 26 0000 R BF   C          AND      FBA_STATE,NOT F_READ_IN_PROGRESS ; READ SEQUENCE IS NOW
437                              C                                    ;   CANCELLED
438                              C
439      004D                    C  POR_1:
440      004D  80 26 0000 R DF   C          AND      FBA_STATE,NOT F_WRITE_IN_PROGRESS ; WRITE SEQUENCE IS
441                              C                                    ;   CANCELLED
442                              C
443      0052  E8 0000 E         C          CALL     PROC_INTERRUPTS ; PROCESS OTHER PENDING INTERRUPTS
444      0055  FB                C          STI
445                              C
446      0056  B4 02             C          MOV      AH,REASON_POWER_ON_RESET ; INDICATE POR RECEIVED
447                              C
448      0058  8D 36 000F R      C          LEA      SI,DATA_XFER_VECTOR ; INFORM ALL INTERRUPT
449      005C  E8 02C2 R         C          CALL     RESET_BUFFER_COUNTS ; HANDLERS THAT A POWER ON RESET
450      005F  E8 02AD R         C          CALL     INFORM_APPL      ;   HAS OCCURRED AND RESET ALL INPUT
451                              C                                    ;   BUFFER COUNTERS
452      0062  8D 36 0020 R      C          LEA      SI,SCREEN_CAPTURE_VECTOR
453      0066  E8 02C2 R         C          CALL     RESET_BUFFER_COUNTS
454      0069  E8 02AD R         C          CALL     INFORM_APPL
455                              C
456      006C  8D 36 0031 R      C          LEA      SI,WRAP_TEST_VECTOR
457      0070  E8 02C2 R         C          CALL     RESET_BUFFER_COUNTS
458      0073  E8 02AD R         C          CALL     INFORM_APPL
459                              C
460      0076  8D 36 0042 R      C          LEA      SI,QUERY_STATE_VECTOR
461      007A  E8 02C2 R         C          CALL     RESET_BUFFER_COUNTS
462      007D  E8 02AD R         C          CALL     INFORM_APPL
463                              C
464      0080  C3                C          RET                       ; PROCESS OTHER PENDING INTERRUPTS
465                              C
466                              C
467                              C
468                              C  ;*******************************************************
469                              C  ;*
470                              C  ;*  Procedure Name: READ_RECEIVED
471                              C  ;*
472                              C  ;*  Function: To process a Start Operation command from the 3274
473                              C  ;*            which indicates Read
474                              C  ;*
475                              C  ;*  Input:
476                              C  ;*
477                              C  ;*     F_READ_PENDING = 1 if a read request is pending
478                              C  ;*
479                              C  ;*  Output:
480                              C  ;*
481                              C  ;*     F_READ = 1
482                              C  ;*     F_READ_IN_PROGRESS = 1
483                              C  ;*
484                              C  ;*******************************************************
485                              C
486      0081                    C  READ_RECEIVED:
487      0081  F6 06 0000 R 80   C          TEST     FBA_STATE,F_READ_PENDING ; IS THERE A READ PENDING?
488      0086  74 0B             C          JZ       READ_1           ; NO, SEND A CLEARED BUFFER TO THE 3274
489                              C                                    ;   TO CANCEL THE READ REQUEST
490                              C
491      0088  80 0E 0001 R 80   C          OR       FBA_PENDING_OP,F_READ ; INDICATE READ RECEIVED
492      008D  80 0E 0000 R 40   C          OR       FBA_STATE,F_READ_IN_PROGRESS ; INDICATE READ SEQUENCE
493                              C                                    ;   IS NOW IN PROGRESS
494      0092  C3                C          RET                       ; PROCESS NEXT PENDING INTERRUPT
495                              C
```

```
496   0093                           C  READ_1:
497   0093  BA ---- R                C        MOV    DX,FBA_BUFFER       ; CLEAR THE FBA BUFFER
498   0096  8E C2                    C        MOV    ES,DX
499   0098  BF 0000                  C        MOV    DI,0
500   009B  B9 0080                  C        MOV    CX,SIZE_FBA_BUFFER/2
501   009E  33 C0                    C        XOR    AX,AX
502   00A0  FC                       C        CLD
503   00A1  F3/ AB                   C        REP    STOSW
504                                  C
505   00A3  E8 029A R                C        CALL   WAIT_FOR_POLL_ACK   ; WAIT FOR THE PREVIOUS POLL REQUEST
506                                  C                                  ;   TO BE ACKNOWLEDGED
507   00A6  BA 03E4                  C        MOV    DX,COMMAND_PORT    ; TELL THE 3274 TO READ THE CLEARED
508   00A9  B0 02                    C        MOV    AL,READ_COMPLETE   ;   BUFFER
509   00AB  EE                       C        OUT    DX,AL
510                                  C
511   00AC  C3                       C        RET                       ; PROCESS OTHER PENDING INTERRUPTS
512                                  C
513                                  C
514                                  C
515                                  C  ;********************************************************************
516                                  C  ;*
517                                  C  ;* Procedure Name: WRITE_RECEIVED
518                                  C  ;*
519                                  C  ;* Function: To process a Start Operation command from the 3274
520                                  C  ;*           which indicates Write
521                                  C  ;*
522                                  C  ;* Input:
523                                  C  ;*
524                                  C  ;*    FBA_BUFFER contains message from the 3274
525                                  C  ;*
526                                  C  ;* Output:
527                                  C  ;*
528                                  C  ;*    F_WRITE_IN_PROGRESS = 1
529                                  C  ;*    FBA_RECEIVE_VECTOR = address of interrupt vector
530                                  C  ;*    data saved in input buffer for the specified data type
531                                  C  ;*
532                                  C  ;********************************************************************
533                                  C
534   00AD                           C  WRITE_RECEIVED:
535                                  C        ASSUME ES:FBA_BUFFER       ; ESTABLISH ADDRESSABLITY TO THE
536   00AD  BA ---- R                C        MOV    DX,FBA_BUFFER       ;   FEATURE BUS ADAPTER BUFFER
537   00B0  8E C2                    C        MOV    ES,DX
538                                  C
539   00B2  80 0E 0000 R 20          C        OR     FBA_STATE,F_WRITE_IN_PROGRESS ; INDICATE WRITE SEQUENCE
540                                  C                                  ;   IS IN PROGRESS
541   00B7  8D 36 000F R             C        LEA    SI,DATA_XFER_VECTOR ; DETERMINE WHICH INTERRUPT
542   00BB  26: 80 3E 0002 R 03      C        CMP    HDR_TYPE,HT_SF_FROM_HOST ; VECTOR TO USE
543   00C1  74 25                    C        JE     WRITE_1
544                                  C
545   00C3  8D 36 0020 R             C        LEA    SI,SCREEN_CAPTURE_VECTOR
546   00C7  26: 80 3E 0002 R 05      C        CMP    HDR_TYPE,HT_SC_DATA
547   00CD  74 7F                    C        JE     WRITE_SC
548                                  C
549   00CF  8D 36 0031 R             C        LEA    SI,WRAP_TEST_VECTOR
550   00D3  26: 80 3E 0002 R 01      C        CMP    HDR_TYPE,HT_WRAP_FROM_3274
551   00D9  74 0D                    C        JE     WRITE_1
552                                  C
553   00DB  8D 36 0042 R             C        LEA    SI,QUERY_STATE_VECTOR
554   00DF  26: 80 3E 0002 R 07      C        CMP    HDR_TYPE,HT_KBD_STATE
555   00E5  74 01                    C        JE     WRITE_1
556                                  C
557   00E7  C3                       C        RET                       ; INVALID MESSAGE HEADER - IGNORE THE
558                                  C                                  ; START OPERATION - THE 3274 WILL TIM
559                                  C                                  ; OUT AND TAKE THE 3278/3279 OFFLINE
560                                  C
561   00E8                           C  WRITE_1:
562   00E8  83 7C 06 00              C        CMP    WORD PTR [SI].BUFFER_ADDRESS+2,0 ; WAS AN INPUT BUFFER
563                                  C                                  ;   SPECIFIED FOR THIS MESSAGE TYPE?
564   00EC  74 45                    C        JE     WRITE_4             ; NO, INDICATE DATA OVERRUN
565   00EE  F6 44 0F 20              C        TEST   [SI].MESSAGE_FLAGS,MF_IN_USE ; IS THE INPUT BUFFER IN
566                                  C                                  ;   USE?
567   00F2  75 3F                    C        JNZ    WRITE_4             ; YES, INDICATE DATA OVERRUN
568                                  C
569   00F4  89 36 0055 R             C        MOV    FBA_RECEIVE_VECTOR,SI ; SAVE THE ADDRESS OF THE
570                                  C                                  ;   INTERRUPT VECTOR FOR THIS MESSAGE
571                                  C
572   00F8  26: 8B 0E 0000 R         C        MOV    CX,HDR_LENGTH      ; PICK UP LENGTH OF THIS BLOCK
573   00FD  86 E9                    C        XCHG   CH,CL
574                                  C
575   00FF  8B 7C 04                 C        MOV    DI,WORD PTR [SI].BUFFER_ADDRESS ; PICK UP ADDRESS OF
576                                  C                                  ;   INPUT BUFFER
577   0102  8B 44 0A                 C        MOV    AX,[SI].BUFFER_COUNT ; PICK UP NUMBER OF BYTES CURRENTL
578                                  C                                  ;   IN THE INPUT BUFFER
579   0105  03 F8                    C        ADD    DI,AX               ; CALCULATE WHERE THE NEW DATA GOES
580   0107  03 C1                    C        ADD    AX,CX               ; UPDATE NUMBER OF BYTES RECEIVED
581                                  C
582   0109  3B 44 08                 C        CMP    AX,[SI].BUFFER_LENGTH ; DOES THE NEW DATA FIT IN THE
583                                  C                                  ;   BUFFER?
584   010C  76 0D                    C        JNA    WRITE_2             ; YES, CONTINUE
585                                  C
586   010E  80 4C 0F 80              C        OR     [SI].MESSAGE_FLAGS,MF_DATA_TRUNC ; NO, THE DATA IS
587                                  C                                  ;   BEING TRUNCATED
588   0112  8B 4C 08                 C        MOV    CX,[SI].BUFFER_LENGTH ; FILL UP THE REST OF THE BUFFER
```

```
589    0115  2B 4C 0A              C           SUB     CX,[SI].BUFFER_COUNT
590    0118  8B 44 08              C           MOV     AX,[SI].BUFFER_LENGTH
591                                C
592    011B                        C   WRITE_2:
593    011B  89 44 0A              C           MOV     [SI].BUFFER_COUNT,AX ; SAVE THE UPDATED RECEIVE COUNT
594                                C
595    011E  8B 54 06              C           MOV     DX,WORD PTR [SI].BUFFER_ADDRESS+2 ; MOVE THE
596    0121  26: 8D 36 0004 R      C           LEA     SI,HDR_DATA          ; DATA FROM THE FBA BUFFER TO THE
597    0126  1E                    C           PUSH    DS                   ;  INPUT BUFFER
598    0127  06                    C           PUSH    ES
599    0128  1F                    C           POP     DS
600    0129  8E C2                 C           MOV     ES,DX
601    012B  FC                    C           CLD
602    012C  F3/ A4                C           REP     MOVSB
603    012E  1F                    C           POP     DS
604                                C
605    012F                        C   WRITE_3:
606    012F  E8 02A3 R             C           CALL    SEND_OP_COMPLETE ; ACKNOWLEDGE THE MESSAGE
607                                C
608    0132  C3                    C           RET                      ; PROCESS ANY OTHER PENDING INTERRUPTS
609                                C
610                                C   ;    DATA HAS BEEN RECEIVED WHEN THERE IS NO BUFFER AVAILABLE TO
611                                C   ;    STORE IT - INDICATE DATA OVERRUN
612                                C
613    0133                        C   WRITE_4:
614    0133  F6 44 10 80           C           TEST    [SI].STATUS_FLAGS,SF_PROCESSING ; IS THE INTERRUPT
615                                C                                          ;  HANDLER BUSY?
616    0137  75 0F                 C           JNZ     WRITE_5          ; YES, REMEMBER OVERRUN CONDITION
617                                C   ;                                ; NO, CALL THE INTERRUPT HANDLER
618    0139  E8 02A3 R             C           CALL    SEND_OP_COMPLETE ; ACKNOWLEDGE THE MESSAGE
619                                C
620    013C  56                    C           PUSH    SI
621    013D  E8 0000 E             C           CALL    PROC_INTERRUPTS  ; PROCESS OTHER PENDING INTERRUPTS
622    0140  5E                    C           POP     SI
623    0141  FB                    C           STI
624                                C
625    0142  B4 03                 C           MOV     AH,REASON_DATA_OVERRUN ; INDICATE DATA OVERRUN
626    0144  E8 02AD R             C           CALL    INFORM_APPL      ; CALL THE INTERRUPT HANDLER
627    0147  C3                    C           RET                      ; PROCESS OTHER PENDING INTERRUPTS
628                                C
629    0148                        C   WRITE_5:
630    0148  80 4C 10 40           C           OR      [SI].STATUS_FLAGS,SF_OVERRUN ; INDICATE DATA WAS LOST
631    014C  EB E1                 C           JMP     WRITE_3          ; CLEAN UP AND EXIT
632                                C
633                                C   ;    UPDATE THE HEADER IN THE SCREEN CAPTURE BUFFER
634                                C
635    014E                        C   WRITE_SC:
636    014E  26: F6 06 0003 R 80   C           TEST    HDR_FLAGS,HDR_F_START ; IS THIS THE START OF A NEW
637                                C                                          ;  BUFFER SECTION?
638    0154  74 15                 C           JZ      WRITE_SC_1       ; NO, CONTINUATION OF PREVIOUS SECTION
639                                C
640    0156  8B 54 04              C           MOV     DX,WORD PTR [SI].BUFFER_ADDRESS ; CALCULATE THE ADDRESS
641    0159  03 54 0A              C           ADD     DX,[SI].BUFFER_COUNT ;   OF THE LENGTH FIELD
642    015C  89 16 0057 R          C           MOV     WORD PTR SC_SECTION_LENGTH,DX ; SAVE THE ADDRESS OF THE
643    0160  8B 54 06              C           MOV     DX,WORD PTR [SI].BUFFER_ADDRESS+2 ; BUFFER SECTION
644    0163  89 16 0059 R          C           MOV     WORD PTR SC_SECTION_LENGTH+2,DX ;   LENGTH FIELD
645    0167  83 44 0A 02           C           ADD     [SI].BUFFER_COUNT,2 ; POINT PAST THE LENGTH FIELD
646                                C
647    016B                        C   WRITE_SC_1:
648    016B  1E                    C           PUSH    DS               ; SAVE ADDRESS OF DATA AREA
649    016C  C5 1E 0057 R          C           LDS     BX,SC_SECTION_LENGTH ; PICK UP THE ADDRESS OF THE
650                                C                                          ; BUFFER SECTION LENGTH FIELD
651                                C
652    0170  26: F6 06 0003 R 80   C           TEST    HDR_FLAGS,HDR_F_START ; IS THIS THE START OF A BUFFER
653                                C                                          ; SECTION?
654    0176  74 04                 C           JZ      WRITE_SC_2       ; NO, CONTINUE
655                                C
656    0178  C7 07 0000            C           MOV     WORD PTR DS:[BX],0 ; YES, CLEAR THE LENGTH FIELD
657                                C
658    017C                        C   WRITE_SC_2:
659    017C  26: 8B 0E 0000 R      C           MOV     CX,HDR_LENGTH    ;  BUFFER SECTION
660    0181  86 E9                 C           XCHG    CH,CL
661    0183  01 0F                 C           ADD     WORD PTR DS:[BX],CX
662                                C
663    0185  1F                    C           POP     DS               ; RESTORE ADDRESS OF DATA AREA
664                                C
665    0186  E9 00E8 R             C           JMP     WRITE_1          ; MOVE THE DATA INTO THE INPUT BUFFER
666                                C
667                                C           INCLUDE NDSPSOP2.ASM
668                                C
669                                C
670                                C
671                                C   ;****************************************************************
672                                C   ;*
673                                C   ;*  Procedure Name: EXECUTE_RECEIVED                              *
674                                C   ;*
675                                C   ;*  Function: To process a Start Operation command from the 3274  *
676                                C   ;*            which indicates Execute                             *
677                                C   ;*
678                                C   ;*  Input:                                                        *
679                                C   ;*
680                                C   ;*    F_READ_IN_PROGRESS  = 1 if a message is being sent to the 3274  *
681                                C   ;*    F_WRITE_IN_PROGRESS = 1 if a message is being received from    *
682                                C   ;*                              the 3274                              *
```

```
683                          C ;*     RECEIVE_VECTOR = address of interrupt vector for message    *
684                          C ;*                     being received from the 3274               *
685                          C ;*                                                                 *
686                          C ;* Output:                                                         *
687                          C ;*                                                                 *
688                          C ;*    If a message is being sent to the 3274                       *
689                          C ;*       F_EXECUTE = 1                                             *
690                          C ;*       F_READ_IN_PROGRESS = 0                                    *
691                          C ;*                                                                 *
692                          C ;*    If a message is being received from the 3274:                *
693                          C ;*       F_WRITE_IN_PROGRESS = 0                                   *
694                          C ;*       interrupt handler is called with reason code indicating   *
695                          C ;*          Message Received From 3274                             *
696                          C ;*       If a message is received while the interrupt handler is busy, *
697                          C ;*          it is called again with reason code indicating Data Overrun *
698                          C ;*                                                                 *
699                          C ;*****************************************************************
700                          C
701   0189                   C  EXECUTE_RECEIVED:
702   0189  E8 02A3 R        C        CALL    SEND_OP_COMPLETE ; ACKNOWLEDGE THE START OPERATION
703                          C
704   018C  F6 06 0000 R 20  C        TEST    FBA_STATE,F_WRITE_IN_PROGRESS ; IS A WRITE SEQUENCE IN
705                          C                                  ;    PROGRESS?
706   0191  74 67            C        JZ      EXECUTE_5        ; NO, CONTINUE
707                          C
708   0193  80 26 0000 R DF  C        AND     FBA_STATE,NOT F_WRITE_IN_PROGRESS ; YES, THE WRITE
709                          C                                  ;   SEQUENCE IS NOW COMPLETE
710   0198  8B 36 0055 R     C        MOV     SI,FBA_RECEIVE_VECTOR ; PICK UP THE ADDRESS OF THE
711                          C                                  ;    INTERRUPT VECTOR FOR THE LAST
712                          C                                  ;    BLOCK RECEIVED
713                          C
714   019C  0B F6            C        OR      SI,SI            ; WAS THE LAST BLOCK RECEIVED ASSIGNED
715                          C                                  ;    TO AN INTERRUPT VECTOR?
716   019E  74 59            C        JZ      EXECUTE_4        ; NO, THE DATA WAS DISCARDED
717                          C
718   01A0  80 7C 0E 04      C        CMP     [SI].MESSAGE_TYPE,HT_SET_SC_OPTIONS ; IS THIS A SCREEN
719                          C                                  ;    CAPTURE MESSAGE?
720   01A4  75 06            C        JNE     EXECUTE_2        ; NO, CONTINUE
721                          C
722   01A6  BA 03E4          C        MOV     DX,COMMAND_PORT  ; YES, INDICATE SCREEN CAPTURE IS IN
723   01A9  B0 05            C        MOV     AL,SCREEN_CAPTURE ;     PROGRESS
724   01AB  EE               C        OUT     DX,AL
725                          C
726   01AC                   C  EXECUTE_2:
727   01AC  56               C        PUSH    SI
728   01AD  E8 0000 E        C        CALL    PROC_INTERRUPTS  ; PROCESS OTHER PENDING INTERRUPTS
729   01B0  5E               C        POP     SI
730   01B1  FB               C        STI
731                          C
732   01B2  B4 01            C        MOV     AH,REASON_MESSAGE_RECEIVED ; INDICATE MESSAGE RECEIVED
733   01B4  8A 44 0F         C        MOV     AL,[SI].MESSAGE_FLAGS ; PICK UP MESSAGE FLAGS
734   01B7  24 80            C        AND     AL,MF_DATA_TRUNC ; ISOLATE THE DATA TRUNCATED FLAG
735   01B9  8B 4C 0A         C        MOV     CX,[SI].BUFFER_COUNT ; PICK UP THE NUMBER OF BYTES
736                          C                                  ;    IN THE MESSAGE
737   01BC  C4 54 04         C        LES     DX,[SI].BUFFER_ADDRESS ; PICK UP THE ADDRESS OF THE
738                          C                                  ;    INPUT BUFFER
739                          C
740   01BF  C7 06 0055 R 0000 C        MOV    FBA_RECEIVE_VECTOR,0 ; INDICATE THE MESSAGE WAS
741                          C                                  ;    PROCESSED
742   01C5  E8 02C2 R        C        CALL    RESET_BUFFER_COUNTS ; RESET BUFFER COUNTERS
743   01C8  80 4C 0F 20      C        OR      [SI].MESSAGE_FLAGS,MF_IN_USE ; INDICATE MESSAGE BUFFER
744                          C                                  ;    IS IN USE
745                          C
746   01CC  E8 02AD R        C        CALL    INFORM_APPL      ; CALL THE INTERRUPT HANDLER TO PROCESS
747                          C                                  ;    THE MESSAGE
748                          C
749   01CF  80 64 0F DF      C        AND     [SI].MESSAGE_FLAGS,NOT MF_IN_USE ; INDICATE MESSAGE
750                          C                                  ;    BUFFER IS AVAILABLE
751   01D3  83 7C 06 00      C        CMP     [SI].BUFFER_ADDRESS+2,0 ; IS THERE A MESSAGE BUFFER?
752   01D7  74 0F            C        JZ      EXECUTE_3        ; NO, CONTINUE
753   01D9  80 7C 0E 04      C        CMP     [SI].MESSAGE_TYPE,HT_SET_SC_OPTIONS ; WAS THIS A SCREEN
754                          C                                  ;    CAPTURE MESSAGE?
755   01DD  75 09            C        JNE     EXECUTE_3        ; NO, CONTINUE
756                          C
757   01DF  E8 029A R        C        CALL    WAIT_FOR_POLL_ACK ; WAIT FOR THE PREVIOUS POLL REQUEST
758                          C                                  ;    TO BE ACKNOWLEDGED
759   01E2  BA 03E4          C        MOV     DX,COMMAND_PORT  ; A SCREEN CAPTURE MESSAGE WAS JUST
760   01E5  B0 04            C        MOV     AL,SCREEN_CAPTURE_COMPLETE ;   PROCESSED AND THE BUFFER
761   01E7  EE               C        OUT     DX,AL            ;    IS AVAILABLE - SCREEN CAPTURE
762                          C                                  ;    PROCESSING MUST BE COMPLETE
763                          C
764   01E8                   C  EXECUTE_3:
765   01E8  F6 44 10 40      C        TEST    [SI].STATUS_FLAGS,SF_OVERRUN ; WAS MORE DATA RECEIVED
766                          C                                  ;    WHILE THE INTERRUPT HANDLER WAS
767                          C                                  ;    BUSY?
768   01EC  74 0B            C        JZ      EXECUTE_4        ; NO, CONTINUE
769   01EE  80 64 10 BF      C        AND     [SI].STATUS_FLAGS,NOT SF_OVERRUN ; YES, INFORM THE USER
770   01F2  B4 03            C        MOV     AH,REASON_DATA_OVERRUN ; INDICATE DATA LOST
771   01F4  E8 02AD R        C        CALL    INFORM_APPL      ; CALL THE INTERRUPT HANDLER AGAIN
772   01F7  EB EF            C        JMP     EXECUTE_3        ; TEST FOR OVERRUN AGAIN
773                          C
774   01F9                   C  EXECUTE_4:
775   01F9  C3               C        RET                      ; PROCESS OTHER PENDING INTERRUPTS
776                          C
```

```
777  01FA                    C  EXECUTE_5:
778  01FA  F6 06 0000 R 40   C          TEST    FBA_STATE,F_READ_IN_PROGRESS ; IS A READ SEQUENCE IN
779                          C                                               ;   PROGRESS?
780  01FF  74 F8             C          JZ      EXECUTE_4            ; NO, IGNORE THE EXECUTE
781                          C
782  0201  80 0E 0001 R 20   C          OR      FBA_PENDING_OP,F_EXECUTE ; YES, INDICATE EXECUTE HAS
783                          C                                           ;  RECEIVED
784  0206  80 26 0000 R BF   C          AND     FBA_STATE,NOT F_READ_IN_PROGRESS ; THE READ SEQUENCE IS
785                          C                                                   ;  NOW COMPLETE
786  020B  C3                C          RET                          ; PROCESS OTHER PENDING INTERRUPTS
787
788
789                          C
790                          C ;**********************************************************************
791                          C ;*
792                          C ;*  Procedure Name: ABORT_E_RECEIVED
793                          C ;*
794                          C ;*  Function: To process a Start Operation command from the 3274
795                          C ;*            which indicates Abort Transmission
796                          C ;*
797                          C ;*  Input:
798                          C ;*
799                          C ;*     F_READ_IN_PROGRESS = 1 if a message is being sent to the 3274
800                          C ;*     F_WRITE_IN_PROGRESS = 1 if a message is being received from
801                          C ;*                             the 3274
802                          C ;*     RECEIVE_VECTOR = address of interrupt vector for message
803                          C ;*                      being received from the 3274
804                          C ;*
805                          C ;*  Output:
806                          C ;*
807                          C ;*     If a message is being sent to the 3274
808                          C ;*        F_ABORT_E = 1
809                          C ;*        F_READ_IN_PROGRESS = 0
810                          C ;*
811                          C ;*     If a message is being received from the 3274:
812                          C ;*        F_WRITE_IN_PROGRESS = 0
813                          C ;*        interrupt vector data counts are reset
814                          C ;*
815                          C ;**********************************************************************
816                          C
817  020C                    C  ABORT_E_RECEIVED:
818  020C  E8 02A3 R         C          CALL    SEND_OP_COMPLETE ; ACKNOWLEDGE THE START OP
819                          C
820  020F  F6 06 0000 R 20   C          TEST    FBA_STATE,F_WRITE_IN_PROGRESS ; IS A WRITE SEQUENCE IN
821                          C                                                ;   PROGRESS?
822  0214  74 0D             C          JZ      ABORT_E_1            ; NO, CONTINUE
823                          C
824  0216  80 26 0000 R DF   C          AND     FBA_STATE,NOT F_WRITE_IN_PROGRESS ; YES, CANCEL THE
825                          C                                                    ;  WRITE SEQUENCE
826  021B  8B 36 0055 R      C          MOV     SI,FBA_RECEIVE_VECTOR ; PICK UP THE ADDRESS OF THE
827                          C                                        ;  INTERRUPT VECTOR FOR THE LAST BLOCK
828                          C                                        ;  RECEIVED
829  021F  E8 02C2 R         C          CALL    RESET_BUFFER_COUNTS ; RESET THE BUFFER COUNTERS
830  0222  C3                C          RET                          ; PROCESS OTHER PENDING INTERRUPTS
831                          C
832  0223                    C  ABORT_E_1:
833  0223  F6 06 0000 R 40   C          TEST    FBA_STATE,F_READ_IN_PROGRESS ; IS A READ SEQUENCE IN
834                          C                                               ;   PROGRESS?
835  0228  74 0A             C          JZ      ABORT_E_2            ; NO, IGNORE THE ABORT TRANSMISSION
836                          C
837  022A  80 0E 0001 R 10   C          OR      FBA_PENDING_OP,F_ABORT_E ; YES, INDICATE ABORT
838                          C                                           ;  TRANSMISSION RECEIVED
839  022F  80 26 0000 R BF   C          AND     FBA_STATE,NOT F_READ_IN_PROGRESS ; THE READ SEQUENCE
840                          C                                                   ;  HAS TO BE RESTARTED
841                          C
842  0234                    C  ABORT_E_2:
843  0234  C3                C          RET                          ; PROCESS OTHER PENDING INTERRUPTS
844
845
846                          C
847                          C ;**********************************************************************
848                          C ;*                                                                    *
849                          C ;*  Procedure Name: ABORT_V_RECEIVED                                  *
850                          C ;*                                                                    *
851                          C ;*  Function: To process a Start Operation command from the 3274     *
852                          C ;*            .which indicates Abort To Last Verify                   *
853                          C ;*                                                                    *
854                          C ;*  Input:                                                            *
855                          C ;*                                                                    *
856                          C ;*     F_READ_IN_PROGRESS = 1 if a message is being sent to the 3274 *
857                          C ;*     F_WRITE_IN_PROGRESS = 1 if a message is being received from   *
858                          C ;*                             the 3274                               *
859                          C ;*     RECEIVE_VECTOR = address of interrupt vector for message      *
860                          C ;*                      being received from the 3274                  *
861                          C ;*                                                                    *
862                          C ;*  Output:                                                           *
863                          C ;*                                                                    *
864                          C ;*     If a message is being sent to the 3274                         *
865                          C ;*        F_ABORT_V = 1                                               *
866                          C ;*                                                                    *
867                          C ;*     If a message is being received from the 3274:                  *
868                          C ;*        all data received since receiving the last Start Operation *
869                          C ;*           command indicating Verify is discarded                   *
870                          C ;*                                                                    *
871                          C ;**********************************************************************
```

```
872
873     0235                      C   ABORT_V_RECEIVED:
874     0235  E8 02A3 R           C           CALL    SEND_OP_COMPLETE ; ACKNOWLEDGE THE START OP
875                               C
876     0238  F6 06 0000 R 20     C           TEST    FBA_STATE,F_WRITE_IN_PROGRESS ; IS A WRITE SEQUENCE IN
877                               C                                           ;   PROGRESS?
878     023D  74 15               C           JZ      ABORT_V_1       ; NO, CONTINUE
879                               C
880     023F  8B 36 0055 R        C           MOV     SI,FBA_RECEIVE_VECTOR ; PICK UP THE ADDRESS OF THE
881                               C                                           ;   INTERRUPT VECTOR FOR THE LAST BLOCK
882                               C                                           ;   RECEIVED
883     0243  8B 44 0C            C           MOV     AX,[SI].VERIFY_COUNT ; SET THE NUMBER OF BYTES RECEIVED
884     0246  89 44 0A            C           MOV     [SI].BUFFER_COUNT,AX ; TO THE NUMBER OF VERIFIED BYTES
885                               C
886     0249  F6 44 0F 40         C           TEST    [SI].MESSAGE_FLAGS,MF_VERIFY_TRUNC ; WAS THE LAST VERIFY
887                               C                                           ;   PAST THE END OF THE BUFFER?
888     024D  75 16               C           JNZ     ABORT_V_2       ; YES, THE DATA IS STILL TRUNCATED
889     024F  80 64 0F 7F         C           AND     [SI].MESSAGE_FLAGS,NOT MF_DATA_TRUNC ; NO, THE VERIFIED
890                               C                                           ;   DATA ALL FITS IN THE BUFFER
891     0253  C3                  C           RET                     ; PROCESS OTHER PENDING INTERRUPTS
892                               C
893     0254                      C   ABORT_V_1:
894     0254  F6 06 0000 R 40     C           TEST    FBA_STATE,F_READ_IN_PROGRESS ; IS A READ SEQUENCE IN
895                               C                                           ;   PROGRESS?
896     0259  74 0A               C           JZ      ABORT_V_2       ; NO, IGNORE THE ABORT TO LAST VERIFY
897                               C
898     025B  80 0E 0001 R 08     C           OR      FBA_PENDING_OP,F_ABORT_V ; YES, INDICATE ABORT TO LAST
899                               C                                           ;   VERIFY RECEIVED - THE MESSAGE WILL
900                               C                                           ;   BE RETRANSMITTED
901     0260  80 26 0000 R BF     C           AND     FBA_STATE,NOT F_READ_IN_PROGRESS ; THE READ SEQUENCE
902                               C                                           ;   HAS TO BE RESTARTED
903                               C
904     0265                      C   ABORT_V_2:
905     0265  C3                  C           RET                     ; PROCESS OTHER PENDING INTERRUPTS
906                               C
907                               C
908                               C
909                               C   ;****************************************************************
910                               C   ;*                                                              *
911                               C   ;*  Procedure Name: ERROR_RECEIVED                              *
912                               C   ;*                                                              *
913                               C   ;*  Function: To process a Start Operation command from the 3274 *
914                               C   ;*            which indicates Error                             *
915                               C   ;*                                                              *
916                               C   ;*  Input:                                                      *
917                               C   ;*                                                              *
918                               C   ;*    F_READ_IN_PROGRESS = 1 if a message is being sent to the 3274 *
919                               C   ;*                                                              *
920                               C   ;*  Output:                                                     *
921                               C   ;*                                                              *
922                               C   ;*    If a message is being sent to the 3274                    *
923                               C   ;*       F_ERROR = 1                                            *
924                               C   ;*                                                              *
925                               C   ;****************************************************************
926                               C
927     0266                      C   ERROR_RECEIVED:
928     0266  E8 02A3 R           C           CALL    SEND_OP_COMPLETE ; ACKNOWLEDGE THE START OP
929                               C
930     0269  F6 06 0000 R 40     C           TEST    FBA_STATE,F_READ_IN_PROGRESS ; IS A READ SEQUENCE IN
931                               C                                           ;   PROGRESS?
932     026E  74 0A               C           JZ      ERROR_1         ; NO, IGNORE THE ERROR
933                               C
934     0270  80 0E 0001 R 04     C           OR      FBA_PENDING_OP,F_ERROR ; YES, INDICATE ERROR RECEIVED
935     0275  80 26 0000 R BF     C           AND     FBA_STATE,NOT F_READ_IN_PROGRESS ; THE READ SEQUENCE IS
936                               C                                           ;   NOW COMPLETE
937                               C
938     027A                      C   ERROR_1:
939     027A  C3                  C           RET                     ; PROCESS OTHER PENDING INTERRUPTS
940                               C
941                               C
942                               C
943                               C   ;****************************************************************
944                               C   ;*                                                              *
945                               C   ;*  Procedure Name: VERIFY_RECEIVED                             *
946                               C   ;*                                                              *
947                               C   ;*  Function: To process a Start Operation command from the 3274 *
948                               C   ;*            which indicates Verify                            *
949                               C   ;*                                                              *
950                               C   ;*  Input:                                                      *
951                               C   ;*                                                              *
952                               C   ;*    F_WRITE_IN_PROGRESS = 1 if a message is being received from *
953                               C   ;*                              the 3274                         *
954                               C   ;*    RECEIVE_VECTOR = address of interrupt vector for message  *
955                               C   ;*                        being received from the 3274          *
956                               C   ;*                                                              *
957                               C   ;*  Output:                                                     *
958                               C   ;*                                                              *
959                               C   ;*    If a message is being received from the 3274:             *
960                               C   ;*       the current data count is saved for use during a subsequent *
961                               C   ;*         Abort To Last Verify                                 *
962                               C   ;*                                                              *
963                               C   ;****************************************************************
964                               C
```

```
965    027B                    C   VERIFY_RECEIVED:
966    027B  E8 02A3 R         C           CALL    SEND_OP_COMPLETE ; ACKNOWLEDGE THE START OP
967                             C
968    027E  F6 06 0000 R 20   C           TEST    FBA_STATE,F_WRITE_IN_PROGRESS ; IS A WRITE SEQUENCE IN
969                             C                                                ;    PROGRESS?
970    0283  74 14              C           JZ      VERIFY_1         ; NO, IGNORE THE VERIFY COMMAND
971                             C
972    0285  8B 36 0055 R      C           MOV     SI,FBA_RECEIVE_VECTOR ; PICK UP THE ADDRESS OF THE
973                             C                                          ;   INTERRUPT VECTOR FOR THE LAST BLOCK
974                             C                                          ;   RECEIVED
975    0289  8B 44 0A          C           MOV     AX,[SI].BUFFER_COUNT ; SAVE THE NUMBER OF VERIFIED
976    028C  89 44 0C          C           MOV     [SI].VERIFY_COUNT,AX ;   DATA BYTES
977    028F  F6 44 0F 80       C           TEST    [SI].MESSAGE_FLAGS,MF_DATA_TRUNC ; HAS THE DATA
978                             C                                                    ;   TRUNCATED?
979    0293  74 04              C           JZ      VERIFY_1         ; NO, CONTINUE
980    0295  80 4C 0F 40       C           OR      [SI].MESSAGE_FLAGS,MF_VERIFY_TRUNC ; YES, INDICATE THE
981                             C                                                      ;   VERIFIED DATA HAS TRUNCATED
982                             C
983    0299                    C   VERIFY_1:
984    0299  C3                C           RET                       ; PROCESS OTHER PENDING INTERRUPTS
985                             C
986                             C
987                             C
988                             C   ;***********************************************************
989                             C   ;*
990                             C   ;*  Procedure Name: WAIT_FOR_POLL_ACK
991                             C   ;*
992                             C   ;*  Function: To wait for the previous poll request to be acknowledged
993                             C   ;*            by the 3274
994                             C   ;*
995                             C   ;*  Input: None
996                             C   ;*
997                             C   ;*  Output:
998                             C   ;*
999                             C   ;*     AL and DX are unpredictable
1000                            C   ;*
1001                            C   ;***********************************************************
1002                            C
1003   029A                    C   WAIT_FOR_POLL_ACK PROC NEAR
1004   029A  BA 03E4           C           MOV     DX,STATUS_PORT   ; WAIT UNTIL THE ADAPTER STATUS
1005   029D  EC                C           IN      AL,DX            ;   INDICATES THAT A POLL REQUEST IS
1006   029E  A8 40             C           TEST    AL,ST_POLL_ACTIVE ; NOT PENDING
1007   02A0  75 F8             C           JNZ     WAIT_FOR_POLL_ACK
1008                            C
1009   02A2  C3                C           RET                       ; RETURN TO CALLER
1010   02A3                    C   WAIT_FOR_POLL_ACK ENDP
1011                            C
1012                            C   ;***********************************************************
1013                            C   ;*
1014                            C   ;*  Procedure Name: SEND_OP_COMPLETE
1015                            C   ;*
1016                            C   ;*  Function: To send an Operation Complete reply to the 3274
1017                            C   ;*
1018                            C   ;*  Input: None
1019                            C   ;*
1020                            C   ;*  Output:
1021                            C   ;*
1022                            C   ;*     AL and DX are unpredictable
1023                            C   ;*
1024                            C   ;***********************************************************
1025                            C
1026   02A3                    C   SEND_OP_COMPLETE PROC NEAR
1027   02A3  E8 029A R         C           CALL    WAIT_FOR_POLL_ACK ; WAIT FOR THE PREVIOUS POLL REQUEST
1028                            C                                     ;   TO BE ACKNOWLEDGED
1029   02A6  BA 03E4           C           MOV     DX,COMMAND_PORT   ; SEND OP COMPLETE TO THE 3278/3279
1030   02A9  B0 01             C           MOV     AL,OP_COMPLETE    ;   ADAPTER
1031   02AB  EE                C           OUT     DX,AL
1032   02AC  C3                C           RET                       ; RETURN TO CALLER
1033   02AD                    C   SEND_OP_COMPLETE ENDP
1034                            C
1035                            C
1036                            C
1037                            C   ;***********************************************************
1038                            C   ;*
1039                            C   ;*  Procedure Name: INFORM_APPL
1040                            C   ;*
1041                            C   ;*  Function: To call a user supplied interrupt handler
1042                            C   ;*
1043                            C   ;*  Input:
1044                            C   ;*
1045                            C   ;*     SI = address of interrupt vector
1046                            C   ;*
1047                            C   ;*  Output:
1048                            C   ;*
1049                            C   ;*     All registers other than DS and SI are unpredictable
1050                            C   ;*
1051                            C   ;***********************************************************
1052                            C
1053   02AD                    C   INFORM_APPL PROC NEAR
1054   02AD  83 7C 02 00       C           CMP     WORD PTR [SI].INTERRUPT_VECTOR+2,0 ; IS THERE AN
1055                            C                                                      ;   INTERRUPT HANDLER SPECIFIED?
1056   02B1  74 0E             C           JZ      INFORM_APPL_1     ; NO, RETURN TO CALLER
1057                            C
```

```
1058   02B3  80 4C 10 80    C         OR      [SI].STATUS_FLAGS,SF_PROCESSING ; INDICATE THE INTERRUPT
1059                        C                                                ;   HANDLER IS BUSY
1060                        C
1061   02B7  1E             C         PUSH    DS                             ; CALL THE USER'S INTERRUPT HANDLER
1062   02B8  56             C         PUSH    SI
1063   02B9  FF 1C          C         CALL    [SI].INTERRUPT_VECTOR
1064   02BB  5E             C         POP     SI
1065   02BC  1F             C         POP     DS
1066                        C
1067   02BD  80 64 10 7F    C         AND     [SI].STATUS_FLAGS,NOT SF_PROCESSING ; INDICATE THE
1068                        C                                                ;   INTERRUPT HANDLER IS NOT BUSY
1069                        C
1070   02C1                 C INFORM_APPL_1:
1071   02C1  C3             C         RET                                    ; RETURN TO CALLER
1072   02C2                 C INFORM_APPL ENDP
1073                        C
1074                        C
1075                        C
1076                        C ;************************************************************
1077                        C ;*
1078                        C ;*  Procedure Name: RESET_BUFFER_COUNTS
1079                        C ;*
1080                        C ;*  Function: To reset the receive data counts and status flags for
1081                        C ;*            an interrupt vector
1082                        C ;*
1083                        C ;*  Input:
1084                        C ;*
1085                        C ;*    SI = address of interrupt vector
1086                        C ;*
1087                        C ;*  Output: None
1088                        C ;*
1089                        C ;************************************************************
1090                        C
1091   02C2                 C RESET_BUFFER_COUNTS PROC NEAR
1092   02C2  50             C         PUSH    AX
1093   02C3  33 C0          C         XOR     AX,AX                  ; SET COUNTERS TO ZERO
1094   02C5  89 44 0A       C         MOV     [SI].BUFFER_COUNT,AX   ; RESET NUMBER OF BYTES RECEIVED
1095   02C8  89 44 0C       C         MOV     [SI].VERIFY_COUNT,AX   ; RESET NUMBER OF BYTES VERIFIED
1096   02CB  C6 44 0F 00    C         MOV     [SI].MESSAGE_FLAGS,0   ; RESET MESSAGE FLAGS
1097   02CF  58             C         POP     AX
1098   02D0  C3             C         RET                            ; RETURN TO CALLER
1099   02D1                 C RESET_BUFFER_COUNTS ENDP
1100                        C
1101                        C
1102
1103   02D1                   NDSP_SOP ENDP
1104
1105                                  SUBTTL  Process a 3278/3279 Attachment function request
1106
1107
1108                          ;************************************************************
1109                          ;*
1110                          ;*  Procedure Name: NDSP_API
1111                          ;*
1112                          ;*  Function: To process a 3278/3279 Attachment function request
1113                          ;*
1114                          ;*  Input:
1115                          ;*
1116                          ;*    AH = function code
1117                          ;*
1118                          ;*  Output:
1119                          ;*
1120                          ;*    CF = 0 if function was processed successfully
1121                          ;*         1 if function failed
1122                          ;*
1123                          ;*    AL = return code if function failed
1124                          ;*
1125                          ;************************************************************
1126
1127   02D1                   NDSP_API  PROC  FAR
1128
1129                        C         INCLUDE NDSPAPI1.ASM
1130                        C
1131                        C ;************************************************************
1132                        C ;*
1133                        C ;*    Process A 3278/3279 Attachment Function Request
1134                        C ;*
1135                        C ;************************************************************
1136                        C
1137   02D1  FB             C         STI                             ; ALLOW HARDWARE INTERRUPTS
1138   02D2  53             C         PUSH    BX                      ; SAVE ALL REGISTERS EXCEPT AX
1139   02D3  51             C         PUSH    CX
1140   02D4  52             C         PUSH    DX
1141   02D5  56             C         PUSH    SI
1142   02D6  57             C         PUSH    DI
1143   02D7  1E             C         PUSH    DS
1144   02D8  06             C         PUSH    ES
1145                        C
1146   02D9  8C DB          C         MOV     BX,DS                   ; SAVE INPUT PARAMETER IN BX
1147                        C
1148   02DB  BE ---- R      C         MOV     SI,BIOSDATA             ; ESTABLISH ADDRESSABILITY TO WORK AREA
1149   02DE  8E DE          C         MOV     DS,SI
1150                        C
1151   02E0  50             C         PUSH    AX
1152   02E1  8A C4          C         MOV     AL,AH                   ; USE THE FUNCTION CODE IN (AH) TO ROUTE
1153   02E3  D0 E0          C         SAL     AL,1                    ;   CONTROL TO THE PROPER PROCESSING
```

```
1154   02E5  98                    c           CBW
1155   02E6  8B F0                 c           MOV    SI,AX              ;   ROUTINE
1156   02E8  3D 0014 90            c           CMP    AX,BIOS_JMP_TABLE_LENGTH
1157   02EC  58                    c           POP    AX
1158   02ED  72 19                 c           JB     BIOS_ROUTE         ; VALID FUNCTION CODE
1159   02EF  B0 01                 c           MOV    AL,RC_INVALID_FUNC ; INVALID FUNCTION CODE
1160   02F1  EB 1A 90              c           JMP    BIOS_ERROR
1161                               c
1162   02F4                        c  BIOS_JMP_TABLE LABEL WORD
1163   02F4  032D R                c           DW     SET_MODE
1164   02F6  0367 R                c           DW     SEND_KEYSTROKES
1165   02F8  0438 R                c           DW     SET_INTERRUPT_VECTOR
1166   02FA  0434 R                c           DW     RESET_INTERRUPT_VECTOR
1167   02FC  0484 R                c           DW     SET_BUFFER_ADDRESS
1168   02FE  04C3 R                c           DW     SEND_MESSAGE
1169   0300  062B R                c           DW     CANCEL_MESSAGE
1170   0302  0648 R                c           DW     MODIFY_XLAT_IN
1171   0304  0653 R                c           DW     MODIFY_XLAT_OUT
1172   0306  065E R                c           DW     QUERY_KEYBOARD_IDENTIFIER
1173                               c
1174     = 0014                    c  BIOS_JMP_TABLE_LENGTH EQU $-BIOS_JMP_TABLE
1175                               c
1176   0308                        c  BIOS_ROUTE:
1177   0308  2E: FF A4 02F4 R      c           JMP    BIOS_JMP_TABLE[SI]
1178                               c
1179                               c
1180                               c  ;*****************************************************
1181                               c  ;*
1182                               c  ;*  Procedure Name: BIOS_ERROR
1183                               c  ;*
1184                               c  ;*  Function: To return to the caller with an error code in (AL)
1185                               c  ;*
1186                               c  ;*  Input:
1187                               c  ;*
1188                               c  ;*     (AL) = error code
1189                               c  ;*
1190                               c  ;*  Output:
1191                               c  ;*
1192                               c  ;*     CF = 1
1193                               c  ;*     (AL) = error code
1194                               c  ;*
1195                               c  ;*****************************************************
1196                               c
1197                               c
1198   030D                        c  BIOS_ERROR:                       ; INDICATE AN ERROR HAS OCCURRED
1199   030D  F9                    c           STC
1200   030E  EB 04 90              c           JMP    BIOS_RETURN        ; RETURN TO CALLER
1201                               c
1202                               c  ;*****************************************************
1203                               c  ;*
1204                               c  ;*  Procedure Name: BIOS_EXIT
1205                               c  ;*
1206                               c  ;*  Function: To return to the caller indicating the function was
1207                               c  ;*            completed successfully
1208                               c  ;*
1209                               c  ;*  Input: None
1210                               c  ;*
1211                               c  ;*  Output:
1212                               c  ;*
1213                               c  ;*     CF = 0
1214                               c  ;*     (AL) = 0
1215                               c  ;*
1216                               c  ;*****************************************************
1217                               c
1218   0311                        c  BIOS_EXIT:                        ; INDICATE SUCCESSFUL COMPLETION
1219   0311  F8                    c           CLC
1220   0312  32 C0                 c           XOR    AL,AL
1221                               c
1222   0314                        c  BIOS_RETURN:                      ; RESTORE REGISTERS
1223   0314  07                    c           POP    ES
1224   0315  1F                    c           POP    DS
1225   0316  5F                    c           POP    DI
1226   0317  5E                    c           POP    SI
1227   0318  5A                    c           POP    DX
1228   0319  59                    c           POP    CX
1229   031A  5B                    c           POP    BX
1230                               c
1231   031B  55                    c           PUSH   BP                 ; SET THE CARRY FLAG IN THE STACK
1232   031C  8B EC                 c           MOV    BP,SP              ;   SO THE USER CAN TEST THE CARRY FLAG
1233   031E  72 07                 c           JC     BIOS_RETURN_1      ;   TO SEE IF THE OPERATION SUCCEEDED
1234   0320  80 66 06 FE           c           AND    BYTE PTR [BP+6],0FEH
1235   0324  EB 05 90              c           JMP    BIOS_RETURN_2
1236   0327                        c  BIOS_RETURN_1:
1237   0327  80 4E 06 01           c           OR     BYTE PTR [BP+6],01H
1238   032B                        c  BIOS_RETURN_2:
1239   032B  5D                    c           POP    BP
1240                               c
1241   032C  CF                    c           IRET                      ; RETURN TO CALLER
1242                               c
1243                               c
1244                               c
```

```
1245                          C   ;**************************************************************
1246                          C   ;*                                                              *
1247                          C   ;*  Procedure Name: SET_MODE                                    *
1248                          C   ;*                                                              *
1249                          C   ;*  Function: To change the mode of the display and/or keyboard *
1250                          C   ;*                                                              *
1251                          C   ;*  Input:                                                      *
1252                          C   ;*                                                              *
1253                          C   ;*     (AL) = 0 - switch to host computer mode                  *
1254                          C   ;*     (AL) = 1 - switch to personal computer mode              *
1255                          C   ;*     (AL) = 2 - display host computer screen image            *
1256                          C   ;*     (AL) = 3 - display personal computer screen image        *
1257                          C   ;*                                                              *
1258                          C   ;*  Output: None                                                *
1259                          C   ;*                                                              *
1260                          C   ;**************************************************************
1261                          C
1262   032D                   C   SET_MODE:
1263   032D  0A C0             C          OR      AL,AL          ; IS MODE = 0?
1264   032F  75 03             C          JNZ     SET_MODE_1     ; NO, CONTINUE
1265   0331  EB 1A 90          C          JMP     SET_MODE_TO_HOST ; YES, SWITCH TO HOST COMPUTER MODE
1266   0334                   C   SET_MODE_1:
1267   0334  FE C8             C          DEC     AL             ; IS MODE = 1?
1268   0336  75 03             C          JNZ     SET_MODE_2     ; NO, CONTINUE
1269   0338  EB 20 90          C          JMP     SET_MODE_TO_PC ; YES, SWITCH TO PERSONAL COMPUTER MODE
1270   033B                   C   SET_MODE_2:
1271   033B  FE C8             C          DEC     AL             ; IS MODE = 2?
1272   033D  75 03             C          JNZ     SET_MODE_3     ; NO, CONTINUE
1273   033F  EB 11 90          C          JMP     SET_MODE_DISPLAY_HOST ; YES, SWITCH DISPLAY TO HOST MODE
1274   0342                   C   SET_MODE_3:
1275   0342  FE C8             C          DEC     AL             ; IS MODE = 3?
1276   0344  75 03             C          JNZ     SET_MODE_4     ; NO, CONTINUE
1277   0346  EB 17 90          C          JMP     SET_MODE_DISPLAY_PC ; YES, SWITCH DISPLAY TO PC MODE
1278   0349                   C   SET_MODE_4:
1279                          C
1280   0349  B0 02             C          MOV     AL,RC_INVALID_MODE ; INDICATE INVALID MODE VALUE
1281   034B  EB C0             C          JMP     BIOS_ERROR
1282                          C
1283                          C   ;   PUT THE KEYBOARD AND DISPLAY INTO HOST COMPUTER MODE
1284                          C   ;   THE 3278/3279 DISPLAY WILL SHOW THE SCREEN IMAGE FROM THE
1285                          C   ;      3274/3276 CONTROL UNIT
1286                          C   ;   ALL KEYSTROKES WILL BE ROUTED TO THE 3278/3279 DISPLAY
1287                          C
1288   034D                   C   SET_MODE_TO_HOST:
1289   034D  80 0E 0000 R 80   C          OR      TERM_MODE,T_HOST ; INDICATE TERMINAL IN HOST MODE
1290                          C
1291                          C   ;   PUT THE DISPLAY INTO HOST COMPUTER MODE
1292                          C   ;   THE 3278/3279 DISPLAY WILL SHOW THE SCREEN IMAGE FROM THE
1293                          C   ;      3274/3276 CONTROL UNIT
1294                          C
1295   0352                   C   SET_MODE_DISPLAY_HOST:
1296   0352  BA 03E3           C          MOV     DX,CMD_8255    ; SWITCH THE DISPLAY TO HOST MODE
1297   0355  B0 0F             C          MOV     AL,HOST_MODE
1298   0357  EE                C          OUT     DX,AL
1299                          C
1300   0358  EB B7             C          JMP     BIOS_EXIT      ; RETURN TO CALLER
1301                          C
1302                          C   ;   PUT THE KEYBOARD AND DISPLAY INTO PERSONAL COMPUTER MODE
1303                          C   ;   THE 3278/3279 DISPLAY WILL SHOW THE SCREEN IMAGE FROM THE
1304                          C   ;      PERSONAL COMPUTER
1305                          C   ;   ALL KEYSTROKES WILL BE ROUTED TO THE PERSONAL COMPUTER
1306                          C
1307   035A                   C   SET_MODE_TO_PC:
1308                          C
1309   035A  80 26 0000 R 7F   C          AND     TERM_MODE,NOT T_HOST ; INDICATE TERMINAL IS IN PC MODE
1310                          C
1311                          C   ;   PUT THE DISPLAY INTO PERSONAL COMPUTER MODE
1312                          C   ;   THE 3278/3279 DISPLAY WILL SHOW THE SCREEN IMAGE FROM THE
1313                          C   ;      PERSONAL COMPUTER
1314                          C
1315   035F                   C   SET_MODE_DISPLAY_PC:
1316   035F  BA 03E3           C          MOV     DX,CMD_8255    ; SWITCH THE DISPLAY TO PERSONAL
1317   0362  B0 0E             C          MOV     AL,PC_MODE     ;   COMPUTE MODE
1318   0364  EE                C          OUT     DX,AL
1319                          C
1320   0365  EB AA             C          JMP     BIOS_EXIT      ; RETURN TO CALLER
1321                          C
1322                          C
1323                          C
1324                          C   ;**************************************************************
1325                          C   ;*                                                              *
1326                          C   ;*  Procedure Name: SEND_KEYSTROKES                             *
1327                          C   ;*                                                              *
1328                          C   ;*  Function: To send a series of keystrokes to the 3278/3279   *
1329                          C   ;*                                                              *
1330                          C   ;*  Input:                                                      *
1331                          C   ;*                                                              *
1332                          C   ;*     BX:DX = address of encoded keystrokes                    *
1333                          C   ;*     (CX)  = number of encoded keystrokes                     *
1334                          C   ;*                                                              *
1335                          C   ;*  Output: None                                                *
1336                          C   ;*                                                              *
1337                          C   ;**************************************************************
```

```
1338                                    C
1339    0367                            C   SEND_KEYSTROKES:
1340    0367  F6 06 0000 R 02           C           TEST    FBA_STATE,F_ENABLED  ; IS THE FEATURE BUS ENABLED?
1341    036C  75 09                     C           JNZ     SEND_KEYSTROKES_3    ; YES, INSURE KEYSTROKES ARE RECEIVED
1342                                    C
1343    036E  E8 0000 E                 C           CALL    SEND_ENCODED_KEYSTROKES_TO_3278 ; DECODE AND SEND
1344                                    C                                        ;   KEYSTROKES
1345    0371  72 02                     C           JC      SEND_KEYSTROKES_2    ; INVALID KEYSTROKE ENCODING
1346                                    C
1347    0373                            C   SEND_KEYSTROKES_1:
1348    0373  EB 9C                     C           JMP     BIOS_EXIT            ; KEYSTROKES WERE VALID
1349                                    C
1350    0375                            C   SEND_KEYSTROKES_2:
1351    0375  EB 96                     C           JMP     BIOS_ERROR           ; KEYSTROKES WERE INVALID
1352                                    C
1353    0377                            C   SEND_KEYSTROKES_3:
1354    0377  8E C3                     C           MOV     ES,BX                ; FIND THE FIRST ENCODED KEYSTROKE
1355    0379  8B F2                     C           MOV     SI,DX
1356    037B  26: 8A 04                 C           MOV     AL,ES:[SI]
1357    037E  3C 88                     C           CMP     AL,88H               ; IS IT THE RESET KEY?
1358    0380  74 15                     C           JE      SEND_KEYSTROKES_4    ; YES, RESET SHOULD UNLOCK THE
1359                                    C                                        ;   KEYBOARD IF IT IS LOCKED
1360                                    C
1361    0382  E8 03C9 R                 C           CALL    QUERY_KBD_STATE      ; GET CURRENT KEYBOARD STATE
1362                                    C
1363    0385  51                        C           PUSH    CX
1364    0386  B9 681A                   C           MOV     CX,DELAY_100_MS      ; WAIT FOR 100 MILLISECONDS
1365    0389  E2 FE                     C           LOOP    $
1366    038B  59                        C           POP     CX
1367                                    C
1368    038C  3C 00                     C           CMP     AL,RC_OK             ; WAS QUERY ACCEPTED BY THE 3274?
1369    038E  75 E5                     C           JNE     SEND_KEYSTROKES_2    ; NO, INFORM USER OF THE PROBLEM
1370    0390  80 3E 005C R 00           C           CMP     KBD_STATE,00H        ; YES, IS KEYBOARD UNLOCKED?
1371    0395  75 25                     C           JNE     SEND_KEYSTROKES_5    ; NO, KEYBOARD IS LOCKED
1372                                    C
1373    0397                            C   SEND_KEYSTROKES_4:
1374    0397  E8 0000 E                 C           CALL    SEND_ENCODED_KEYSTROKES_TO_3278 ; DECODE AND SEND
1375                                    C                                        ;   KEYSTROKES
1376    039A  72 D9                     C           JC      SEND_KEYSTROKES_2    ; INVALID KEYSTROKE ENCODING
1377                                    C
1378    039C  B9 0A69                   C           MOV     CX,DELAY_100_MS/10   ; WAIT FOR 10 MILLISECONDS
1379    039F  E2 FE                     C           LOOP    $
1380                                    C
1381    03A1  E8 03C9 R                 C           CALL    QUERY_KBD_STATE      ; GET NEW KEYBOARD STATE
1382    03A4  3C 00                     C           CMP     AL,RC_OK             ; WAS QUERY ACCEPTED BY 3274?
1383    03A6  75 CD                     C           JNE     SEND_KEYSTROKES_2    ; NO, INFORM USER OF THE PROBLEM
1384    03A8  80 3E 005C R 00           C           CMP     KBD_STATE,00H        ; IS THE KEYBOARD INHIBITED?
1385    03AD  74 C4                     C           JE      SEND_KEYSTROKES_1    ; YES, RETURN TO CALLER
1386                                    C
1387    03AF  B0 0C                     C           MOV     AL,RC_AID_SENT       ; INDICATE AID IS NOW PENDING
1388    03B1  80 3E 005C R C0           C           CMP     KBD_STATE,0C0H       ; IS THE KEYBOARD INHIBITED BECAUSE OF
1389                                    C                                        ;   AN ATTENTION INTERRUPT?
1390    03B6  74 BD                     C           JE      SEND_KEYSTROKES_2    ; YES, RETURN TO CALLER
1391    03B8  B0 0D                     C           MOV     AL,RC_MESSAGE_LOST   ; NO, INDICATE PART OF THE MESSAGE
1392                                    C                                        ;   WAS LOST DURING TRANSMISSION
1393    03BA  EB B9                     C           JMP     SEND_KEYSTROKES_2    ; RETURN TO CALLER
1394                                    C
1395                                    C
1396    03BC                            C   SEND_KEYSTROKES_5:
1397    03BC  B0 0A                     C           MOV     AL,RC_AID_PENDING    ; INDICATE AID IS PENDING
1398    03BE  80 3E 005C R C0           C           CMP     KBD_STATE,0C0H       ; IS THE KEYBOARD INHIBITED BECAUSE OF
1399                                    C                                        ;   A PREVIOUS ATTENTION INTERRUPT?
1400    03C3  74 B0                     C           JE      SEND_KEYSTROKES_2    ; YES, RETURN TO CALLER
1401    03C5  B0 0B                     C           MOV     AL,RC_KEYBOARD_INHIBITED ; NO, INDICATE KEYBOARD IS
1402                                    C                                        ;   INHIBITED FOR ANOTHER REASON
1403    03C7  EB AC                     C           JMP     SEND_KEYSTROKES_2    ; RETURN TO CALLER
1404                                    C
1405                                    C
1406                                    C
1407                                    C   ;**********************************************************
1408                                    C   ;*
1409                                    C   ;* Procedure Name: QUERY_KBD_STATE
1410                                    C   ;*
1411                                    C   ;* Function: To get the current keyboard state from the 3274
1412                                    C   ;*
1413                                    C   ;* Input: None
1414                                    C   ;*
1415                                    C   ;* Output:
1416                                    C   ;*
1417                                    C   ;*    AH is unpredictable
1418                                    C   ;*    (AL) = error code
1419                                    C   ;*    KBD_STATE = current keyboard state
1420                                    C   ;*
1421                                    C   ;**********************************************************
1422                                    C
1423    03C9                            C   QUERY_KBD_STATE PROC NEAR
1424                                    C
1425    03C9  51                        C           PUSH    CX                   ; SAVE WORK REGISTERS
1426    03CA  52                        C           PUSH    DX
1427                                    C
1428    03CB  1E                        C           PUSH    DS
1429    03CC  B4 02                     C           MOV     AH,FUNC_SET_INT_VECTOR ; INITIALIZE QUERY KEYBOARD
1430    03CE  B0 03                     C           MOV     AL,VECTOR_QUERY_KBD_STATE ; STATE INTERRUPT VECTOR
1431    03D0  BA 0410 R                 C           MOV     DX,OFFSET QUERY_STATE_INT_HAND
1432    03D3  0E                        C           PUSH    CS
```

```
1433    03D4  1F                    C         POP     DS
1434    03D5  CD 50                 C         INT     NDSP_INT_CODE
1435    03D7  1F                    C         POP     DS
1436                                C
1437    03D8  B4 04                 C         MOV     AH,FUNC_SET_BUFFER_ADDRESS ; INITIALIZE QUERY KEYBOARD
1438    03DA  B0 03                 C         MOV     AL,VECTOR_QUERY_KBD_STATE ; STATE INPUT BUFFER ADDRESS
1439    03DC  8D 16 005C R          C         LEA     DX,KBD_STATE
1440    03E0  B9 0001               C         MOV     CX,1
1441    03E3  CD 50                 C         INT     NDSP_INT_CODE
1442                                C
1443    03E5  80 0E 0000 R 10       C         OR      FBA_STATE,F_QUERY_IN_PROGRESS ; INDICATE QUERY KEYBOARD
1444                                C                                                ; STATE IS IN PROGRESS
1445                                C
1446    03EA  B4 05                 C         MOV     AH,FUNC_SEND_MESSAGE ; SEND THE DUMMY QUERY KEYBOARD
1447    03EC  B0 03                 C         MOV     AL,VECTOR_QUERY_KBD_STATE ;   MESSAGE TO THE 3274
1448    03EE  B9 0001               C         MOV     CX,1
1449    03F1  8D 16 005B R          C         LEA     DX,QUERY_KBD_STATE_MSG
1450    03F5  CD 50                 C         INT     NDSP_INT_CODE
1451    03F7  72 0A                 C         JC      QUERY_KBD_STATE_2 ; ERROR WHILE SENDING MESSAGE
1452                                C
1453    03F9                        C QUERY_KBD_STATE_1:
1454    03F9  F6 06 0000 R 10       C         TEST    FBA_STATE,F_QUERY_IN_PROGRESS ; WAIT FOR QUERY REPLY
1455    03FE  75 F9                 C         JNZ     QUERY_KBD_STATE_1 ;   TO BE RECEIVED
1456                                C
1457    0400  A0 005D R             C         MOV     AL,QUERY_RC       ; SET UP RETURN CODE FOR CALLER
1458                                C
1459    0403                        C QUERY_KBD_STATE_2:
1460    0403  8A C8                 C         MOV     CL,AL             ; SAVE RETURN CODE
1461                                C
1462    0405  B4 03                 C         MOV     AH,FUNC_RESET_INT_VECTOR ; RESET QUERY KEYBOARD
1463    0407  B0 03                 C         MOV     AL,VECTOR_QUERY_KBD_STATE ; STATE INTERRUPT VECTOR
1464    0409  CD 50                 C         INT     NDSP_INT_CODE
1465                                C
1466    040B  8A C1                 C         MOV     AL,CL             ; RESTORE RETURN CODE
1467    040D  5A                    C         POP     DX                ; RESTORE WORK REGISTERS
1468    040E  59                    C         POP     CX
1469    040F  C3                    C         RET                       ; RETURN TO CALLER
1470                                C
1471    0410                        C QUERY_KBD_STATE ENDP
1472                                C
1473                                C
1474                                C
1475                                C ;*********************************************************************
1476                                C ;*                                                                   *
1477                                C ;* Procedure Name: QUERY_STATE_INT_HAND                               *
1478                                C ;*                                                                   *
1479                                C ;* Function: To process a Query Keyboard State reply interrupt       *
1480                                C ;*                                                                   *
1481                                C ;* Input:                                                             *
1482                                C ;*                                                                   *
1483                                C ;*    (AH) = reason interrupt handler was entered                    *
1484                                C ;*                                                                   *
1485                                C ;* Output:                                                            *
1486                                C ;*                                                                   *
1487                                C ;*    QUERY_RC = return code                                          *
1488                                C ;*    KBD_STATE = current keyboard state                              *
1489                                C ;*                                                                   *
1490                                C ;*********************************************************************
1491                                C
1492    0410                        C QUERY_STATE_INT_HAND PROC FAR
1493    0410  BB ---- R             C         MOV     BX,BIOSDATA       ; ESTABLISH ADDRESSABILITY TO DATA AREA
1494    0413  8E DB                 C         MOV     DS,BX
1495                                C
1496    0415  C6 06 005D R 00       C         MOV     QUERY_RC,RC_OK    ; SET UP RETURN CODE
1497    041A  80 FC 01              C         CMP     AH,REASON_MESSAGE_RECEIVED ; IS THIS THE REPLY?
1498    041D  74 0F                 C         JE      QUERY_STATE_INT_HAND_1 ; YES, RETURN TO CALLER
1499    041F  C6 06 005D R 06       C         MOV     QUERY_RC,RC_POWER_ON_RESET ; NO, SEE WHAT IT IS
1500    0424  80 FC 02              C         CMP     AH,REASON_POWER_ON_RESET ; IS THIS A POWER ON RESET?
1501    0427  74 05                 C         JE      QUERY_STATE_INT_HAND_1 ; YES, RETURN TO CALLER
1502    0429  C6 06 005D R 07       C         MOV     QUERY_RC,RC_PROTOCOL_VIOLATION ; NO, SOME OTHER ERROR
1503                                C
1504    042E                        C QUERY_STATE_INT_HAND_1:
1505    042E  80 26 0000 R EF       C         AND     FBA_STATE,NOT F_QUERY_IN_PROGRESS ; INDICATE QUERY KBD
1506                                C                                                   ; STATE REPLY WAS RECEIVED
1507    0433  CB                    C         RET                       ; RETURN TO BIOS
1508                                C
1509    0434                        C QUERY_STATE_INT_HAND ENDP
1510                                C
1511                                C         INCLUDE NDSPAPI2.ASM
1512                                C
1513                                C
1514                                C
1515                                C ;*********************************************************************
1516                                C ;*                                                                   *
1517                                C ;* Procedure Name: RESET_INTERRUPT_VECTOR                             *
1518                                C ;*                                                                   *
1519                                C ;* Function: To reset a 3276/3279 Attachment interrupt vector        *
1520                                C ;*                                                                   *
1521                                C ;* Input:                                                             *
1522                                C ;*                                                                   *
1523                                C ;*    (AL) = interrupt vector code                                    *
1524                                C ;*                                                                   *
1525                                C ;* Output:                                                            *
```

```
1526                    C  ;*
1527                    C  ;*     BX and DX = 0                                                *
1528                    C  ;*                                                                  *
1529                    C  ;**********************************************************************
1530                    C
1531    0434            C  RESET_INTERRUPT_VECTOR:
1532    0434  33 DB     C          XOR     BX,BX            ; SET INTERRUPT HANDLER ADDRESS TO ZERO
1533    0436  33 D2     C          XOR     DX,DX
1534                    C
1535                    C  ;**********************************************************************
1536                    C  ;*                                                                  *
1537                    C  ;*  Procedure Name: SET_INTERRUPT_VECTOR                            *
1538                    C  ;*                                                                  *
1539                    C  ;*  Function: To set a 3278/3279 Attachment interrupt vector        *
1540                    C  ;*                                                                  *
1541                    C  ;*  Input:                                                          *
1542                    C  ;*                                                                  *
1543                    C  ;*     (AL) = interrupt vector code                                 *
1544                    C  ;*     BX:DX = address of interrupt handler                         *
1545                    C  ;*                                                                  *
1546                    C  ;*  Output: None                                                    *
1547                    C  ;*                                                                  *
1548                    C  ;**********************************************************************
1549                    C
1550    0438            C  SET_INTERRUPT_VECTOR:
1551    0438  E8 0664 R C          CALL    FIND_VECTOR      ; IDENTIFY WHICH VECTOR IS TO BE CHANGED
1552    043B  73 03     C          JNC     SET_VECTOR_1     ; VECTOR WAS FOUND
1553    043D  E9 030D R C          JMP     BIOS_ERROR       ; ERROR - INVALID VECTOR WAS SPECIFIED
1554    0440            C  SET_VECTOR_1:
1555                    C
1556    0440  FA        C          CLI                      ; TURN OFF INTERRUPTS SO WE ARE NOT
1557                    C                                   ;   DISTURBED WHILE CHANGING THE VECTOR
1558    0441  89 15     C          MOV     WORD PTR [DI].INTERRUPT_VECTOR,DX ; SAVE ADDRESS OF
1559    0443  89 5D 02  C          MOV     WORD PTR [DI].INTERRUPT_VECTOR+2,BX ; INTERRUPT HANDLER
1560                    C
1561    0446  C7 45 04 0000 C      MOV     WORD PTR [DI].BUFFER_ADDRESS,0 ; CLEAR ADDRESS OF
1562    044B  C7 45 06 0000 C      MOV     WORD PTR [DI].BUFFER_ADDRESS+2,0 ; INPUT BUFFER
1563                    C
1564    0450  FB        C          STI                      ; ALLOW INTERRUPTS NOW
1565                    C
1566    0451  0B DB     C          OR      BX,BX            ; IS THERE AN INTERRUPT HANDLER?
1567    0453  74 10     C          JZ      SET_VECTOR_2     ; NO, THIS IS A RESET REQUEST
1568                    C
1569    0455  E8 029A R C          CALL    WAIT_FOR_POLL_ACK ; WAIT FOR THE PREVIOUS POLL REQUEST
1570                    C                                   ;   TO BE ACKNOWLEDGED
1571    0458  BA 03E4   C          MOV     DX,COMMAND_PORT  ; SIGNAL IPL COMPLETE TO THE 3274
1572    045B  B0 0D     C          MOV     AL,IPL_COMPLETE
1573    045D  EE        C          OUT     DX,AL
1574    045E  80 0E 0000 R 02 C    OR      FBA_STATE,F_ENABLED ; INDICATE FEATURE BUS IS ENABLED
1575    0463  EB 1C     C          JMP     SHORT SET_VECTOR_4 ; RETURN TO CALLER
1576                    C
1577    0465            C  SET_VECTOR_2:
1578    0465  8B 16 0011 R C       MOV     DX,DATA_XFER_VECTOR.INTERRUPT_VECTOR+2 ; IS THERE STILL
1579    0469  0B 16 0022 R C       OR      DX,SCREEN_CAPTURE_VECTOR.INTERRUPT_VECTOR+2 ; AN ACTIVE
1580    046D  0B 16 0033 R C       OR      DX,WRAP_TEST_VECTOR.INTERRUPT_VECTOR+2 ; INTERRUPT
1581    0471  75 0E     C          JNZ     SET_VECTOR_4     ; HANDLER?
1582                    C
1583                    C                                   ; NO, DISABLE THE FEATURE BUS INTERFACE
1584    0473  E8 029A R C          CALL    WAIT_FOR_POLL_ACK ; WAIT FOR THE PREVIOUS POLL REQUEST
1585                    C                                   ;   TO BE ACKNOWLEDGED
1586                    C
1587    0476  BA 03E4   C          MOV     DX,COMMAND_PORT  ; DISABLE 3278/3279 ATTACHMENT
1588    0479  B0 0C     C          MOV     AL,RESET_IPL_COMPLETE ; OPTION FEATURE BUS INTERFACE
1589    047B  EE        C          OUT     DX,AL
1590    047C  80 26 0000 R FD C    AND     FBA_STATE,NOT F_ENABLED ; INDICATE FEATURE BUS IS
1591                    C                                   ;     NOT ENABLED
1592                    C
1593                    C
1594    0481            C  SET_VECTOR_4:
1595    0481  E9 0311 R C          JMP     BIOS_EXIT        ; RETURN TO CALLER
1596                    C
1597                    C          Page
1598                    C
1599                    C  ;**********************************************************************
1600                    C  ;*                                                                  *
1601                    C  ;*  Procedure Name: SET_BUFFER_ADDRESS                              *
1602                    C  ;*                                                                  *
1603                    C  ;*  Function: To set an input buffer address                        *
1604                    C  ;*                                                                  *
1605                    C  ;*  Input:                                                          *
1606                    C  ;*                                                                  *
1607                    C  ;*     (AL) = interrupt vector code                                 *
1608                    C  ;*     BX:DX = address of input buffer                              *
1609                    C  ;*                                                                  *
1610                    C  ;*  Output: None                                                    *
1611                    C  ;*                                                                  *
1612                    C  ;**********************************************************************
1613                    C
1614    0484            C  SET_BUFFER_ADDRESS:
1615    0484  E8 0664 R C          CALL    FIND_VECTOR      ; IDENTIFY WHICH INPUT BUFFER IS BEING
1616                    C                                   ;   SPECIFIED
1617    0487  73 03     C          JNC     SET_BUFFER_ADDRESS_1 ; VALID IDENTIFIER
1618    0489  E9 030D R C          JMP     BIOS_ERROR       ; ERROR - INVALID BUFFER IDENTIFIER
1619                    C
```

```
1620   048C                         C    SET_BUFFER_ADDRESS_1:
1621   048C  83 7D 02 00            C            CMP     WORD PTR [DI].INTERRUPT_VECTOR+2,0 ; IS THERE AN
1622                                C                                            ;  INTERRUPT HANDLER FOR THIS TYPE OF
1623                                C                                            ;  INPUT?
1624   0490  75 05                  C            JNE     SET_BUFFER_ADDRESS_2 ; YES, CONTINUE
1625   0492  B0 05                  C            MOV     AL,RC_INVALID_VECTOR ; INDICATE INVALID BUFFER TYPE
1626   0494  E9 030D R              C            JMP     BIOS_ERROR
1627                                C
1628   0497                         C    SET_BUFFER_ADDRESS_2:
1629   0497  0B C9                  C            OR      CX,CX           ; IS THIS A ZERO LENGTH BUFFER?
1630   0499  75 04                  C            JNZ     SET_BUFFER_ADDRESS_3 ; NO, CONTINUE
1631   049B  8B D1                  C            MOV     DX,CX           ; YES, ASSUME NO BUFFER WAS SPECIFIED
1632   049D  8B D9                  C            MOV     BX,CX
1633                                C
1634   049F                         C    SET_BUFFER_ADDRESS_3:
1635   049F  FA                     C            CLI                     ; DISABLE INTERRUPTS SO WE ARE NOT
1636                                C                                    ;  DISTURBED WHILE CHANGING THE
1637                                C                                    ;  BUFFER ADDRESS
1638                                C
1639   04A0  89 55 04               C            MOV     WORD PTR [DI].BUFFER_ADDRESS,DX ; SAVE THE ADDRESS
1640   04A3  89 5D 06               C            MOV     WORD PTR [DI].BUFFER_ADDRESS+2,BX ; OF THE INPUT BUFFER
1641   04A6  89 4D 08               C            MOV     [DI].BUFFER_LENGTH,CX ; SAVE THE LENGTH OF THE BUFFER
1642   04A9  E8 C2C2 R              C            CALL    RESET_BUFFER_COUNTS ; RESET THE RECEIVED DATA COUNTS
1643                                C
1644   04AC  FB                     C            STI                     ; ALLOW INTERRUPTS TO BE PROCESSED
1645                                C
1646   04AD  0B DB                  C            OR      BX,BX           ; IS THERE A BUFFER?
1647   04AF  74 0F                  C            JZ      SET_BUFFER_ADDRESS_4 ; NO, CONTINUE
1648   04B1  80 7D 0E 04            C            CMP     [DI].MESSAGE_TYPE,HT_SET_SC_OPTIONS ; IS THIS THE SCREI
1649                                C                                    ; CAPTURE BUFFER?
1650   04B5  75 09                  C            JNE     SET_BUFFER_ADDRESS_4 ; NO, CONTINUE
1651                                C
1652   04B7  E8 029A R              C            CALL    WAIT_FOR_POLL_ACK ; WAIT FOR THE PREVIOUS POLL REQUEST
1653                                C                                    ;  TO BE ACKNOWLEDGED
1654   04BA  BA 03E4                C            MOV     DX,COMMAND_PORT ; YES, INDICATE SCREEN CAPTURE
1655   04BD  B0 04                  C            MOV     AL,SCREEN_CAPTURE_COMPLETE ;  PROCESSING IS COMPLETE
1656   04BF  EE                     C            OUT     DX,AL
1657                                C
1658   04C0                         C    SET_BUFFER_ADDRESS_4:
1659   04C0  E9 0311 R              C            JMP     BIOS_EXIT       ; RETURN TO CALLER
1660                                C
1661                                C            Page
1662                                C
1663                                C    ;***********************************************************************
1664                                C    ;*                                                                     *
1665                                C    ;*  Procedure Name: SEND_MESSAGE                                       *
1666                                C    ;*                                                                     *
1667                                C    ;*  Function: To send a message to the 3274 via the feature bus        *
1668                                C    ;*                                                                     *
1669                                C    ;*  Input:                                                             *
1670                                C    ;*                                                                     *
1671                                C    ;*    (AL) = interrupt vector code                                     *
1672                                C    ;*    BX:DX = address of message                                       *
1673                                C    ;*    (CX) = length of message                                         *
1674                                C    ;*                                                                     *
1675                                C    ;*  Output: None                                                       *
1676                                C    ;*                                                                     *
1677                                C    ;***********************************************************************
1678                                C
1679   04C3                         C    SEND_MESSAGE:
1680   04C3  E8 0664 R              C            CALL    FIND_VECTOR     ; IDENTIFY THE TYPE OF MESSAGE TO BE SENT
1681   04C6  73 03                  C            JNC     SEND_MESSAGE_0  ; VALID MESSAGE TYPE
1682   04C8  E9 030D R              C            JMP     BIOS_ERROR      ; ERROR - INVALID MESSAGE TYPE
1683                                C
1684   04CB                         C    SEND_MESSAGE_0:
1685   04CB  83 7D 02 00            C            CMP     WORD PTR [DI].INTERRUPT_VECTOR+2,0 ; IS THERE AN
1686                                C                                    ;  INTERRUPT HANDLER FOR THIS TYPE OF
1687                                C                                    ;  INPUT?
1688   04CF  75 05                  C            JNE     SEND_MESSAGE_00 ; YES, CONTINUE
1689   04D1  B0 05                  C            MOV     AL,RC_INVALID_VECTOR ; INDICATE INVALID BUFFER TYPE
1690   04D3  E9 030D R              C            JMP     BIOS_ERROR
1691                                C
1692   04D6                         C    SEND_MESSAGE_00:
1693   04D6  0B C9                  C            OR      CX,CX           ; IS THE MESSAGE LENGTH VALID?
1694   04D8  75 05                  C            JNZ     SEND_MESSAGE_1  ; YES, CONTINUE
1695                                C
1696   04DA  B0 07                  C            MOV     AL,RC_PROTOCOL_VIOLATION ; NO, INVALID MESSAGE LENGTH
1697   04DC  E9 030D R              C            JMP     BIOS_ERROR
1698                                C
1699   04DF                         C    SEND_MESSAGE_1:
1700                                C            ASSUME  ES:FBA_BUFFER   ; ESTABLISH ADDRESSABILITY TO THE BUFFER
1701   04DF  B8 ---- R              C            MOV     AX,FBA_BUFFER   ;  ON THE FEATURE BUS ADAPTER
1702   04E2  8E C0                  C            MOV     ES,AX
1703                                C
1704   04E4  89 16 0002 R           C            MOV     FBA_MESSAGE_START,DX ; SAVE ADDRESS OF MESSAGE
1705   04E8  89 1E 0004 R           C            MOV     FBA_MESSAGE_START+2,BX
1706   04EC  89 0E 0006 R           C            MOV     FBA_MESSAGE_SIZE,CX ; SAVE LENGTH OF MESSAGE
1707   04F0  8A 45 0E               C            MOV     AL,[DI].MESSAGE_TYPE ; SAVE MESSAGE TYPE
1708   04F3  A2 000E R              C            MOV     FBA_MESSAGE_TYPE,AL
1709   04F6  89 3E 0053 R           C            MOV     FBA_SEND_VECTOR,DI ; SAVE INTERRUPT VECTOR ADDRESS
1710                                C
1711   04FA                         C    RESTART_SEND_1:
1712   04FA  C6 06 0001 R 00        C            MOV     FBA_PENDING_OP,0 ; INDICATE NO OPERATIONS ARE PENDING
1713   04FF  80 0E 0000 R 80        C            OR      FBA_STATE,F_READ_PENDING ; INDICATE READ IS PENDING
```

```
1714                               c
1715    0504  E8 029A R            c           CALL    WAIT_FOR_POLL_ACK ; WAIT FOR THE PREVIOUS POLL REQUEST
1716                               c                                   ;   TO BE ACKNOWLEDGED
1717    0507  BA 03E4              c           MOV     DX,COMMAND_PORT ; REQUEST A READ FROM THE 3274
1718    050A  B0 03                c           MOV     AL,READ_REQUEST
1719    050C  EE                   c           OUT     DX,AL
1720                               c
1721    050D                       c   RESTART_SEND_2:
1722    050D  8B 16 0002 R         c           MOV     DX,FBA_MESSAGE_START ; SET UP TO TRANSMIT MESSAGE
1723    0511  89 16 0008 R         c           MOV     FBA_MESSAGE,DX  ;  TO THE 3274
1724    0515  8B 16 0004 R         c           MOV     DX,FBA_MESSAGE_START+2
1725    0519  89 16 000A R         c           MOV     FBA_MESSAGE+2,DX
1726    051D  8B 0E 0006 R         c           MOV     CX,FBA_MESSAGE_SIZE
1727    0521  89 0E 000C R         c           MOV     FBA_MESSAGE_LENGTH,CX
1728                               c
1729    0525  E8 05A6 R            c           CALL    WAIT_FOR_READ  ; WAIT FOR THE 3274 TO ACKNOWLEDGE THE
1730                               c                                  ;   REQUEST FOR A READ SEQUENCE
1731                               c
1732    0528  26: C6 06 0003 R 80  c           MOV     HDR_FLAGS,HDR_F_START ; INDICATE START OF MESSAGE
1733                               c
1734    052E                       c   SEND_MESSAGE_2:
1735    052E  8B 0E 000C R         c           MOV     CX,FBA_MESSAGE_LENGTH ; PICK UP REMAINING MESSAGE LENGT
1736                               c
1737    0532  81 F9 00FC           c           CMP     CX,SIZE HDR_DATA ; WE CAN ONLY SEND 252 BYTES PER BLOCK
1738    0536  76 03                c           JNA     SEND_MESSAGE_3
1739    0538  B9 00FC              c           MOV     CX,SIZE HDR_DATA
1740                               c
1741    053B                       c   SEND_MESSAGE_3:
1742    053B  29 0E 000C R         c           SUB     FBA_MESSAGE_LENGTH,CX ; UPDATE REMAINING MESSAGE LENGTH
1743    053F  75 06                c           JNZ     SEND_MESSAGE_4 ; THIS IS NOT THE LAST BLOCK OF THE MSG
1744    0541  26: 80 0E 0003 R 40  c           OR      HDR_FLAGS,HDR_F_END ; INDICATE LAST BLOCK OF MESSAGE
1745                               c
1746    0547                       c   SEND_MESSAGE_4:
1747    0547  86 E9                c           XCHG    CH,CL
1748    0549  26: 89 0E 0000 R     c           MOV     HDR_LENGTH,CX  ; PUT BLOCK LENGTH INTO HEADER
1749    054E  A0 000E R            c           MOV     AL,FBA_MESSAGE_TYPE ; PUT MESSAGE TYPE INTO HEADER
1750    0551  26: A2 0002 R        c           MOV     HDR_TYPE,AL
1751    0555  86 E9                c           XCHG    CH,CL
1752                               c
1753    0557  8C DB                c           MOV     BX,DS          ; SAVE DATA SEGMENT POINTER
1754    0559  C5 36 0008 R         c           LDS     SI,FBA_MESSAGE ; POINT TO MESSAGE TEXT
1755    055D  26: 8D 3E 0004 R     c           LEA     DI,HDR_DATA    ; POINT TO DATA AREA IN BUFFER
1756    0562  FC                   c           CLD                    ; MOVE MESSAGE TO BUFFER
1757    0563  F3/ A4               c           REP     MOVSB
1758    0565  8E DB                c           MOV     DS,BX          ; RESTORE DATA SEGMENT POINTER
1759    0567  89 36 0008 R         c           MOV     FBA_MESSAGE,SI ; UPDATE MESSAGE STARTING ADDRESS
1760                               c
1761    056B  E8 029A R            c           CALL    WAIT_FOR_POLL_ACK ; WAIT FOR THE PREVIOUS POLL REQUEST
1762                               c                                   ;   TO BE ACKNOWLEDGED
1763    056E  BA 03E4              c           MOV     DX,COMMAND_PORT ; INDICATE THAT THE BUFFER MAY NOW BE
1764    0571  B0 02                c           MOV     AL,READ_COMPLETE ;  READ BY THE 3274
1765    0573  EE                   c           OUT     DX,AL
1766                               c
1767    0574  F6 06 0000 R 08      c           TEST    FBA_STATE,F_DEFERRED_CANCEL ; SHOULD THIS MESSAGE BE
1768                               c                                              ;              CANCELLED?
1769    0579  74 11                c           JZ      SEND_MESSAGE_5 ; NO, CONTINUE
1770    057B  83 3E 000C R 00      c           CMP     FBA_MESSAGE_LENGTH,0 ; YES, WAS THE ENTIRE MESSAGE SENT
1771    0580  75 0A                c           JNZ     SEND_MESSAGE_5 ; NO, CONTINUE
1772                               c
1773    0582  80 26 0000 R 3F      c           AND     FBA_STATE,NOT (F_READ_PENDING OR F_READ_IN_PROGRESS)
1774    0587  B0 08                c           MOV     AL,RC_MESSAGE_CANCELLED ; INDICATE MESSAGE CANCELLED
1775    0589  E9 030D R            c           JMP     BIOS_ERROR     ; RETURN TO APPLICATION PROGRAM
1776                               c
1777    058C                       c   SEND_MESSAGE_5:
1778    058C  E8 05A6 R            c           CALL    WAIT_FOR_READ  ; WAIT FOR THE 3274 TO START THE NEXT
1779                               c                                  ;   READ SEQUENCE OR TO SIGNAL END OF
1780                               c                                  ;   MESSAGE
1781                               c
1782    058F  F6 06 0001 R 20      c           TEST    FBA_PENDING_OP,F_EXECUTE ; IS THIS THE END OF THE
1783                               c                                            ;   MESSAGE?
1784    0594  75 08                c           JNZ     SEND_MESSAGE_6 ; YES, THE ENTIRE MESSAGE HAS BEEN
1785                               c                                  ;   RECEIVED BY THE 3274
1786                               c
1787    0596  26: C6 06 0003 R 00  c           MOV     HDR_FLAGS,0    ; CLEAR START AND END BLOCK FLAGS
1788    059C  EB 90                c           JMP     SEND_MESSAGE_2 ; SEND NEXT BLOCK TO THE 3274
1789                               c
1790    059E                       c   SEND_MESSAGE_6:
1791    059E  80 26 0000 R 7F      c           AND     FBA_STATE,NOT F_READ_PENDING ; INDICATE THE READ HAS
1792                               c                                                ;  BEEN COMPLETED
1793                               c
1794    05A3  E9 0311 R            c           JMP     BIOS_EXIT      ; RETURN TO CALLER
1795                               c
1796                               c           ASSUME  ES:NOTHING
1797                               c
1798                               c   ;       WAIT FOR THE 3274 TO SEND A START OPERATION COMMAND
1799                               c
1800    05A6                       c   WAIT_FOR_READ PROC NEAR
1801    05A6                       c   WAIT_FOR_READ_1:
1802    05A6  80 3E 0001 R 00      c           CMP     FBA_PENDING_OP,0 ; HAS A START OPERATION COMMAND BEEN
1803                               c                                    ;   RECEIVED?
1804    05AB  74 F9                c           JZ      WAIT_FOR_READ_1 ; NO, WAIT FOR THE START OP
1805                               c
1806    05AD  F6 06 0001 R 40      c           TEST    FBA_PENDING_OP,F_POR ; HAS A POWER ON RESET RECEIVED?
```

```
1807    05B2  74 0B                  C           JZ      WAIT_FOR_READ_2 ; NO, CONTINUE
1808                                 C
1809                                 C   ;       POWER ON RESET RECEIVED - THE READ SEQUENCE HAS BEEN CANCELLED
1810                                 C
1811    05B4  80 26 0000 R 7F        C           AND     FBA_STATE,NOT F_READ_PENDING ; READ SEQUENCE IS FINISHED
1812    05B9  58                     C           POP     AX              ; REMOVE RETURN ADDRESS FROM STACK
1813    05BA  B0 06                  C           MOV     AL,RC_POWER_ON_RESET ; INDICATE POWER ON RESET RECEIVED
1814    05BC  E9 030D R              C           JMP     BIOS_ERROR
1815                                 C
1816    05BF                         C   WAIT_FOR_READ_2:
1817    05BF  F6 06 0001 R 20        C           TEST    FBA_PENDING_OP,F_EXECUTE ; WAS AN EXECUTE RECEIVED?
1818    05C4  74 03                  C           JZ      WAIT_FOR_READ_3 ; NO, CONTINUE
1819                                 C
1820                                 C   ;       EXECUTE RECEIVED - THE ENTIRE MESSAGE HAS BEEN RECEIVED BY
1821                                 C   ;       THE 3274
1822                                 C
1823    05C6  EB 5D 90               C           JMP     WAIT_FOR_READ_8 ; RETURN TO CALLER
1824                                 C
1825    05C9                         C   WAIT_FOR_READ_3:
1826    05C9  F6 06 0001 R 10        C           TEST    FBA_PENDING_OP,F_ABORT_E ; WAS AN ABORT TRANSMISSION
1827                                 C                                   ;   RECEIVED?
1828    05CE  74 04                  C           JZ      WAIT_FOR_READ_4 ; NO, CONTINUE
1829                                 C
1830                                 C   ;       ABORT TRANSMISSION RECEIVED - RESTART THE ENTIRE TRANSMISSION
1831                                 C   ;       SEQUENCE
1832                                 C
1833    05D0  58                     C           POP     AX              ; REMOVE RETURN ADDRESS FROM THE STACK
1834    05D1  E9 04FA R              C           JMP     RESTART_SEND_1 ; RESTART THE READ SEQUENCE
1835                                 C
1836    05D4                         C   WAIT_FOR_READ_4:
1837    05D4  F6 06 0001 R 08        C           TEST    FBA_PENDING_OP,F_ABORT_V ; WAS AN ABORT TO LAST VERIFY
1838                                 C                                   ;   RECEIVED?
1839    05D9  74 09                  C           JZ      WAIT_FOR_READ_5 ; NO, CONTINUE
1840                                 C
1841                                 C   ;       ABORT TO LAST VERIFY RECEIVED - RETRANSMIT THE ENTIRE MESSAGE
1842                                 C
1843    05DB  80 26 0001 R F7        C           AND     FBA_PENDING_OP,NOT F_ABORT_V ; CLEAR START OP STATUS
1844    05E0  58                     C           POP     AX              ; REMOVE RETURN ADDRESS FROM THE STACK
1845    05E1  E9 050D R              C           JMP     RESTART_SEND_2 ; RETRANSMIT THE MESSAGE
1846                                 C
1847    05E4                         C   WAIT_FOR_READ_5:
1848    05E4  F6 06 0001 R 04        C           TEST    FBA_PENDING_OP,F_ERROR ; WAS AN ERROR RECEIVED?
1849    05E9  74 0B                  C           JZ      WAIT_FOR_READ_6 ; NO, CONTINUE
1850                                 C
1851                                 C   ;       ERROR RECEIVED - INDICATE PROTOCOL VIOLATION FOR THE MESSAGE
1852                                 C
1853    05EB  80 26 0000 R 7F        C           AND     FBA_STATE,NOT F_READ_PENDING ; READ SEQUENCE IS FINISHED
1854    05F0  58                     C           POP     AX              ; REMOVE RETURN ADDRESS FROM THE STACK
1855    05F1  B0 07                  C           MOV     AL,RC_PROTOCOL_VIOLATION ; INDICATE PROTOCOL VIOLATION
1856    05F3  E9 030D R              C           JMP     BIOS_ERROR      ; RETURN TO APPLICATION PROGRAM
1857                                 C
1858    05F6                         C   WAIT_FOR_READ_6:
1859    05F6  F6 06 0001 R 02        C           TEST    FBA_PENDING_OP,F_CANCEL ; DID THE USER REQUEST TO CANCEL
1860                                 C                                   ;   THIS MESSAGE
1861    05FB  74 28                  C           JZ      WAIT_FOR_READ_8 ; NO, CONTINUE
1862                                 C
1863                                 C   ;       THE APPLICATION PROGRAM CANCELLED THIS MESSAGE
1864                                 C
1865    05FD  FA                     C           CLI                     ; INSURE NO INTERRUPTS OCCUR WHILE
1866                                 C                                   ;   CHANGING STATE FLAGS
1867    05FE  80 26 0001 R FD        C           AND     FBA_PENDING_OP,NOT F_CANCEL ; INDICATE CANCEL PROCESSED
1868    0603  F6 06 0000 R 40        C           TEST    FBA_STATE,F_READ_IN_PROGRESS ; IS THE MESSAGE ALREADY
1869                                 C                                   ;   BEING TRANSMITTED TO THE 3274?
1870    0608  74 0F                  C           JZ      WAIT_FOR_READ_7 ; NO, THE MESSAGE CAN BE CANCELLED
1871    060A  83 3E 000C R 00        C           CMP     FBA_MESSAGE_LENGTH,0 ; WAS THE WHOLE MESSAGE ALREADY
1872                                 C                                   ;   SEND TO THE 3274?
1873    060F  74 08                  C           JZ      WAIT_FOR_READ_7 ; YES, THE MESSAGE CAN BE CANCELLED
1874                                 C
1875    0611  80 0E 0000 R 08        C           OR      FBA_STATE,F_DEFERRED_CANCEL ; NO, CAN'T CANCEL THE
1876    0616  FB                     C           STI                     ;   MESSAGE UNTIL THE ENTIRE MESSAGE HAS
1877                                 C                                   ;   BEEN SENT TO THE 3274
1878    0617  EB 8D                  C           JMP     WAIT_FOR_READ_1 ; WAIT FOR THE NEXT START OPERATION
1879                                 C
1880    0619                         C   WAIT_FOR_READ_7:
1881    0619  80 26 0000 R 3F        C           AND     FBA_STATE,NOT (F_READ_PENDING OR F_READ_IN_PROGRESS)
1882                                 C                                   ; READ SEQUENCE IS FINISHED
1883    061E  FB                     C           STI                     ; ENABLE INTERRUPTS AGAIN
1884    061F  58                     C           POP     AX              ; REMOVE RETURN ADDRESS FROM THE STACK
1885    0620  B0 08                  C           MOV     AL,RC_MESSAGE_CANCELLED ; INDICATE MESSAGE CANCELLED
1886    0622  E9 030D R              C           JMP     BIOS_ERROR      ; RETURN TO APPLICATION PROGRAM
1887                                 C
1888    0625                         C   WAIT_FOR_READ_8:
1889    0625  80 26 0001 R 7F        C           AND     FBA_PENDING_OP,NOT F_READ ; YES, CAN COMPLETE READ
1890                                 C                                   ;   SEQUENCE
1891                                 C
1892    062A  C3                     C           RET                     ; RETURN TO CALLER
1893    062B                         C   WAIT_FOR_READ ENDP
1894                                 C
1895                                 C
1896                                 C
```

```
1897      C  ;*****************************************************************
1898      C  ;*                                                               *
1899      C  ;*   Procedure Name: CANCEL_MESSAGE                              *
1900      C  ;*                                                               *
1901      C  ;*   Function: To cancel a message waiting to be sent to the 3274*
1902      C  ;*                                                               *
1903      C  ;*   Input:                                                      *
1904      C  ;*                                                               *
1905      C  ;*      (AL) = interrupt vector code                             *
1906      C  ;*                                                               *
1907      C  ;*   Output: None                                                *
1908      C  ;*                                                               *
1909      C  ;*****************************************************************
1910      C
1911  062B              C  CANCEL_MESSAGE:
1912  062B  E8 0664 R   C         CALL    FIND_VECTOR      ; IDENTIFY WHICH MESSAGE IS BEING
1913                    C                                  ;    SPECIFIED
1914  062E  73 03       C         JNC     CANCEL_MESSAGE_1 ; VALID IDENTIFIER
1915  0630  E9 0311 R   C         JMP     BIOS_EXIT        ; ERROR - INVALID MESSAGE IDENTIFIER
1916                    C
1917  0633              C  CANCEL_MESSAGE_1:
1918  0633 F6 06 0000 R 80 C      TEST    FBA_STATE,F_READ_PENDING ; IS A READ REQUEST PENDING?
1919  0636  74 0B       C         JZ      CANCEL_MESSAGE_2 ; NO, IGNORE CANCEL REQUEST
1920                    C
1921  063A  3B 3E 0053 R C        CMP     DI,FBA_SEND_VECTOR ; IS THIS MESSAGE STILL BEING SENT?
1922  063E  75 05       C         JNE     CANCEL_MESSAGE_2 ; NO, IT WAS ALREADY SENT TO THE 3274
1923                    C
1924  0640 80 0E 0001 R 02 C      OR      FBA_PENDING_OP,F_CANCEL ; YES, INDICATE THAT THE USER
1925                    C                                  ;    WANTS TO CANCEL THE MESSAGE
1926                    C
1927  0645              C  CANCEL_MESSAGE_2:
1928  0645  E9 0311 R   C         JMP     BIOS_EXIT        ; RETURN TO CALLER
1929                    C
1930                    C
1931                    C         INCLUDE NDSPAPI3.ASM
1932                    C
1933                    C
1934                    C  ;*****************************************************************
1935                    C  ;*
1936                    C  ;*   Procedure Name: MODIFY_XLAT_IN
1937                    C  ;*
1938                    C  ;*   Function: To modify the inbound keyboard translation table
1939                    C  ;*
1940                    C  ;*   Input:
1941                    C  ;*
1942                    C  ;*      (CH) = 3278/3279 relative key number
1943                    C  ;*      (CL) = 3278/3279 keyboard case
1944                    C  ;*      (DH) = Personal Computer keyboard scan code or BIOS function code
1945                    C  ;*      (DL) = Personal Computer keyboard case
1946                    C  ;*
1947                    C  ;*   Output:
1948                    C  ;*
1949                    C  ;*      (AL) = error code if parameters are invalid
1950                    C  ;*      CF   = 0 if parameters are valid
1951                    C  ;*             1 if parameters are invalid
1952                    C  ;*
1953                    C  ;*****************************************************************
1954                    C
1955  0648              C  MODIFY_XLAT_IN:
1956  0648  E8 0000 E   C         CALL    MOD_XLAT_IN      ; MODIFY KEYBOARD TRANSLATION TABLE
1957  064B  72 03       C         JC      MODIFY_XLAT_IN_1
1958  064D  E9 0311 R   C         JMP     BIOS_EXIT        ; PARAMETERS WERE VALID
1959  0650              C  MODIFY_XLAT_IN_1:
1960  0650  E9 030D R   C         JMP     BIOS_ERROR       ; PARAMETERS WERE INVALID
1961                    C
1962                    C  ;*****************************************************************
1963                    C  ;*
1964                    C  ;*   Procedure Name: MODIFY_XLAT_OUT
1965                    C  ;*
1966                    C  ;*   Function: To modify the outbound keyboard translation table
1967                    C  ;*
1968                    C  ;*   Input:
1969                    C  ;*
1970                    C  ;*      (CH) = encoded keystroke value
1971                    C  ;*      (DH) = 3278/3279 relative key number
1972                    C  ;*      (DL) = 3278/3279 keyboard case
1973                    C  ;*
1974                    C  ;*   Output:
1975                    C  ;*
1976                    C  ;*      (AL) = error code if parameters are invalid
1977                    C  ;*      CF   = 0 if parameters are valid
1978                    C  ;*             1 if parameters are invalid
1979                    C  ;*
1980                    C  ;*****************************************************************
1981                    C
1982  0653              C  MODIFY_XLAT_OUT:
1983  0653  E8 0000 E   C         CALL    MOD_XLAT_OUT     ; MODIFY KEYBOARD TRANSLATION TABLE
1984  0656  72 03       C         JC      MODIFY_XLAT_OUT_1
1985  0658  E9 0311 R   C         JMP     BIOS_EXIT        ; PARAMETERS WERE VALID
1986  065B              C  MODIFY_XLAT_OUT_1:
1987  065B  E9 030D R   C         JMP     BIOS_ERROR       ; PARAMETERS WERE INVALID
1988                    C
1989                    C  ;*****************************************************************
1990                    C  ;*
1991                    C  ;*   Procedure Name: QUERY_KEYBOARD_IDENTIFIER
```

```
1992                               C ;*
1993                               C ;*  Function: To return the identifier of the current keyboard
1994                               C ;*            translation table
1995                               C ;*
1996                               C ;*  Input: None
1997                               C ;*
1998                               C ;*  Output:
1999                               C ;*
2000                               C ;*     BX on stack = keyboard translation table identifier
2001                               C ;*
2002                               C ;*********************************************************
2003                               C
2004    065E                       C QUERY_KEYBOARD_IDENTIFIER:
2005    065E  E8 0000 E            C          CALL    QUERY_KEYBOARD_ID ; GET KEYBOARD TRANSLATION TABLE ID
2006    0661  E9 0311 R            C          JMP     EIOS_EXIT         ; RETURN TO CALLER
2007                               C
2008                               C
2009                               C
2010                               C ;*********************************************************
2011                               C ;*
2012                               C ;*  Procedure Name: FIND_VECTOR
2013                               C ;*
2014                               C ;*  Function: To find an interrupt vector
2015                               C ;*
2016                               C ;*  Input:
2017                               C ;*
2018                               C ;*     (AL) = interrupt vector code
2019                               C ;*
2020                               C ;*  Output:
2021                               C ;*
2022                               C ;*     (AL) = error code if interrupt vector code is invalid
2023                               C ;*     (DI) = address of interrupt vector
2024                               C ;*     CF   = 0 if interrupt vector code is valid
2025                               C ;*            1 if interrupt vector code is invalid or the feature
2026                               C ;*              bus adapter is inoperative
2027                               C ;*
2028                               C ;*********************************************************
2029                               C
2030    0664                       C FIND_VECTOR PROC NEAR
2031    0664  F6 06 0000 R 01      C          TEST    FBA_STATE,F_FBA_NOT_OP ; IS THE FEATURE BUS ADAPTER
2032                               C                                         ; OPERATIONAL?
2033    0669  74 05                C          JZ      FIND_VECTOR_1 ; YES, CONTINUE
2034                               C
2035    066B  B0 03                C          MOV     AL,RC_FBA_NOT_OP ; NO, INDICATE FBA IS INOPERATIVE
2036    066D  EB 23 90             C          JMP     FIND_VECTOR_2   ; RETURN TO CALLER
2037                               C
2038    0670                       C FIND_VECTOR_1:
2039    0670  8D 3E 000F R         C          LEA     DI,DATA_XFER_VECTOR ; SET UP PROPER INTERRUPT
2040    0674  0A C0                C          OR      AL,AL           ;  VECTOR ADDRESS
2041    0676  74 1B                C          JZ      FIND_VECTOR_3
2042    0678  8D 3E 0020 R         C          LEA     DI,SCREEN_CAPTURE_VECTOR
2043    067C  FE C8                C          DEC     AL
2044    067E  74 13                C          JZ      FIND_VECTOR_3
2045    0680  8D 3E 0031 R         C          LEA     DI,WRAP_TEST_VECTOR
2046    0684  FE C8                C          DEC     AL
2047    0686  74 0B                C          JZ      FIND_VECTOR_3
2048    0688  8D 3E 0042 R         C          LEA     DI,QUERY_STATE_VECTOR
2049    068C  FE C8                C          DEC     AL
2050    068E  74 03                C          JZ      FIND_VECTOR_3
2051                               C
2052    0690  B0 05                C          MOV     AL,RC_INVALID_VECTOR ; INVALID INTERRUPT VECTOR CODE
2053    0692                       C FIND_VECTOR_2:
2054    0692  F9                   C          STC                     ; INDICATE INVALID INTERRUPT VECTOR CODE
2055                               C
2056    0693                       C FIND_VECTOR_3:
2057    0693  C3                   C          RET
2058                               C
2059    0694                       C FIND_VECTOR ENDP
2060                               C
2061
2062    0694                         NDSP_API ENDP
2063
2064    0694                         NDSPBIOS ENDS
2065
2066                                          END
```

APPENDIX D

```
The IBM Personal Computer MACRO Assembler          PAGE   D-1
       3278/3279 Attachment BIOS End Label ;******************** Start of Specifications ********************
                          ;
                          ; Module Name: NDSPBEND
                          ;
                          ; Descriptive Name: 3278/3279 Attachment BIOS extension end label
                          ;
                          ; Copyright: IBM Corp 1982
                          ;
                          ; Status: Version 1.00
                          ;
                          ; Function: This label marks the physical end of the 3278/3279
                          ;           attachment BIOS extension
                          ;
                          ; Notes:
                          ;
                          ;   Dependencies: None
                          ;
                          ;   Restrictions: No code or data which is needed by the 3278/3279
                          ;                 interrupt handlers may follow this module when
                          ;                 3270ATT is linked together
                          ;
                          ; Module Type: Program
                          ;
                          ;   Processor: Assembler
                          ;
                          ; Entry Point: BIOS_END
                          ;
                          ;   Purpose: See function
                          ;
                          ;   Linkage: None
                          ;
                          ;   Input Parameters: None
                          ;
                          ; Exit Normal: None
                          ;
                          ; Exit Error: None
                          ;
                          ; External References:
                          ;
                          ;   Procedure Invoked: None
                          ;
                          ;   Control Blocks: None
                          ;
                          ; Messages Issued: None
                          ;
                          ; Change Activity: None
                          ;
                          ;********************** End of Specifications **********************

0000                 NDSPBIOS SEGMENT PUBLIC 'NDSPBIOS'

PUBLIC  BIOS_END
     0000                 BIOS_END LABEL BYTE            ; LAST BYTE IN 3278/3279 ATTACHMENT
                          ;                                BIOS CODE

0000                 NDSPBIOS ENDS

END
```

APPENDIX E

The IBM Personal Computer MACRO Assembler     PAGE   E-1
3278/3279 Attachment Initialization

```
;****************** Start of Specifications ********************
;
; Module Name: NDSPINIT
;
; Descriptive Name: 3278/3279 attachment initialization
;
; Copyright: IBM Corp 1982
;
; Status: Version 1.00
;
; Function: To iniitialize the 3278/3279 Attachment Option and the
;           3278/3279 Attachment BIOS extension (interrupt handlers)
;
; Notes:
;
;   Dependencies: DOS 1.1 or later
;
;   Restrictions: None
;
; Module Type: Program
;
;   Processor: Assembler
;
; Entry Point: NDSP_INIT
;
;   Purpose: See function
;
;   Linkage: Call
;
;   Input Parameters:
;
;      (DS) = address of DOS Program Segment Prefix
;
; Exit Normal:
;
;   Purpose: To fix the 3278/3279 Attachment interrupt handlers in
;            storage and return to DOS
;
;   Linkage: INT 27H
;
;   Output:
;
;      (DX) = offset to end of interrupt handler
;
; Exit Error: None
;
; External References:
;
;   Procedure Invoked: None
;
;   Control Blocks:
;
;      NDSPDCLS - 3278/3279 Attachment Option interfaces
;      NDSPUSER - 3278/3279 Attachment BIOS extension interfaces
;
; Messages Issued:
;
;   1901 - 3278 adapter not operational.
;   1902 - 3278 keyboard not attached - typewriter assumed.
;   1903 - 3278 keyboard not supported by the specified language -
;          typewriter assumed.
;   1904 - 3278 adapter failure - cannot communicate with host
;          system.
;
; Change Activity: None
;
;****************** End of Specifications **********************

SUBTTL  WORK AREAS

;       INCLUDE NDSPDCLS.ASM
;       INCLUDE NDSPUSER.ASM
        .LIST

;***************************************************************
;*
;*      IBM PERSONAL COMPUTER DOS PROGRAM SEGMENT PREFIX
;*
;***************************************************************

0000    PSP     SEGMENT AT 0
0000    INT20   LABEL   BYTE        ; INT 20H INSTRUCTION (USED TO RETURN
                                    ;    TO DOS)
0000    PSP     ENDS
```

```
 94                                      ;******************************************************
 95                                      ;*
 96                                      ;*     DATA AREAS USED BY THE ROM BIOS ROUTINES
 97                                      ;*
 98                                      ;******************************************************
 99
100   0000                                ROMDATA SEGMENT AT 40H
101   0072                                        ORG       72H
102   0072  ????                          RESET_FLAG DW     ?              ; WORD=1234H IF KEYBOARD RESET UNDERWAY
103   0090                                        ORG       90H
104   0090         40 [                   PARMS_6845 DB     64 DUP(?)      ; CRTC PARAMETERS SET BY MODE COMMAND
105                      ??
106                          ]
107
108   0000                                ROMDATA ENDS
109
110
111                                      ;******************************************************
112                                      ;*
113                                      ;*     DATA AREAS
114                                      ;*
115                                      ;******************************************************
116
117   0000                                INITDATA SEGMENT 'NDSPINIT'
118   0000  ??                            KB_ID    DB   ?                  ; KEYBOARD IDENTIFIER
119   0001  00                            STATUS   DB   0                  ; STATUS BITS
120   = 0080                              ST_FBA_NOT_OP EQU 80H            ;   FEATURE BUS ADAPTER NOT OPERATIONAL
121
122
123
124
125                                      ;    6845 CRT CONTROLLER PARAMETERS FOR 3278 DISPLAY
126
127   0002                                PARMS_3278 LABEL BYTE
128   0002  38 28 2B 05 1A 00                     DB    38H,28H,2BH,05H,1AH,00H,19H,19H ; 40x25 TEXT MODE
129         19 19
130   000A  02 07 06 07 00 00                     DB    02H,07H,06H,07H,00H,00H,00H,00H
131         00 00
132
133   0012  71 50 57 0A 1A 00                     DB    71H,50H,57H,0AH,1AH,00H,19H,19H ; 80x25 TEXT MODE
134         19 19
135   001A  02 07 06 07 00 00                     DB    02H,07H,06H,07H,00H,00H,00H,00H
136         00 00
137
138   0022  38 28 2B 05 6B 00                     DB    38H,28H,2BH,05H,6BH,00H,64H,64H ; GRAPHICS MODE
139         64 64
140   002A  02 01 06 07 00 00                     DB    02H,01H,06H,07H,00H,00H,00H,00H
141         00 00
142
143   0032  63 50 52 0F 19 00                     DB    63H,50H,52H,0FH,19H,00H,19H,18H ; 80x25 MONOCHROME
144         19 18
145   003A  02 0D 0B 0C 00 00                     DB    02H,0DH,0BH,0CH,00H,00H,00H,00H
146         00 00
147
148
149                                      ;    6845 CRT CONTROLLER PARAMETERS FOR 3279 DISPLAY
150
151   0042                                PARMS_3279 LABEL BYTE
152   0042  38 28 2B 05 1A 00                     DB    38H,28H,2BH,05H,1AH,00H,19H,19H ; 40x25 TEXT MODE
153         19 19
154   004A  02 07 06 07 00 00                     DB    02H,07H,06H,07H,00H,00H,00H,00H
155         00 00
156
157   0052  71 50 56 0A 1A 00                     DB    71H,50H,56H,0AH,1AH,00H,19H,19H ; 80x25 TEXT MODE
158         19 19
159   005A  02 07 06 07 00 00                     DB    02H,07H,06H,07H,00H,00H,00H,00H
160         00 00
161
162   0062  38 28 2B 05 6B 00                     DB    38H,28H,2BH,05H,6BH,00H,64H,64H ; GRAPHICS MODE
163         64 64
164   006A  02 01 06 07 00 00                     DB    02H,01H,06H,07H,00H,00H,00H,00H
165         00 00
166
167   0072  63 50 52 0F 19 00                     DB    63H,50H,52H,0FH,19H,00H,19H,18H ; 80x25 MONOCHROME
168         19 18
169   007A  02 0D 0B 0C 00 00                     DB    02H,0DH,0BH,0CH,00H,00H,00H,00H
170         00 00
171
172                                      ;    ERROR MESSAGES
173
174   = 000A                               LF    EQU   0AH            ; LINE FEED CHARACTER
175   = 000D                               CR    EQU   0DH            ; CARRIAGE RETURN CHARACTER
176
177   0082  31 39 30 31 20 2D             MSG_ADAPTER_NOT_OP   DB '1901 - 3278 adapter not operational.'
178         20 33 32 37 38 20
179         61 64 61 70 74 65
180         72 20 6E 6F 74 20
181         6F 70 65 72 61 74
182         69 6F 6E 61 6C 2E
183   00A6  0D 0A 24                                            DB CR,LF,'$'
184   00A9  31 39 30 32 20 2D             MSG_NO_KEYBOARD      DB '1902 - 3278 keyboard not attached'
185         20 33 32 37 38 20
186         6B 65 79 62 6F 61
187         72 64 20 6E 6F 74
```

```
188            20 61 74 74 61 63
189            68 65 64
190   00CA     20 2D 20 74 79 70                    DB   ' - typewriter assumed.'
191            65 77 72 69 74 65
192            72 20 61 73 73 75
193            6D 65 64 2E
194   00E0     0D 0A 24                             DB   CR,LF,'$'
195   00E3     31 39 30 33 20 2D    MSG_INVALID_KEYBOARD  DB  '1903 - 3278 keyboard not supported by '
196            20 33 32 37 38 20
197            6B 65 79 62 6F 61
198            72 64 20 6E 6F 74
199            20 73 75 70 70 6F
200            72 74 65 64 20 62
201            79 20
202   0109     74 68 65 20 73 70                    DB   'the specified language'
203            65 63 69 66 69 65
204            64 20 6C 61 6E 67
205            75 61 67 65
206   011F     20 2D 20 74 79 70                    DB   ' - typewriter assumed.'
207            65 77 72 69 74 65
208            72 20 61 73 73 75
209            6D 65 64 2E
210   0135     0D 0A 24                             DB   CR,LF,'$'
211   0138     31 39 30 34 20 2D    MSG_FBA_NOT_OP  DB   '1904 - 3278 adapter failure - cannot '
212            20 33 32 37 38 20
213            61 64 61 70 74 65
214            72 20 66 61 69 6C
215            75 72 65 20 2D 20
216            63 61 6E 6E 6F 74
217            20
218   015D     63 6F 6D 6D 75 6E                    DB   'communicate with host system.'
219            69 63 61 74 65 20
220            77 69 74 68 20 68
221            6F 73 74 20 73 79
222            73 74 65 6D 2E
223   017A     0D 0A 24                             DB   CR,LF,'$'
224
225   017D                          INITDATA ENDS
226
227
228
229            ;************************************************************
230            ;*                                                          *
231            ;*   STACK AREA USED BY INITIALIZATION ROUTINE              *
232            ;*                                                          *
233            ;************************************************************
234
235   0000                          INITSTCK SEGMENT PARA STACK 'STACK'
236   0000     20 [                      DW   32 DUP(?)
237            ????
238                 ]
239
240   0040                          INITSTCK ENDS
241
242
243            ;************************************************************
244            ;*                                                          *
245            ;*   DATA AREAS WITHIN OTHER MODULES                        *
246            ;*                                                          *
247            ;************************************************************
248
249   0000                          NDSPBIOS SEGMENT PUBLIC 'NDSPBIOS' ; 3278/3279 ATTACHMENT BIOS CODE
250                                      EXTRN  NDSP_COPYRIGHT:BYTE ; COPYRIGHT NOTICE
251                                      EXTRN  NDSP_INT:FAR    ; INTERRUPT HANDLER FOR 3278/3279
252                                                             ;    ADAPTER
253                                      EXTRN  NDSP_API:FAR    ; INTERRUPT HANDLER FOR 3278/3279
254                                                             ;    INTERFACE SOFTWARE INTERRUPTS
255                                      EXTRN  BIOS_END:FAR    ; END OF 3278/3279 ATTACHMENT BIOS
256   0000                          NDSPBIOS ENDS
257
258                                 BIOSDATA GROUP BIOSDATA_KEYBOARD,BIOSDATA_FBA
259
260                                 BIOSDATA_KEYBOARD SEGMENT PUBLIC 'NDSPBIOS' ; KEYBOARD BIOS DATA AREAS
261   0000                               EXTRN  XLAT_TABLES:BYTE ; KEYBOARD TRANSLATION TABLE
262                                      EXTRN  XLAT_TABLES_END:BYTE ; END OF KEYBOARD TRANSLATION TABLE
263   0000                          BIOSDATA_KEYBOARD ENDS
264
265   0000                          BIOSDATA_FBA SEGMENT PUBLIC 'NDSPBIOS' ; FEATURE BUS ADAPTER DATA AREAS
266                                      EXTRN  FBA_STATE:BYTE  ; FEATURE BUS ADAPTER STATE
267    = 0001                        F_FBA_NOT_OP  EQU  01H      ;  FEATURE BUS ADAPTER NOT OPERATIONAL
268   0000                          BIOSDATA_FBA ENDS
269
270   0000                          TABLES  SEGMENT PUBLIC 'TABLES' ; KEYBOARD TRANSLATION TABLES
271                                      EXTRN  XLAT_TABLES_PTR:WORD ; ARRAY OF POINTERS TO TRANSLATION
272                                                             ;    TABLES
273                                      EXTRN  RPQ_TABLE:WORD  ; TRANSLATION TABLE UPDATES FOR AN RPQ
274
275   0000                          TABLES  ENDS
276
277                                      SUBTTL Initialize the 3278/3279 Attachment
```

```
278
279
280    0000                          NDSPINIT SEGMENT 'NDSPINIT'
281
282                                 ;************************************************************
283                                 ;*
284                                 ;*  Procedure Name: NDSP_INIT
285                                 ;*
286                                 ;*  Function: To initialize the 3278/3279 Attachment Option and
287                                 ;*            interrupt handlers
288                                 ;*
289                                 ;*  Input:
290                                 ;*
291                                 ;*     (CS) = address of NDSPINIT segment
292                                 ;*     (DS) = address of DOS Program Segment Prefix
293                                 ;*
294                                 ;*  Output:
295                                 ;*
296                                 ;*     (DX) = offset to end of interrupt handler code
297                                 ;*
298                                 ;************************************************************
299
300    0000                          NDSP_INIT PROC  FAR
301
302                                            ASSUME  CS:NDSPINIT
303    0000 E8 0019 R                          CALL    SETUP_EXIT       ; SET UP FOR RETURN TO DOS
304    0003 E8 0035 R                          CALL    INIT_VECTORS     ; INITIALIZE INTERRUPT VECTORS
305    0006 E8 00C6 R                          CALL    INIT_6845        ; INITIALIZE THE PARAMETERS FOR THE 68
306                                                                     ;   DISPLAY PROCESSOR
307    0009 E8 004D R                          CALL    BASIC_ASSURANCE_TEST ; TEST 3278/3279 ADAPTER
308    000C 72 09                              JC      INIT_1           ; ADAPTER IS NOT INSTALLED
309    000E E8 010E R                          CALL    INIT_ADAPTER     ; INITIALIZE 3278/3279 ADAPTER
310    0011 E8 016E R                          CALL    INIT_XLAT        ; INTIIALIZE KEYBOARD TRANSLATION TABL
311    0014 E8 0166 R                          CALL    ENABLE_INTERRUPT ; ENABLE INTERRUPTS FROM THE 3278
312                                                                     ;   ADAPTER
313
314                                  ;        RETURN TO DOS AND LEAVE THE INTERRUPT HANDLER RESIDENT
315
316    0017                          INIT_1:
317    0017 5A                                 POP     DX               ; RETRIEVE END OF PROGRAM OFFSET
318    0018 CB                                 RET                      ; RETURN TO DOS
319
320    0019                          NDSP_INIT ENDP
321
322                                            SUBTTL  Set up for the return to DOS
323
324
325                                 ;************************************************************
326                                 ;*
327                                 ;*  Procedure Name: SETUP_EXIT
328                                 ;*
329                                 ;*  Function: To set up for the exit from the initialization routine
330                                 ;*            back to DOS
331                                 ;*
332                                 ;*  Input:
333                                 ;*
334                                 ;*     (DS) = address of Program Segment Prefix
335                                 ;*
336                                 ;*  Output:
337                                 ;*
338                                 ;*     return instruction in the PSP set to INT 27H
339                                 ;*     address of return instruction put on the stack
340                                 ;*     offset of end of interrupt handler code put on the stack
341                                 ;*
342                                 ;************************************************************
343
344    0019                          SETUP_EXIT PROC NEAR
345
346                                            ASSUME  DS:PSP
347    0019 5B                                 POP     BX               ; SAVE SUBROUTINE RETURN ADDRESS
348
349    001A C6 06 0001 R 27                    MOV     INT20+1,27H      ; CHANGE RETURN INSTRUCTION TO INT 27H
350
351    001F 1E                                 PUSH    DS               ; PUT ADDRESS OF INT 27H INSTRUCTION
352    0020 33 D2                              XOR     DX,DX            ;   ON STACK
353    0022 52                                 PUSH    DX
354
355    0023 BA ---- E                          MOV     DX,SEG BIOS_END  ; PUT OFFSET TO END OF INTERRUPT HANDLER
356    0026 8C D8                              MOV     AX,DS            ;   ON STACK
357    0028 2B D0                              SUB     DX,AX
358    002A B1 04                              MOV     CL,4
359    002C D3 E2                              SAL     DX,CL
360    002E 81 C2 0000 E                       ADD     DX,OFFSET BIOS_END
361    0032 52                                 PUSH    DX
362
363    0033 53                                 PUSH    BX               ; PUT SUBROUTINE RETURN ADDRESS BACK
364                                                                     ;   ON STACK
365    0034 C3                                 RET                      ; RETURN TO MAINLINE ROUTINE
366                                            ASSUME  DS:NOTHING
367
368    0035                          SETUP_EXIT ENDP
369
370                                            SUBTTL  Initialize 3278/3279 Attachment interrupt vectors
```

```
;************************************************************
;*                                                          *
;* Procedure Name: INIT_VECTORS                             *
;*                                                          *
;* Function: To initialize the interrupt vectors used by the*
;*           3278/3279 Attachment interrupt handlers        *
;*                                                          *
;* Input: None                                              *
;*                                                          *
;* Output:                                                  *
;*                                                          *
;*    interrupt vector 0A initialized for NDSP_INT          *
;*    interrupt vector 50 initialized for NDSP_API          *
;*                                                          *
;************************************************************
```

```
                    INIT_VECTORS PROC NEAR

0035  BA ---- R             MOV     DX,NDSPBIOS     ; PICK UP ADDRESS OF BIOS CODE SEGMENT
0038  8E DA                 MOV     DS,DX
003A  BA 0000 E             MOV     DX,OFFSET NDSP_INT ; PICK UP ADDRESS OF HARDWARE
                                                    ;   INTERRUPT HANDLER
003D  B0 0A                 MOV     AL,0AH          ; INITIALIZE INTERRUPT VECTOR 0A
003F  B4 25                 MOV     AH,25H
0041  CD 21                 INT     21H

0043  BA 0000 E             MOV     DX,OFFSET NDSP_API ; PICK UP ADDRESS OF SOFTWARE
                                                    ;   INTERRUPT HANDLER
0046  B0 50                 MOV     AL,NDSP_INT_CODE ; INITIALIZE INTERRUPT VECTOR
0048  B4 25                 MOV     AH,25H
004A  CD 21                 INT     21H

004C  C3                    RET                     ; RETURN TO MAINLINE ROUTINE

004D                 INIT_VECTORS ENDP
```

```
;************************************************************
;*                                                          *
;* Procedure Name: BASIC_ASSURANCE_TEST                     *
;*                                                          *
;* Function: To verify that the 3278/3279 Attachment Option is
;*           operational                                    *
;*                                                          *
;* Input: None                                              *
;*                                                          *
;* Output:                                                  *
;*                                                          *
;*    CF = 0 if the 3278/3279 adapter is installed          *
;*         1 if the 3278/3279 adapter is not installed      *
;*    F_FBA_NOT_OP = 1 if the 3278/3279 adapter is installed and
;*                    the feature bus interface is not operational
;*                                                          *
;************************************************************
```

```
004D                 BASIC_ASSURANCE_TEST PROC NEAR
                         ASSUME  DS:INITDATA     ; ESTABLISH ADDRESSABILITY TO DATA AREA
004D  BA ---- R          MOV     DX,INITDATA
0050  8E DA              MOV     DS,DX

0052  BA 03E5            MOV     DX,START_OP_MOD ; CLEAR THE START OPERATION MODIFIER
0055  EC                 IN      AL,DX           ;   REGISTER TO INSURE THAT THE ADAPTER
                                                 ;   STATUS CANNOT BE FF

0056  BA 03E4            MOV     DX,STATUS_PORT  ; READ THE ADAPTER STATUS - FF INDICATE
0059  EC                 IN      AL,DX           ;   THAT THE ADAPTER IS NOT INSTALLED
005A  3C FF              CMP     AL,0FFH
005C  74 2E              JE      BAT_2

;   TEST THE MEMORY ON THE 3278/3279 ADAPTER

ASSUME  ES:FBA_BUFFER   ; ESTABLISH ADDRESSABILITY TO FEATURE
005E  BA ---- R          MOV     DX,FBA_BUFFER   ;   BUS ADAPTER BUFFER
0061  8E C2              MOV     ES,DX

0063  BA 03E4            MOV     DX,COMMAND_PORT ; INDICATE THE ADAPTER IS NOT
0066  B0 0C              MOV     AL,RESET_IPL_COMPLETE ; INITIALIZED SO WE CAN ACCESS THE
0068  EE                 OUT     DX,AL           ;   FBA BUFFER 0069  33 C0              XOR     AX,AX           ; INITIALIZE THE FBA BUFFER TO ALL ZERO
006B  8B F8              MOV     DI,AX
006D  B9 0080            MOV     CX,(SIZE_FBA_BUFFER)/2
0070  FC                 CLD
0071  F3/ AB             REP     STOSW

0073  B8 00FF            MOV     AX,000FFH       ; TEST EACH BYTE FOR 00 AND RESET THE
0076  E8 0098 R          CALL    TEST_RAM        ;   BYTE TO FF
0079  72 0F              JC      BAT_1           ; MEMORY TEST FAILED

007B  B8 FF00            MOV     AX,0FF00H       ; TEST EACH BYTE FOR FF AND RESET THE
007E  E8 0098 R          CALL    TEST_RAM        ;   BYTE TO 00
0081  72 07              JC      BAT_1           ; MEMORY TEST FAILED
```

```
466
467    0083  33 C0                    XOR    AX,AX            ; TEST EACH BYTE FOR 00 AND LEAVE THE
468    0085  E8 0098 R                CALL   TEST_RAM         ;   MEMORY CLEARED TO ZEROS
469    0088  72 00                    JC     BAT_1            ; MEMORY TEST FAILED
470
471    008A                    BAT_1:
472    008A  F8                       CLC                     ; INDICATE ADAPTER IS INSTALLED
473    008B  C3                       RET                     ; RETURN TO MAINLINE ROUTINE
474
475    008C                    BAT_2:
476    008C  8D 16 0082 R             LEA    DX,MSG_ADAPTER_NOT_OP ; INFORM THE USER THAT THE
477    0090  E8 022F R                CALL   INFORM_OPERATOR  ;   ADAPTER IS NOT INSTALLED
478
479    0093  E8 00B3 R                CALL   FBA_NOT_OP       ; INDICATE THE FEATURE BUS ADAPTER
480                                                           ;   IS NOT OPERATIONAL
481
482    0096  F9                       STC                     ; INDICATE ADAPTER IS NOT INSTALLED
483    0097  C3                       RET                     ; RETURN TO MAINLINE ROUTINE
484
485    0098                    TEST_RAM PROC NEAR
486    0098  33 FF                    XOR    DI,DI            ; START AT BEGINNING OF BUFFER
487    009A  B9 0100                  MOV    CX,SIZE_FBA_BUFFER ; SCAN ALL BYTES IN THE BUFFER
488
489    009D                    TEST_RAM_1:
490    009D  26: 3A 25                CMP    AH,BYTE PTR ES:[DI] ; IS THIS BYTE CORRECT?
491    00A0  75 05                    JNE    TEST_RAM_2       ; NO, MEMORY TEST FAILED
492    00A2  AA                       STOSB                   ; YES, REPLACE IT WITH THE NEW VALUE
493    00A3  E2 F8                    LOOP   TEST_RAM_1       ; LOOP UNTIL ENTIRE BUFFER IS TESTED
494    00A5  F8                       CLC                     ; INDICATE MEMORY TEST SUCCEEDED
495    00A6  C3                       RET                     ; RETURN TO CALLER
496
497    00A7                    TEST_RAM_2:
498    00A7  8D 16 0138 R             LEA    DX,MSG_FBA_NOT_OP ; INFORM USER THAT THE FEATURE
499    00AB  E8 022F R                CALL   INFORM_OPERATOR  ; BUS ADAPTER IS NOT OPERATIONAL
500
501    00AE  E8 00B3 R                CALL   FBA_NOT_OP       ; INDICATE FEATURE BUS ADAPTER IS
502                                                           ;   NOT OPERATIONAL
503
504    00B1  F9                       STC                     ; INDICATE MEMORY TEST FAILED
505    00B2  C3                       RET                     ; RETURN TO CALLER
506    00B3                    TEST_RAM ENDP
507
508    00B3                    FBA_NOT_OP PROC NEAR
509    00B3  BA ---- R                MOV    DX,BIOSDATA      ; ESTABLISH ADDRESSABILITY TO FBA
510    00B6  8E C2                    MOV    ES,DX            ;   STATE FLAGS
511    00B8  8D 3E 0000 E             LEA    DI,BIOSDATA:FBA_STATE
512
513    00BC  26: 80 0D 01             OR     BYTE PTR ES:[DI],F_FBA_NOT_OP ; INDICATE THAT THE
514    00C0  80 0E 0001 R 80          OR     STATUS,ST_FBA_NOT_OP ; FEATURE BUS ADAPTER IS NOT
515                                                           ;         WORKING
516
517    00C5  C3                       RET                     ; RETURN TO CALLER
518    00C6                    FBA_NOT_OP ENDP
519
520                                   ASSUME DS:NOTHING,ES:NOTHING
521
522    00C6                    BASIC_ASSURANCE_TEST ENDP
523
524                        C          INCLUDE NDSPINI2.ASM
525                        C          SUBTTL Initialize 6845 Parameters
526                        C
527                        C
528                        C  ;************************************************************
529                        C  ;*
530                        C  ;*  Procedure Name: INIT_6845
531                        C  ;*
532                        C  ;*  Function: To modify the 6845 display processor parameters so the
533                        C  ;*            Personal Computer screen image is correct on both the
534                        C  ;*            3278 and 3279 display stations
535                        C  ;*
536                        C  ;*  Input:
537                        C  ;*
538                        C  ;*    3278/3279 adapter status flag indicating whether the display
539                        C  ;*            station is a 3278 or a 3279
540                        C  ;*
541                        C  ;*  Output:
542                        C  ;*
543                        C  ;*    interrupt vector ID changed to point to the parameter area
544                        C  ;*    used by the MODE command, which is initialized with the
545                        C  ;*    proper set of parameters for this display station
546                        C  ;*
547                        C  ;************************************************************
548                        C
549    00C6                 C  INIT_6845 PROC  NEAR
550                        C
551                        C          ASSUME DS:INITDATA,ES:ROMDATA
552    00C6  BA ---- R      C         MOV    DX,INITDATA      ; PICK UP ADDRESS OF WORK AREA SEGMENT
553    00C9  8E DA          C         MOV    DS,DX
554                        C
555    00CB  BA ---- R      C         MOV    DX,ROMDATA       ; PICK UP ADDRESS OF ROM WORK AREA
556                        C                                  ;   SEGMENT
557    00CE  8E C2          C         MOV    ES,DX
558                        C
```

```
559   0000  BA 03E4         c           MOV    DX,STATUS_PORT    ; READ ADAPTER STATUS
560   00D3  EC              c           IN     AL,DX
561                         c
562   00D4  8D 36 0002 R    c           LEA    SI,PARMS_3278     ; POINT TO PROPER SET OF 6845
563                         c                                    ;   PARAMETERS
564   00D8  A8 20           c           TEST   AL,ST_3278
565   00DA  75 04           c           JNZ    MOV_6845
566   00DC  8D 36 0042 R    c           LEA    SI,PARMS_3279
567                         c
568   00E0                  c   MOV_6845:
569   00E0  26: 8D 3E 0090 R c          LEA    DI,PARMS_6845     ; MOVE PARAMETERS TO BIOS DATA AREA
570   00E5  B9 0020         c           MOV    CX,32
571   00E8  FC              c           CLD
572   00E9  F3/ A5          c           REP    MOVSW
573                         c
574   00EB  8C C2           c           MOV    DX,ES             ; POINT INTERRUPT VECTOR 1D TO THE
575   00ED  8E DA           c           MOV    DS,DX             ;   NEW VIDEO PARAMETERS
576   00EF  26: 8D 16 0090 R c          LEA    DX,PARMS_6845
577   00F4  B0 1D           c           MOV    AL,1DH
578   00F6  B4 25           c           MOV    AH,25H
579   00F8  CD 21           c           INT    21H
580                         c
581   00FA  B4 0F           c           MOV    AH,15             ; GET CURRENT CRTC MODE
582   00FC  CD 10           c           INT    10H
583   00FE  32 E4           c           XOR    AH,AH             ; REINITIALIZE THE 6845 WITH THE NEW
584   0100  CD 10           c           INT    10H               ;   PARAMETERS WITHOUT CHANGING MODES
585                         c
586   0102  B8 ---- E       c           MOV    AX,SEG NDSP_COPYRIGHT ; DISPLAY THE COPYRIGHT MESSAGE
587   0105  8E D8           c           MOV    DS,AX
588   0107  BA 0000 E       c           MOV    DX,OFFSET NDSP_COPYRIGHT
589   010A  E8 022F R       c           CALL   INFORM_OPERATOR
590                         c
591   010D  C3              c           RET                      ; RETURN TO MAINLINE ROUTINE
592                         c           ASSUME DS:NOTHING,ES:NOTHING
593                         c
594   010E                  c   INIT_6845 ENDP
595                         c
596                         c           SUBTTL Initialize 3278/3279 Attachment Option
597                         c
598                         c
599                         c   ;**********************************************************
600                         c   ;*
601                         c   ;*  Procedure Name: INIT_ADAPTER
602                         c   ;*
603                         c   ;*  Function: To initialize the 3278/3279 Attachment Option
604                         c   ;*
605                         c   ;*  Input: None
606                         c   ;*
607                         c   ;*  Output:
608                         c   ;*
609                         c   ;*    KB_ID = 3278/3279 keyboard identifier
610                         c   ;*    3278/3279 adapter initialized
611                         c   ;*
612                         c   ;**********************************************************
613                         c
614   010E                  c   INIT_ADAPTER PROC NEAR
615                         c
616                         c           ASSUME DS:INITDATA
617   010E  BA ---- R       c           MOV    DX,INITDATA       ; PICK UP ADDRESS OF DATA SEGMENT
618   0111  8E DA           c           MOV    DS,DX
619                         c
620   0113  BA 03E4         c           MOV    DX,COMMAND_PORT   ; RESET THE 3278/3279 ADAPTER
621   0116  B0 0E           c           MOV    AL,RESET_ADAPTER
622   0118  EE              c           OUT    DX,AL
623                         c
624   0119  B0 0A           c           MOV    AL,DISABLE_NDS    ; DISABLE THE 3278/3279 DISPLAY
625   011B  EE              c           OUT    DX,AL             ;   INTERFACE
626                         c
627   011C  BA 03E3         c           MOV    DX,CMD_8255       ; INITIALIZE THE 8255:
628   011F  B0 94           c           MOV    AL,94H            ;   PORT A = MODE 0 INPUT
629   0121  EE              c           OUT    DX,AL             ;   PORT B = MODE 1 OUTPUT
630                         c                                    ;   PORT C = MODE 0 OUTPUT
631                         c
632   0122  BA 03E2         c           MOV    DX,KB_CTL         ; SELECT KEYBOARD IDENTIFIER TO BE READ
633   0125  B0 40           c           MOV    AL,SELECT_ID
634   0127  EE              c           OUT    DX,AL
635                         c
636   0128  BA 03E0         c           MOV    DX,NDS_KB_IN      ; READ KEYBOARD IDENTIFIER
637   012B  EC              c           IN     AL,DX
638   012C  24 0F           c           AND    AL,0FH
639   012E  A2 0000 R       c           MOV    KB_ID,AL
640                         c
641   0131  BA 03E3         c           MOV    DX,CMD_8255       ; INITIALIZE THE 8255:
642   0134  B0 B4           c           MOV    AL,0B4H           ;   PORT A = MODE 1 INPUT
643   0136  EE              c           OUT    DX,AL             ;   PORT B = MODE 1 OUTPUT
644                         c                                    ;   PORT C = MODE 1 OUTPUT
645                         c
646   0137                  c   INIT_ADAPTER_1:
647   0137  BA 03E0         c           MOV    DX,NDS_KB_IN      ; FLUSH 3278/3279 KEYBOARD INPUT
648   013A  EC              c           IN     AL,DX             ;   BUFFER
649   013B  BA 03E4         c           MOV    DX,STATUS_PORT
650   013E  EC              c           IN     AL,DX
651   013F  A8 01           c           TEST   AL,ST_KB_IN
652   0141  75 F4           c           JNZ    INIT_ADAPTER_1
```

```
653
654     0143  BA 03E3                  MOV     DX,CMD_8255
655     0146  B0 03                    MOV     AL,NOT_CBF      ; INDICATE NO OUTPUT CHARACTER AVAILABL
656     0148  EE                       OUT     DX,AL           ;    TO 3278/3279
657
658     0149  B0 09                    MOV     AL,SET_INTE_A   ; ENABLE 3278/3279 KEYBOARD DATA
659     014B  EE                       OUT     DX,AL           ;    AVAILABLE INTERRUPT
660
661     014C  BA 03E4                  MOV     DX,COMMAND_PORT ; TURN OFF 3278/3279 KEYBOARD CLICKER
662     014F  B0 08                    MOV     AL,CLICK_OFF
663     0151  EE                       OUT     DX,AL
664
665     0152  B0 00                    MOV     AL,SERIAL_INT_OFF ; RESET SERIAL PORT INTERRUPT FLAG
666     0154  EE                       OUT     DX,AL
667
668     0155  BA 03E5                  MOV     DX,START_OP_MOD ; FLUSH START OP MODIFIER
669     0158  EC                       IN      AL,DX
670
671     0159  BA 03E4                  MOV     DX,COMMAND_PORT
672     015C  B0 0B                    MOV     AL,ENABLE_NDS   ; ENABLE THE 3278/3279 DISPLAY INTERFAC
673     015E  EE                       OUT     DX,AL
674
675     015F  B4 00                    MOV     AH,FUNC_SET_MODE ; PUT THE TERMINAL INTO PC MODE
676     0161  B0 01                    MOV     AL,SET_MODE_PC
677     0163  CD 50                    INT     NDSP_INT_CODE
678
679     0165  C3                       RET                     ; RETURN TO MAINLINE ROUTINE
680                                    ASSUME  DS:NOTHING
681
682     0166                   INIT_ADAPTER ENDP
683                                    SUBTTL  Enable interrupts from the 3278/3279 Attachment Option
684
685
686                            ;****************************************************************
687                            ;*
688                            ;*  Procedure Name: ENABLE_INTERRUPT
689                            ;*
690                            ;*  Function: Enable the hardware interrupt generated by the
691                            ;*            3278/3279 adapter
692                            ;*
693                            ;*  Input: None
694                            ;*
695                            ;*  Output:
696                            ;*
697                            ;*    hardware interrupt level 2 enabled in the 8259 interrupt
698                            ;*       controller
699                            ;*
700                            ;****************************************************************
701
702     0166                   ENABLE_INTERRUPT PROC NEAR
703
704     0166  BA 0021                  MOV     DX,IMR_8259     ; READ THE CURRENT INTERRUPT MASK
705     0169  EC                       IN      AL,DX           ;    REGISTER VALUE
706
707     016A  24 FB                    AND     AL,0FBH         ; ENABLE HARDWARE INTERRUPT LEVEL 2
708     016C  EE                       OUT     DX,AL
709
710     016D  C3                       RET                     ; RETURN TO MAINLINE ROUTINE
711
712     016E                   ENABLE_INTERRUPT ENDP
713
714                                    SUBTTL  Initialize the 3278/3279 keyboard translation tables
715
716
717                            ;****************************************************************
718                            ;*
719                            ;*  Procedure Name: INIT_XLAT
720                            ;*
721                            ;*  Function: To select the proper keyboard translation table for
722                            ;*            use by the 3278/3279 keyboard input routine
723                            ;*
724                            ;*  Input:
725                            ;*
726                            ;*    KB_ID = 3278/3279 keyboard identifier
727                            ;*    XLAT_TABLES_PTR = pointers to keyboard translation tables
728                            ;*
729                            ;*  Output:
730                            ;*
731                            ;*    XLAT_TABLES = copy of proper translation tables
732                            ;*
733                            ;****************************************************************
734
735     016E                   INIT_XLAT PROC  NEAR
736
737                                    ASSUME  DS:INITDATA
738     016E  BA ---- R                MOV     DX,INITDATA     ; PICK UP ADDRESS OF DATA SEGMENT
739     0171  8E DA                    MOV     DS,DX
740
741     0173  A0 0000 R                MOV     AL,KB_ID        ; PICK UP KEYBOARD IDENTIFIER
742     0176  3C 0F                    CMP     AL,15           ; IS THERE A KEYBOARD ATTACHED?
743     0178  75 09                    JNE     INIT_XLAT_1     ; YES, USE THIS KEYBOARD
744
745     017A  8D 16 00A9 R             LEA     DX,MSG_NO_KEYBOARD ; INFORM THE USER THAT THERE
746     017E  E8 022F R                CALL    INFORM_OPERATOR ;    IS NO KEYBOARD ATTACHED
```

```
747    0181  B0 0F                 C         MOV     AL,15              ; USE THE DEFAULT KEYBOARD
748                                C
749    0183                        C  INIT_XLAT_1:
750                                C         ASSUME  DS:TABLES,ES:BIOSDATA
751    0183  BA ---- R             C         MOV     DX,TABLES          ; PICK UP ADDRESS OF TRANSLATION TABLES
752    0186  8E DA                 C         MOV     DS,DX              ;   SEGMENT
753                                C
754    0188  BA ---- R             C         MOV     DX,BIOSDATA        ; PICK UP ADDRESS OF BIOS DATA SEGMENT
755    018B  8E C2                 C         MOV     ES,DX
756                                C
757    018D  D0 E0                 C         SAL     AL,1               ; AX = 8*KEYBOARD IDENTIFIER
758    018F  D0 E0                 C         SAL     AL,1
759    0191  D0 E0                 C         SAL     AL,1
760    0193  32 E4                 C         XOR     AH,AH
761                                C
762    0195  8B F0                 C         MOV     SI,AX              ; PICK UP TRANSLATION TABLE IDENTIFIER
763    0197  8B 84 0000 E          C         MOV     AX,XLAT_TABLES_PTR[SI]
764    019B  0B C0                 C         OR      AX,AX              ; IS THERE A TRANSLATION TABLE FOR THIS
765                                C                                    ;   KEYBOARD TYPE?
766    019D  75 15                 C         JNZ     INIT_XLAT_2        ; YES, USE THIS KEYBOARD TYPE
767                                C
768    019F  1E                    C         PUSH    DS                 ; INFORM THE USER THAT THIS KEYBOARD
769    01A0  BA ---- R             C         MOV     DX,INITDATA        ;   IS NOT SUPPORTED
770    01A3  8E DA                 C         MOV     DS,DX
771                                C         ASSUME  DS:INITDATA
772    01A5  8D 16 00E3 R          C         LEA     DX,MSG_INVALID_KEYBOARD
773    01A9  E8 022F R             C         CALL    INFORM_OPERATOR
774    01AC  1F                    C         POP     DS
775                                C         ASSUME  DS:TABLES
776                                C
777    01AD  BE 0078               C         MOV     SI,15*8            ; USE THE DEFAULT KEYBOARD TRANSLATION
778    01B0  8B 84 0000 E          C         MOV     AX,XLAT_TABLES_PTR[SI] ; TABLE
779                                C
780    01B4                        C  INIT_XLAT_2:
781    01B4  26: A3 0000 E         C         MOV     WORD PTR XLAT_TABLES,AX ; SAVE KEYBOARD IDENTIFIER
782                                C
783    01B8  56                    C         PUSH    SI                 ; SAVE TRANSLATION TABLE INDEX ADDRESS
784                                C
785    01B9  8B B4 0002 E          C         MOV     SI,XLAT_TABLES_PTR+2[SI] ; MOVE THE TRANSLATION TABLE
786    01BD  26: 8D 3E 0002 E      C         LEA     DI,XLAT_TABLES+2   ; INTO THE BIOS DATA AREA
787    01C2  26: 8D 0E 0000 E      C         LEA     CX,XLAT_TABLES_END
788    01C7  2B CF                 C         SUB     CX,DI
789    01C9  D1 F9                 C         SAR     CX,1
790    01CB  FC                    C         CLD
791    01CC  F3/ A5                C         REP     MOVSW
792                                C
793    01CE  5E                    C         POP     SI                 ; RETRIEVE TRANSLATION TABLE INDEX
794    01CF  56                    C         PUSH    SI
795    01D0  8B B4 0004 E          C         MOV     SI,XLAT_TABLES_PTR+4[SI] ; PICK UP ADDRESS OF FIRST
796                                C                                    ;   MODIFICATION TABLE
797    01D4  0B F6                 C         OR      SI,SI              ; IS THERE A MODIFICATION TABLE?
798    01D6  74 03                 C         JZ      INIT_XLAT_3        ; NO, CONTINUE
799                                C
800    01D8  E8 0203 R             C         CALL    INIT_XLAT_MOD      ; YES, APPLY THE MODIFICATIONS
801                                C
802    01DB                        C  INIT_XLAT_3:
803    01DB  5E                    C         POP     SI                 ; RETRIEVE TRANSLATION TABLE INDEX
804    01DC  8B B4 0006 E          C         MOV     SI,XLAT_TABLES_PTR+6[SI] ; PICK UP ADDRESS OF SECOND
805                                C                                    ;   MODIFICATION TABLE
806    01E0  0B F6                 C         OR      SI,SI              ; IS THERE A MODIFICATION TABLE?
807    01E2  74 03                 C         JZ      INIT_XLAT_4        ; NO, CONTINUE
808                                C
809    01E4  E8 0203 R             C         CALL    INIT_XLAT_MOD      ; YES, APPLY THE MODIFICATIONS
810                                C
811    01E7                        C  INIT_XLAT_4:
812    01E7  8D 36 0000 E          C         LEA     SI,RPQ_TABLE       ; SEE IF THE RPQ TABLE APPLIES TO THIS
813    01EB  26: 8B 1E 0000 E      C         MOV     BX,WORD PTR XLAT_TABLES ;   KEYBOARD
814    01F0  3B 1C                 C         CMP     BX,WORD PTR [SI]
815    01F2  75 0E                 C         JNE     INIT_XLAT_5        ; NO, SKIP THE RPQ TABLE
816                                C
817    01F4  8B 5C 02              C         MOV     BX,WORD PTR [SI+2] ; YES, CHANGE THE TRANSLATION TABLE
818    01F7  26: 89 1E 0000 E      C         MOV     WORD PTR XLAT_TABLES,BX ; IDENTIFIER TO THE RPQ TABLE
819                                C                                    ;            IDENTIFIER
820                                C
821    01FC  83 C6 04              C         ADD     SI,4               ; POINT TO START OF RPQ MODIFICATIONS
822    01FF  E8 0203 R             C         CALL    INIT_XLAT_MOD      ; APPLY THE MODIFICATIONS
823                                C
824    0202                        C  INIT_XLAT_5:
825    0202  C3                    C         RET                        ; RETURN TO MAINLINE ROUTINE
826                                C
827                                C         ASSUME  DS:NOTHING,ES:NOTHING
828                                C
829    0203                        C  INIT_XLAT ENDP
830                                C
831                                C
```

```
832                     C   ;******************************************************;
833                     C   ;*                                                       *
834                     C   ;*   Procedure Name: INIT_XLAT_MOD                       *
835                     C   ;*                                                       *
836                     C   ;*   Function: To apply a series of modifications to the keyboard *
837                     C   ;*             translation tables                        *
838                     C   ;*                                                       *
839                     C   ;*   Input:                                              *
840                     C   ;*                                                       *
841                     C   ;*      (SI) = address of modification table             *
842                     C   ;*                                                       *
843                     C   ;*   Output:                                             *
844                     C   ;*                                                       *
845                     C   ;*      translation tables updated                       *
846                     C   ;*                                                       *
847                     C   ;********************************************************
848                     C
849     0203            C   INIT_XLAT_MOD  PROC NEAR
850                     C
851     0203            C   INIT_XLAT_MOD_1:                    ; MODIFY INBOUND TRANSLATION TABLE
852     0203  8B 0C     C           MOV     CX,WORD PTR [SI]
853     0205  0B C9     C           OR      CX,CX               ; IS THIS THE END OF THE TABLE?
854     0207  74 0C     C           JZ      INIT_XLAT_MOD_2     ; YES, END OF INBOUND XLAT TABLE UPDATES
855     0209  8B 54 02  C           MOV     DX,WORD PTR [SI+2]  ; NO, MAKE THE SPECIFIED CHANGE IN
856     020C  B4 07     C           MOV     AH,FUNC_MOD_XLAT_IN ;    THE INBOUND KEYBOARD
857     020E  CD 50     C           INT     NDSP_INT_CODE       ;      TRANSLATION TABLE
858     0210  83 C6 04  C           ADD     SI,4                ; POINT TO THE NEXT TABLE ENTRY
859     0213  EB EE     C           JMP     INIT_XLAT_MOD_1     ; PROCESS ALL INBOUND TABLE CHANGES
860                     C
861     0215            C   INIT_XLAT_MOD_2:
862     0215  83 C6 04  C           ADD     SI,4                ; POINT TO FIRST OUTBOUND TABLE ENTRY
863                     C
864     0218            C   INIT_XLAT_MOD_3:                    ; MODIFY OUTBOUND TRANSLATION TABLE
865     0218  8A 2C     C           MOV     CH,BYTE PTR [SI]
866     021A  8B 54 01  C           MOV     DX,WORD PTR[SI+1]
867     021D  0A ED     C           OR      CH,CH               ; IS THIS THE END OF THE TABLE?
868     021F  75 04     C           JNZ     INIT_XLAT_MOD_4     ; NO, CONTINUE
869     0221  0B D2     C           OR      DX,DX
870     0223  74 09     C           JZ      INIT_XLAT_MOD_5     ; YES, END OF TRANSLATION TABLE UPDATES
871     0225            C   INIT_XLAT_MOD_4:
872     0225  B4 08     C           MOV     AH,FUNC_MOD_XLAT_OUT ; MAKE THE SPECIFIED CHANGE IN THE
873     0227  CD 50     C           INT     NDSP_INT_CODE       ;    OUTBOUND TRANSLATION TABLE
874     0229  83 C6 03  C           ADD     SI,3                ; POINT TO THE NEXT TABLE ENTRY
875     022C  EB EA     C           JMP     INIT_XLAT_MOD_3     ; PROCESS ALL OUTBOUND TABLE CHANGES
876                     C
877     022E            C   INIT_XLAT_MOD_5:
878     022E  C3        C           RET                         ; RETURN TO CALLER
879                     C
880     022F            C   INIT_XLAT_MOD  ENDP
881                     C           SUBTTL  Utility Subroutines
882                     C
883                     C
884                     C   ;************************************************************
885                     C   ;*
886                     C   ;*   Procedure Name: INFORM_OPERATOR
887                     C   ;*
888                     C   ;*   Function: To display a message to the system operator
889                     C   ;*
890                     C   ;*   Input:
891                     C   ;*
892                     C   ;*      (DX) = address of message to be issued
893                     C   ;*
894                     C   ;*   Output:
895                     C   ;*
896                     C   ;*      AH is unpredictable
897                     C   ;*
898                     C   ;************************************************************
899                     C
900     022F            C   INFORM_OPERATOR PROC NEAR
901     022F  B4 09     C           MOV     AH,9                ; ISSUE THE MESSAGE
902     0231  CD 21     C           INT     21H
903                     C
904     0233  C3        C           RET                         ; RETURN TO CALLER
905     0234            C   INFORM_OPERATOR ENDP
906                     C
907                     C
908
909     0234                NDSPINIT ENDS
910
911                                 END     NDSP_INIT
```

APPENDIX F

The IBM Personal Computer MACRO Assembler            PAGE   F-1
          United States EBCDIC Keyboard Translation Tables

```
 3
 4
 5                                          ;******************* Start of Specifications *******************
 6                                          ;
 7                                          ; Module Name: XLATUSE
 8                                          ;
 9                                          ; Descriptive Name: United States EBCDIC keyboard translation tables
10                                          ;
11                                          ; Copyright: IBM Corp 1982
12                                          ;
13                                          ; Status: Version 1.00
14                                          ;
15                                          ; Function: Keyboard translation tables for the 3278/3279 U.S. EBCDIC
16                                          ;           keyboards
17                                          ;
18                                          ; Notes:
19                                          ;
20                                          ;    Dependencies: None
21                                          ;
22                                          ;    Restrictions: None
23                                          ;
24                                          ; Module Type: Program
25                                          ;
26                                          ;    Processor: Assembler
27                                          ;
28                                          ; Entry Point: XLAT_TABLES_PTR
29                                          ;
30                                          ;    Purpose: Array of pointers to keyboard translation tables
31                                          ;
32                                          ; External References:
33                                          ;
34                                          ;    Control Blocks:
35                                          ;
36                                          ;       NDSPXLAT - translation table values
37                                          ;
38                                          ; Messages Issued: None
39                                          ;
40                                          ; Change Activity: None
41                                          ;
42                                          ;******************* End of Specifications *******************
43
44                                                  SUBTTL  Keyboard Selection Table
45
46                                          ;       INCLUDE NDSPXLAT.ASM
47                                                  .LIST
48
49      0000                                TABLES  SEGMENT PUBLIC 'TABLES'
50
51
52                                          ;***************************************************************
53                                          ;*
54                                          ;*      KEYBOARD SELECTION TABLE
55                                          ;*
56                                          ;***************************************************************
57                                                          PUBLIC  XLAT_TABLES_PTR
58      0000                                XLAT_TABLES_PTR LABEL   WORD
59      0000  0000 0000 0000 0000                   DW      0000H,0,0,0                  ; RESERVED
60      0008  0140 0080 R 05FA R                    DW      0140H,TYPEWRITER,APL,0       ; APL, NUMERIC LOCK
61            0000
62      0010  0150 0080 R 05FA R                    DW      0150H,TYPEWRITER,APL,TEXT    ; TEXT, NUMERIC LOCK
63            06DC R
64      0018  0114 0080 R 07C0 R                    DW      0114H,TYPEWRITER,R8K1038,0   ; RPQ TYPEWRITER
65            0000
66      0020  0160 0080 R 0741 R                    DW      0160H,TYPEWRITER,AS,0        ; TYPEWRITER, ATTRIB SELECT
67            0000
68      0028  0140 0080 R 05FA R                    DW      0140H,TYPEWRITER,APL,0       ; APL
69            0000
70      0030  0150 0080 R 05FA R                    DW      0150H,TYPEWRITER,APL,TEXT    ; TEXT
71            06DC R
72      0038  0170 0080 R 05FA R                    DW      0170H,TYPEWRITER,APL,AS      ; APL, ATTRIBUTE SELECT
73            0741 R
74      0040  0130 0908 R 0E82 R                    DW      0130H,DATA_ENTRY,KP,0        ; DATA ENTRY 2, NUMERIC LOC
75            0000
76      0048  0120 0908 R 0000 0000                 DW      0120H,DATA_ENTRY,0,0         ; DATA ENTRY 1, NUMERIC LOC
77      0050  0110 0080 R 0000 0000                 DW      0110H,TYPEWRITER,0,0         ; TYPEWRITER, NUMERIC LOCK
78      0058  0000 0000 0000 0000                   DW      0000H,0,0,0                  ; RESERVED
79      0060  0130 0908 R 0E82 R                    DW      0130H,DATA_ENTRY,KP,0        ; DATA ENTRY 2
80            0000
81      0068  0120 0908 R 0000 0000                 DW      0120H,DATA_ENTRY,0,0         ; DATA ENTRY 1
82      0070  0110 0080 R 0000 0000                 DW      0110H,TYPEWRITER,0,0         ; TYPEWRITER
83      0078  0110 0080 R 0000 0000                 DW      0110H,TYPEWRITER,0,0         ; NO KEYBOARD - DEFAULT TO
84                                                                                       ;    TYPEWRITER
85
86                                                                                       ; TYPEWRITER XLAT TABLE
87                                  C               INCLUDE USETYP.ASM
88                                  C               SUBTTL  Typewriter Keyboard
```

```
 89
 90
 91                                    C   ;*******************************************************
 92                                    C   ;*
 93                                    C   ;*      Typewriter Keyboard Translation Table
 94                                    C   ;*
 95                                    C   ;*******************************************************
 96                                    C
 97      0080                          C   TYPEWRITER LABEL BYTE
 98                                    C
 99                                    C   ;      LOWER CASE
100                                    C
101      0080  00 29 00 02 00 03       C          DB      L,41,L, 2,L, 3,L, 4,L, 5                ;  1- 5
102            00 04 00 05             C
103      008A  00 06 00 07 00 08       C          DB      L, 6,L, 7,L, 8,L, 9,L,10                ;  6-10
104            00 09 00 0A             C
105      0094  00 0B 00 0C 00 0D       C          DB      L,11,L,12,L,13,L,14,L,15                ; 11-15
106            00 0E 00 0F             C
107      009E  00 10 00 11 00 12       C          DB      L,16,L,17,L,18,L,19,L,20                ; 16-20
108            00 13 00 14             C
109      00A8  00 15 00 16 00 17       C          DB      L,21,L,22,L,23,L,24,L,25                ; 21-25
110            00 18 00 19             C
111      00B2  00 1A 00 2B 80 0F       C          DB      L,26,L,43,U,15,0,SHIFT_LOCK,L,30        ; 26-30
112            00 FF 00 1E             C
113      00BC  00 1F 00 20 00 21       C          DB      L,31,L,32,L,33,L,34,L,35                ; 31-35
114            00 22 00 23             C
115      00C6  00 24 00 25 00 26       C          DB      L,36,L,37,L,38,L,39,L,40                ; 36-40
116            00 27 00 28             C
117      00D0  80 1A 00 1C 00 FE       C          DB      U,26,L,28,0,L_SHIFT,U,51,L,44           ; 41-45
118            80 33 00 2C             C
119      00DA  00 2D 00 2E 00 2F       C          DB      L,45,L,46,L,47,L,48,L,49                ; 46-50
120            00 30 00 31             C
121      00E4  00 32 00 33 00 34       C          DB      L,50,L,51,L,52,L,53,0,R_SHIFT           ; 51-55
122            00 35 00 FD             C
123      00EE  00 F8 00 1C 40 46       C          DB      0,RESET,L,28,C,70,L OR B,70,0,0         ; 56-60
124            01 46 00 00             C
125      00F8  00 00 00 00 40 4F       C          DB      0,0,0,0,C,79,U,55,0,CLICK               ; 61-65
126            80 37 00 F7             C
127      0102  00 F2 00 F6 01 52       C          DB      0,PAUSE_KEY,0,DEC_INP,L OR B,82,L,83,L,72 ; 66-70
128            00 53 00 48             C
129      010C  00 50 00 4B 00 4D       C          DB      L,80,L,75,L,77,0,ALT_SHIFT,L,57         ; 71-75
130            00 F9 00 39             C
131      0116  80 3D 80 3E 80 3F       C          DB      U,61,U,62,U,63,U,64,U,65                ; 76-80
132            80 40 80 41             C
133      0120  80 42 80 43 80 44       C          DB      U,66,U,67,U,68,C,59,C,60                ; 81-85
134            40 3B 40 3C             C
135      012A  40 3D 40 3E 00 00       C          DB      C,61,C,62,0, 0,0, 0                     ; 86-89
136            00 00                   C
137                                    C
138                                    C
139                                    C   ;      UPPER CASE
140      0132  80 29 80 2B 80 03       C          DB      U,41,U,43,U, 3,U, 4,U, 5                ;  1- 5
141            80 04 80 05             C
142      013C  80 06 80 07 80 08       C          DB      U, 6,U, 7,U, 8,U, 9,U,10                ;  6-10
143            80 09 80 0A             C
144      0146  80 0B 80 0C 80 0D       C          DB      U,11,U,12,U,13,U,14,L,15                ; 11-15
145            80 0E 00 0F             C
146      0150  80 10 80 11 80 12       C          DB      U,16,U,17,U,18,U,19,U,20                ; 16-20
147            80 13 80 14             C
148      015A  80 15 80 16 80 17       C          DB      U,21,U,22,U,23,U,24,U,25                ; 21-25
149            80 18 80 19             C
150      0164  80 02 00 1B 80 0F       C          DB      U, 2,L,27,U,15,0,SHIFT_LOCK,U,30        ; 26-30
151            00 FF 80 1E             C
152      016E  80 1F 80 20 80 21       C          DB      U,31,U,32,U,33,U,34,U,35                ; 31-35
153            80 22 80 23             C
154      0178  80 24 80 25 80 26       C          DB      U,36,U,37,U,38,U,39,U,40                ; 36-40
155            80 27 80 28             C
156      0182  80 1B 80 1C 00 FE       C          DB      U,27,U,28,0,L_SHIFT,U,52,U,44           ; 41-45
157            80 34 80 2C             C
158      018C  80 2D 80 2E 80 2F       C          DB      U,45,U,46,U,47,U,48,U,49                ; 46-50
159            80 30 80 31             C
160      0196  80 32 00 33 00 34       C          DB      U,50,L,51,L,52,U,53,0,R_SHIFT           ; 51-55
161            80 35 00 FD             C
162      01A0  00 F8 80 1C 40 46       C          DB      0,RESET,U,28,C,70,U OR B,70,0,0         ; 56-60
163            81 46 00 00             C
164      01AA  00 00 00 00 40 4F       C          DB      0, 0,0, 0,C,79,U,55,0,CLICK             ; 61-65
165            80 37 00 F7             C
166      01B4  00 F2 00 F6 01 52       C          DB      0,PAUSE_KEY,0,DEC_INP,L OR B,82,L,83,L,72 ; 66-70
167            00 53 00 48             C
168      01BE  00 50 00 4B 00 4D       C          DB      L,80,L,75,L,77,0,ALT_SHIFT,U,57         ; 71-75
169            00 F9 80 39             C
170      01C8  80 3D 80 3E 80 3F       C          DB      U,61,U,62,U,63,U,64,U,65                ; 76-80
171            80 40 80 41             C
172      01D2  80 42 80 43 80 44       C          DB      U,66,U,67,U,68,C,59,C,60                ; 81-85
173            40 3B 40 3C             C
174      01DC  40 3D 40 3E 00 00       C          DB      C,61,C,62,0, 0,0, 0                     ; 86-89
175            00 00                   C
176                                    C
177                                    C   ;      PERSONAL COMPUTER CONTROL CASE
178                                    C
179      01E4  00 00 00 00 40 03       C          DB      0, 0,0, 0,C, 3,0, 0,0, 0                ;  1- 5
180            00 00 00 00             C
181      01EE  00 00 40 07 00 00       C          DB      0, 0,C, 7,0, 0,0, 0,0, 0                ;  6-10
182            00 00 00 00             C
```

| Line | Addr | Bytes | | | | | | Col | Op | Operands | Comment |
|---|---|---|---|---|---|---|---|---|---|---|---|
| 183 | 01F8 | 00 | 00 | 40 | 0C | 00 | 00 | C | DB | 0, 0,C,12,0, 0,C,14,0, 0 | ; 11-15 |
| 184 | | 40 | 0E | 00 | 00 | | | C | | | |
| 185 | 0202 | 40 | 10 | 40 | 11 | 40 | 12 | C | DB | C,16,C,17,C,18,C,19,C,20 | ; 16-20 |
| 186 | | 40 | 13 | 40 | 14 | | | C | | | |
| 187 | 020C | 40 | 15 | 40 | 16 | 40 | 17 | C | DB | C,21,C,22,C,23,C,24,C,25 | ; 21-25 |
| 188 | | 40 | 18 | 40 | 19 | | | C | | | |
| 189 | 0216 | 40 | 1A | 40 | 2B | 40 | 47 | C | DB | C,26,C,43,C,71,0,SHIFT_LOCK,C,30 | ; 26-30 |
| 190 | | 00 | FF | 40 | 1E | | | C | | | |
| 191 | 0220 | 40 | 1F | 40 | 20 | 40 | 21 | C | DB | C,31,C,32,C,33,C,34,C,35 | ; 31-35 |
| 192 | | 40 | 22 | 40 | 23 | | | C | | | |
| 193 | 022A | 40 | 24 | 40 | 25 | 40 | 26 | C | DB | C,36,C,37,C,38,0, 0,0, 0 | ; 36-40 |
| 194 | | 00 | 00 | 00 | 00 | | | C | | | |
| 195 | 0234 | 40 | 1B | 40 | 1C | 00 | FE | C | DB | C,27,C,28,0,L_SHIFT,0, 0,C,44 | ; 41-45 |
| 196 | | 00 | 00 | 40 | 2C | | | C | | | |
| 197 | 023E | 40 | 2D | 40 | 2E | 40 | 2F | C | DB | C,45,C,46,C,47,C,48,C,49 | ; 46-50 |
| 198 | | 40 | 30 | 40 | 31 | | | C | | | |
| 199 | 0248 | 40 | 32 | 00 | 00 | 00 | 00 | C | DB | C,50,0, 0,0, 0,0, 0,0,R_SHIFT | ; 51-55 |
| 200 | | 00 | 00 | 00 | FD | | | C | | | |
| 201 | 0252 | 00 | F8 | 40 | 1C | 00 | 00 | C | DB | 0,RESET,C,28,0, 0,0, 0,0, 0 | ; 56-60 |
| 202 | | 00 | 00 | 00 | 00 | | | C | | | |
| 203 | 025C | 00 | 00 | 00 | 00 | 00 | 00 | C | DB | 0, 0,0, 0,0, 0,C,55,0, 0 | ; 61-65 |
| 204 | | 40 | 37 | 00 | 00 | | | C | | | |
| 205 | 0266 | 00 | 00 | 00 | 00 | 00 | 00 | C | DB | 0, 0,0, 0,0, 0,C OR A,63,C,73 | ; 66-70 |
| 206 | | 60 | 53 | 40 | 49 | | | C | | | |
| 207 | 0270 | 40 | 51 | 00 | 00 | 00 | 00 | C | DB | C,81,0, 0,0, 0,0, 0,ALT_SHIFT,C,57 | ; 71-75 |
| 208 | | 00 | F9 | 40 | 39 | | | C | | | |
| 209 | 027A | 00 | 00 | 00 | 00 | 00 | 00 | C | DB | 0, 0,0, 0,0, 0,0, 0,0, 0 | ; 76-80 |
| 210 | | 00 | 00 | 00 | 00 | | | C | | | |
| 211 | 0284 | 00 | 00 | 00 | 00 | 00 | 00 | C | DB | 0, 0,0, 0,0, 0,0, 0,0, 0 | ; 81-85 |
| 212 | | 00 | 00 | 00 | 00 | | | C | | | |
| 213 | 028E | 00 | 00 | 00 | 00 | 00 | 00 | C | DB | 0, 0,0, 0,0, 0,0, 0 | ; 86-89 |
| 214 | | 00 | 00 | | | | | C | | | |
| 215 | | | | | | | | C | | | |
| 216 | | | | | | | | C ; | | PERSONAL COMPUTER ALT CASE | |
| 217 | | | | | | | | C | | | |
| 218 | 0296 | 00 | 00 | 20 | 02 | 20 | 03 | C | DB | 0, 0,A, 2,A, 3, A, 4,A, 5 | ; 1- 5 |
| 219 | | 20 | 04 | 20 | 05 | | | C | | | |
| 220 | 02A0 | 20 | 06 | 20 | 07 | 20 | 08 | C | DB | A, 6,A, 7,A, 8,A, 9,A,10 | ; 6-10 |
| 221 | | 20 | 09 | 20 | 0A | | | C | | | |
| 222 | 02AA | 20 | 0B | 20 | 0C | 20 | 0D | C | DB | A,11,A,12,A,13,0, 0,0, 0 | ; 11-15 |
| 223 | | 00 | 00 | 00 | 00 | | | C | | | |
| 224 | 02B4 | 20 | 10 | 20 | 11 | 20 | 12 | C | DB | A,16,A,17,A,18,A,19,A,20 | ; 16-20 |
| 225 | | 20 | 13 | 20 | 14 | | | C | | | |
| 226 | 02BE | 20 | 15 | 20 | 16 | 20 | 17 | C | DB | A,21,A,22,A,23,A,24,A,25 | ; 21-25 |
| 227 | | 20 | 18 | 20 | 19 | | | C | | | |
| 228 | 02C8 | 00 | 00 | 00 | 00 | 00 | 00 | C | DB | 0, 0,0, 0,0, 0,SHIFT_LOCK,A,30 | ; 26-30 |
| 229 | | 00 | FF | 20 | 1E | | | C | | | |
| 230 | 02D2 | 20 | 1F | 20 | 20 | 20 | 21 | C | DB | A,31,A,32,A,33,A,34,A,35 | ; 31-35 |
| 231 | | 20 | 22 | 20 | 23 | | | C | | | |
| 232 | 02DC | 20 | 24 | 20 | 25 | 20 | 26 | C | DB | A,36,A,37,A,38,0, 0,0, 0 | ; 36-40 |
| 233 | | 00 | 00 | 00 | 00 | | | C | | | |
| 234 | 02E6 | 00 | 00 | 00 | 00 | 00 | FE | C | DB | 0, 0,0, 0,0,L_SHIFT,0, 0,A,44 | ; 41-45 |
| 235 | | 00 | 00 | 20 | 2C | | | C | | | |
| 236 | 02F0 | 20 | 2D | 20 | 2E | 20 | 2F | C | DB | A,45,A,46,A,47,A,48,A,49 | ; 46-50 |
| 237 | | 20 | 30 | 20 | 31 | | | C | | | |
| 238 | 02FA | 20 | 32 | 00 | 00 | 00 | 00 | C | DB | A,50,0, 0,0, 0,0, 0,0,R_SHIFT | ; 51-55 |
| 239 | | 00 | 00 | 00 | FD | | | C | | | |
| 240 | 0304 | 00 | F8 | 00 | 00 | 00 | 00 | C | DB | 0,RESET,0, 0,0, 0,0, 0,0, 0 | ; 56-60 |
| 241 | | 00 | 00 | 00 | 00 | | | C | | | |
| 242 | 030E | 00 | 00 | 00 | 00 | 00 | 00 | C | DB | 0, 0,0, 0,0, 0,0, 0,0, 0 | ; 61-65 |
| 243 | | 00 | 00 | 00 | 00 | | | C | | | |
| 244 | 0318 | 00 | 00 | 00 | 00 | 00 | 00 | C | DB | 0, 0,0, 0,0, 0,0, 0,0, 0 | ; 66-70 |
| 245 | | 00 | 00 | 00 | 00 | | | C | | | |
| 246 | 0322 | 00 | 00 | 00 | 00 | 00 | 00 | C | DB | 0, 0,0, 0,0, 0,0,ALT_SHIFT,A,57 | ; 71-75 |
| 247 | | 00 | F9 | 20 | 39 | | | C | | | |
| 248 | 032C | 00 | 00 | 00 | 00 | 00 | 00 | C | DB | 0, 0,0, 0,0, 0,0, 0,0, 0 | ; 76-80 |
| 249 | | 00 | 00 | 00 | 00 | | | C | | | |
| 250 | 0336 | 00 | 00 | 00 | 00 | 00 | 00 | C | DB | 0, 0,0, 0,0, 0,0, 0,0, 0 | ; 81-85 |
| 251 | | 00 | 00 | 00 | 00 | | | C | | | |
| 252 | 0340 | 00 | 00 | 00 | 00 | 00 | 00 | C | DB | 0, 0,0, 0,0, 0,0, 0 | ; 86-89 |
| 253 | | 00 | 00 | | | | | C | | | |
| 254 | | | | | | | | C | | | |
| 255 | | | | | | | | C ; | | ALT CASE | |
| 256 | | | | | | | | C | | | |
| 257 | 0348 | 00 | 01 | 00 | 3B | 00 | 3C | C | DB | L, 1,L,59,L,60,L,61,L,62 | ; 1- 5 |
| 258 | | 00 | 3D | 00 | 3E | | | C | | | |
| 259 | 0352 | 00 | 3F | 00 | 40 | 00 | 41 | C | DB | L,63,L,64,L,65,L,66,L,67 | ; 6-10 |
| 260 | | 00 | 42 | 00 | 43 | | | C | | | |
| 261 | 035C | 00 | 44 | 80 | 3B | 80 | 3C | C | DB | L,68,U,59,U,60,0, 0,L,79 | ; 11-15 |
| 262 | | 00 | 00 | 00 | 4F | | | C | | | |
| 263 | 0366 | 80 | 3B | 80 | 3C | 80 | 3D | C | DB | U,59,U,60,U,61,U,62,U,63 | ; 16-20 |
| 264 | | 80 | 3E | 80 | 3F | | | C | | | |
| 265 | 0370 | 80 | 40 | 80 | 41 | 80 | 42 | C | DB | U,64,U,65,U,66,U,67,U,68 | ; 21-25 |
| 266 | | 80 | 43 | 80 | 44 | | | C | | | |
| 267 | 037A | 00 | 00 | 00 | 00 | 00 | 47 | C | DB | 0, 0,0, 0,L,71,0,SHIFT_LOCK,C,59 | ; 26-30 |
| 268 | | 00 | FF | 40 | 3B | | | C | | | |
| 269 | 0384 | 40 | 3C | 40 | 3D | 40 | 3E | C | DB | C,60,C,61,C,62,C,63,C,64 | ; 31-35 |
| 270 | | 40 | 3F | 40 | 40 | | | C | | | |
| 271 | 038E | 40 | 41 | 40 | 42 | 40 | 43 | C | DB | C,65,C,66,C,67,C,68,0, 0 | ; 36-40 |
| 272 | | 40 | 44 | 00 | 00 | | | C | | | |
| 273 | 0398 | 00 | 00 | 40 | 1C | 00 | FE | C | DB | 0, 0,C,28,0,L_SHIFT,0, 0,A,59 | ; 41-45 |
| 274 | | 00 | 00 | 20 | 3B | | | C | | | |
| 275 | 03A2 | 20 | 3C | 20 | 3D | 20 | 3E | C | DB | A,60,A,61,A,62,A,63,A,64 | ; 46-50 |
| 276 | | 20 | 3F | 20 | 40 | | | C | | | |

| | | | | | |
|---|---|---|---|---|---|
| 277 | 03AC | 20 41 20 42 20 43 | C | DB | A,65,A,66,A,67,A,68,0,R_SHIFT ; 51-55 |
| 278 | | 20 44 00 FD | C | | |
| 279 | 03B6 | 00 F8 40 1C 00 00 | C | DB | 0,RESET,C,28,0,0,C,71,0, 0 ; 56-60 |
| 280 | | 40 47 00 00 | C | | |
| 281 | 03C0 | 40 51 00 00 00 00 | C | DB | C,81,0, 0,0, 0,0, 0,0, 0 ; 61-65 |
| 282 | | 00 00 00 00 | C | | |
| 283 | 03CA | 00 F4 00 F3 00 F5 | C | DB | 0,CTL_KEY,0,ALT_KEY,0,SWITCH_MODE,0, 0,L,73 ; 66-70 |
| 284 | | 00 00 00 49 | C | | |
| 285 | 03D4 | 00 51 40 4B 40 4D | C | DB | L,31,C,75,C,77,0,ALT_SHIFT,L,57 ; 71-75 |
| 286 | | 00 F9 00 39 | C | | |
| 287 | 03DE | 00 00 00 00 00 00 | C | DB | 0, 0,0, 0,0, 0,0, 0,0, 0 ; 76-80 |
| 288 | | 00 00 00 00 | C | | |
| 289 | 03E8 | 00 00 00 00 00 00 | C | DB | 0, 0,0, 0,0, 0,0, 0,0, 0 ; 81-85 |
| 290 | | 00 00 00 00 | C | | |
| 291 | 03F2 | 00 00 00 00 00 00 | C | DB | 0, 0,0, 0,0, 0,0, 0 ; 86-89 |
| 292 | | 00 00 | C | | |
| 293 | | | C | | |
| 294 | | | C ; | ENCODED KEYSTROKE TRANSLATION TABLE | |
| 295 | | | C | | |
| 296 | 03FA | 00 00 00 00 00 00 | C | DB | 0, 0,0, 0,0, 0,0, 0,0, 0,0, 0,0, 0,0, 0 ; 00-07 |
| 297 | | 00 00 00 00 00 00 | C | | |
| 298 | | 00 00 00 00 | C | | |
| 299 | 040A | 00 0E 00 0F 00 00 | C | DB | L,14,L,15,0, 0,0, 0,L,42,0, 0,0, 0 ; 08-0F |
| 300 | | 00 00 00 00 00 2A | C | | |
| 301 | | 00 00 00 00 | C | | |
| 302 | 041A | 00 00 00 00 00 00 | C | DB | 0, 0,0, 0,0, 0,0, 0,0, 0,0, 0,0, 0,0, 0 ; 10-17 |
| 303 | | 00 00 00 00 00 00 | C | | |
| 304 | | 00 00 00 00 | C | | |
| 305 | 042A | 00 00 00 00 00 00 | C | DB | 0, 0,0, 0,0,A,63,0, 0,0, 0,0, 0,0, 0 ; 18-1F |
| 306 | | 20 3F 00 00 00 00 | C | | |
| 307 | | 00 00 00 00 | C | | |
| 308 | 043A | 00 4B 80 1A 80 28 | C | DB | L,75,U,26,U,40,U, 4,U, 5,U, 6,U, 8,L,40 ; 20-27 |
| 309 | | 80 04 80 05 80 06 | C | | |
| 310 | | 80 08 00 28 | C | | |
| 311 | 044A | 80 0A 80 0B 80 09 | C | DB | U,10,U,11,U, 9,U,13,L,52,L,12,L,53,L,54 ; 28-2F |
| 312 | | 80 0D 00 34 00 0C | C | | |
| 313 | | 00 35 00 36 | C | | |
| 314 | 045A | 00 0B 00 02 00 03 | C | DB | L,11,L, 2,L, 3,L, 4,L, 5,L, 6,L, 7,L, 8 ; 30-37 |
| 315 | | 00 04 00 05 00 06 | C | | |
| 316 | | 00 07 00 08 | C | | |
| 317 | 046A | 00 09 00 0A 80 27 | C | DB | L, 9,L,10,U,39,L,39,L,44,L,13,U,44,U,54 ; 38-3F |
| 318 | | 00 27 00 2C 00 0D | C | | |
| 319 | | 80 2C 80 36 | C | | |
| 320 | 047A | 80 03 80 1E 80 31 | C | DB | U, 3,U,30,U,49,U,47,U,32,U,18,U,33,U,34 ; 40-47 |
| 321 | | 80 2F 80 20 80 12 | C | | |
| 322 | | 80 21 80 22 | C | | |
| 323 | 048A | 80 23 80 17 80 24 | C | DB | U,35,U,23,U,36,U,37,U,38,U,51,U,50,U,24 ; 48-4F |
| 324 | | 80 25 80 26 80 33 | C | | |
| 325 | | 80 32 80 18 | C | | |
| 326 | 049A | 80 19 80 10 80 13 | C | DB | U,25,U,16,U,19,U,31,U,20,U,22,U,48,U,17 ; 50-57 |
| 327 | | 80 1F 80 14 80 16 | C | | |
| 328 | | 80 30 80 11 | C | | |
| 329 | 04AA | 80 2E 80 15 80 2D | C | DB | U,46,U,21,U,45,0, 0,L,27,0, 0,0, 0,U,12 ; 58-5F |
| 330 | | 00 00 00 1B 00 00 | C | | |
| 331 | | 00 00 80 0C | C | | |
| 332 | 04BA | 00 01 00 1E 00 31 | C | DB | L, 1,L,30,L,49,L,47,L,32,L,18,L,33,L,34 ; 60-67 |
| 333 | | 00 2F 00 20 00 12 | C | | |
| 334 | | 00 21 00 22 | C | | |
| 335 | 04CA | 00 23 00 17 00 24 | C | DB | L,35,L,23,L,36,L,37,L,38,L,51,L,50,L,24 ; 68-6F |
| 336 | | 00 25 00 26 00 33 | C | | |
| 337 | | 00 32 00 18 | C | | |
| 338 | 04DA | 00 19 00 10 00 13 | C | DB | L,25,L,16,L,19,L,31,L,20,L,22,L,48,L,17 ; 70-77 |
| 339 | | 00 1F 00 14 00 16 | C | | |
| 340 | | 00 30 00 11 | C | | |
| 341 | 04EA | 00 2E 00 15 00 2D | C | DB | L,46,L,21,L,45,L,41,U,27,U,41,U, 1,0, 0 ; 78-7F |
| 342 | | 00 29 80 1B 80 29 | C | | |
| 343 | | 80 01 00 00 | C | | |
| 344 | 04FA | 80 02 80 07 00 1A | C | DB | U, 2,U, 7,L,26,L,14,L,15,L,28,L,42,A,28 ; 80-87 |
| 345 | | 00 0E 00 0F 00 1C | C | | |
| 346 | | 00 2A 20 1C | C | | |
| 347 | 050A | 00 38 20 38 00 39 | C | DB | L,56,A,56,L,57,A, 0,BA,0, 0,0, 0,0, 0,0, 0 ; 88-8F |
| 348 | | 20 00 02 00 00 00 | C | | |
| 349 | | 00 00 00 00 | C | | |
| 350 | 051A | 00 3A 20 3A 00 3B | C | DB | L,58,A,58,L,59,A,59,L,60,A,60,L,61,A,61 ; 90-97 |
| 351 | | 20 3B 00 3C 20 3C | C | | |
| 352 | | 00 3D 20 3D | C | | |
| 353 | 052A | 00 3E 20 3E 00 3F | C | DB | L,62,A,62,L,63,A,63,L,64,A,64,L,65,A,65 ; 98-9F |
| 354 | | 20 3F 00 40 20 40 | C | | |
| 355 | | 00 41 20 41 | C | | |
| 356 | 053A | 00 42 20 42 00 43 | C | DB | L,66,A,66,L,67,A,67,L,68,A,68,L,69,A,69 ; A0-A7 |
| 357 | | 20 43 00 44 20 44 | C | | |
| 358 | | 00 45 20 45 | C | | |
| 359 | 054A | 00 46 20 46 00 47 | C | DB | L,70,A,70,L,71,A,71,L,72,A,72,L,73,A,73 ; A8-AF |
| 360 | | 20 47 00 48 20 48 | C | | |
| 361 | | 00 49 20 49 | C | | |
| 362 | 055A | 20 02 20 03 20 04 | C | DB | A, 2,A, 3,A, 4,A, 5,A, 6,A, 7,A, 8,A, 9 ; B0-B7 |
| 363 | | 20 05 20 06 20 07 | C | | |
| 364 | | 20 08 20 09 | C | | |
| 365 | 056A | 20 0A 20 0B 20 0C | C | DB | A,10,A,11,A,12,A,13,L,76,L,77,L,78,L,79 ; B8-BF |
| 366 | | 20 0D 00 4C 00 4D | C | | |
| 367 | | 00 4E 00 4F | C | | |
| 368 | 057A | 00 50 00 51 00 52 | C | DB | L,80,L,81,L,82,L,83,L,84,L,85,L,86,L,87 ; C0-C7 |
| 369 | | 00 53 00 54 00 55 | C | | |
| 370 | | 00 56 00 57 | C | | |
| 371 | 058A | 00 00 00 00 00 00 | C | DB | 0, 0,0, 0,0, 0,0, 0,0, 0,0, 0,0, 0,0, 0 ; C8-CF |

```
372              00 00 00 00 00 00    c
373              00 00 00 00          c
374     059A     00 00 00 00 00 00    c          DB      0, 0,0, 0,0, 0,0, 0,0, 0,0, 0,0, 0,0, 0      ; D0-D7
375              00 00 00 00 00 00    c
376              00 00 00 00          c
377     05AA     00 00 00 00 00 00    c          DB      0, 0,0, 0,0, 0,0, 0,0, 0,0, 0,0, 0,0, 0      ; D8-DF
378              00 00 00 00 00 00    c
379              00 00 00 00          c
380     05BA     00 00 00 00 00 00    c          DB      0, 0,0, 0,0, 0,0, 0,0, 0,0, 0,0, 0,0, 0      ; E0-E7
381              00 00 00 00 00 00    c
382              00 00 00 00          c
383     05CA     00 00 00 00 00 00    c          DB      0, 0,0, 0,0, 0,0, 0,0, 0,0, 0,0, 0,0, 0      ; E8-EF
384              00 00 00 00 00 00    c
385              00 00 00 00          c
386     05DA     00 00 00 00 00 00    c          DB      0, 0,0, 0,0, 0,0, 0,0, 0,0, 0,0, 0,0, 0      ; F0-F7
387              00 00 00 00 00 00    c
388              00 00 00 00          c
389     05EA     00 00 00 00 00 00    c          DB      0, 0,0, 0,0, 0,0, 0,0, 0,0, 0,0, 0,0, 0      ; F8-FF
390              00 00 00 00 00 00    c
391              00 00 00 00          c
392                                   c
393                                   c
394                                   c          INCLUDE USEAPL.ASM                ; APL MODIFICATIONS
395                                   c          SUBTTL  Modifications For APL Keyboard
396                                   c
397                                   c ;********************************************************
398                                   c ;*                                                        *
399                                   c ;*    Modifications required to change Typewriter keyboard into   *
400                                   c ;*    an APL keyboard                                     *
401                                   c ;*                                                        *
402                                   c ;********************************************************
403                                   c
404                                   c
405     05FA                          c APL      LABEL WORD
406                                   c
407                                   c ;        Inbound translation table changes
408                                   c
409     05FA     05 02 00 00          c          DB      NA , 2, 0, 0      ; Remove PF1-12 from keys 2-13
410     05FE     05 03 00 00          c          DB      NA , 3, 0, 0
411     0602     05 04 00 00          c          DB      NA , 4, 0, 0
412     0606     05 05 00 00          c          DB      NA , 5, 0, 0
413     060A     05 06 00 00          c          DB      NA , 6, 0, 0
414     060E     05 07 00 00          c          DB      NA , 7, 0, 0
415     0612     05 08 00 00          c          DB      NA , 8, 0, 0
416     0616     05 09 00 00          c          DB      NA , 9, 0, 0
417     061A     05 0A 00 00          c          DB      NA ,10, 0, 0
418     061E     05 0B 00 00          c          DB      NA ,11, 0, 0
419     0622     05 0C 00 00          c          DB      NA ,12, 0, 0
420     0626     05 0D 00 00          c          DB      NA ,13, 0, 0
421                                   c
422     062A     01 4C 00 3B          c          DB      NL ,76,PL,59     ; Put PF1-12 on outboard keypad
423     062E     02 4C 00 3B          c          DB      NU ,76,PL,59
424     0632     01 4D 00 3C          c          DB      NL ,77,PL,60
425     0636     02 4D 00 3C          c          DB      NU ,77,PL,60
426     063A     01 4E 00 3D          c          DB      NL ,78,PL,61
427     063E     02 4E 00 3D          c          DB      NU ,78,PL,61
428     0642     01 4F 00 3E          c          DB      NL ,79,PL,62
429     0646     02 4F 00 3E          c          DB      NU ,79,PL,62
430     064A     01 50 00 3F          c          DB      NL ,80,PL,63
431     064E     02 50 00 3F          c          DB      NU ,80,PL,63
432     0652     01 51 00 40          c          DB      NL ,81,PL,64
433     0656     02 51 00 40          c          DB      NU ,81,PL,64
434     065A     01 52 00 41          c          DB      NL ,82,PL,65
435     065E     02 52 00 41          c          DB      NU ,82,PL,65
436     0662     01 53 00 42          c          DB      NL ,83,PL,66
437     0666     02 53 00 42          c          DB      NU ,83,PL,66
438     066A     01 54 00 43          c          DB      NL ,84,PL,67
439     066E     02 54 00 43          c          DB      NU ,84,PL,67
440     0672     01 55 00 44          c          DB      NL ,85,PL,68
441     0676     02 55 00 44          c          DB      NU ,85,PL,68
442     067A     01 56 80 3B          c          DB      NL ,86,PU,59
443     067E     02 56 80 3B          c          DB      NU ,86,PU,59
444     0682     01 57 80 3C          c          DB      NL ,87,PU,60
445     0686     02 57 80 3C          c          DB      NU ,87,PU,60
446                                   c
447     068A     00 00 00 00          c          DB      0, 0, 0, 0       ; End of inbound table changes
448                                   c
449                                   c ;        Outbound translation table changes
450                                   c
451     068E     8F 20 0E             c          DB      08FH,A,14         ; Move APL ON/OFF to ALT key 14
452                                   c
453     0691     B0 00 4C             c          DB      0B0H,L,76         ; Move PF1-12 to outboard keypad
454     0694     B1 00 4D             c          DB      0B1H,L,77
455     0697     B2 00 4E             c          DB      0B2H,L,78
456     069A     B3 00 4F             c          DB      0B3H,L,79
457     069D     B4 00 50             c          DB      0B4H,L,80
458     06A0     B5 00 51             c          DB      0B5H,L,81
459     06A3     B6 00 52             c          DB      0B6H,L,82
460     06A6     B7 00 53             c          DB      0B7H,L,83
461     06A9     B8 00 54             c          DB      0B8H,L,84
462     06AC     B9 00 55             c          DB      0B9H,L,85
463     06AF     BA 00 56             c          DB      0BAH,L,86
464     06B2     BB 00 57             c          DB      0BBH,L,87
465     06B5     BC 00 00             c          DB      0BCH,0, 0         ; Remove PF13-F24
466     06B8     BD 00 00             c          DB      0BDH,0, 0
467     06BB     BE 00 00             c          DB      0BEH,0, 0
468     06BE     BF 00 00             c          DB      0BFH,0, 0
```

```
469  06C1  C0 00 00           C        DB      0C0H,0, 0
470  06C4  C1 00 00           C        DB      0C1H,0, 0
471  06C7  C2 00 00           C        DB      0C2H,0, 0
472  06CA  C3 00 00           C        DB      0C3H,0, 0
473  06CD  C4 00 00           C        DB      0C4H,0, 0
474  06D0  C5 00 00           C        DB      0C5H,0, 0
475  06D3  C6 00 00           C        DB      0C6H,0, 0
476  06D6  C7 00 00           C        DB      0C7H,0, 0
477                           C
478  06D9  00 00 00           C        DB      000H,0, 0       ; End of outbound table changes
479                           C
480                           C
481                           C        INCLUDE USETXT.ASM              ;  TEXT MODIFICATIONS
482                           C        SUBTTL  Modifications For Text Keyboard
483                           C
484                           C
485                           C  ;****************************************************************
486                           C  ;*
487                           C  ;*     Modifications required to change Typewriter keyboard into
488                           C  ;*     a Text keyboard
489                           C  ;*
490                           C  ;*     Note: the changes for the APL keyboard are also required for
491                           C  ;*           the Text keyboard
492                           C  ;*
493                           C  ;****************************************************************
494                           C
495  06DC                     C  TEXT   LABEL WORD
496                           C
497                           C  ;      Inbound translation table changes
498                           C
499  06DC  01 1A 80 02        C        DB      NL ,26,PU, 2    ; Put ! on lower case key 26
500  06E0  02 1A 00 1A        C        DB      NU ,26,PL,26    ; Put ¦ on upper case key 26
501                           C
502  06E4  05 1C 00 00        C        DB      NA ,28, 0, 0    ; Move HOME to ALT/DELETE
503  06E8  05 45 00 47        C        DB      NA ,69,PL,71
504                           C
505  06EC  01 42 00 F4        C        DB      NL ,66, 0,CTL_KEY ; Move PA1 to lower case of DUP key
506                           C
507  06F0  03 1C 00 00        C        DB      NPC,28, 0, 0    ; Move MODE SWITCH to ALT/PA1
508  06F4  05 42 00 F5        C        DB      NA ,66, 0,SWITCH_MODE
509                           C
510  06F8  01 43 00 F3        C        DB      NL ,67, 0,ALT_KEY ; Move PA2 to lower case of FM key
511  06FC  05 43 00 00        C        DB      NA ,67, 0, 0
512                           C
513  0700  05 44 00 1C        C        DB      NA ,68,PL,28    ; Move RETURN to ALT/INSERT
514                           C
515  0704  01 3B 40 47        C        DB      NL ,59,PC,71    ; Swap CURSR SEL and CLEAR
516  0708  02 3B 40 47        C        DB      NU ,59,PC,71
517  070C  05 3B 00 46        C        DB      NA ,59,PL,70
518                           C
519  0710  00 00 00 00        C        DB      0, 0, 0, 0      ; End of inbound table changes
520                           C
521                           C  ;      Outbound translation table changes
522                           C
523  0714  21 00 1A           C        DB      021H,L,26       ; Move ! to lower case key 26
524  0717  81 80 1A           C        DB      081H,U,26       ; Move Not Sign to upper case 26
525  071A  82 20 07           C        DB      082H,A,7        ; Move Cent Sign to ALT/key 7
526                           C
527  071D  08 00 00           C        DB      008H,0, 0       ; Remove Backspace
528  0720  83 00 00           C        DB      083H,0, 0
529                           C
530  0723  8F 00 0E           C        DB      08FH,L,14       ; Move TEXT ON/OFF to lower case key 14
531                           C
532  0726  0D 20 44           C        DB      00DH,A,68       ; Move RETURN to ALT/INSERT
533  0729  87 20 45           C        DB      087H,A,69       ; Move HOME to ALT/DELETE
534  072C  92 20 3B           C        DB      092H,A,59       ; Move CURSR SEL to ALT/key 59
535  072F  93 00 3B           C        DB      093H,L,59       ; Move CLEAR to lower case key 59
536  0732  A0 80 42           C        DB      0A0H,U,66       ; Move DUP to upper case key 66
537  0735  A1 00 42           C        DB      0A1H,L,66       ; Move PA1 to lower case key 66
538  0738  A2 80 43           C        DB      0A2H,U,67       ; Move Field Mark to upper case key 67
539  073B  A3 00 43           C        DB      0A3H,L,67       ; Move PA2 to lower case key 67
540                           C
541  073E  00 00 00           C        DB      000H,0, 0       ; End of outbound table changes
542                           C
543                           C
544                           C        INCLUDE USEAS.ASM               ;  ATTRIBUTE SELECT MODS
545                           C        SUBTTL  Modifications For Attribute Select keyboard
546                           C
547                           C
548                           C  ;****************************************************************
549                           C  ;*
550                           C  ;*     Modifications required to change Typewriter or APL keyboard
551                           C  ;*     into an Attribute Select keyboard
552                           C  ;*
553                           C  ;****************************************************************
554                           C
555  0741                     C  AS     LABEL WORD
556                           C
557                           C  ;      Inbound translation table changes
558                           C
559  0741  02 4C 00 00        C        DB      NU ,76, 0, 0    ; Remove function keys from upper case
560  0745  02 4D 00 00        C        DB      NU ,77, 0, 0    ;   on outboard keypad
561  0749  02 4E 00 00        C        DB      NU ,78, 0, 0
562  074D  02 4F 00 00        C        DB      NU ,79, 0, 0
```

```
563     0751    02 50 00 00         C       DB      NU ,80, 0, 0
564     0755    02 51 00 00         C       DB      NU ,81, 0, 0
565     0759    02 52 00 00         C       DB      NU ,82, 0, 0
566     075D    02 53 00 00         C       DB      NU ,83, 0, 0
567     0761    02 54 00 00         C       DB      NU ,84, 0, 0
568     0765    02 55 00 00         C       DB      NU ,85, 0, 0
569     0769    02 56 00 00         C       DB      NU ,86, 0, 0
570     076D    02 57 00 00         C       DB      NU ,87, 0, 0
571                                 C
572     0771    00 00 00 00         C       DB       0 , 0, 0, 0       ; End of inbound table changes
573                                 C
574                                 C ;     Outbound translation table changes
575                                 C
576     0775    D0 80 4C            C       DB      0D0H,U,76          ; Put attributes on outboard key pad
577     0778    D1 80 4F            C       DB      0D1H,U,79
578     077B    D2 80 52            C       DB      0D2H,U,82
579     077E    D3 80 55            C       DB      0D3H,U,85
580     0781    D4 20 4C            C       DB      0D4H,A,76
581     0784    D5 20 4F            C       DB      0D5H,A,79
582     0787    D6 20 52            C       DB      0D6H,A,82
583     078A    D7 20 55            C       DB      0D7H,A,85
584                                 C
585     078D    E0 80 4D            C       DB      0E0H,U,77          ; Put PS selection on outboard key pad
586     0790    E1 80 50            C       DB      0E1H,U,80
587     0793    E2 80 53            C       DB      0E2H,U,83
588     0796    E3 80 56            C       DB      0E3H,U,86
589     0799    E4 20 4D            C       DB      0E4H,A,77
590     079C    E5 20 50            C       DB      0E5H,A,80
591     079F    E6 20 53            C       DB      0E6H,A,83
592     07A2    E7 20 56            C       DB      0E7H,A,86
593                                 C
594     07A5    F0 80 4E            C       DB      0F0H,U,78          ; Put colors on outboard key pad
595     07A8    F1 80 51            C       DB      0F1H,U,81
596     07AB    F2 80 54            C       DB      0F2H,U,84
597     07AE    F3 80 57            C       DB      0F3H,U,87
598     07B1    F4 20 4E            C       DB      0F4H,A,78
599     07B4    F5 20 51            C       DB      0F5H,A,81
600     07B7    F6 20 54            C       DB      0F6H,A,84
601     07BA    F7 20 57            C       DB      0F7H,A,87
602                                 C
603     07BD    00 00 00            C       DB      000H,0, 0          ; End of outbound table changes
604                                 C
605                                 C
606                                 C       INCLUDE USER1038.ASM       ; RPQ 8K1038 MODIFICATIONS
607                                 C       SUBTTL  Modifications For RPQ 8K1038 Keyboard
608                                 C
609                                 C
610                                 C ;**************************************************************
611                                 C ;*
612                                 C ;*     Modifications required to change Typewriter keyboard into
613                                 C ;*     an RPQ 8K1038 keyboard
614                                 C ;*
615                                 C ;**************************************************************
616                                 C
617     07C0                        C       R8K1038 LABEL WORD
618                                 C
619                                 C ;     Inbound translation table changes
620                                 C
621     07C0    05 02 00 00         C       DB      NA , 2, 0,0        ; Remove F1-12 from keys 2-13
622     07C4    05 03 00 00         C       DB      NA , 3, 0,0
623     07C8    05 04 00 00         C       DB      NA , 4, 0,0
624     07CC    05 05 00 00         C       DB      NA , 5, 0,0
625     07D0    05 06 00 00         C       DB      NA , 6, 0,0
626     07D4    05 07 00 00         C       DB      NA , 7, 0,0
627     07D8    05 08 00 00         C       DB      NA , 8, 0,0
628     07DC    05 09 00 00         C       DB      NA , 9, 0,0
629     07E0    05 0A 00 00         C       DB      NA ,10, 0,0
630     07E4    05 0B 00 00         C       DB      NA ,11, 0,0
631     07E8    05 0C 00 00         C       DB      NA ,12, 0,0
632     07EC    05 0D 00 00         C       DB      NA ,13, 0,0
633                                 C
634     07F0    01 3B 40 47         C       DB      NL ,59,PC,71       ; Move CLEAR to upper/lower case key !
635     07F4    02 3B 40 47         C       DB      NU ,59,PC,71
636     07F8    05 3B 00 00         C       DB      NA ,59, 0, 0
637                                 C
638     07FC    01 3D 00 46         C       DB      NL ,61,PL,70       ; Move CURSR SEL to upper/lower key 61
639     0800    02 3D 80 46         C       DB      NU ,61,PU,70
640                                 C
641     0804    01 42 00 F4         C       DB      NL ,66, 0,CTL_KEY  ; Move PA1 to lower case key 66
642     0808    05 42 00 00         C       DB      NA ,66, 0, 0
643                                 C
644     080C    01 43 00 F3         C       DB      NL ,67, 0,ALT_KEY  ; Move PA2 to lower case key 67
645     0810    05 43 00 00         C       DB      NA ,67, 0, 0
646                                 C
647     0814    01 4C 00 3B         C       DB      NL ,76,PL,59       ; Move PF1-12 to lower case on outboar
648     0818    01 4D 00 3C         C       DB      NL ,77,PL,60       ;   keypad
649     081C    01 4E 00 3D         C       DB      NL ,78,PL,61
650     0820    01 4F 00 3E         C       DB      NL ,79,PL,62
651     0824    01 50 00 3F         C       DB      NL ,80,PL,63
652     0828    01 51 00 40         C       DB      NL ,81,PL,64
653     082C    01 52 00 41         C       DB      NL ,82,PL,65
654     0830    01 53 00 42         C       DB      NL ,83,PL,66
655     0834    01 54 00 43         C       DB      NL ,84,PL,67
656     0838    01 55 00 44         C       DB      NL ,85,PL,68
```

```
657    083C  01 56 80 3B      C        DB      NL ,86,PU,59
658    0840  01 57 80 3C      C        DB      NL ,87,PU,60
659                           C
660    0844  02 4C 00 08      C        DB      NU ,76,PL, 8    ; Move numeric keys to upper case on
661    0848  02 4D 00 09      C        DB      NU ,77,PL, 9    ;    outboard key pad:
662    084C  02 4E 00 0A      C        DB      NU ,78,PL,10
663    0850  02 4F 00 05      C        DB      NU ,79,PL, 5    ;        7 8 9
664    0854  02 50 00 06      C        DB      NU ,80,PL, 6    ;        4 5 6
665    0858  02 51 00 07      C        DB      NU ,81,PL, 7    ;        1 2 3
666    085C  02 52 00 02      C        DB      NU ,82,PL, 2    ;        0 . ->|
667    0860  02 53 00 03      C        DB      NU ,83,PL, 3
668    0864  02 54 00 04      C        DB      NU ,84,PL, 4
669    0868  02 55 00 0B      C        DB      NU ,85,PL,11
670    086C  02 56 00 34      C        DB      NU ,86,PL,52
671    0870  02 57 00 0F      C        DB      NU ,87,PL,15
672                           C
673    0874  05 4C 80 3D      C        DB      NA ,76,PU,61    ; Move PF13-24 to ALT case on outboard
674    0878  05 4D 80 3E      C        DB      NA ,77,PU,62    ;    keypad
675    087C  05 4E 80 3F      C        DB      NA ,78,PU,63
676    0880  05 4F 80 40      C        DB      NA ,79,PU,64
677    0884  05 50 80 41      C        DB      NA ,80,PU,65
678    0888  05 51 80 42      C        DB      NA ,81,PU,66
679    088C  05 52 80 43      C        DB      NA ,82,PU,67
680    0890  05 53 80 44      C        DB      NA ,83,PU,68

681    0894  05 54 40 3B      C        DB      NA ,84,PC,59.
682    0898  05 55 40 3C      C        DB      NA ,85,PC,60
683    089C  05 56 40 3D      C        DB      NA ,86,PC,61
684    08A0  05 57 40 3E      C        DB      NA ,87,PC,62
685                           C
686    08A4  00 00 00 00      C        DB      0, 0, 0, 0      ; End of inbound table changes
687                           C
688                           C  ;  Outbound translation table changes
689                           C
690    08A8  92 00 3D         C        DB      092H,L,61       ; Move CURSR SEL to lower case key 61
691    08AB  93 00 3B         C        DB      093H,L,59       ; Move CLEAR to lower case key 59
692    08AE  96 00 00         C        DB.     096H,0, 0       ; Remove dead key
693    08B1  A0 80 42         C        DB      0A0H,U,66       ; Move DUP to upper case key 66
694    08B4  A1 00 42         C        DB      0A1H,L,66       ; Move PA1 to lower case key 66
695    08B7  A2 80 43         C        DB      0A2H,U,67       ; Move Field Mark to upper case key 67
696    08BA  A3 00 43         C        DB      0A3H,L,67       ; Move PA2 to lower case key 67
697                           C
698    08BD  B0 00 4C         C        DB      0B0H,L,76       ; Move F1-24 to outboard keypad
699    08C0  B1 00 4D         C        DB      0B1H,L,77
700    08C3  B2 00 4E         C        DB      0B2H,L,78
701    08C6  B3 00 4F         C        DB      0B3H,L,79
702    08C9  B4 00 50         C        DB      0B4H,L,80
703    08CC  B5 00 51         C        DB      0B5H,L,81
704    08CF  B6 00 52         C        DB      0B6H,L,82
705    08D2  B7 00 53         C        DB      0B7H,L,83
706    08D5  B8 00 54         C        DB      0B8H,L,84
707    08D8  B9 00 55         C        DB      0B9H,L,85
708    08DB  BA 00 56         C        DB      0BAH,L,86
709    08DE  BB 00 57         C        DB      0BBH,L,87
710    08E1  BC 20 4C         C        DB      0BCH,A,76
711    08E4  BD 20 4D         C        DB      0BDH,A,77
712    08E7  BE 20 4E         C        DB      0BEH,A,78
713    08EA  BF 20 4F         C        DB      0BFH,A,79
714    08ED  C0 20 50         C        DB      0C0H,A,80
715    08F0  C1 20 51         C        DB      0C1H,A,81
716    08F3  C2 20 52         C        DB      0C2H,A,82
717    08F6  C3 20 53         C        DB      0C3H,A,83
718    08F9  C4 20 54         C        DB      0C4H,A,84
719    08FC  C5 20 55         C        DB      0C5H,A,85
720    08FF  C6 20 56         C        DB      0C6H,A,86
721    0902  C7 20 57         C        DB      0C7H,A,87
722                           C
723    0905  00 00 00         C        DB      000H,0, 0       ; End of outbound table changes
724                           C
725                           C
726                           C        INCLUDE USEDATA.ASM            ; DATA ENTRY XLAT TABLE
727                           C        SUBTTL  Data Entry Keyboard
728                           C
729                           C
730                           C  ;************************************************************
731                           C  ;*
732                           C  ;*     Data Entry Keyboard Translation Table
733                           C  ;*
734                           C  ;************************************************************
735                           C
736    0908                   C  DATA_ENTRY LABEL BYTE
737                           C
738                           C
739                           C  ;      ALPHA CASE
740                           C
741    0908  00 29 00 3B 80 03 C       DB      L,41,L,59,U, 3,U, 6,U, 9                ; 1- 5
742          80 06 80 09       C
743    0912  80 33 00 F6 00 F2 C       DB      U,51,0,DEC_INP,0,PAUSE_KEY,L,12,L,53    ; 6-10
744          00 0C 00 35       C
745    091C  00 3C 00 3D 00 3E C       DB      L,60,L,61,L,62,L,14,L,15                ; 11-15
746          00 0E 00 0F       C
747    0926  80 10 80 11 80·12 C       DB      U,16,U,17,U,18,U,19,U,20                ; 16-20
748          80 13 80 14       C
749    0930  80 15 80 16 80 17 C       DB      U,21,U,22,U,23,U,24,U,25                ; 21-25
750          80 18 80 19       C
```

```
751  093A  00 3F 00 40 80 0F    C    DB    L,63,L,64,U,15,0,NUM_LOCK,U,30              ; 26-30
752        00 FC 80 1E          C
753  0944  80 1F 80 20 80 21    C    DB    U,31,U,32,U,33,U,34,U,35                    ; 31-35
754        80 22 80 23          C
755  094E  80 24 80 25 80 26    C    DB    U,36,U,37,U,38,U,26,L,65                    ; 36-40
756        80 1A 00 41          C
757  0958  00 42 00 1C 00 FB    C    DB    L,66,L,28,0,NUM_SHIFT,L,67,U,44             ; 41-45
758        00 43 80 2C          C
759  0962  80 2D 80 2E 80 2F    C    DB    U,45,U,46,U,47,U,48,U,49                    ; 46-50
760        80 30 80 31          C
761  096C  80 32 00 33 00 34    C    DB    U,50,L,51,L,52,L,68,0,ALPHA_SHIFT           ; 51-55
762        00 44 00 FA          C
763  0976  00 FB 00 1C 40 46    C    DB    0,RESET,L,28,C,70,L OR B,70,0,0             ; 56-60
764        01 46 00 00          C
765  0980  00 00 00 00 40 4F    C    DB    0,0,0,0,C,79,U,55,0,CLICK                   ; 61-65
766        80 37 00 F7          C
767  098A  00 F4 00 F3 01 52    C    DB    0,CTL_KEY,0,ALT_KEY,L OR B,82,L,03,L,72     ; 66-70
768        00 53 00 48          C
769  0994  00 50 00 4B 00 4D    C    DB    L,80,L,75,L,77,0,ALT_SHIFT,L,57             ; 71-75
770        00 F9 C0 39          C
771  099E  00 00 00 00 00 00    C    DB    0, 0,0, 0,0, 0,0, 0,0, 0                    ; 76-80
772        00 00 00 00          C
773  09A8  00 00 00 00 00 00    C    DB    0, 0,0, 0,0, 0,0, 0,0, 0                    ; 81-85
774        00 00 00 00          C
775  09B2  00 00 00 00 00 00    C    DB    0, 0,0, 0,0, 0,0, 0                         ; 86-89
776        00 00                C
777                             C
778                             C ;  NUM CASE
779                             C
780  09BA  80 29 00 3B 80 04    C    DB    U,41,L,59,U, 4,L,51,U, 5                    ; 1- 5
781        00 33 80 05          C
782  09C4  00 34 00 F6 00 F2    C    DB    L,52,0,DEC_INP,0,PAUSE_KEY,L,12,L,11        ; 6-10
783        00 0C 00 0B          C
784  09CE  00 3C 00 3D 00 3E    C    DB    L,60,L,61,L,62,U,14,L,15                    ; 11-15
785        80 0E 00 0F          C
786  09D8  80 0D 80 0C 80 0B    C    DB    U,13,U,12,U,11,L,26,L,43                    ; 16-20
787        00 1A 00 2B          C
788  09E2  80 2B 00 02 00 03    C    DB    U,43,L, 2,L, 3,L, 4,U, 8                    ; 21-25
789        00 04 80 08          C
790  09EC  00 3F 00 40 80 0F    C    DB    L,63,L,64,U,15,0,NUM_LOCK,L,27              ; 26-30
791        00 FC 00 1B          C
792  09F6  80 34 80 27 00 27    C    DB    U,52,U,39,L,39,U, 7,L,40                    ; 31-35
793        80 07 00 28          C
794  0A00  00 05 00 06 00 07    C    DB    L, 5,L, 6,L, 7,U,27,L,65                    ; 36-40
795        80 1B 00 41          C
796  0A0A  00 42 00 1C 00 FB    C    DB    L,66,L,28,0,NUM_SHIFT,L,67,0, 0             ; 41-45
797        00 43 00 00          C
798  0A14  80 35 80 28 00 0D    C    DB    U,53,U,40,L,13,U, 2,U,10                    ; 46-50
799        80 02 80 0A          C
800  0A1E  00 08 00 09 00 0A    C    DB    L, 8,L, 9,L,10,L,68,0,ALPHA_SHIFT           ; 51-55
801        00 44 00 FA          C
802  0A28  00 F8 00 1C 40 46    C    DB    0,RESET,L,28,C,70,U OR B,70,0,0             ; 56-60
803        81 46 00 00          C
804  0A32  00 00 00 00 40 4F    C    DB    0, 0,0, 0,C,79,U,55,0,CLICK                 ; 61-65
805        80 37 00 F7          C
806  0A3C  00 F4 00 F3 01 52    C    DB    0,CTL_KEY,0,ALT_KEY,L OR B,82,L,83,L,72     ; 66-70
807        00 53 00 48          C
808  0A46  00 50 00 4B 00 4D    C    DB    L,80,L,75,L,77,0,ALT_SHIFT,U,57             ; 71-75
809        00 F9 80 39          C
810  0A50  00 00 00 00 00 00    C    DB    0, 0,0, 0,0, 0,0, 0,0, 0                    ; 76-80
811        00 00 00 00          C
812  0A5A  00 00 00 00 00 00    C    DB    0, 0,0, 0,0, 0,0, 0,0, 0                    ; 81-85
813        00 00 00 00          C
814  0A64  00 00 00 00 00 00    C    DB    0, 0,0, 0,0, 0,0, 0                         ; 86-89
815        00 00                C
816                             C
817                             C ;  PERSONAL COMPUTER CONTROL CASE
818                             C
819  0A6C  00 00 00 00 40 03    C    DB    0, 0,0, 0,C, 3,0, 0,0, 0                    ; 1- 5
820        00 00 00 00          C
821  0A76  00 00 40 07 00 00    C    DB    0, 0,C, 7,0, 0,C,12,0, 0                    ; 6-10
822        40 0C 00 00          C
823  0A80  00 00 40 00 00 00    C    DB    0, 0,C, 0,0, 0,C,14,0, 0                    ; 11-15
824        40 0E 00 00          C
825  0A8A  40 10 40 11 40 12    C    DB    C,16,C,17,C,18,C,19,C,20                    ; 16-20
826        40 13 40 14          C
827  0A94  40 15 40 16 40 17    C    DB    C,21,C,22,C,23,C,24,C,25                    ; 21-25
828        40 18 40 19          C
829  0A9E  40 1A 40 2B 40 47    C    DB    C,26,C,43,C,71,0,NUM_LOCK,C,30              ; 26-30
830        00 FC 40 1E          C
831  0AA8  40 1F 40 20 40 21    C    DB    C,31,C,32,C,33,C,34,C,35                    ; 31-35
832        40 22 40 23          C
833  0AB2  40 24 40 25 40 26    C    DB    C,36,C,37,C,38,C,27,0, 0                    ; 36-40
834        40 1B 00 00          C
835  0ABC  00 00 00 00 00 FB    C    DB    0, 0,0, 0,0,NUM_SHIFT,0, 0,C,44             ; 41-45
836        00 00 40 2C          C
837  0AC6  40 2D 40 2E 40 2F    C    DB    C,45,C,46,C,47,C,48,C,49                    ; 46-50
838        40 30 40 31          C
839  0AD0  40 32 00 00 00 00    C    DB    C,50,0, 0,0, 0,0, 0,0,ALPHA_SHIFT           ; 51-55
840        00 00 00 FA          C
841  0ADA  00 F8 00 00 00 00    C    DB    0,RESET,0, 0,0, 0,0, 0,0, 0                 ; 56-60
842        00 00 00 00          C
843  0AE4  00 00 00 00 00 00    C    DB    0, 0,0, 0,0, 0,C,55,0, 0                    ; 61-65
844        40 37 00 00          C
845  0AEE  00 00 00 00 00 00    C    DB    0, 0,0, 0,0, 0,C OR A,83,C,73               ; 66-70
```

```
846        60 53 40 49           C
847  0AF8  40 51 00 00 00 00     C      DB      C,81,0, 0,0, 0,0,ALT_SHIFT,C,57           ; 71-75
848        00 F9 40 39           C
849  0B02  00 00 00 00 00 00     C      DB      0, 0,0, 0,0, 0,0, 0,0, 0                  ; 76-80
850        00 00 00 00           C
851  0B0C  00 00 00 00 00 00     C      DB      0, 0,0, 0,0, 0,0, 0,0, 0                  ; 81-85
852        00 00 00 00           C
853  0B16  00 00 00 00 00 00     C      DB      0, 0,0, 0,0, 0,0, 0                       ; 86-89
854        00 00                 C
855                              C
856                              C  ;   PERSONAL COMPUTER ALT CASE
857                              C
858  0B1E  00 00 20 02 20 03     C      DB      0, 0,A, 2,A, 3,A, 4,A, 5                  ;  1- 5
859        20 04 20 05           C
860  0B28  20 06 20 07 20 08     C      DB      A, 6,A, 7,A, 8,A, 9,A,10                  ;  6-10
861        20 09 20 0A           C
862  0B32  20 0B 20 0C 20 0D     C      DB      A,11,A,12,A,13,0, 0,0, 0                  ; 11-15
863        00 00 00 00           C
864  0B3C  20 10 20 11 20 12     C      DB      A,16,A,17,A,18,A,19,A,20                  ; 16-20
865        20 13 20 14           C
866  0B46  20 15 20 16 20 17     C      DB      A,21,A,22,A,23,A,24,A,25                  ; 21-25
867        20 18 20 19           C
868  0B50  00 00 00 00 00 00     C      DB      0, 0,0, 0,0, 0,0,NUM_LOCK,A,30            ; 26-30
869        00 FC 20 1E           C
870  0B5A  20 1F 20 20 20 21     C      DB      A,31,A,32,A,33,A,34,A,35                  ; 31-35
871        20 22 20 23           C
872  0B64  20 24 20 25 20 26     C      DB      A,36,A,37,A,38,0, 0,0, 0                  ; 36-40
873        00 00 00 00           C
874  0B6E  00 00 00 00 00 FB     C      DB      0, 0,0, 0,0,NUM_SHIFT,0, 0,A,44           ; 41-45
875        00 00 20 2C           C
876  0B78  20 2D 20 2E 20 2F     C      DB      A,45,A,46,A,47,A,48,A,49                  ; 46-50
877        20 30 20 31           C
878  0B82  20 32 00 00 00 00     C      DB      A,50,0, 0,0, 0,0, 0,0,ALPHA_SHIFT         ; 51-55
879        00 00 00 FA           C
880  0B8C  00 F8 00 00 00 00     C      DB      0,RESET,0, 0,0, 0,0, 0,0, 0               ; 56-60
881        00 00 00 00           C
882  0B96  00 00 00 00 00 00     C      DB      0, 0,0, 0,0, 0,0, 0,0, 0                  ; 61-65
883        00 00 00 00           C
884  0BA0  00 00 00 00 00 00     C      DB      0, 0,0, 0,0, 0,0, 0,0, 0                  ; 66-70
885        00 00 00 00           C
886  0BAA  00 00 00 00 00 00     C      DB      0, 0,0, 0,0, 0,0,ALT_SHIFT,A,57           ; 71-75
887        00 F9 20 39           C
888  0BB4  00 00 00 00 00 00     C      DB      0, 0,0, 0,0, 0,0, 0,0, 0                  ; 76-80
889        00 00 00 00           C
890  0BBE  00 00 00 00 00 00     C      DB      0, 0,0, 0,0, 0,0, 0,0, 0                  ; 81-85
891        00 00 00 00           C
892  0BC8  00 00 00 00 00 00     C      DB      0, 0,0, 0,0, 0,0, 0                       ; 86-89
893        00 00                 C
894                              C
895                              C  ;   ALT CASE
896                              C
897  0BD0  00 01 00 00 00 00     C      DB      L, 1,0, 0,0, 0,0, 0,0, 0                  ;  1- 5
898        00 00 00 00           C
899  0BDA  00 00 00 00 00 00     C      DB      0, 0,0, 0,0, 0,0, 0,0, 0                  ;  6-10
900        00 00 00 00           C
901  0BE4  00 00 00 00 00 00     C      DB      0, 0,0, 0,0, 0,0, 0,L,79                  ; 11-15
902        00 00 00 4F           C
903  0BEE  80 3B 80 3C 80 3D     C      DB      U,59,U,60,U,61,U,62,U,63                  ; 16-20
904        80 3E 80 3F           C
905  0BF8  80 40 80 41 80 42     C      DB      U,64,U,65,U,66,U,67,U,68                  ; 21-25
906        80 43 80 44           C
907  0C02  00 00 00 00 00 47     C      DB      0, 0,0, 0,L,71,0,NUM_LOCK,C,59            ; 26-30
908        00 FC 40 3B           C
909  0C0C  40 3C 40 3D 40 3E     C      DB      C,60,C,61,C,62,C,63,C,64                  ; 31-35
910        40 3F 40 40           C
911  0C16  40 41 40 42 40 43     C      DB      C,65,C,66,C,67,C,68,0, 0                  ; 36-40
912        40 44 00 00           C
913  0C20  00 00 40 1C 00 FB     C      DB      0, 0,C,28,0,NUM_SHIFT,0, 0,A,59           ; 41-45
914        00 00 20 3B           C
915  0C2A  20 3C 20 3D 20 3E     C      DB      A,60,A,61,A,62,A,63,A,64                  ; 46-50
916        20 3F 20 40           C
917  0C34  20 41 20 42 20 43     C      DB      A,65,A,66,A,67,A,68,0,ALPHA_SHIFT         ; 51-55
918        20 44 00 FA           C
919  0C3E  00 F8 40 1C 00 00     C      DB      0,RESET,C,28,0,0,C,71,0, 0                ; 56-60
920        40 47 00 00           C
921  0C48  40 51 00 00 00 00     C      DB      C,81,0, 0,0, 0,0, 0,0, 0                  ; 61-65
922        00 00 00 00           C
923  0C52  00 00 00 00 00 F5     C      DB      0, 0,0, 0,0,SWITCH_MODE,0, 0,L,73         ; 66-70
924        00 00 00 49           C
925  0C5C  00 51 40 4B 40 4D     C      DB      L,81,C,75,C,77,0,ALT_SHIFT,L,57           ; 71-75
926        00 F9 00 39           C
927  0C66  00 00 00 00 00 00     C      DB      0, 0,0, 0,0, 0,0, 0,0, 0                  ; 76-80
928        00 00 00 00           C
929  0C70  00 00 00 00 00 00     C      DB      0, 0,0, 0,0, 0,0, 0,0, 0                  ; 81-85
930        00 00 00 00           C
931  0C7A  00 00 00 00 00 00     C      DB      0, 0,0, 0,0, 0,0, 0                       ; 86-89
932        00 00                 C
933                              C
934                              C  ;   ENCODED KEYSTROKE TRANSLATION TABLE
935                              C
936  0C82  00 00 00 00 00 00     C      DB      0, 0,0, 0,0, 0,0, 0,0, 0,0, 0,0, 0,0, 0   ; 00-07
937        00 00 00 00 00 00     C
938        00 00 00 00           C
939  0C92  00 0E 00 0F 00 00     C      DB      L,14,L,15,0, 0,0, 0,0,L,42,0, 0,0, 0      ; 08-0F
940        00 00 00 00 00 2A     C
```

```
941        00 00 00 00           c
942  OCA2  00 00 00 00 00 00     c   DB   0, 0,0, 0,0, 0,0, 0,0, 0,0, 0,0, 0,0, 0    ; 10-17
943        00 00 00 00 00 00     c
944        00 00 00 00           c
945  OCB2  00 00 00 00 00 00     c   DB   0, 0,0, 0,0, 0,A,63,0, 0,0, 0,0, 0,0, 0    ; 18-1F
946        20 3F 00 00 00 00     c
947        00 00 00 00           c
948  OCC2  C0 4B C0 31 80 2F     c   DB   L,75,U,45,U,47,U, 3,U, 5,L, 4,U,25,U,35   ; 20-27
949        80 03 80 05 00 04     c
950        80 19 80 23           c
951  OCD2  80 32 80 12 00 05     c   DB   U,50,U,18,L, 5,U,16,L,52,L, 9,L,53,L,10   ; 28-2F
952        80 10 00 34 00 09     c
953        00 35 00 0A           c
954  OCE2  80 0A 80 16 80 17     c   DB   U,10,U,22,U,23,U,24,U,36,U,37,U,38,U,51   ; 30-37
955        80 18 80 24 80 25     c
956        80 26 80 33           c
957  OCF2  80 34 80 35 80 20     c   DB   U,52,U,53,U,32,U,33,L, 6,U,48,U,31,U,46   ; 38-3F
958        80 21 00 06 80 30     c
959        80 1F 80 2E           c
960  0D02  00 03 00 1E 00 31     c   DB   L, 3,L,30,L,49,L,47,L,32,L,18,L,33,L,34   ; 40-47
961        00 2F 00 20 00 12     c
962        00 21 00 22           c
963  0D12  00 23 00 17 00 24     c   DB   L,35,L,23,L,36,L,37,L,38,L,51,L,50,L,24   ; 48-4F
964        00 25 00 26 00 33     c
965        00 32 00 18           c
966  0D22  00 19 00 10 00 13     c   DB   L,25,L,16,L,19,L,31,L,20,L,22,L,48,L,17   ; 50-57
967        00 1F 00 14 00 16     c
968        00 30 00 11           c
969  0D32  00 2E 00 15 00 2D     c   DB   L,46,L,21,L,45,0, 0,U,20,0, 0,0, 0,U,17   ; 58-5F
970        00 00 80 14 00 00     c
971        00 00 80 11           c
972  0D42  00 00 00 00 00 00     c   DB   0, 0,0, 0,0, 0,0, 0,0, 0,0, 0,0, 0,0, 0    ; 60-67
973        00 00 00 00 00 00     c
974        00 00 00 00           c
975  0D52  00 00 00 00 00 00     c   DB   0, 0,0, 0,0, 0,0, 0,0, 0,0, 0,0, 0,0, 0    ; 68-6F
976        00 00 00 00 00 00     c
977        00 00 00 00           c
978  0D62  00 00 00 00 00 00     c   DB   0, 0,0, 0,0, 0,0, 0,0, 0,0, 0,0, 0,0, 0    ; 70-77
979        00 00 00 00 00 00     c
980        00 00 00 00           c
981  0D72  00 00 00 00 00 00     c   DB   0, 0,0, 0,0, 0,0, 0,0, 0,0, 0,0, 0,0, 0    ; 78-7F
982        00 00 00 00 00 00     c
983        00 00 00 00           c
984  0D82  80 15 80 22 80 13     c   DB   U,21,U,34,U,19,L,14,L,15,L,28,L,42,A,28   ; 80-87
985        00 0E 00 0F 00 1C     c
986        00 2A 20 1C           c
987  0D92  00 38 20 38 00 39     c   DB   L,56,A,56,L,57,A, 0,BA,0,L, 1,L,39,0, 0   ; 88-8F
988        20 00 02 00 00 01     c
989        00 27 00 00           c
990  0DA2  00 3A 20 3A 00 3B     c   DB   L,58,A,58,L,59,A,59,L,60,A,60,L,61,A,61   ; 90-97
991        20 3B 00 3C 20 3C     c
992        00 3D 20 3D           c
993  0DB2  00 3E 20 3E 00 3F     c   DB   L,62,A,62,L,63,A,63,L,64,A,64,L,65,A,65   ; 98-9F
994        20 3F 00 40 20 40     c
995        00 41 20 41           c
996  0DC2  00 08 00 42 00 07     c   DB   L, 8,L,66,L, 7,L,67,L,68,A,68,L,69,A,69   ; A0-A7
997        00 43 00 44 20 44     c
998        00 45 20 45           c
999  0DD2  00 46 20 46 00 47     c   DB   L,70,A,70,L,71,A,71,L,72,A,72,L,73,A,73   ; A8-AF
1000       20 47 00 48 20 48     c
1001       00 49 20 49           c
1002 0DE2  00 02 00 0B 00 0C     c   DB   L, 2,L,11,L,12,L,13,L,26,L,27,L,40,L,41   ; B0-B7
1003       00 0D 00 1A 00 1B     c
1004       00 28 00 29           c
1005 0DF2  00 2C 00 36 00 00     c   DB   L,44,L,54,0, 0,0, 0,0, 0,0, 0,0, 0,0, 0    ; B8-BF
1006       00 00 00 00 00 00     c
1007       00 00 00 00           c
1008 0E02  00 00 00 00 00 00     c   DB   0, 0,0, 0,0, 0,0, 0,0, 0,0, 0,0, 0,0, 0    ; C0-C7
1009       00 00 00 00 00 00     c
1010       00 00 00 00           c
1011 0E12  00 00 00 00 00 00     c   DB   0, 0,0, 0,0, 0,0, 0,0, 0,0, 0,0, 0,0, 0    ; C8-CF
1012       00 00 00 00 00 00     c
1013       00 00 00 00           c
1014 0E22  00 00 00 00 00 00     c   DB   0, 0,0, 0,0, 0,0, 0,0, 0,0, 0,0, 0,0, 0    ; D0-D7
1015       00 00 00 00 00 00     c
1016       00 00 00 00           c
1017 0E32  00 00 00 00 00 00     c   DB   0, 0,0, 0,0, 0,0, 0,0, 0,0, 0,0, 0,0, 0    ; D8-DF
1018       00 00 00 00 00 00     c
1019       00 00 00 00           c
1020 0E42  00 00 00 00 00 00     c   DB   0, 0,0, 0,0, 0,0, 0,0, 0,0, 0,0, 0,0, 0    ; E0-E7
1021       00 00 00 00 00 00     c
1022       00 00 00 00           c
1023 0E52  00 00 00 00 00 00     c   DB   0, 0,0, 0,0, 0,0, 0,0, 0,0, 0,0, 0,0, 0    ; E8-EF
1024       00 00 00 00 00 00     c
1025       00 00 00 00           c
1026 0E62  00 00 00 00 00 00     c   DB   0, 0,0, 0,0, 0,0, 0,0, 0,0, 0,0, 0,0, 0    ; F0-F7
1027       00 00 00 00 00 00     c
1028       00 00 00 00           c
1029 0E72  00 00 00 00 00 00     c   DB   0, 0,0, 0,0, 0,0, 0,0, 0,0, 0,0, 0,0, 0    ; F8-FF
1030       00 00 00 00 00 00     c
1031       00 00 00 00           c
1032                             c
1033                             c
1034                             c   INCLUDE USEKP.ASM              ; DATA ENTRY KEYPUNCH MODS
1035                             c   SUBTTL  Modifications For Data Entry Keypunch Keyboard
```

```
1036                              C
1037                              C
1038                              C  ;******************************************************
1039                              C  ;*
1040                              C  ;*    Modifications required to change Data Entry keyboard into
1041                              C  ;*    a Data Entry Keypunch keyboard
1042                              C  ;*
1043                              C  ;******************************************************
1044                              C
1045      0E82                    C  KP      LABEL   WORD
1046                              C
1047                              C  ;       Inbound translation table changes
1048                              C
1049      0E82  01 0B 00 F8       C          DB      NL ,11, 0,RESET   ; Put RESET on key 11
1050      0E86  02 0B 00 F8       C          DB      NU ,11, 0,RESET
1051      0E8A  03 0B 00 F8       C          DB      NPC,11, 0,RESET
1052      0E8E  04 0B 00 F8       C          DB      NPA,11, 0,RESET
1053      0E92  05 0B 00 F8       C          DB      NA ,11, 0,RESET
1054                              C
1055      0E96  01 0C 00 3C       C          DB      NL ,12,PL,60      ; Put PF2 on key 12
1056      0E9A  02 0C 00 3C       C          DB      NU ,12,PL,60
1057      0E9E  04 0C 20 0B       C          DB      NPA,12,PA,11
1058                              C
1059      0EA2  01 0D 00 3D       C          DB      NL ,13,PL,61      ; Put PF3 on key 13
1060      0EA6  02 0D 00 3D       C          DB      NU ,13,PL,61
1061      0EAA  04 0D 20 0C       C          DB      NPA,13,PA,12
1062                              C
1063      0EAE  01 0E 00 3E       C          DB      NL ,14,PL,62      ; Put PF4 on key 14
1064      0EB2  02 0E 00 3E       C          DB      NU ,14,PL,62
1065      0EB6  03 0E 00 00       C          DB      NPC,14, 0, 0
1066      0EBA  04 0E 20 0D       C          DB      NPA,14,PA,13
1067                              C
1068      0EBE  01 1A 00 1C       C          DB      NL ,26,PL,28      ; Put ENTER on key 26
1069      0EC2  02 1A 00 1C       C          DB      NU ,26,PL,28
1070      0EC6  05 1A 40 1C       C          DB      NA ,26,PC,28
1071                              C
1072      0ECA  01 1B 00 3F       C          DB      NL ,27,PL,63      ; Put PF5 on key 27
1073      0ECE  02 1B 00 3F       C          DB      NU ,27,PL,63
1074                              C
1075      0ED2  01 28 00 40       C          DB      NL ,40,PL,64      ; Put PF6 on key 40
1076      0ED6  02 28 00 40       C          DB      NU ,40,PL,64
1077                              C
1078      0EDA  01 29 00 41       C          DB      NL ,41,PL,65      ; Put PF7 on key 41
1079      0EDE  02 29 00 41       C          DB      NU ,41,PL,65
1080                              C
1081      0EE2  01 2A 00 42       C          DB      NL ,42,PL,66      ; Put PF8 on key 42
1082      0EE6  02 2A 00 42       C          DB      NU ,42,PL,66
1083      0EEA  05 2A 00 00       C          DB      NA ,42, 0, 0
1084                              C
1085      0EEE  01 36 00 0E       C          DB      NL ,54,PL,14      ; Put Backspace on key 54
1086      0EF2  02 36 80 0E       C          DB      NU ,54,PU,14
1087      0EF6  03 36 40 0E       C          DB      NPC,54,PC,14
1088                              C
1089      0EFA  01 38 00 44       C          DB      NL ,56,PL,68      ; Put PF10 on key 56
1090      0EFE  02 38 00 44       C          DB      NU ,56,PL,68
1091      0F02  03 38 00 00       C          DB      NPC,56, 0, 0
1092      0F06  04 38 00 00       C          DB      NPA,56, 0, 0
1093      0F0A  05 38 00 00       C          DB      NA ,56, 0, 0
1094                              C
1095      0F0E  00 00 00 00       C          DB      0, 0, 0, 0        ; End of inbound table changes
1096                              C
1097                              C  ;       Outbound translation table changes
1098                              C
1099      0F12  08 00 36          C          DB      008H,L,54         ; Put Backspace on key 54
1100      0F15  83 00 36          C          DB      083H,L,54
1101      0F18  0D 00 39          C          DB      00DH,L,57         ; Put RETURN on key 57
1102      0F1B  86 00 39          C          DB      086H,L,57
1103      0F1E  88 00 0B          C          DB      088H,L,11         ; Put RESET on key 11
1104      0F21  8A 00 1A          C          DB      08AH,L,26         ; Put ENTER on key 26
1105      0F24  B1 00 0C          C          DB      0B1H,L,12         ; Put PF2 on key 12
1106      0F27  B2 00 0D          C          DB      0B2H,L,13         ; Put PF3 on key 13
1107      0F2A  B3 00 0E          C          DB      0B3H,L,14         ; Put PF4 on key 14
1108      0F2D  B4 00 1B          C          DB      0B4H,L,27         ; Put PF5 on key 27
1109      0F30  B5 00 28          C          DB      0B5H,L,40         ; Put PF6 on key 40
1110      0F33  B6 00 29          C          DB      0B6H,L,41         ; Put PF7 on key 41
1111      0F36  B7 00 2A          C          DB      0B7H,L,42         ; Put PF8 on key 42
1112      0F39  B9 00 38          C          DB      0B9H,L,56         ; Put PF10 on key 56
1113                              C
1114      0F3C  00 00 00          C          DB      000H,0, 0         ; End of outbound table changes
1115                              C
1116                              C
1117
1118      0F3F                       TABLES  ENDS
1119                                         END
```

We claim:

1. A personal computer attachment for a display station of the type that communicates with a host computer for the purpose of accessing data and running programs on said host computer, said display station having a display unit and a keyboard, said display unit including display means for displaying an image, buffer means for supplying image data to said display means, keyboard adapter means for receiving keyboard signals from said keyboard, feature bus means for connecting optional features to said display station, and means for providing an interface to a controller external to said display station and for providing a communication link between said buffer means, said keyboard adapter means and said feature bus means, said personal computer attachment comprising:

a personal computer system unit including a system bus, a microprocessor, memory means and keyboard adapter connected to said system bus, and input/output means connected to said system bus for providing an interface to external devices, said input/output means including a display adapter having a buffer for supplying image data to a display means, switch means disposed between said display means and said buffer means in said display station and also connected to said display adapter for selectively supplying image data from said buffer means or said display adapter to said display means, and an attachment adapter including an input/output interface, a switch control, a two-way keyboard adapter, and a feature bus adapter, said keyboard being connected to said two-way keyboard adapter, and each of said switch control, two-way keyboard adapter and feature bus adapter communicating with said system bus of said personal computer system unit via said input/output interface, said switch control further being connected to a control input of said switch means, said two-way keyboard adapter further being connected to said keyboard adapter means in said display station and to said keyboard adapter in said personal computer system unit, and said feature bus adapter further being connected to said feature bus means in said display station whereby keystroke signals from said keyboard are transmitted by said two-way keyboard adapter via said input/output interface and system bus to said memory means of said personal computer for interpretation by said microprocessor and then retransmitted back to said two-way keyboard adapter and either to said keyboard adapter means in said display station or to said keyboard adapter in said personal computer system unit and said switch control being responsive to a unique keystroke signal generated by said keyboard to control said switch means.

2. An attachment as recited in claim 1 wherein said input/output means in said personal computer system unit further includes a bulk storage media adapter and a printer adapter, said attachment further including bulk storage media means and printer means connected respectively to said bulk storage media adapter and said printer adapter.

3. An attachment as recited in claim 1 further comprising means responsive to a keyboard command for unloading said buffer means in said display station and transmitting the image data that was stored in said buffer means to said personal computer via said feature bus means and said feature bus adapter.

4. An attachment as recited in claim 1 further comprising means for transmitting data from a host computer to either said buffer means in said display unit or said personal computer system unit via said feature bus means and said feature bus adapter.

5. An attachment as recited in claim 1 further comprising means for transmitting data from said personal computer to said host computer via said feature bus adapter and said feature bus means, said data being generated either by signals from said keyboard or a program run on said personal computer.

6. An attachment as recited in claim 1 wherein said two-way keyboard adapter includes logic that accepts keystroke information from said keyboard and directs it either to said display unit or said personal computer, said logic being powered by said display unit so that if there is a failure in said personal computer, the operator can switch to a host mode of operation using a keystroke sequence.

7. In a data processing system of the type having a central host computer and a plurality of display stations, each of said display stations having a keyboard and a display unit, said display unit having a display means for displaying an image, first buffer means for supplying image data to said display means, first keyboard adapter means for receiving signals from said keyboard, and interface means for providing an interface between said host computer and said buffer means and keyboard adapter means, the improvement comprising a personal computer attachment for at least one of said display stations, said personal computer attachment comprising:

microprocessor means, memory means, second keyboard adpater means and input/output means, each connected to a common system bus, said system bus being connected to said interface means and said input/output means including display adapter means having second buffer means for supplying image data to said display means, switch means disposed between said display means and said first and second buffer means for selectively supplying image data from said first or second buffer means to said display means, two-way keyboard adapter means disposed between said keyboard and said first and second keyboard adapter means for selectively supplying signals from said keyboard to said first or second keyboard adapter means, and control means responsive to an operator input for controlling said switch means and said two-way keyboard adapter means for operating said display station in a host mode or a personal computer mode wherein the image data from said first buffer means is supplied to said display means and the signals from said keyboard are supplied to said first keyboard adapter means in said host mode, and wherein the image data from said second buffer means is supplied to said display means and the signals from said keyboard are supplied to said second keyboard adapter means in said personal computer mode.

8. The personal computer attachment as recited in claim 7 wherein said input/output means further comprises printer means and print command means responsive to an operator input for selectively printing the content of said first or second buffer means by said printer means.

9. The personal computer attachment as recited in claim 7 wherein said input/output means further comprises bulk storage means and copy command means responsive to an operator input for selectively copying the content of said first or second buffer means in said bulk storage means.

10. The personal computer attachment as recited in claim 7 further comprising file transfer means for transferring files between said host computer and said personal computer.

11. The personal computer attachment as recited in claim 7 wherein said display means is a monochrome display and said second buffer means is a color graphics adapter means providing at least three color output signals, said switch means including color to grey scale conversion means for converting said color output signals to variable intensity level signals which are supplied to said display means in the personal computer mode.

12. The personal computer attachment as recited in claim 7 wherein said display means is a monochrome display and said second buffer means may be either a monochrome adapter means or a color graphics adapter means, said color graphics means providing at least three color output signals, said switch means including color to grey scale conversion means for converting said color output signals to variable intensity level signals, and display adapter detection means connected to said second buffer means for automatically detecting whether said second buffer means is a monochrome adapter means or a color graphics adapter means and, if said second buffer means is a monochrome adapter means, inhibiting the output of said grey scale conversion means to said display means in the personal computer mode.

13. The personal computer attachment as recited in claim 12 wherein said display means requires synchronizing pulses of longer duration than those supplied by either said monochrome adapter means or said color graphics adapter means, said switch means further including pulse stretching means connectable to either said monochrome adpater means or said color graphics adapter means for generating synchronizing bulses of the required duration for said display means.

14. The personal computer attachment as recited in claim 12 wherein the horizontal frequency signals from said monochrome adapter mseans and said color graphics adapter means are different, further comprising means in said display unit responsive to said display adapter detection means for changing the ramp slope of said display means to accomodate the horizontal frequency signal of the detected adapter means.

15. A personal computer attachment for a display station of the type that communicates with a host computer, said display station having a display unit and a keyboard, said display unit having display means for displaying image data and first buffer means for receiving image data from said host computer and supplying said image data to said display means, said attachment comprising:

a personal computer including a system bus, a microprocessor and memory means connected to said system bus, said memory means including second buffer means for storing image data, switch means connected to said display means and to said first buffer means in said display unit and to said second buffer means in said personal computer for selectively supplying image data from said first or second buffer means to said display means, bus means for connecting said personal computer system bus to said host computer through said display station for providing a communications link therebetween for selectively transmitting data between said host computer and said personal computer, keyboard means for selectively connecting said keyboard to said host computer via said display station or to said personal computer system bus, and control means responsive to keyboard inputs for controlling said switch means, said bus means and said keyboard means.

16. A personal computer attachment for a display station of the type that communicates with a host computer, said display station having a display unit and a keyboard, said display unit having display means for displaying image data and first buffer means for receiving image data from said host computer and supplying said image data to said display means, said attachment comprising:

a personal computer including a system bus, a microprocessor and memory means connected to said system bus, said memory means including second buffer means for storing image data, switch means connected to said display means and to said first buffer means in said display unit and to said second buffer means in said personal computer for selectively supplying image data from said first or second buffer means to said display means, bus means for selectively connecting said personal computer system bus to said first buffer means for transmitting data in said first buffer means to said memory means of said personal computer, keyboard means for selectively connecting said keyboard to said host computer via said display station or to said personal computer system bus, and control means responsive to keyboard inputs for controlling said switch means, said bus means and said keyboard means.

* * * * *